United States Patent
Crampton

(10) Patent No.: US 7,591,078 B2
(45) Date of Patent: Sep. 22, 2009

(54) CMM ARM WITH EXOSKELETON

(75) Inventor: Stephen James Crampton, Waltham Cross (GB)

(73) Assignee: 3d Scanners Ltd., Derby (GB)

( * ) Notice: Subject to any disclaimer, the term of this patent is extended or adjusted under 35 U.S.C. 154(b) by 0 days.

(21) Appl. No.: 12/135,621

(22) Filed: Jun. 9, 2008

(65) Prior Publication Data

US 2008/0235970 A1    Oct. 2, 2008

Related U.S. Application Data

(63) Continuation of application No. 10/988,398, filed on Nov. 12, 2004, now Pat. No. 7,395,606, which is a continuation-in-part of application No. PCT/GB2004/001827, filed on Apr. 26, 2004.

(30) Foreign Application Priority Data

| Apr. 28, 2003 | (GB) | ................................. | 0309662.5 |
| Jun. 5, 2003 | (GB) | ................................. | 0312963.2 |
| Nov. 26, 2003 | (GB) | ................................. | 0327503.9 |
| Mar. 10, 2004 | (GB) | ................................. | 0405396.3 |

(51) Int. Cl.
*G01B 5/008* (2006.01)

(52) U.S. Cl. .......................................... 33/503; 33/559

(58) Field of Classification Search ................ 33/1 PT, 33/1 N, 551, 553, 554, 555, 556, 558, 559, 33/561

See application file for complete search history.

(56) References Cited

U.S. PATENT DOCUMENTS

| 3,994,798 A | 11/1976 | Westerlund |
| 4,119,212 A | 10/1978 | Flemming |
| 4,505,049 A | 3/1985 | Kuno et al. |
| 4,573,271 A | 3/1986 | Hamilton et al. |
| 4,593,470 A | 6/1986 | Davies |
| 4,606,696 A | 8/1986 | Slocum |
| 4,676,002 A | 6/1987 | Slocum |
| 4,679,331 A | 7/1987 | Koontz |
| 4,680,868 A | 7/1987 | Orr et al. |
| 4,932,131 A | 6/1990 | McMurty et al. |
| 4,964,220 A | 10/1990 | Orr et al. |
| 5,012,587 A | 5/1991 | David |
| 5,339,531 A | 8/1994 | Ogiwara |
| 5,392,384 A | 2/1995 | Tounai et al. |
| 5,402,582 A | 4/1995 | Raab |
| 5,430,948 A | 7/1995 | Vander Wal, III |
| 5,687,293 A | 11/1997 | Snall |
| 5,829,148 A | 11/1998 | Eaton |

(Continued)

FOREIGN PATENT DOCUMENTS

BE      100768      3/1989

(Continued)

*Primary Examiner*—G. Bradley Bennett
(74) *Attorney, Agent, or Firm*—Baker Botts LLP

(57) ABSTRACT

Apparatus for a CMM Arm with Exoskeleton is provided comprising an Internal CMM Arm with a base end and a probe end, and an Exoskeleton driving the Internal CMM Arm through a plurality of transmission. One or more contact probes, optical probes and tools are mounted on the probe end. The CMM Arm with Exoskeleton is provided in manually operable and automated embodiments. The CMM Arm with Exoskeleton is operable for accurate measurement or for performing accurate operations. Methods are provided for operation of the CMM Arm with Exoskeleton.

28 Claims, 81 Drawing Sheets

U.S. PATENT DOCUMENTS

| | | |
|---|---|---|
| 6,078,846 A | 6/2000 | Greer et al. |
| 6,166,811 A | 12/2000 | Long et al. |
| 6,253,458 B1 | 7/2001 | Raab et al. |
| 6,298,569 B1 | 10/2001 | Raab et al. |
| 6,321,137 B1 | 11/2001 | De Smet |
| 6,366,831 B1 | 4/2002 | Raab |
| 6,519,860 B1 | 2/2003 | Bieg et al. |
| 6,535,794 B1 | 3/2003 | Raab |
| 6,931,745 B2 | 8/2005 | Granger |
| 6,973,734 B2 | 12/2005 | Raab et al. |
| 7,395,606 B2 * | 7/2008 | Crampton .................... 33/503 |
| 2002/0087233 A1 | 7/2002 | Raab et al. |
| 2002/0104227 A1 | 8/2002 | Trull et al. |
| 2003/0167647 A1 | 9/2003 | Raab et al. |
| 2005/0150123 A1 | 7/2005 | Eaton |
| 2005/0151963 A1 | 7/2005 | Pulla et al. |

FOREIGN PATENT DOCUMENTS

| | | |
|---|---|---|
| DE | 3420834 | 12/1985 |
| GB | 2036376 | 6/1980 |
| JP | 2002-331489 | 11/2002 |
| WO | WO97/05449 | 2/1997 |
| WO | WO98/27887 | 7/1998 |
| WO | WO01/63202 | 8/2001 |
| WO | WO01/77613 | 10/2001 |
| WO | WO02/22317 | 3/2002 |

* cited by examiner

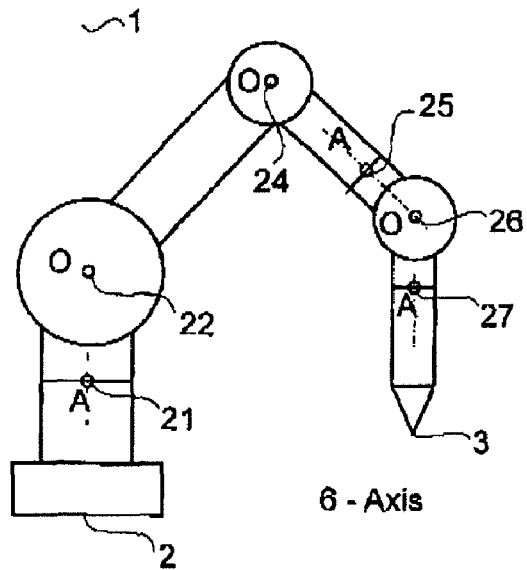
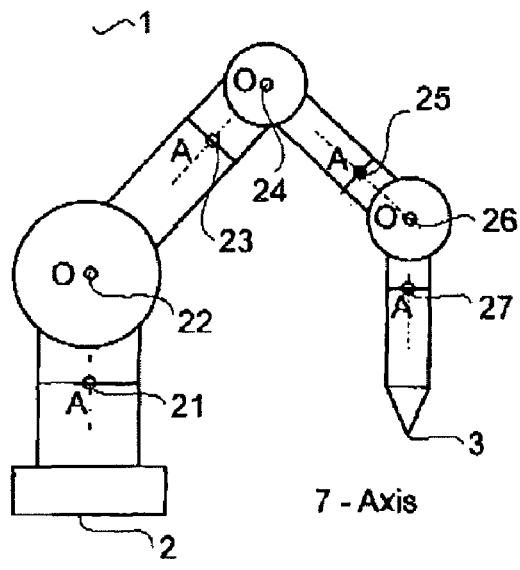
Fig. 1A — 6 - Axis
Fig. 1B — 7 - Axis
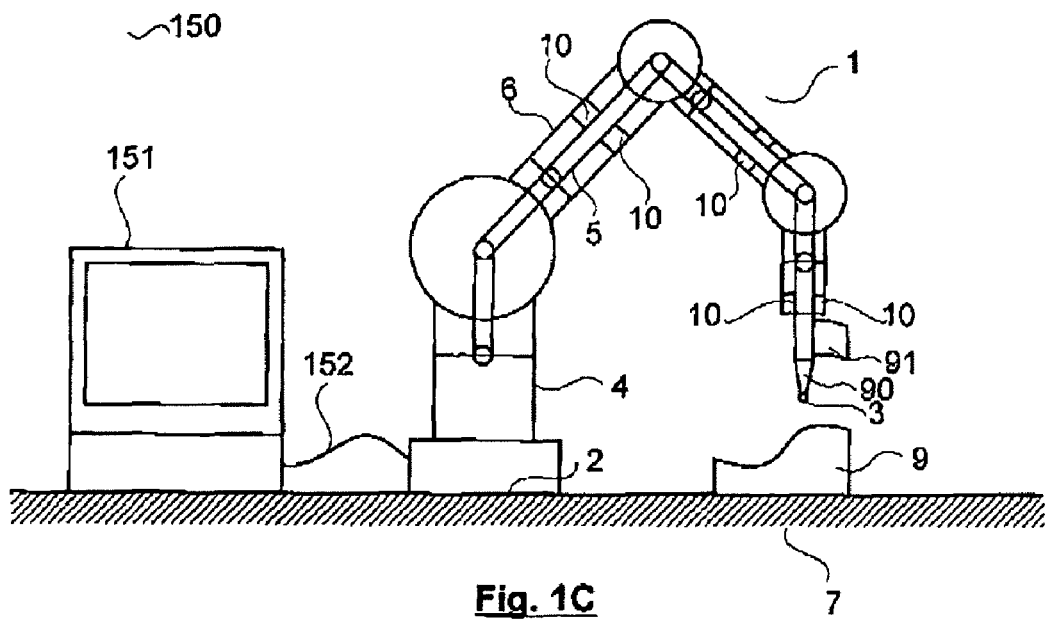
Fig. 1C

Fig. 5C1

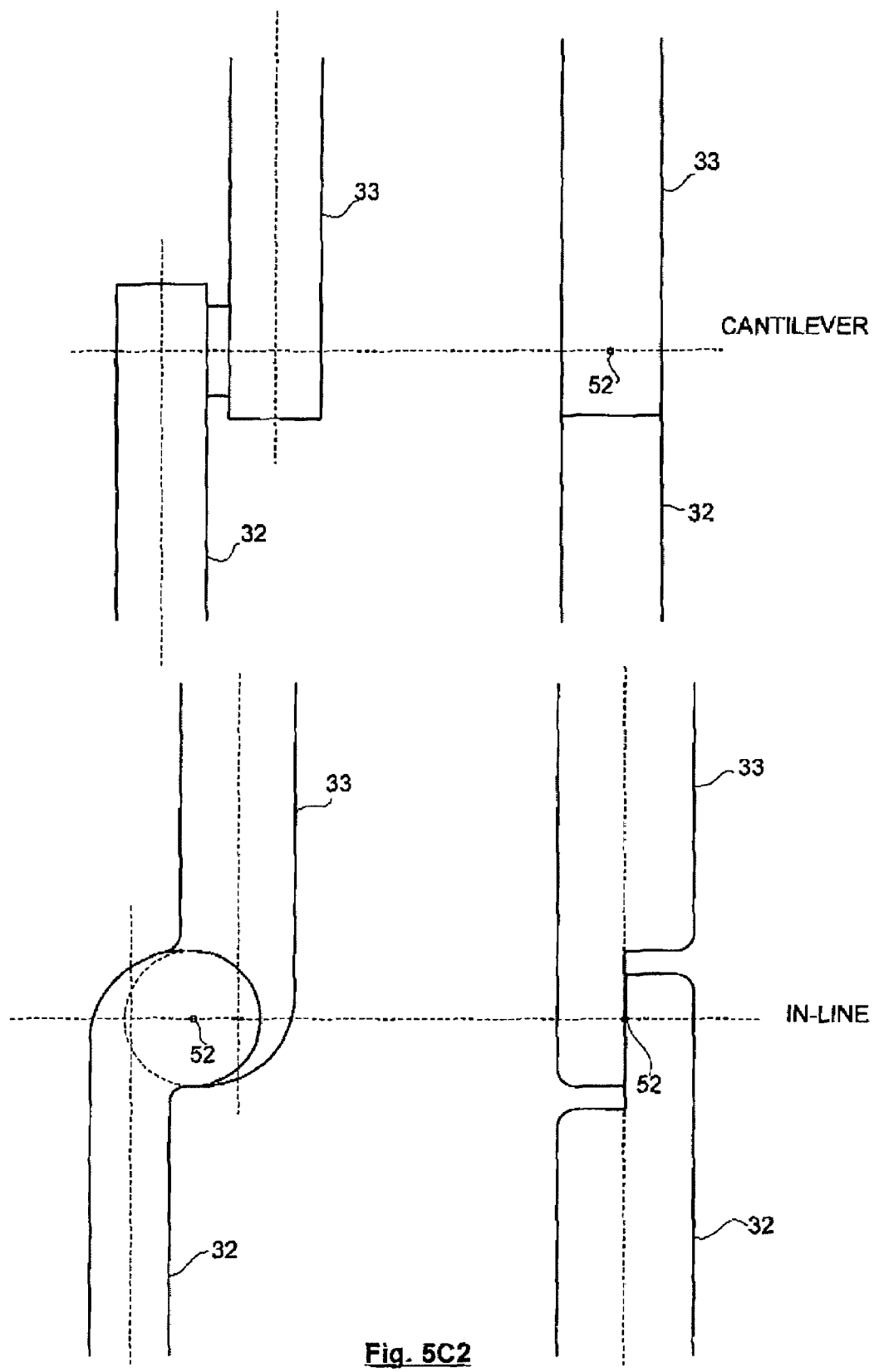
Fig. 5C2

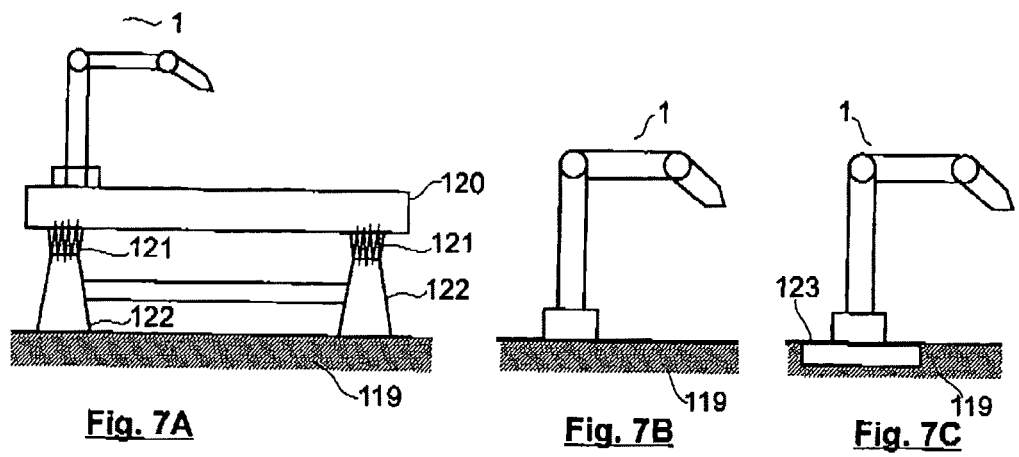
Fig. 7A   Fig. 7B   Fig. 7C
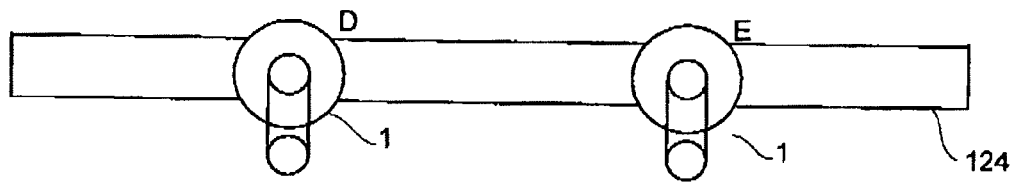
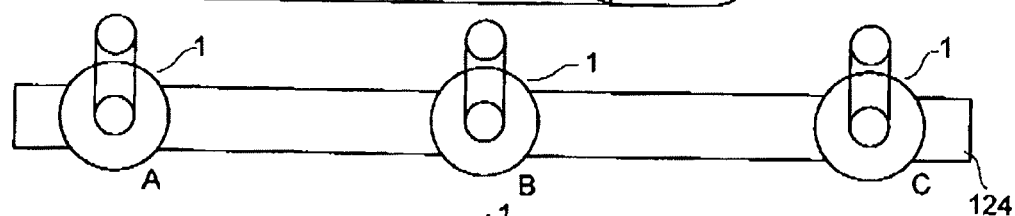
Fig. 7D
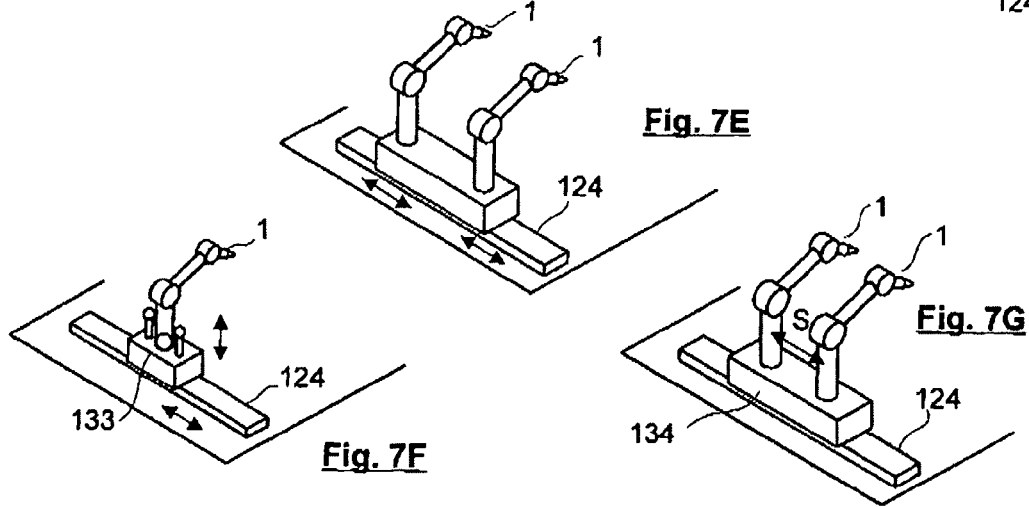
Fig. 7E
Fig. 7F
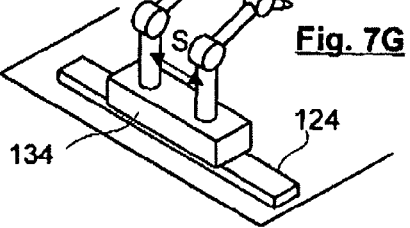
Fig. 7G

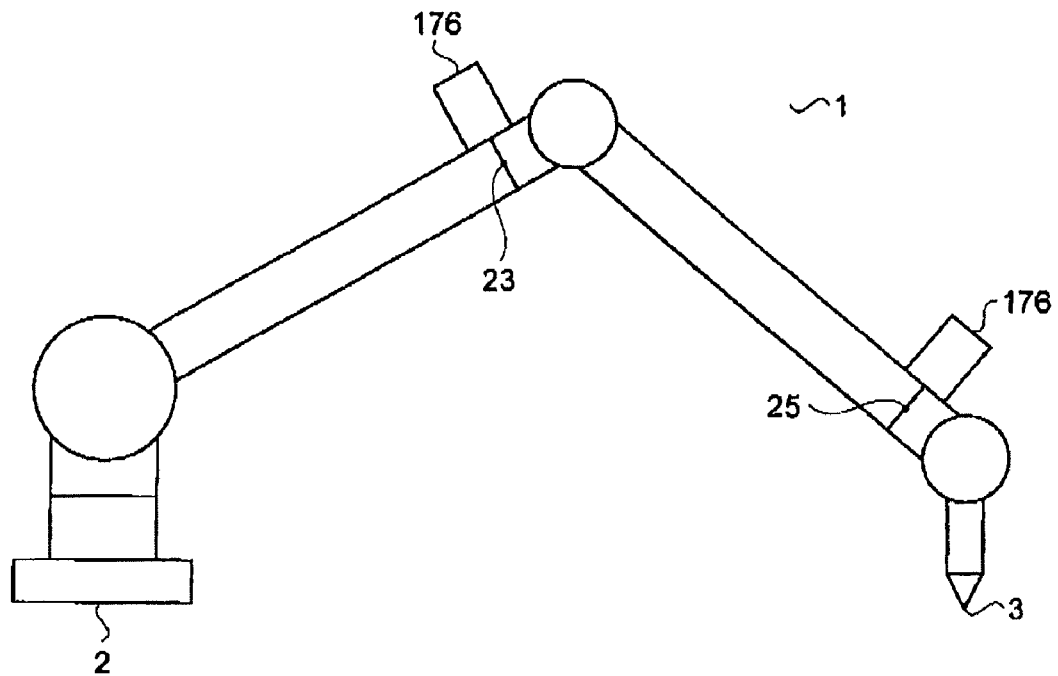
HIGH INERTIA
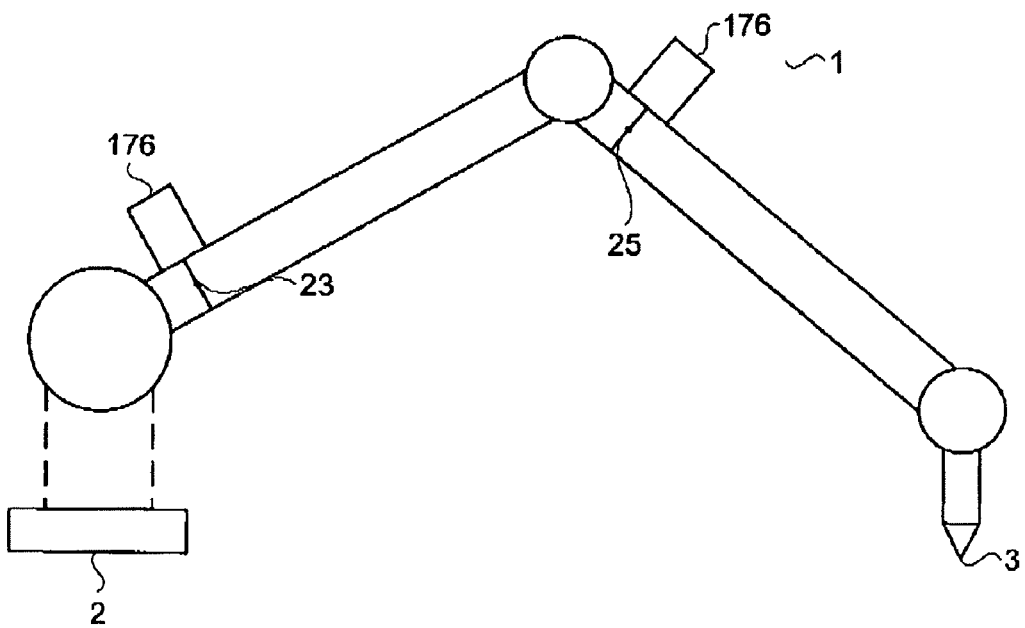
LOW INERTIA
Fig. 13B

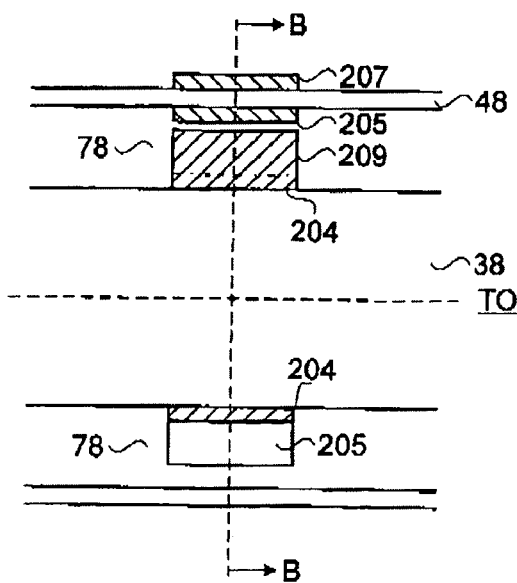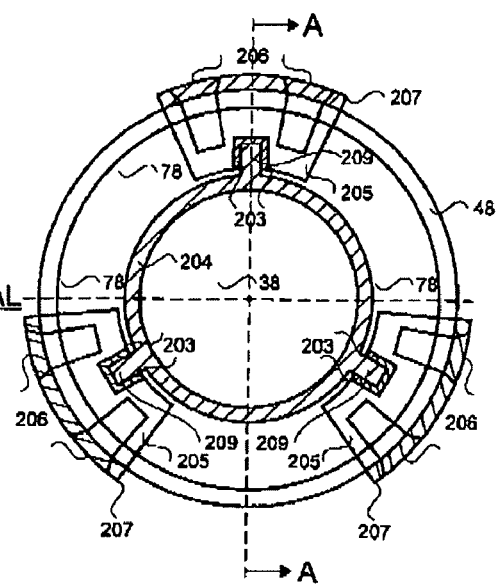
Fig. 18

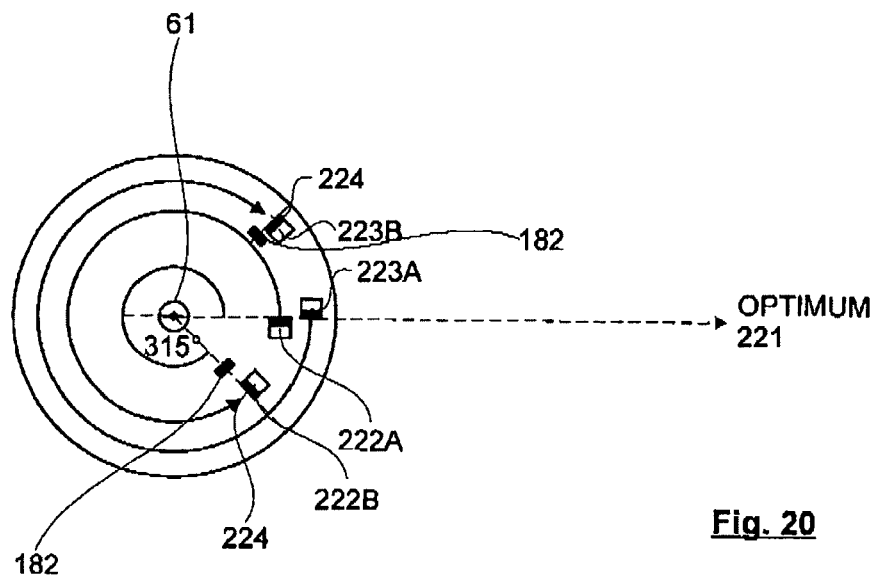
Fig. 20
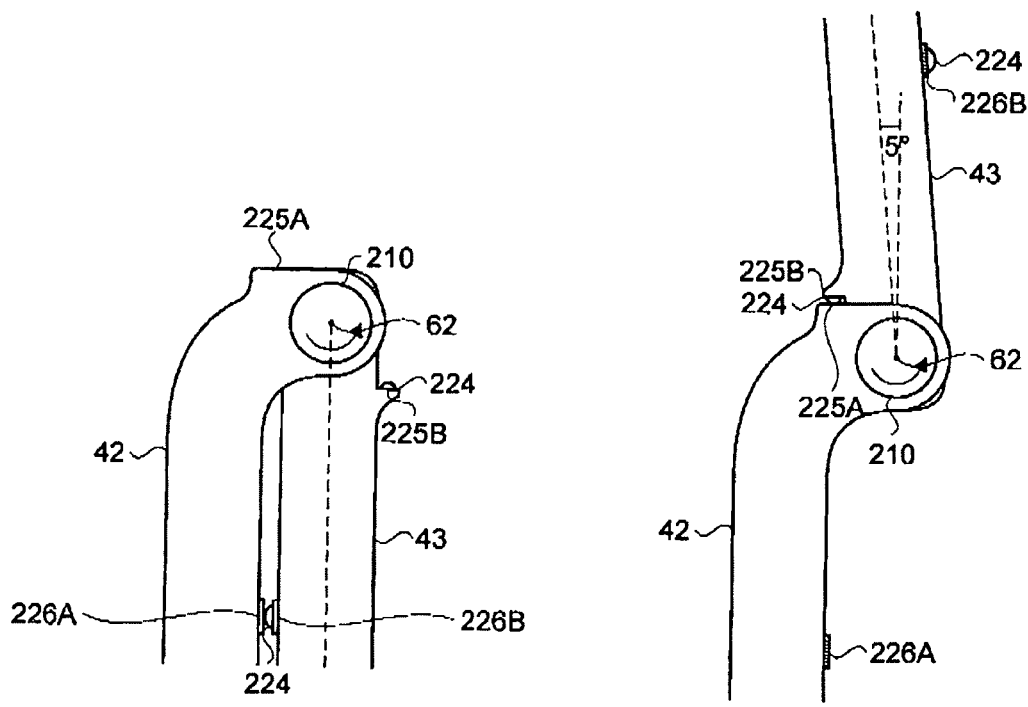
Fig. 21A　　　　Fig. 21B

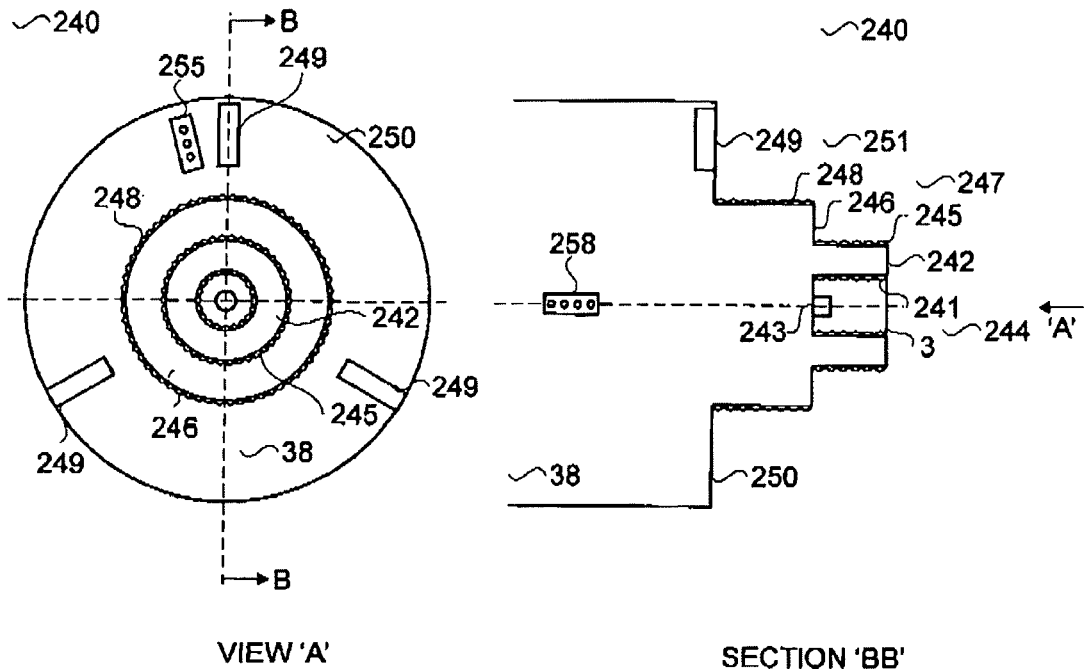
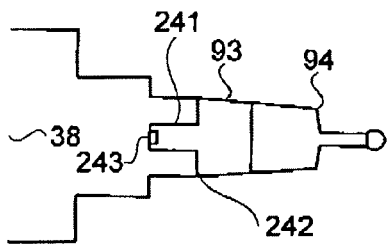
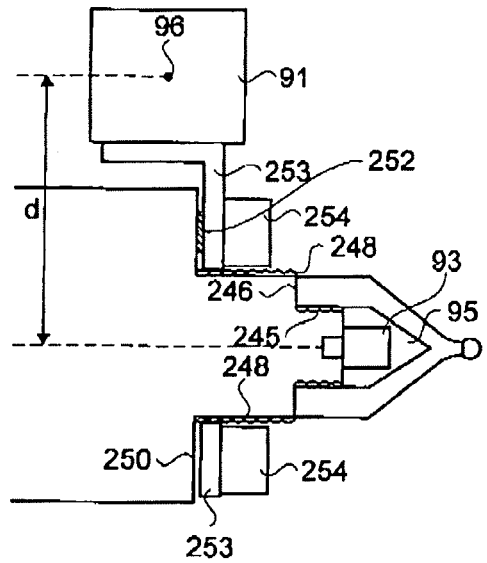
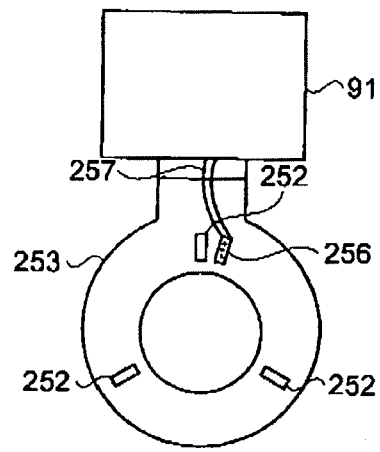
VIEW 'A'    SECTION 'BB'
Fig. 23
Fig. 24
Fig. 25
Fig. 26

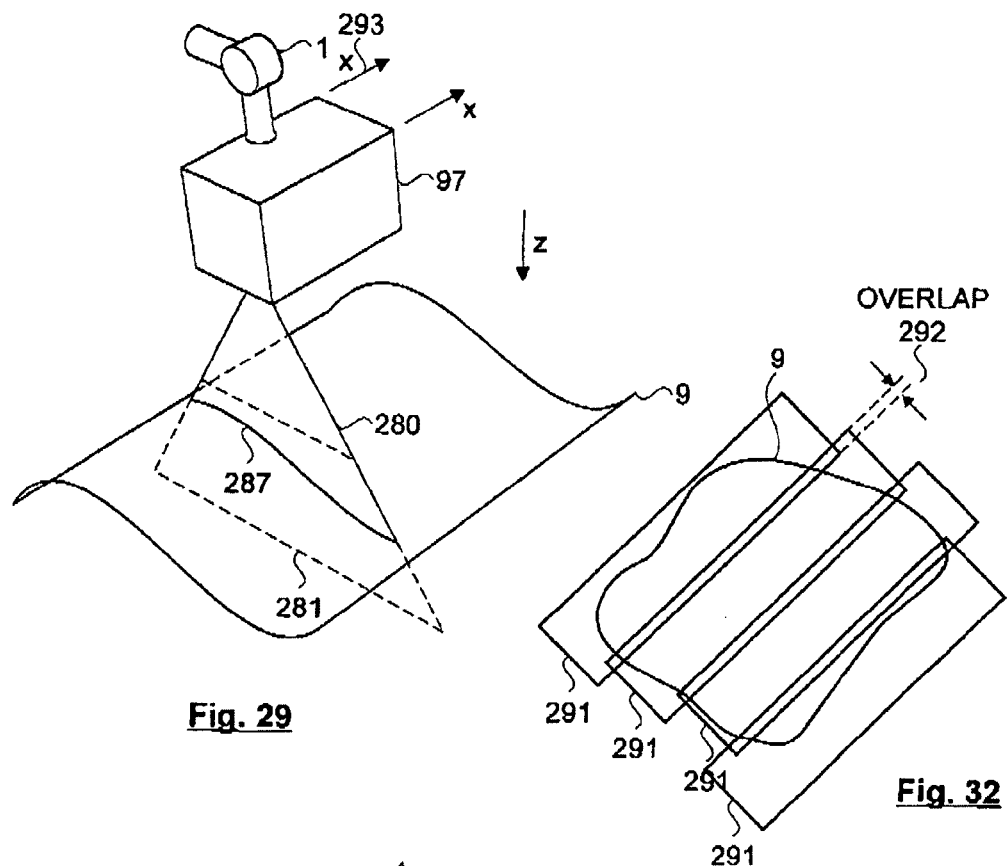
Fig. 29
Fig. 32
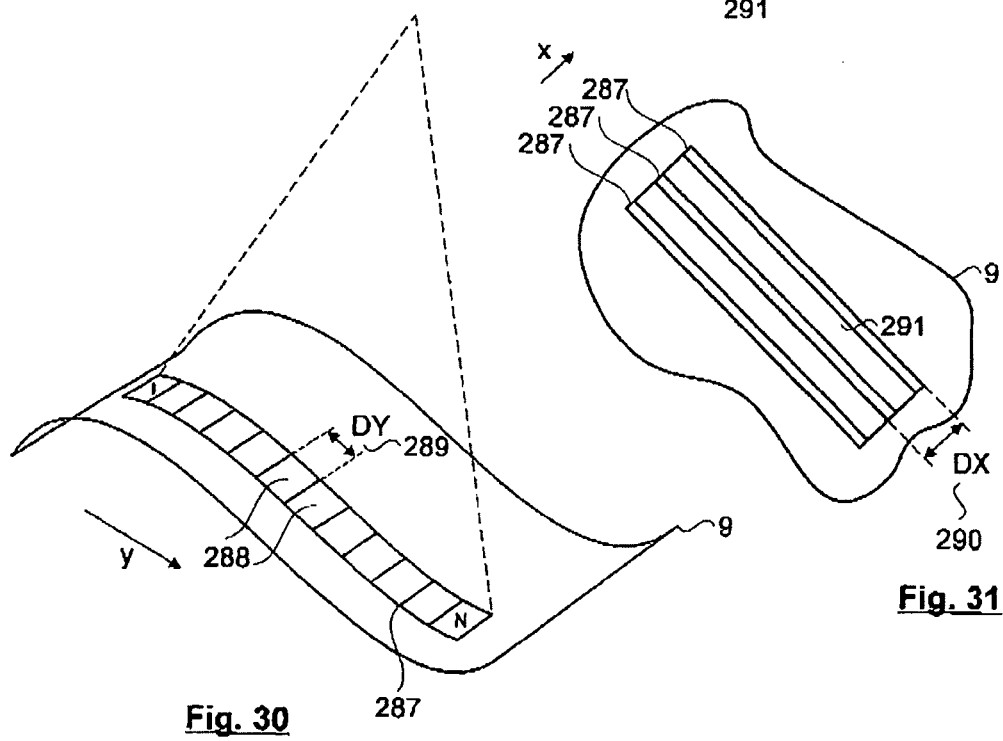
Fig. 30
Fig. 31

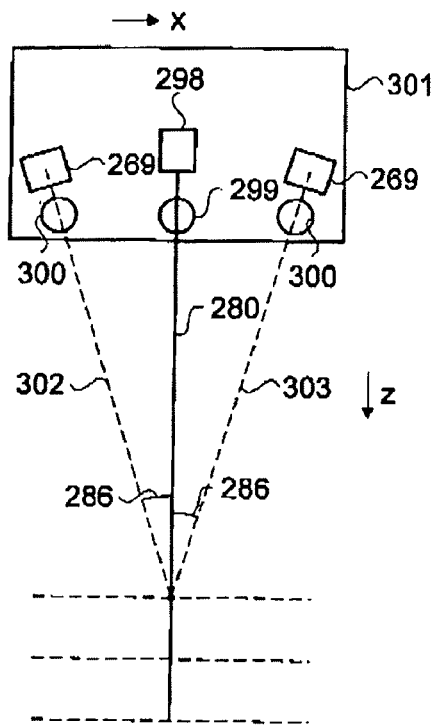
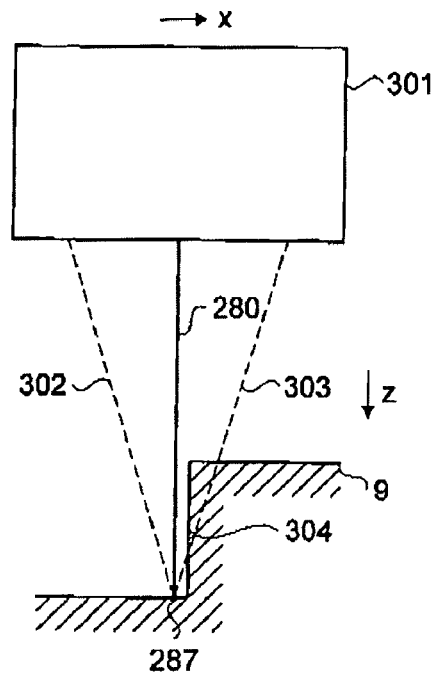
Fig. 33A    Fig. 33B
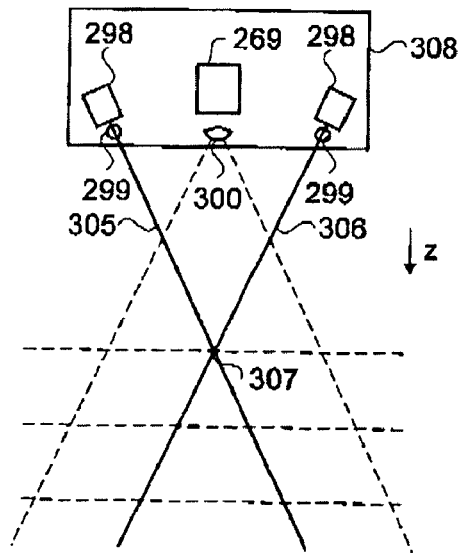
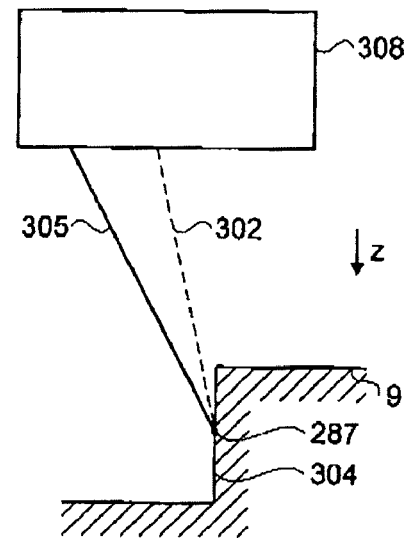
Fig. 34A    Fig. 34B

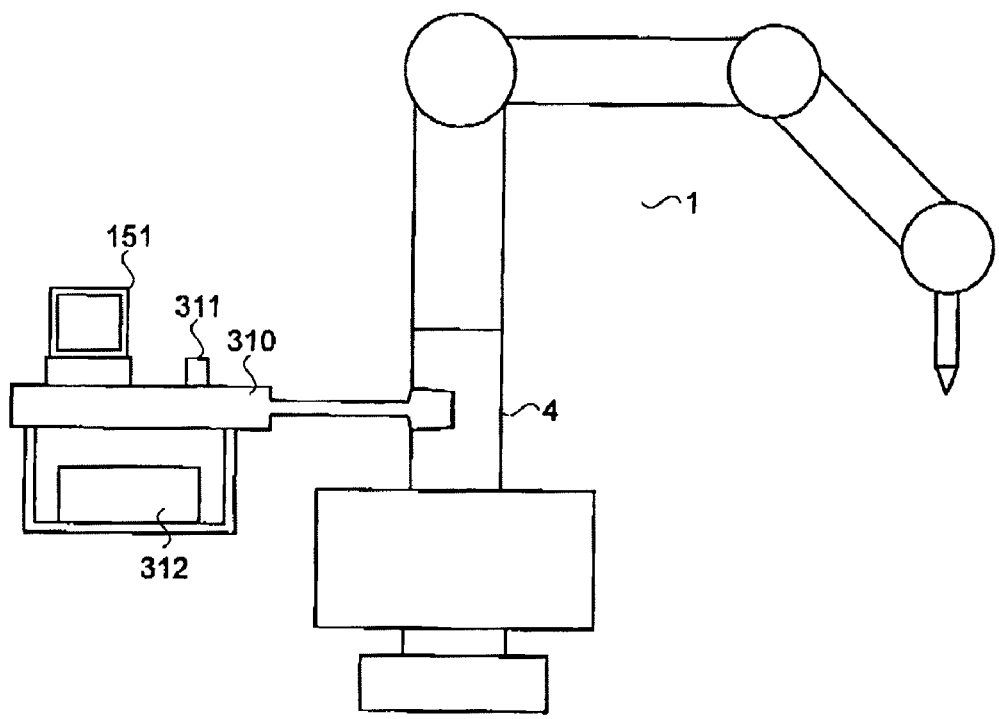
Fig. 35
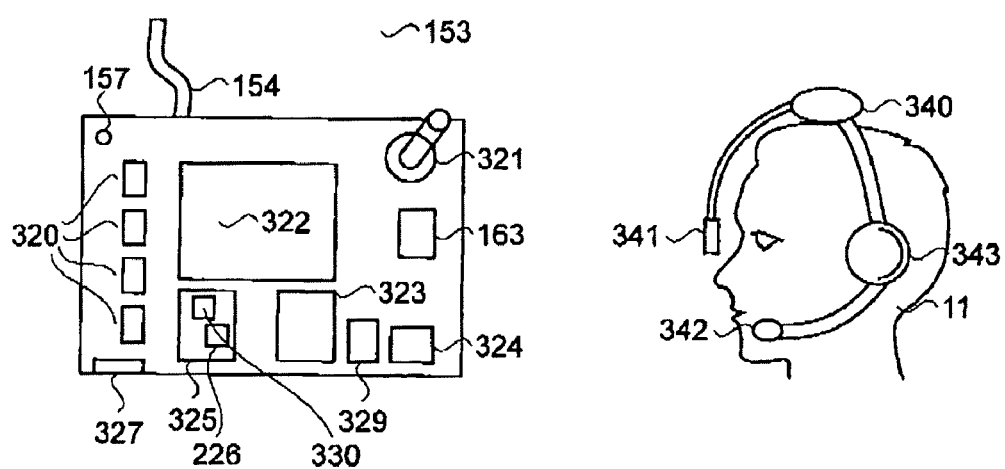 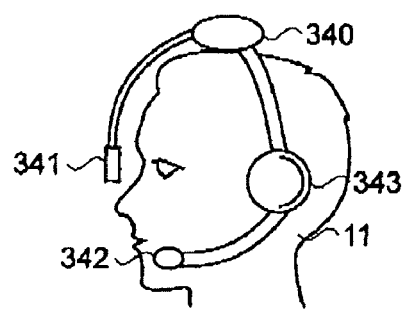
Fig. 36                              Fig. 37

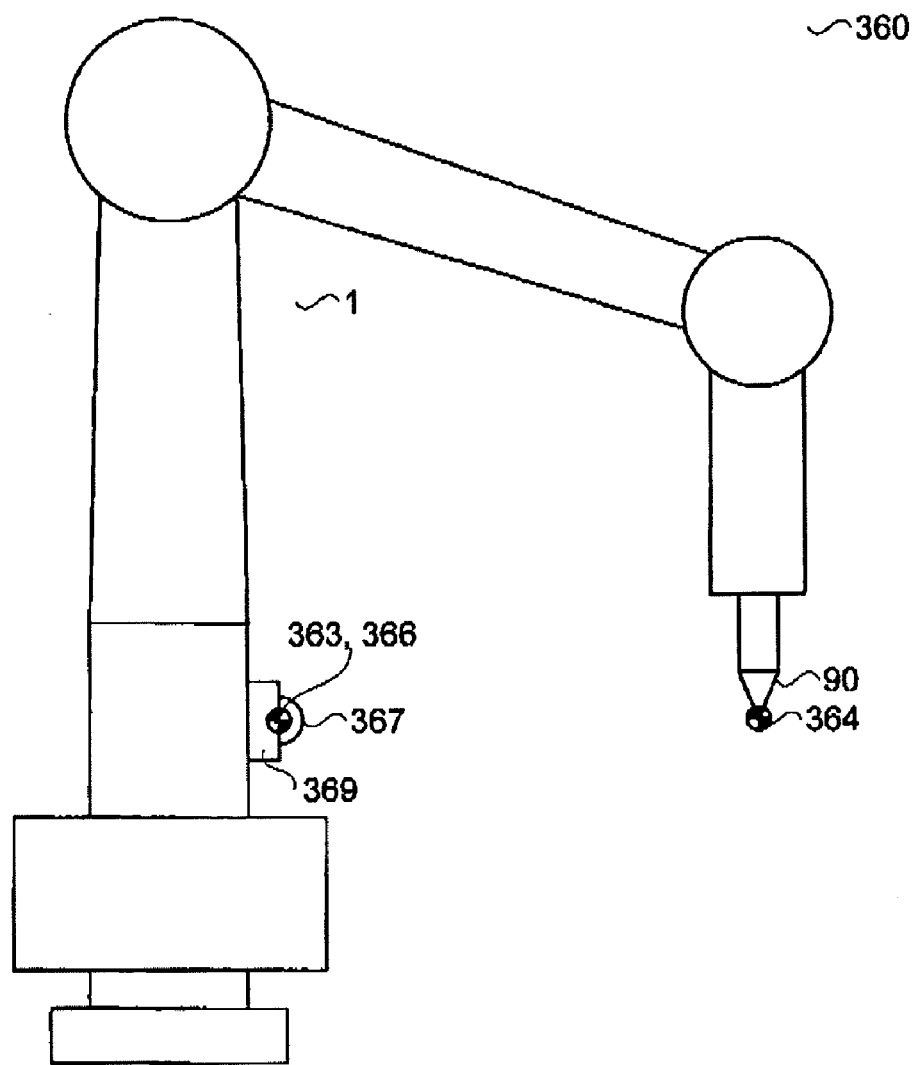
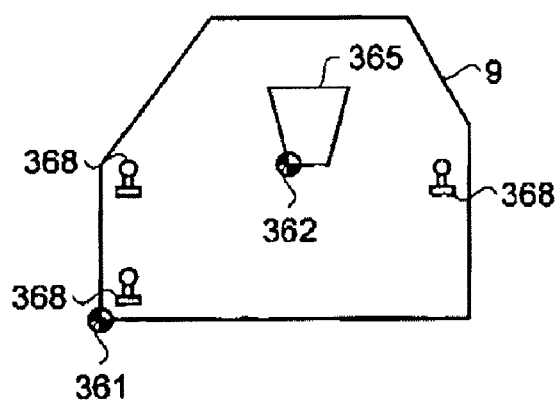
Fig. 39

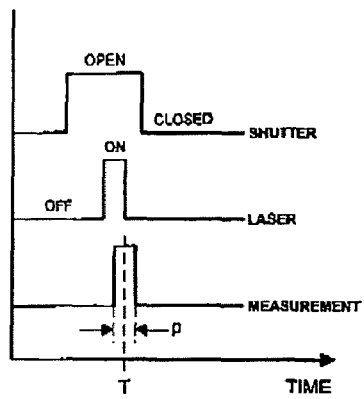 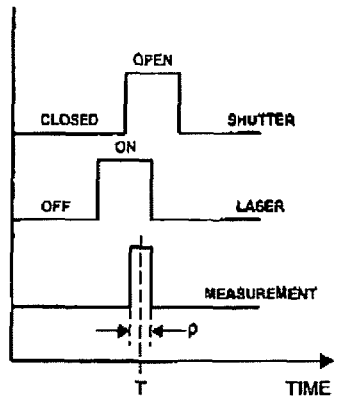 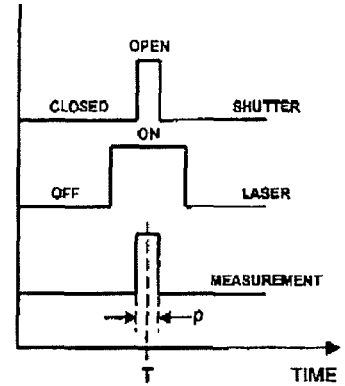
Fig. 43A         Fig. 43B         Fig. 43C
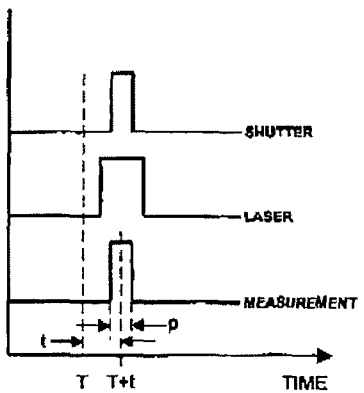
Fig. 44

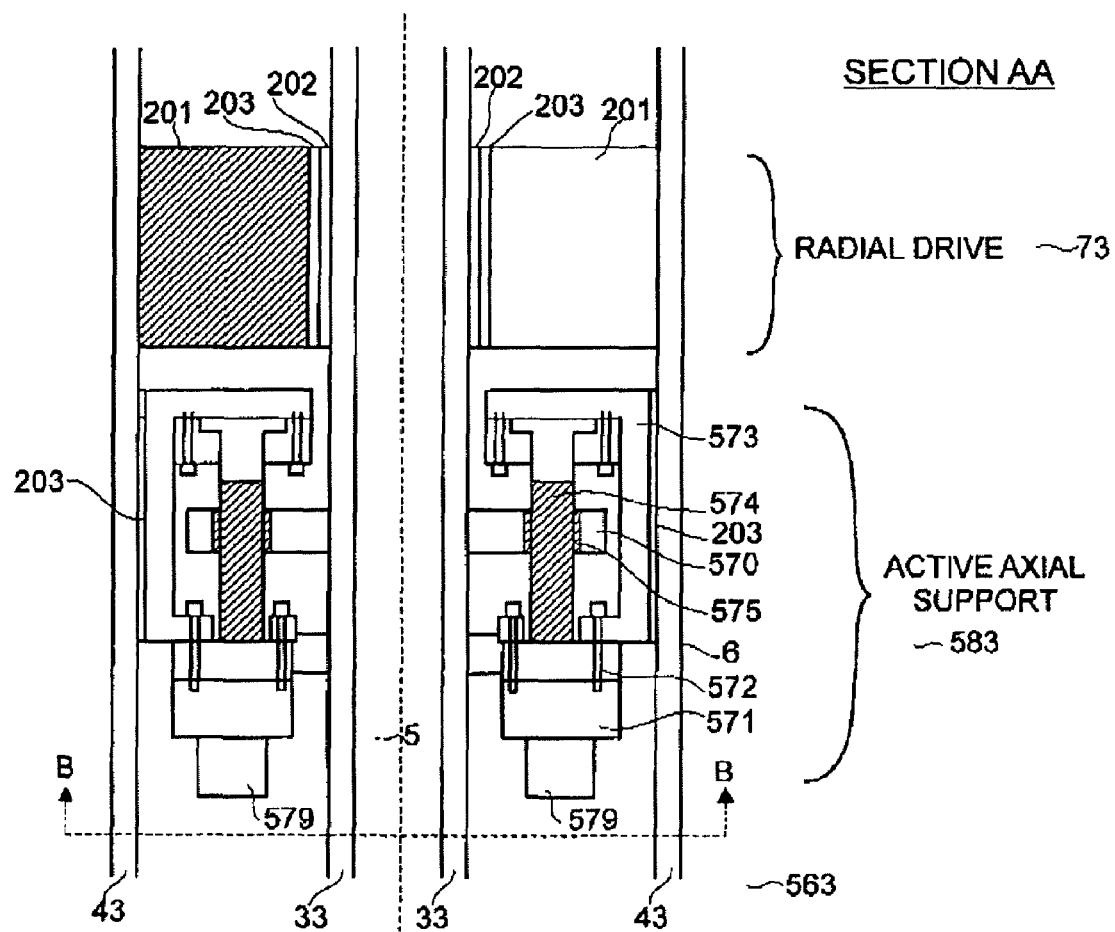
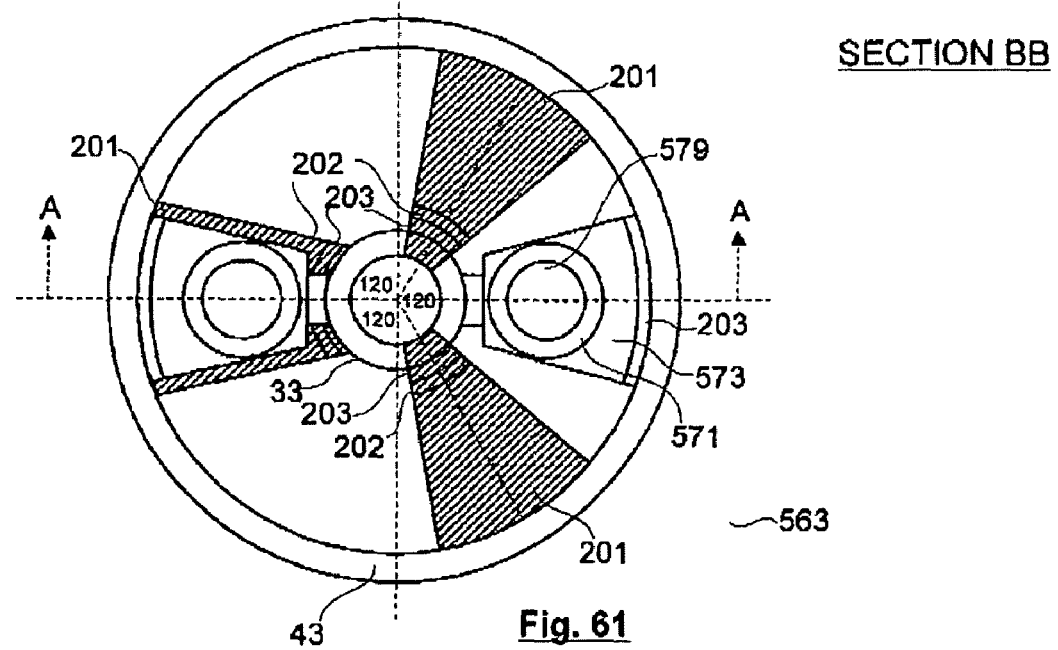
Fig. 61

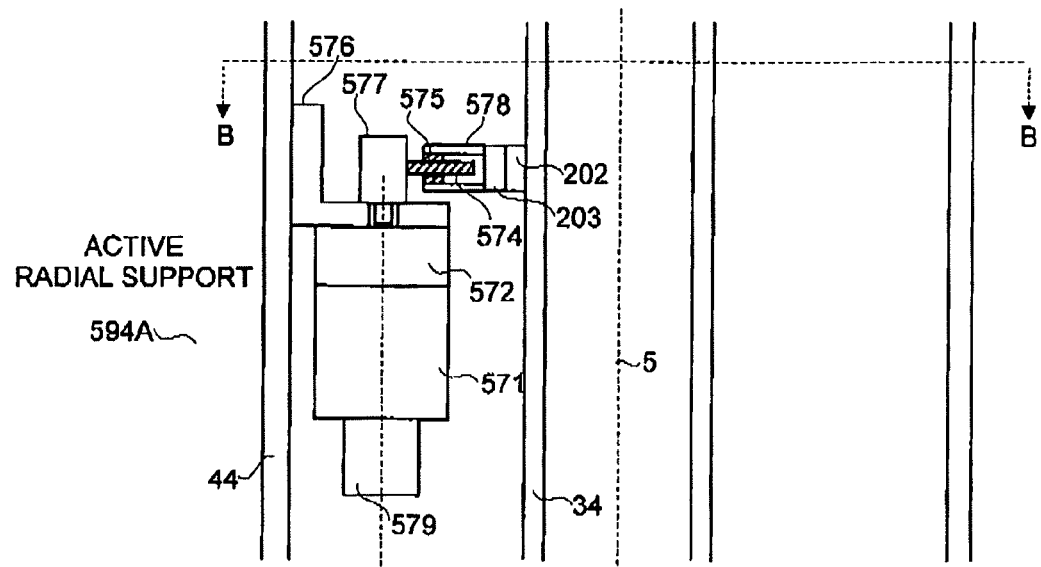
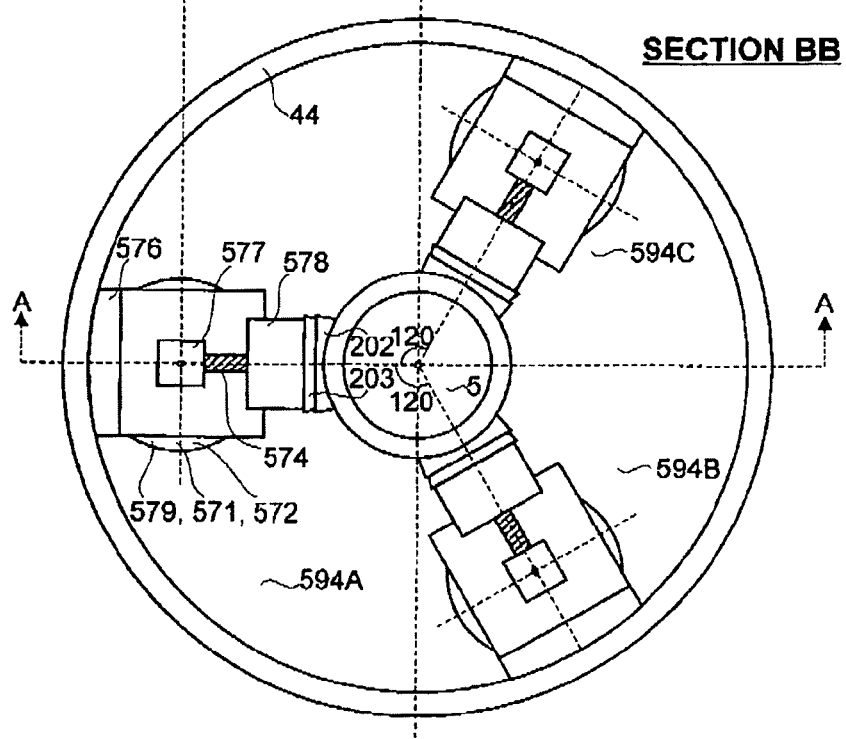
Fig. 63

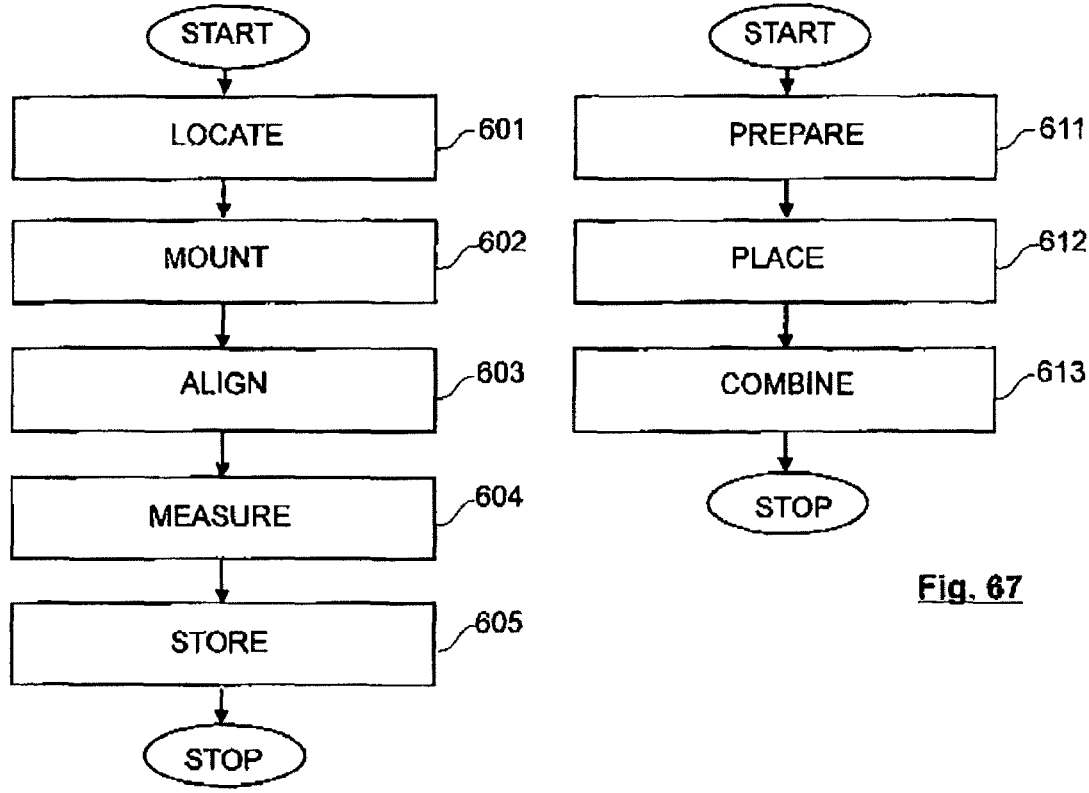
Fig. 66
Fig. 67
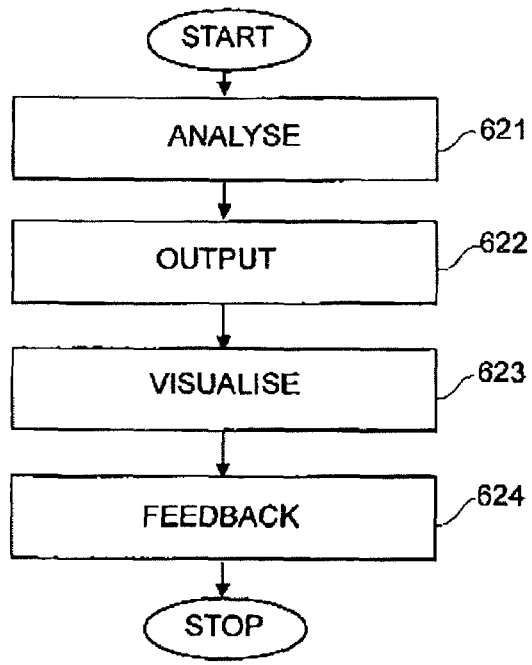
Fig. 68

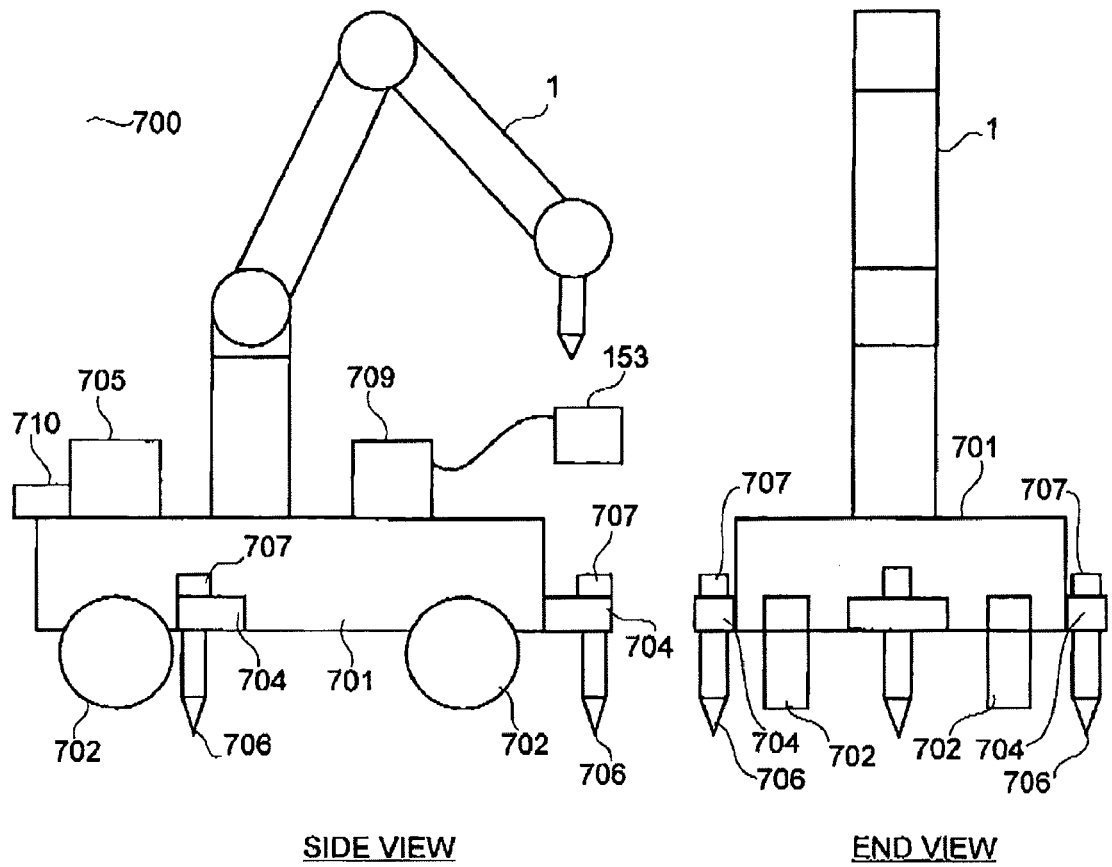
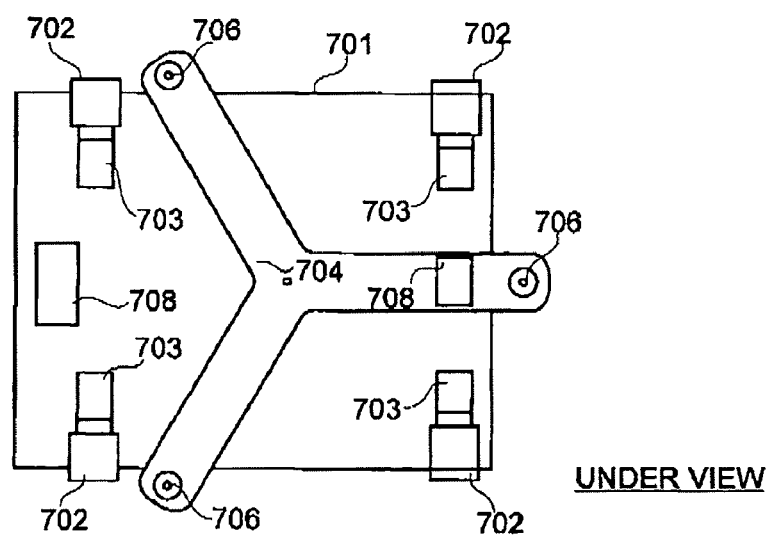
Fig. 69

FLOOR PLAN

| REF CONE | 3D LOCATION | |
|---|---|---|
| 1 | RX1, RY1, RZ1 | |
| 2 | RX2, RY2, RZ2 | ⎫ |
| . | . | ⎬ — 721 |
| . | . | ⎭ |
| N | RXN, RYN, RZN | |

| TARGET | | |
|---|---|---|
| 1 | TX1, TY1, TZ1 | ⎫ |
| 2 | TX2, TY2, TZ2 | ⎬ — 722 |
| . | . | ⎭ |
| M | TXNM, TYM, TZM | |

| TAPE | | |
|---|---|---|
| POLYLINE OF | X1, Y1, Z1 | ⎫ |
|  | . | ⎬ — 723 |
| 'P' POINTS | XP, YP, ZP | ⎭ |

Fig. 72

CMM ARM WITH EXOSKELETON

CROSS-REFERENCE TO RELATED APPLICATIONS

This application is a continuation of U.S. patent application Ser. No. 10/988,398, filed Nov. 12, 2004 now U.S. Pat. No. 7,395,606, which is a continuation-in-part of International Patent Application No. PCT/GB04/001827, filed Apr. 26, 2004, which claims priority to Great Britain Application Serial No. 0309662.5, filed Apr. 28, 2003, Great Britain Application Serial No. 0312963.2, filed Jun. 5, 2003, Great Britain Application Serial No. 0327503.9, filed Nov. 26, 2003, and Great Britain Application Serial No. 0405396.3, filed on Mar. 10, 2004, the contents of which are hereby incorporated by reference in their entireties herein.

FIELD OF THE INVENTION

The present invention concerns apparatus and method for a CMM Arm with Exoskeleton for performing accurate measurement and operations.

BACKGROUND TO THE INVENTION

Existing Methods of Automated Measurement

Automated measurement of medium to large size objects requires a measuring machine accuracy of 0.05 mm (+/−2 Sigma) and typically 0.025 mm (+/−2 Sigma) or better. 'Sigma' means one standard deviation. It is currently carried out in two main ways: (i) a bulky, expensive, conventional Computer Numerically Controlled Coordinate Measuring Machine (CNC CMM) with 3 or more axes; (ii) a rigid structure of static Optical probes that is typically located in a dedicated cell at the end of the automotive production line. With a conventional CMM, the Optical probe moves in a highly controlled way around a static object to produce accurate data. In the second case, both Optical probes and object are static and localised in a calibrated way that permits accurate data. Most conventional CMMs are of either the moving bridge or horizontal arm structures; companies including Zeiss (Germany), Hexagon Brown&Sharpe (Sweden) and LK (UK) produce them. Mechanical touch probes for mounting on conventional CMMs are supplied by companies including Renishaw (UK). Optical probes for mounting on conventional CMMs are supplied by companies including Metris (Belgium). Automatic probe mounts such as the Renishaw Autojoint are repeatable to a high degree of accuracy and are supplied with a rack of probes for automatic probe changing. Rigid structures of static Optical probes are supplied by Perceptron (USA). Both conventional CMMs and rigid structures of static Optical probes have the disadvantages that: they use up cell space on a production line that is typically only used for measurement and not a productive operation, they are usually situated at the end of the line, cannot feed forward data to downstream processes and are expensive and are difficult to justify on a payback basis. In addition, rigid structures of Optical probes are inflexible for rapidly changing models on the production line. Today, efficient production processes using robots that are quicker, better or cheaper than conventional processes but require high accuracy location cannot be deployed on the production line because of the disadvantages of existing high accuracy measurement systems.

Robot Automated Measurement

Since the 1960s, companies have developed heavy robot arms for applications requiring quick cycle times and repeatability. However, due mainly to temperature, wear and vibration problems, they have low accuracy. Robots have been used to carry probes for automated measurement. The robot arms are not accurate enough to meet the demanding requirements of most automated measurement, particularly in the automotive industry. The high repeatability of a robot arm has made 'quasi-static' measurement a solution that has received some uptake by the automotive industry. In 'quasi-static' measurement, the probe is moved from one position to the next and only takes data when static or moving slowly. Measurement can be by either contact or non-contact probes. Measuring probes on robot arms taking three-dimensional data from the surface of an object whilst moving at typical speeds of 10 mm/sec-200 mm/sec (but can be more or less) are not accurate. Companies producing robot arms include Fanuc (Japan) and Kuka (Germany). Perceptron and LMI-Diffracto (USA) offer solutions using robot arms and Optical probes. 3D Scanners and Kuka showed a solution with real-time optical inspection at the Euromold 2001 exhibition in Frankfurt; its accuracy was of the order of 0.5-1 mm. Standard industrial robots thermally grow by around 10 microns per degree Celsius temperature increase per meter of reach; errors in excess of 500 microns can be recorded in production line conditions. LMI-Diffracto have an automotive production line installation comprising four standard industrial robots supplied by Kuka, each carrying an Optical probe, wherein the robots are compensated for thermal growth, potentially reducing the thermal error in production line conditions to below 100 microns. In U.S. Pat. No. 6,078,846 Greer assigned to Perceptron, compensation for robot thermal growth is carried out by measuring a fixed artefact with the Optical Probe. The Optical probes measure whilst the robot is static between movements. Error mapping has improved robot accuracy. There are several approaches including dancing the robot through a program of planned movements whilst measuring it with a photogrammetric system such as that from Krypton (Holland) or Northern Digital (Canada). The measurements are then used to create an error map. Error compensation for load has been carried out by measuring the power used by the servos to automatically calculate the loads on the arm. Even with multiple types of error compensation, accuracies of only 0.2 mm (+/−2 Sigma) have been achieved for robots of the type and reach found in large quantities on automotive production lines. The problem with robot arms carrying scanning probes in which there is relative movement between the probe and the object during scanning is that the systems are not accurate enough to be useful.

Tracking

In U.S. Pat. No. 6,166,811 Long et al, a photogrammetry system for increasing the accuracy of scanning an object is disclosed in which photogrammetry targets affixed to the probe are tracked by a photogrammetry system in real-time. There are many disadvantages to this method. Firstly, a plurality of clear lines of sight need to be maintained between the probe and the photogrammetric cameras. In practice, lines of sight from the photogrammetry cameras to the photogrammetry targets on the probe are often blocked by the programmed robot movement and or the programmed changes in probe orientation necessary to scan the object. This so constrains the applicability of the system as to render it useless for many applications. Secondly, environmental lighting conditions must be maintained at a near ideal state or the accuracy of the photogrammetric system will reduce or the system will cease to function. In practice this is difficult to set up and often conflicts with other lighting requirements for the location. Thirdly, photogrammetric systems often do not have both the resolution and speed necessary for providing sufficient accuracy in this application. Fourthly, the photogrammetric cameras and the Robot must be mounted rigidly relative to each other. This often necessitates a stiff structure of large dimensions to achieve the desired accuracy. The main problem with incorporating photogrammetric technology into a robot measuring system is that the resulting systems are not compact and robust enough to be useful.

Leica Geosystems supply the 6 degrees of freedom Laser Tracker LTD800. It can measure position and orientation over a 35 m range with a single line of sight at up to 1000 measurements per second. Its accuracy is of the order of 50 microns for slow moving targets. Its cost is in excess of US$130,000. Many of its limitations for robot measuring are similar to those of photogrammetry. The main problems with incorporating laser tracker technology into a robot measuring system is that it is expensive, there are limitations to the orientation of the probe being tracked and the resulting systems are not compact and robust enough to be useful.

Robot Controllers and Programming

Controllers for robot arms are well understood by those skilled in the field; a standard reference work is 'Robot Manipulators, Mathematics Programming and Control' by Richard P Paul. Adept Technologies (US) supply 6-axis robot controllers starting at US$8,500. There are many products available for the programming of robots that allow motion sequences to be generated off-line and subsequently communicated to the Robot Controller for later execution; one example is EmWorkplace from Tecnomatix (US). In Patent Application GB 2036376A Richter assigned to HA Schlatter AG (Switzerland), programming is achieved by manually guiding a robot by means of a device mounted on the robot that is held by the user and comprises strain gauges that detect the user's intended direction for robot.

Manual CMM Arms

Since the 1970's, companies have been building manually operable CMM arms that have recently achieved a measuring accuracy using a contact probe of between 0.025 mm (+/−2 Sigma) and 0.005 mm (+/−2 Sigma) depending, mainly, on the reach of the Manual CMM Arm. Manual CMM Arms are expected to become more accurate with further development. These Manual CMM Arms are now accurate enough for many measurement requirements and are a growing sector in the measurement marketplace. They have the flexibility of being able to get into areas with difficult access. Manual CMM Arms are acceptably accurate for many applications, but are not automated; they are expensive to operate, particularly since a semi-skilled operator is required; human operators are also subject to human error. Manual CMM Arms are produced by companies including: Cimcore (USA), Faro Technologies (USA), Romer (France), Zett Mess Technik (Germany) and OGP (UK). As examples, U.S. Pat. No. 3,994,798 Eaton, U.S. Pat. No. 5,402,582 Raab assigned to Faro Technologies, U.S. Pat. No. 5,829,148 Eaton and U.S. Pat. No. 6,366,831 Raab assigned to Faro Technologies disclose background information on Manual CMM Arms. The provision of bearings at the joints of Manual CMM Arms is well known and US Patent Application 2002/0087233 Raab assigned to Faro Technologies discloses background information on bearings. The design of Manual CMM arms is typically limited to around 2 metres in reach from the centre of joint 1 to the probe tip because any longer and it requires two operators to use the arm. The longer the Manual CMM arm is, the less accurate it is. In general, for a modular Manual CMM Arm design all other things being equal, the accuracy is at best inversely proportional to the length. In U.S. Pat. No. 6,366,831 Raab, it is disclosed that in the field, Manual CMM Arms typically have an absolute positional accuracy ten or more times that of a robot arm. Some of the factors in robots that cause inaccuracy including joint misalignments are referred to in U.S. Pat. No. 6,366,831. Manual CMM arms such as those manufactured by Faro Technologies and Romer are generally operated by a single person using both hands. Each of the operator's hands provides a different 6 DOF action on the segment of the Manual CMM arm that is gripped by the hand. Some skilled operator's may only need one hand in some applications. A Manual CMM arm is a mechanism that is controlled in a closed-loop fashion wherein the operator closes the loop. Such control is a skilled activity; the operator needs to control 6 or 7 axes of arm freedom in a variety of different spatial layouts, under the effect of gravity, with just two hands. It is often the case that the operator mishandles the Manual CMM arm and part or all of the Manual CMM arm accelerates under gravity until there is a collision or the operator steadies it. It is the case that during data capture, the operator applies variable and occasionally excessive forces and torques on the Manual CMM arm, which reduce the accuracy of the measurement data the Manual CMM arm outputs.

Compensating and Holding Devices

A Manual CMM Arm typically has a compensating device built into the second joint that provides a torque on the upper arm that tends to provide a lifting force on the upper arm to counterbalance it. Compensating devices for manual CMM arms are disclosed in U.S. Pat. Nos. 6,298,569 Raab et al, 6,253,458 Raab et al, and US Patent Application 2003/0167647 Raab et al, all assigned to Faro Technologies. This means that the arm is lighter for the operator to lift and is consequently less tiring to use. This also means that more torque is transmitted through the Manual CMM Arm and requires that the Manual CMM Arm must be designed to be heavier than without such a compensating device to achieve a required accuracy. It is standard practice to compensate Robots in order to reduce robot power consumption and the power, size and weight of the motors. In 2003/0167647, a machined spring compensating device can be removed, reversed and replaced to compensate the arm when used in a hanging down orientation; this procedure is inconvenient for the user since it must be carried out in the factory. Some Manual CMM Arms have holding devices to lock one or more axes of the arm in any spatial orientation; such holding devices eliminate the need to lay the arm down between sets of measurements. On the 3000 Series manual CMM arm from Cimcore (USA) there is a sliding peg fixing mounted on the compensating device on Axis 2 (the first orthogonal hinge axis); when the peg slides into a hole, the compensating device on which Axis 2 rests is locked. A pneumatic brake on several axes is disclosed in PCT/EP01/01570 Nietz assigned to Zett Mess Technik GmbH and offered on Axes 1 to 4 of Zett Mess's AMPG-P manual CMM arm product; the pneumatic brakes can be released by radio remote control switch; the pneumatic brakes act on a disk. The pneumatic brakes and disks are mounted directly on the manual CMM arm; they add weight to the manual CMM arm and pass moments through the bearings of the manual CMM arm, thereby reducing its accuracy and usability.

Optical Probes on Manual CMM Arms

Optical probes on Manual CMM Arms were disclosed by Crampton, the inventor of the present invention, in several patent applications including WO9705449. Optical probes for Manual CMM Arms are provided or are being developed by 3D Scanners, Romer, Faro Technologies, Perceptron, Steinbichler (Germany), Pulstec (Japan) and Kreon (France) amongst others. Optical probes are generally mounted offset on the side of the Manual CMM Arm or mounted on the probe end of it. There are three broad types of Optical probe: point, line and area. As yet, a measurement accuracy standard does not exist that defines the way accuracy should be measured for point, line and area Optical probes. The marketplace is in the situation of not being able to perform standard tests to verify accuracy and enable comparison between Optical probe types in a practical way. Optical probes have become accurate, largely because their measuring range is short. In general, Optical probes gather measurement data over a measuring range of the order of 20-400 mm. This is often at a standoff to the end of the Manual CMM Arm. The accuracy of the best Manual CMM Arms combined with the best Optical probes is already better than 0.050 mm (+/−2 Sigma) and can be better than 0.010 mm (+/−2 Sigma) or even 0.002 mm (+/−2 Sigma) for short measuring ranges.

Synchronisation and Interpolation of Optical Probes on Manual CMM Arms

In a system comprising a Manual CMM Arm and an Optical probe, measurements from each are combined to give the output measurement data. As disclosed in WO9705449 by Crampton, the inventor of the present invention, the measurement accuracy of a system comprising a Manual CMM Arm and an Optical probe is increased by synchronising the timing of a measurement from the Manual CMM Arm and a measurement from the Optical probe. As further disclosed in WO9705449, alternatively, the measurement accuracy of a system comprising a Manual CMM Arm and an Optical probe is increased by time-stamping each measurement from the Manual CMM Arm and time-stamping each measurement from the Optical probe and later using a process of interpolation of the two sets of measurements to provide a combined set of measurements. However, occasionally there is a perturbation in the system and one or more measurements from one device or another are lost. In this situation, the later process of interpolation can be complex.

Calibration and Alignment of Robots and Manual CMM Arms

As disclosed in U.S. Pat. No. 5,687,293 Snell, a robot can be calibrated using a reference sphere and a spherically tipped probe on the robot by bringing the spherically tipped probe into contact with the reference sphere a number of times with different robot spatial layouts; a 39-parameter kinematic model for a 6-axis robot embodiment is disclosed. The alignment of Optical probes to Robots is disclosed in U.S. Pat. No. 6,321,137B1 De Smet. A method of manually calibrating a Manual CMM Arm is disclosed in U.S. Pat. No. 5,402,582 Raab assigned to Faro Technologies. Manual CMM Arms are calibrated by the manufacturer before shipping. Some suppliers, including Faro Technologies, enable the user to perform a simple probe calibration each time the probe is changed, whilst the Manual CMM Arm calibration remains the same. OGP UK supply the Polar Manual CMM Arm and permit the user to fully calibrate the Polar arm and probe together in a simple procedure by using a reference artefact with several cones into which the spherical probe of the Polar arm is placed whilst the arm is exercised through a variety of spatial layouts; a 39-parameter kinematic model is used for their 6-axis Polar arm. Full and accurate manual calibration of Manual CMM Arms is a painstaking process in which typically 500 separate points are recorded with a process taking some hours. Each point is subject to human error. Different operators hold Manual CMM Arms in different locations, apply different torques through different grips, applying different patterns of loads and bending moments on the arm resulting in different deflections and end slopes. A Manual CMM Arm that is manually calibrated will perform differently depending on how each operator holds and uses it. A Manual CMM Arm is required that is under repeatable patterns of loads and bending moments however it is held for each spatial orientation. A manual method of calibrating Manual CMM Arms is required that has the same pattern of loads and bending moments that will occur in its use by different operators. An automated method of calibrating Manual CMM Arms is needed to increase the repeatability and accuracy of their calibration, in particular enabling more points to be recorded than is practical or cost effective in current manual processes. The alignment (also known as calibration or qualification) of Optical probes to Manual CMM Arms is disclosed in WO9705449 by Crampton, the inventor of the present invention.

Attachment of Robots and Measuring Devices

As disclosed in U.S. Pat. No. 5,392,384 Tounai et al, the tip of a 6 axis articulated measuring device is attached to the tip of a robot for the purpose of calibrating the robot. As disclosed in U.S. Pat. No. 6,535,794 Raab assigned to Faro Technologies the tip of a 6 axis articulated measuring device is attached to the tip of a robot for the purpose of generating an error map. As disclosed in U.S. Pat. No. 6,519,860 Bieg et al, the tip of a 3 axis articulated measuring device is attached to the tip of a robot or machine for the purpose of measuring the spatial performance of the robot or machine. Neither of these disclosures is used to measure an object. As disclosed in WO 98/27887 Wahrburg, a surgical robot and a multiple joint sensor arm are attached at the base; the multiple joint sensor arm is used manually to make measurements on the patient, a robot program is generated based on those measurements and the robot carries out the surgical intervention. In this disclosure the measurement is not automated. Two items of prior art disclose devices for measuring the position and or orientation of the endpoint of a robot arm subject to deflections from bending and or thermal expansions. As disclosed in U.S. Pat. No. 4,119,212 Flemming, a simple knee joint with a planar goniometer rigidly attached at both ends is used to monitor the location of the end of the moving segment. The device is limited to operation in a plane and no out of plane bending is measured. It is therefore not able to measure position and orientation in a 3D space. As disclosed in U.S. Pat. No. 4,606,696 Slocum, a device for measuring the position and orientation of the end of a robot arm comprises a multitude of measuring links joined by rotary and linear bearings and measuring devices to measure rotational angles and linear movements. As well as being pinned at both endpoints of the robot arm, measuring links are rigidly pinned to the robot arm in at least one intermediate hinge joint. This approach requires 12 accurate rotary and linear measuring devices on a 6-axis robot. The stack-up of errors from the 12 measuring devices call into question whether it could ever be developed into an accurate 3D measuring device for 6-axis robots. A simpler and more robust system is needed that does not require additional rotary and linear measuring devices and their associated error stack-up. Both 4,119,212 and 4,606,696 require rigid attachment of the measuring device at each end of the robot arm. Rigid attachment at the probe end is essential for precisely measuring the position of the end of the robot arm. Rigid attachment at the probe end is neither required nor desirable when the robot arm is used to position a CMM arm. Neither 4,119,212 nor 4,606,696 provide means for using calibration information in the devices. Neither do they propose the use of the devices as Coordinate Measuring Machines. Without the use of calibration information, it is questionable whether the devices could be anywhere near as accurate as is required in current applications.

Other Background

As disclosed in PCT/GB01/01590 Gooch, a robot is shown with both an optical probe and a tool mounted at the probe end of the robot; the robot can be used alternately for measuring with the optical probe and performing an operation with the tool; however, to achieve measuring accuracy, an optical tracking system is used that has all the disadvantages previously mentioned. As further disclosed in PCT/GB01/01590 Gooch, a robot may be mobile, for example mounted on rails, to provide access around a large object being measured; this further disclosure also has the disadvantages of optical tracking. A manual marking out system utilising the Faro arm and a robot marking out system utilising an industrial robot from Kuka are disclosed in PCT/GB01/03865 Gooch; these two systems are either accurate or automated but not both. Manual scanning of an object on a rotary table with a non-contact sensor mounted on a Manual CMM Arm is disclosed by Crampton, the inventor of the present invention, in patent application WO9705449. Milling of large objects has been carried out by standard 5 or 6 axis Industrial Robots; the resulting object is not accurate due to the limitations in accuracy of standard industrial robots and typically requires hand finishing where cuts form different orientations result in Milling of large objects is regularly carried out accurately on large 5-axis machining centres such as those manufactured by Mecof spa (Italy) and on large 5-axis horizontal arm CMMs such as those from Zeiss and LK Tool; the class of objects that may be machined is limited by the Cartesian machine type, for instance a horizontal arm cannot bend around corners. Delcam (UK) provide a software called PowerShape that is capable of generating milling programs for 5 axis and 6 axis industrial robots.

Need for Accuracy

Users demand ever higher accuracy from their Manual CMM Arms. A significant amount of error in Manual CMM Arms is derived from the operator over-stressing the Manual CMM Arm, variability of moments on the arm through different hand grip positions and built-in counterbalances providing moments across bearings. There is a need for a more repeatable Manual CMM Arm in which the loads on the CMM Arm are independent of how it is held and which is significantly more accurate. There is a further need for a more accurate calibration process that is automated to remove human error.

Need for Automation

A Manual CMM Arm with an Optical probe is typically used for many hours at a time. During much of this time, the operator holds the Manual CMM Arm at a distance from him, often in awkward locations. The weight that is supported at a distance can be several kilograms for a long Manual CMM Arm. This is hard work and is tiring for many operators, particularly smaller people; operator fatigue is a common problem and this can lead to illness, incapacitation or injury. Much of the work done with Manual CMM Arms is for unique components that only need to be optically inspected once. Often, the surface being inspected is not immediately accessible and requires temporary gantries to be erected for the operator to climb on so that the arm can be manipulated. The problem with Manual CMM Arms carrying scanning probes in which there is relative movement between the probe and the object during scanning is that, although they are accurate enough, the system is fatiguing to use and can output inaccurate data through operator error or over-stressing of the Manual CMM Arm, because it cannot operate automatically.

Need for Accessibility

The shape of objects to be measured and their accessibility to a probe on a movable member vary from application to application. A CMM that is flexible enough to access a larger range of object shapes has more utility. In practice, it is generally established that articulated arm CMMs comprising a series of preferably 6 or 7 joints separated by rigid segments are more flexible than orthogonal axis configuration CMMs. It is also generally established in the existing state of the art that automated orthogonal axis configuration CMMs are several orders more accurate than automated articulated Robot arms. It is also generally established that automated orthogonal axis configuration CMMs are less suitable than automated articulated arm Robots for locating in a manufacturing environment such as on an assembly line. The problem is that no automated CMM machine is available that is articulated and sufficiently accurate.

Need for Portability

As exhibited by the purchase of the order of around 5,000 portable Manual CMM Arms since they became accurate enough in the mid-1990's, there is a significant demand for portable Manual CMM Arms. There is a corresponding need for a portable Automated CMM Arm, but none exist today.

Need for Robustness

Manual CMM Arms are becoming more accurate and less robust. The existing designs of Manual CMM Arms have the precision measuring system exposed to shocks, moments and abuse in usage and transportation. Existing designs of transportation case are unsophisticated and expose Manual CMM Arms to damage, particularly from shock. There is a need for a robust portable Manual CMM Arm and a transportation case that minimises forces and moments on the Manual CMM Arm from shocks in transportation.

SUMMARY OF THE INVENTION

In the prior art, Flemming discloses a robot arm with attached measuring arm that is only usable within a plane and does not take into account out of plane bending. Slocum discloses a measurement device for a robot arm for operation within 3D space. It requires 12 rotary and linear measuring devices for a 6-axis robot, it is complex, expensive to manufacture and limited in accuracy due to error stack-up.

Accordingly, it is an objective of the present invention to provide a CMM Arm with Exoskeleton and transmission means that operates in 3D space and requires only one measuring device per axis i.e. 6 angular encoders on a 6-axis CMM Arm and 7 angular encoders on a 7-axis CMM Arm. This results in a CMM Arm with Exoskeleton that is significantly more robust and accurate than the device of Slocum and that can operate in 3D space, which is a limitation of Flemming's device. It is a further purpose of this invention to provide a CMM Arm with Exoskeleton that has both manually operated and automated embodiments. Another objective is to provide a CMM Arm with Exoskeleton that can collect data. Still another objective is to provide a CMM Arm with Exoskeleton that can perform operations.

In a first embodiment of this invention, a portable Robot CMM Arm comprises an automated Exoskeleton that supports and manipulates an Internal CMM Arm via transmission means such that it can carry out measurement of an object. The Robot CMM Arm and the Internal CMM Arm are rigidly attached at the base. The Exoskeleton and the Internal CMM Arm have the same number of axes and approximately the same joint axis orientations and joint centres. The Robot CMM Arm has preferably 6 or 7 axes. There are transmission means between the Exoskeleton and the Internal CMM Arm such that the Exoskeleton both drives and supports the Internal CMM Arm. The transmission means are non-rigid and the probe end of the Internal CMM Arm can move small amounts relative to the probe end of the Exoskeleton. This first embodiment fundamentally differs from the devices of Slocum and Flemming that require rigid attachment between the probe end of the robot arm and the probe end of the measuring device. At least one probe is mounted on the probe end of the Internal CMM Arm. Positions from the Internal CMM Arm and measurements from the Probe are combined and a novel systematically changing synchronisation label and method are proposed to avoid inaccuracy from ambiguity in the combination. A control box is integrated into the base of the Robot CMM Arm. Slip-rings enable infinite rotation on axial axes. The Robot CMM Arm typically weighs 20-30 kg and is portable, enabling it to be brought to the object being measured. It is a further purpose of this first embodiment to provide a method for positioning the Robot CMM Arm to measure data of an object. This Robot CMM Arm invention has a novel structure, and novel capabilities that none of Robots, Manual CMM Arms or Conventional CMMs are capable of.

In a second embodiment of this invention, an Industrial Robot CMM Arm comprises an Exoskeleton that encloses an Internal CMM Arm. A tool can be mounted on the Industrial Robot CMM Arm for performing operations such as milling. The Exoskeleton and the Internal CMM Arm are rigidly attached at the probe end such that the Internal CMM Arm can measure the position of the tool and guide it more accurately through space than in any previous robot.

In a third embodiment, an Actively Supported Robot CMM Arm comprises active transmission means that support and move the Internal CMM Arm from the Exoskeleton for the purpose of precise measurement. The Exoskeleton cradles the Internal CMM Arm to unweight it and significantly reduce the forces and moments on it. The transmission means are non-rigid and the probe end of the Internal CMM Arm can move small amounts relative to the probe end of the Exoskeleton. This means that the Actively Supported Robot CMM Arm is more accurate than other types of Robot CMM Arm. In a further modification, air bearings are provided between the Internal CMM Arm and the Exoskeleton.

In a fourth embodiment, methods are disclosed for measuring quantities, modelling quantities, analysing quantities, visualising quantities and feeding back results to a manufacturing process. A quantity-measuring probe is attached to the probe end of the Robot CMM Arm. Means are provided for combining the quantities measured with the CAD model of the object being measured.

In a fifth embodiment, a method and apparatus for a Mobile Robot CMM Arm is disclosed. A Robot CMM Arm is mounted on a tripod with retractable feet built into an electric vehicle and moved from one measuring position to the next. It is typically used for automatically scanning large objects such as vehicles or aircraft and provides a lower cost and more flexible alternative to the large horizontal or bridge type CMMs currently used.

In a sixth embodiment, a Robot CMM Arm with displaceable exoskeleton embodiment is disclosed. The Internal CMM Arm is displaced from the Exoskeleton and manually used for generating a robot program. The Internal CMM Arm is replaced in the Exoskeleton and the robot then executes the robot program automatically. Manual manipulation of the Internal CMM Arm for generating a robot program has the advantage of being faster and more usable than conventional methods such as using a teach pendant.

In a seventh embodiment, a Robot CMM Arm comprising a coupled CMM Arm and Robot is disclosed. The CMM Arm is supported by the Robot in at least two positions: at the probe end and at an intermediate position. This embodiment has the advantage of moving the sources of heat from the vicinity of the CMM Arm.

In an eighth embodiment, a Manual CMM Arm with Exoskeleton is disclosed. The Internal CMM Arm is supported and driven by an Exoskeleton that is in turn supported and moved by an operator. Current Manual CMM Arms combine the functions of measurement, self-support and robustness for operator handling in the same arm. This eighth embodiment places the function of measurement into an Internal CMM Arm and the functions of support and robustness for operator handling into the Exoskeleton. In whatever way that the Exoskeleton is held by the operator, the Internal CMM Arm is always supported in exactly the same way at each spatial position such that the loads on the Internal CMM Arm are repeatable and are the same as the loads during the calibration process. This load pattern repeatability means that the Manual CMM Arm with Exoskeleton is a device that is more accurate than any existing Manual CMM Arm device. Flexible button means are provided for the operator to attach a button unit with wireless transmitter at whatever location is convenient on the exoskeleton; a wireless receiver is integrated into the system. Bump stop means are provided in the exoskeleton to cushion the Internal CMM Arm from undesirable shocks and loads. Probe covers are provided to protect the probe from knocks and to compensate some of the load on a contact probe. A number of Manual CMM Arms with Partial Exoskeletons are disclosed that, compared to the Manual CMM Arm with Exoskeleton, are more compact and have improved handling, particularly in the wrist and probe region, whilst still having significant accuracy. Measuring methods are provided for the use of the Manual CMM Arm with Exoskeleton and a number of different contact and non-contact probes. An automated calibration apparatus and method for a Manual CMM Arm with Exoskeleton is disclosed. A transportation case with load spreading mechanism is provided to minimise the magnitude of the shock loads on the Manual CMM Arm with Exoskeleton during transportation.

In a ninth embodiment, a Manual CMM Arm with Holding Exoskeleton is disclosed. One or more joints in the Exoskeleton may be locked by means of a brake. This means that an operator who needs to pause in mid-operation, can lock the arm in whatever position it is in, removing the need to return it to its rest position. Previous braking systems have acted through and placed load on the CMM Arm, but this embodiment has the advantage of acting on the Exoskeleton without placing any loads on the Internal CMM Arm.

In a tenth embodiment, a Manual CMM Arm with Endoskeleton embodiment of the present invention is disclosed. The CMM arm is external to the supporting endoskeleton. In previous devices, the function of counterbalancing has either been parallel and external to the arm as in the Romer and Cimcore devices or embedded in the arm such that the bending moment is across the arm. This invention both hides the function of compensation inside the CMM Arm and compensates without applying a bending moment across the arm.

In an eleventh embodiment, a Robot CMM Arm with Endoskeleton is disclosed. The CMM arm is external to the supporting and driving robot endoskeleton. The first advantage is that the External CMM Arm hides all the drives, providing an arm suitable for applications with limited access. The second advantage is that the External CMM Arm has greater section and bends less, rendering it more accurate.

BRIEF DESCRIPTION OF THE DRAWINGS

Embodiments of the present invention will now be described, by way of example only, with reference to the accompanying drawings, in which:

FIG. 1A is a schematic diagram for a 6-axis Robot CMM Arm in accordance with a first embodiment of the present invention;

FIG. 1B is a schematic diagram for a 7-axis Robot CMM;

FIG. 1C is a layout for a Robot CMM Arm system;

FIG. 5C1 is a schematic diagram of CMM Segment 8;

FIG. 5C2 is a schematic diagram of cantilever and in-line orthogonal joint options;

FIG. 7A is a layout of a Robot CMM Arm mounted on a vibration-isolated table;

FIG. 7B is a layout of a floor mounted Robot CMM Arm;

FIG. 7C is a layout of a Robot CMM Arm mounted on a surface plate embedded in the floor;

FIG. 7D is a layout of Robot CMM Arms mounted on linear rails;

FIG. 7E is a layout of two independent Robot CMM Arms mounted on a horizontal rail;

FIG. 7F is a layout of a Robot CMM Arm mounted on a vertical axis that traverses horizontally;

FIG. 7G is a layout of two Robot CMM Arms mounted on a moving multiple arm base;

FIG. 13B is a schematic diagram of high inertia and low inertia Robot CMM Arms;

FIG. 18 is two sections of torsional transmission means;

FIG. 20 is a schematic diagram of hard limits and limit switches in an axial joint;

FIGS. 21A and 21B are schematic diagrams of hard limits in an orthogonal joint;

FIG. 23 is a view and a section of the probe end of the Internal CMM Arm;

FIG. 24 is a longitudinal section of a touch trigger probe mounted on the probe end;

FIG. 25 is a longitudinal section of an optical probe mounted on the probe end;

FIG. 26 is a view of the optical probe and bracket;

FIG. 29 is a schematic diagram of a stripe probe scanning;

FIG. 30 is a schematic diagram of the measuring areas of a stripe;

FIG. 31 is a schematic diagram of a patch of stripes;

FIG. 32 is a schematic diagram of a number of overlapping patches;

FIG. 33A is a schematic diagram of a two-view stripe probe;

FIG. 33B is a schematic diagram of a two-view stripe probe scanning a stepped object;

FIG. 34A is a schematic diagram of a two-stripe probe;

FIG. 34B is a schematic diagram of a two-stripe probe scanning the vertical wall of a stepped object;

FIG. 35 is a schematic diagram of a platform for a laptop;

FIG. 36 is a schematic diagram of a pendant;

FIG. 37 is a schematic diagram of a headset on an operator;

FIG. 39 is a layout of coordinate systems;

FIGS. 43A, 43B and 43C are timing diagrams for probe measurement;

FIG. 44 is a timing diagram showing the delay of a triggered probe measurement;

FIG. 61 is a diagram of a radial Active Transmission Means with Active Axial Support;

FIG. 63 is a diagram of an Active Transmission Means with Active Radial Support;

FIG. 66 is a flow diagram of a Quantity Measurement process in accordance with a fourth embodiment of the present invention;

FIG. 67 is a flow diagram of a Quantity Modelling process;

FIG. 68 is a flow diagram of a Quantity Analysis, Visualisation and Feedback process;

FIG. 69 is a diagram of a Mobile Robot CMM Arm in accordance with a fifth embodiment of the present invention;

FIG. 72 is a data structure for reference cone positions, target positions and tape positions;

FIG. 73 is a flow diagram of a Mobile Robot CMM Arm preparation process;

FIG. 74 is a flow diagram of a Mobile Robot CMM Arm measuring process;

FIG. 75 is a diagram of a Robot CMM Arm with displaceable exoskeleton in accordance with a sixth embodiment of the present invention;

FIG. 76 is a diagram of a slotted tubular Robot Segment;

FIG. 77 is a diagram of a split bearing Transmission Means;

FIG. 78 is a flow diagram of a Robot CMM Arm with displaceable exoskeleton measuring process;

FIG. 79 is a schematic of a coupled Robot CMM Arm;

FIG. 80A is a layout for a Manual CMM Arm with Exoskeleton System;

FIG. 80B is a schematic of the Manual CMM Arm with Exoskeleton at rest;

FIG. 81 is a schematic of a Probe Cover;

FIG. 82A is a schematic of an Optical Probe Cover;

Figure 82A:
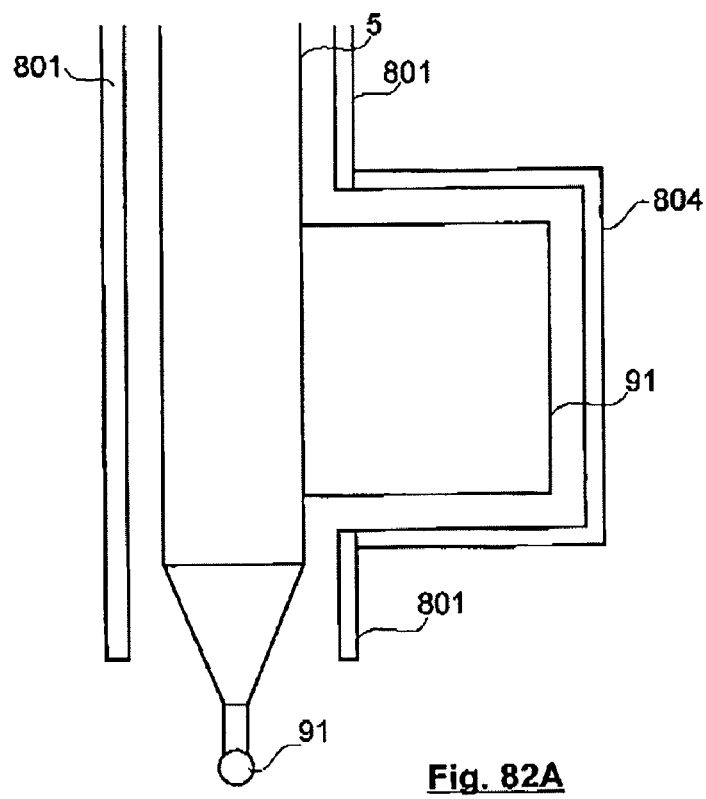
Figure 82B:
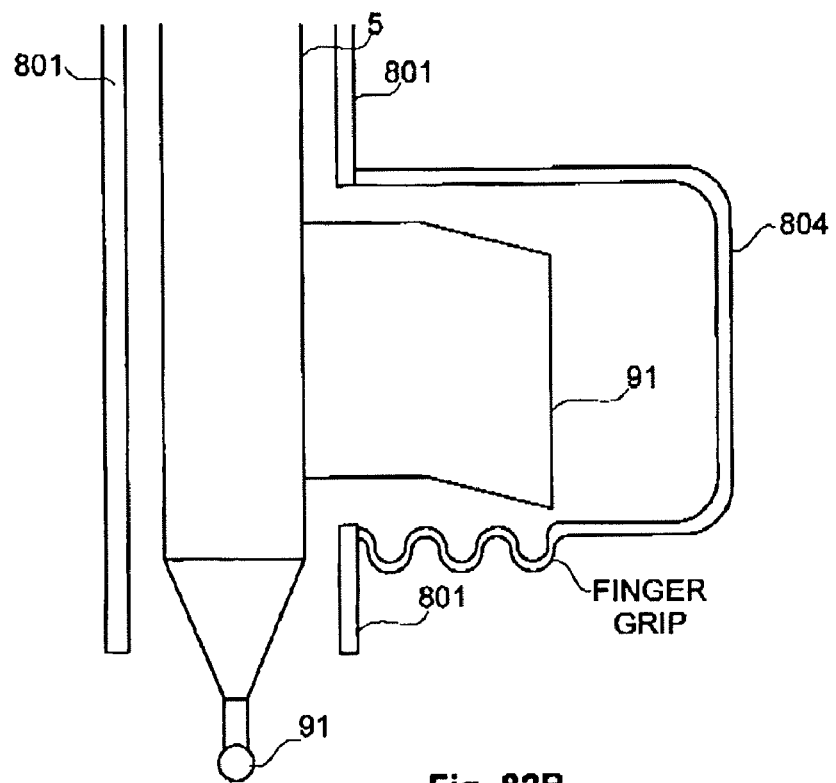
Figure 83A:
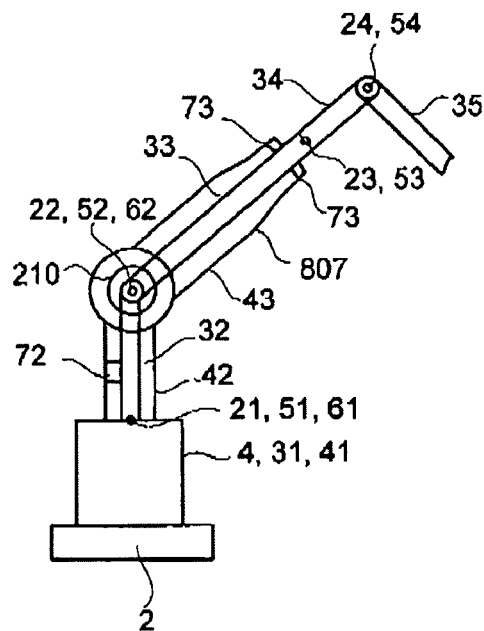
Figure 83B:
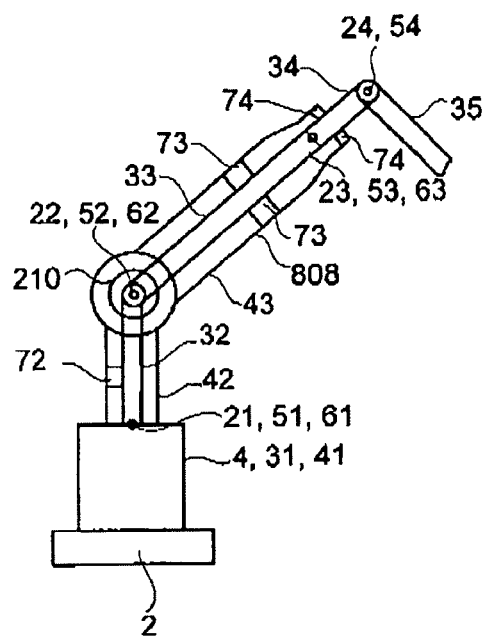
Figure 83C:
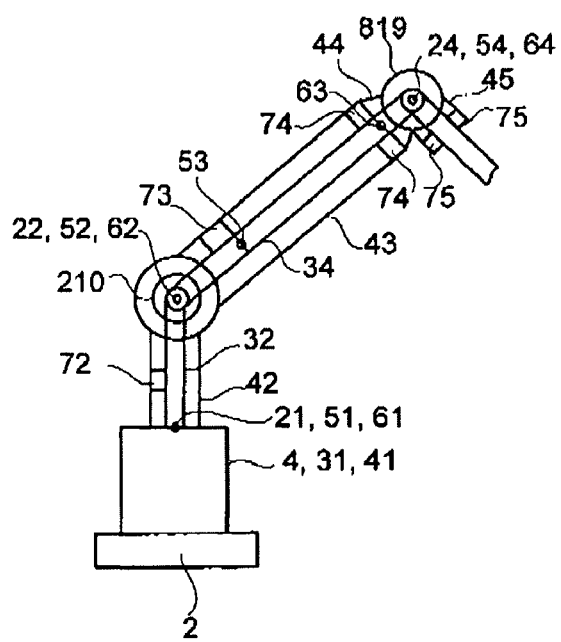
Figure 83D:
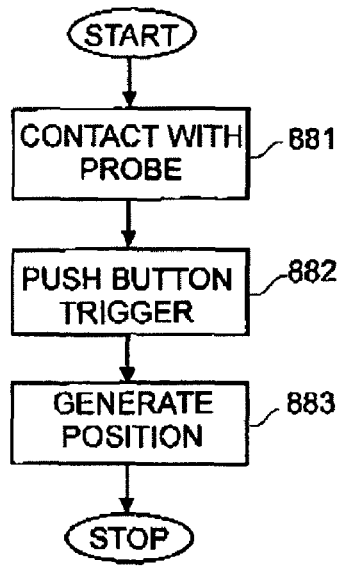
Figure 83E:
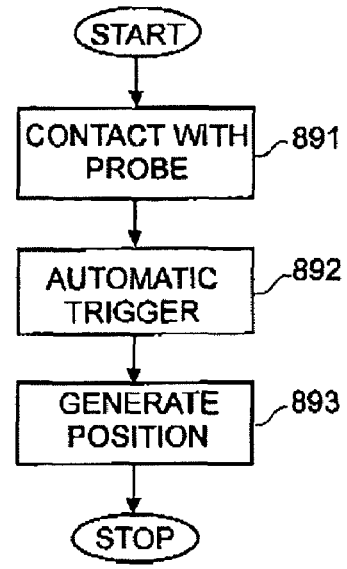
Figure 83F:
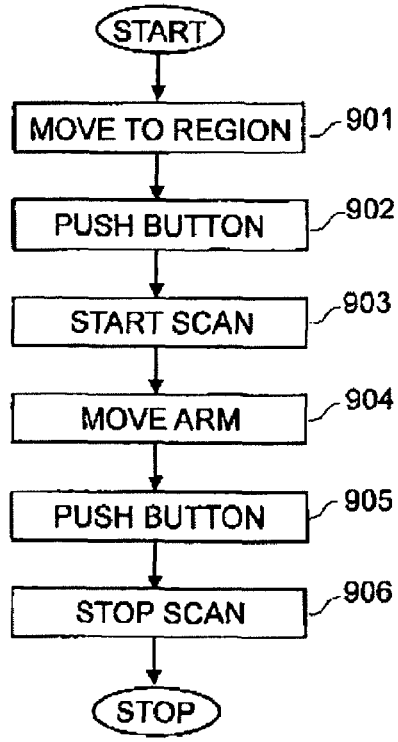
Figure 83G:
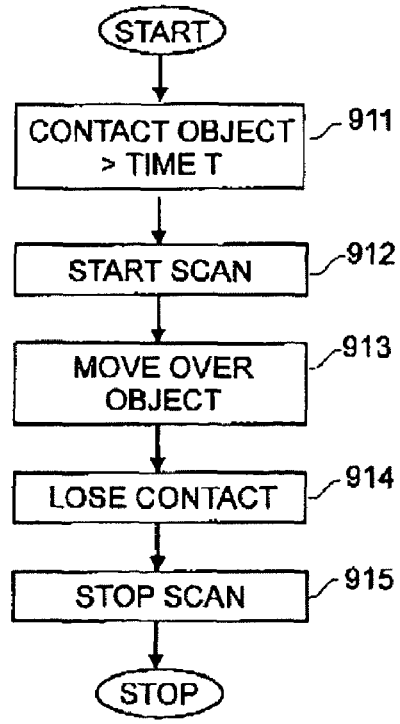
Figure 83H:
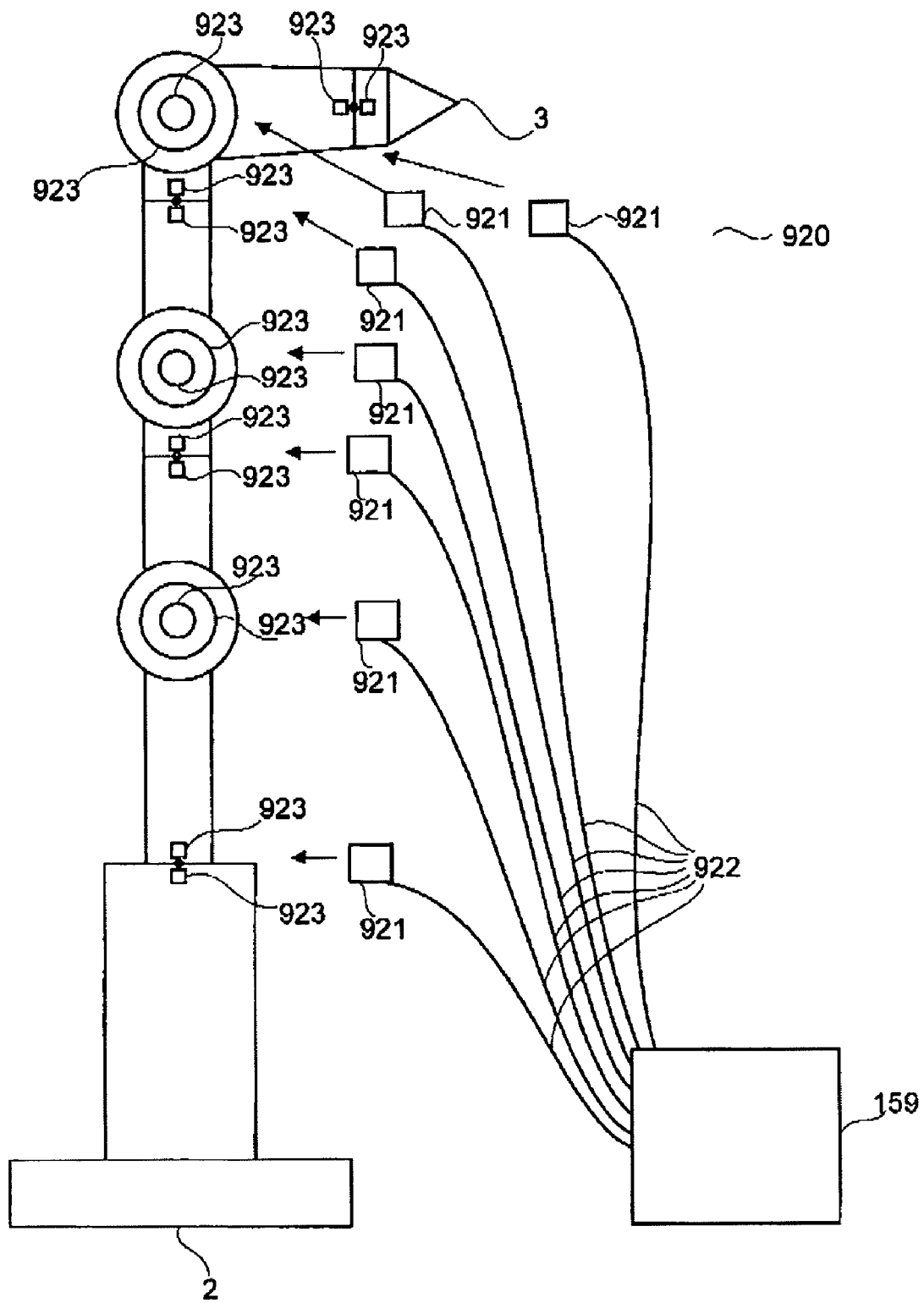
Figure 83I:
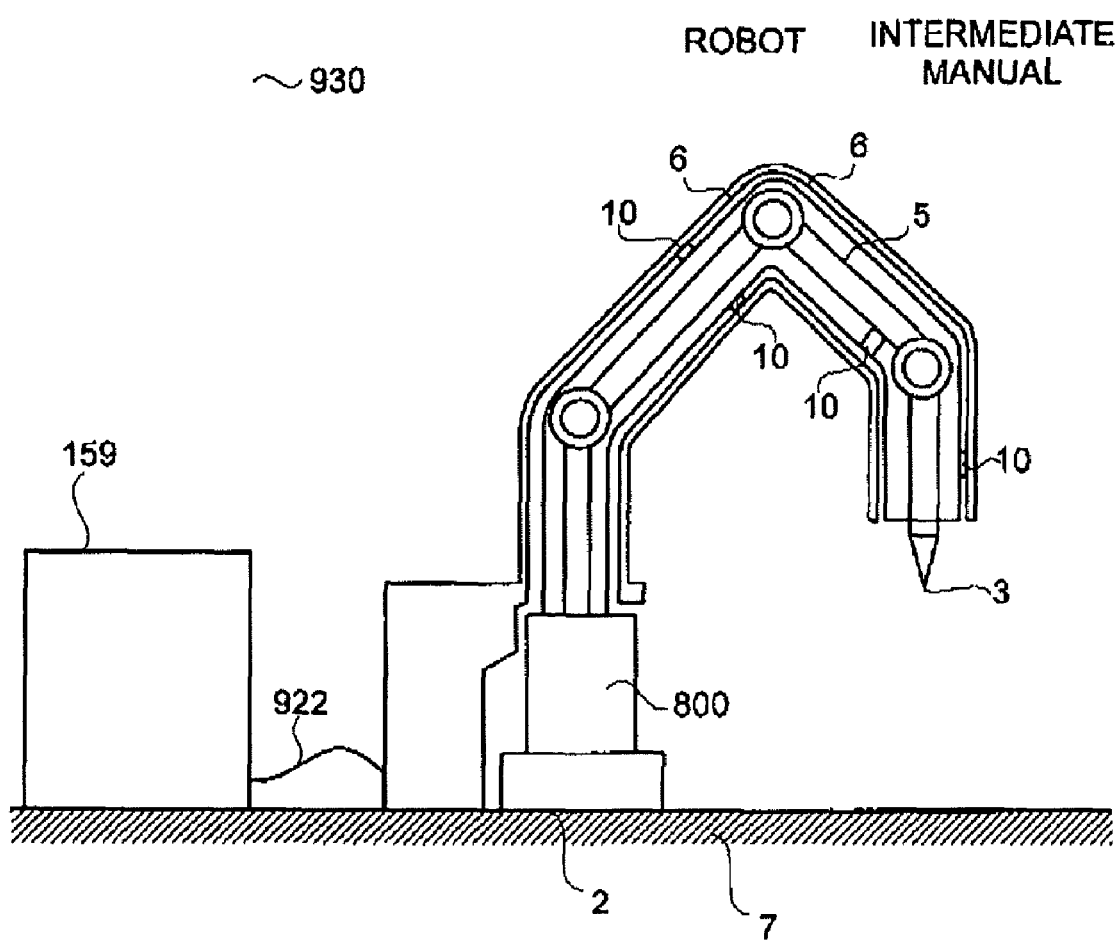
Figure 84:
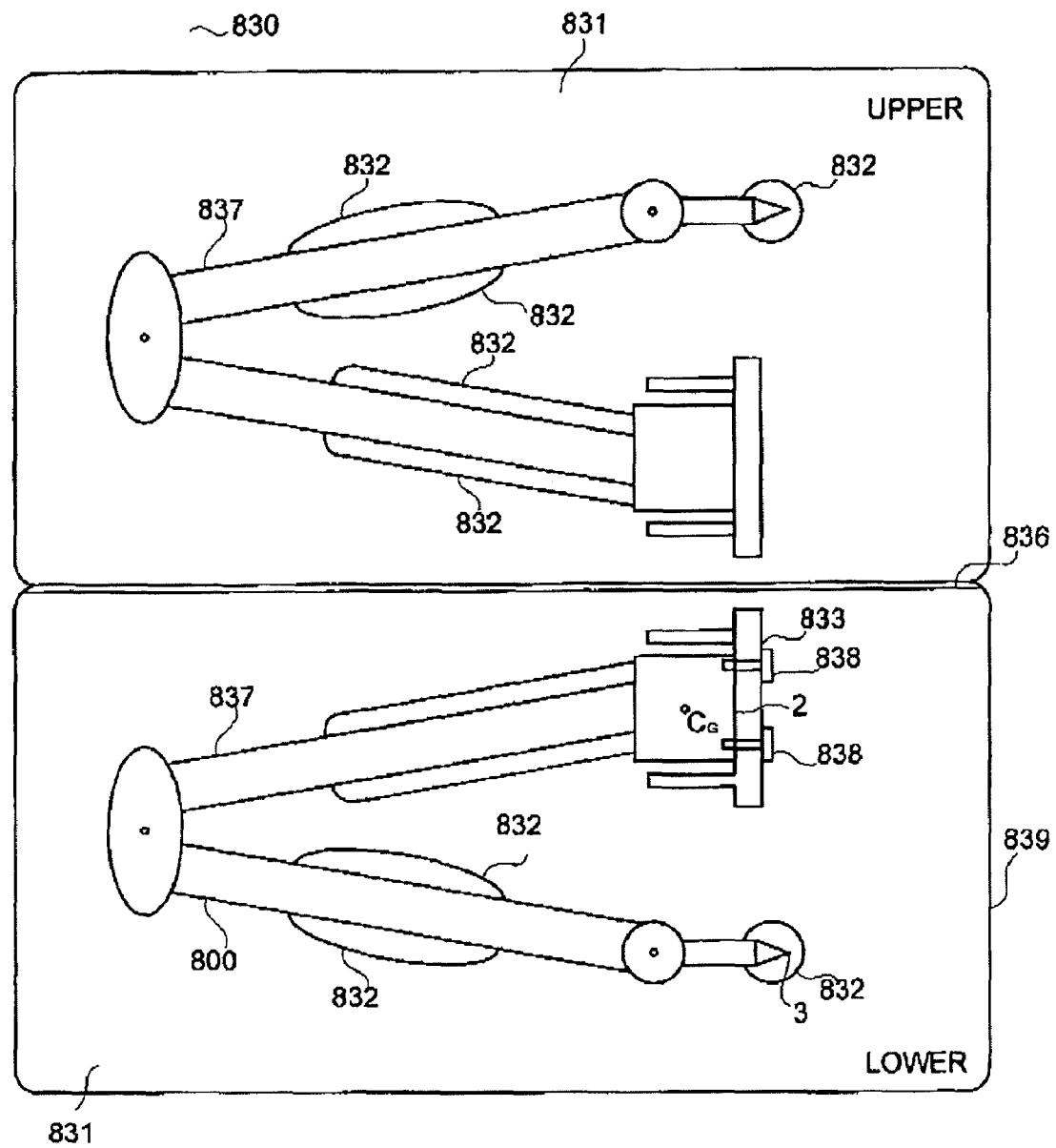
Figure 85:
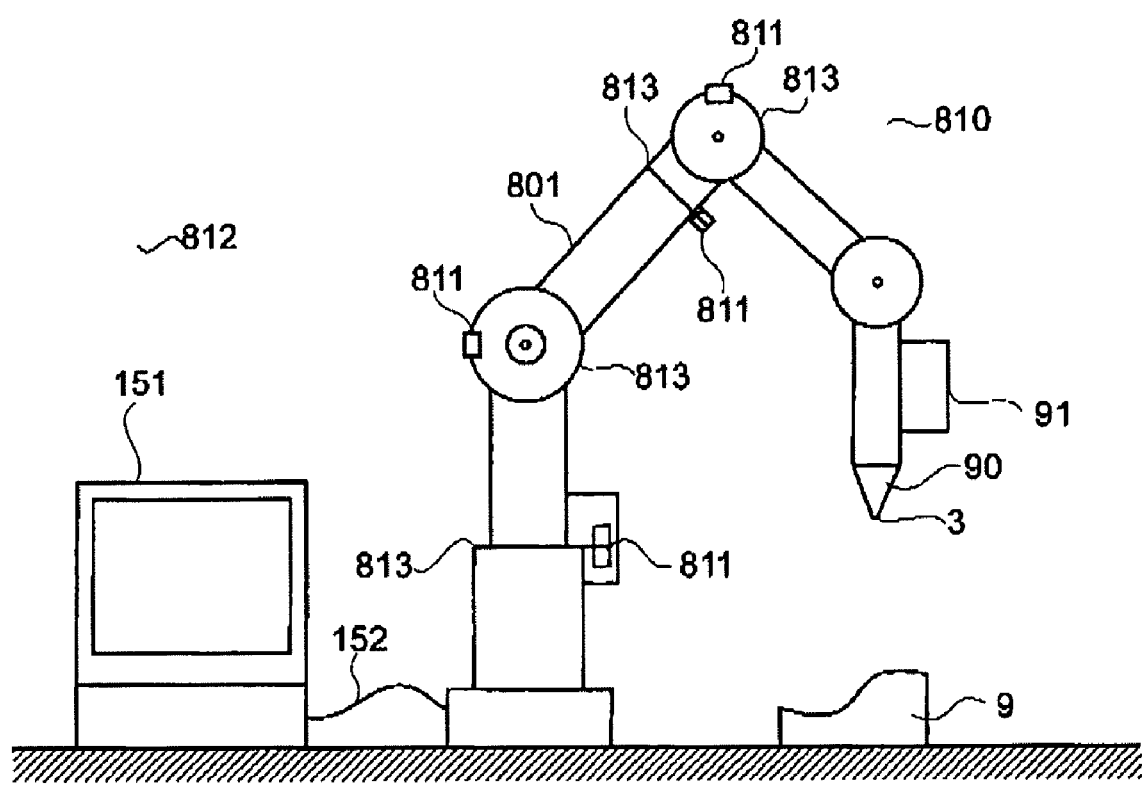
Figure 86A:
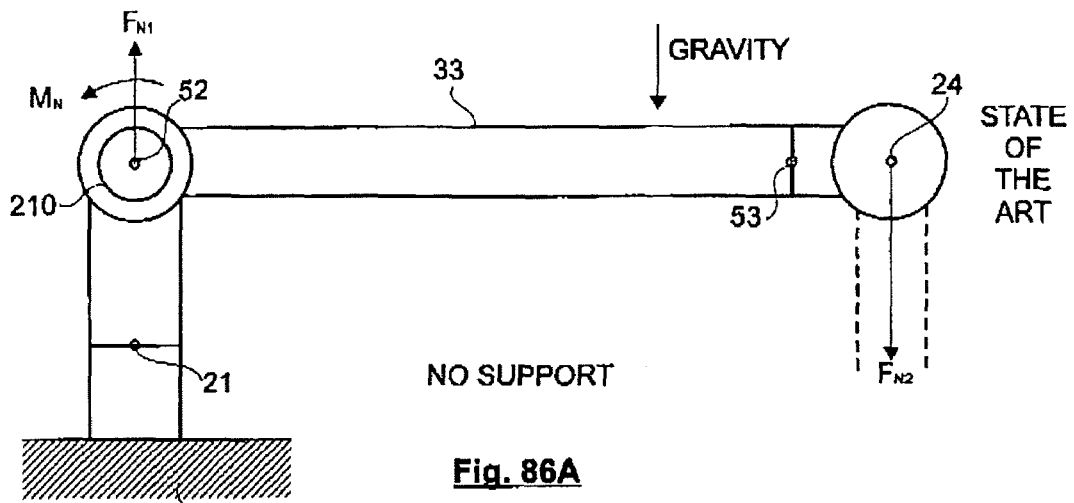
Figure 86B:
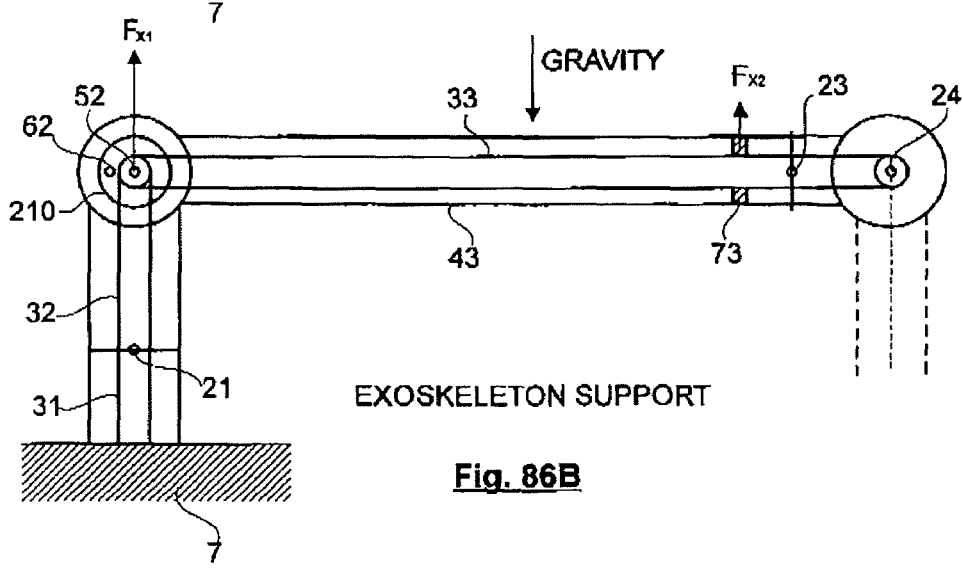
Figure 86C:
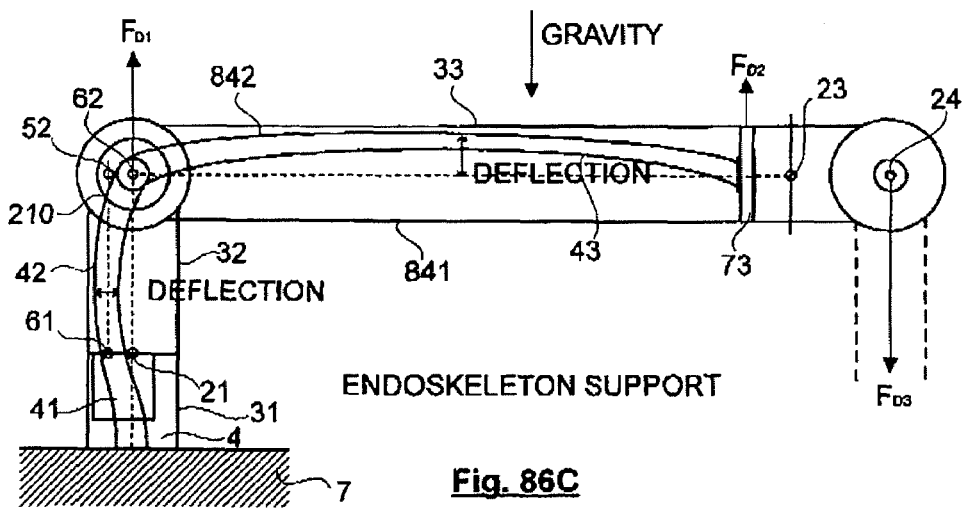
Figure 87:
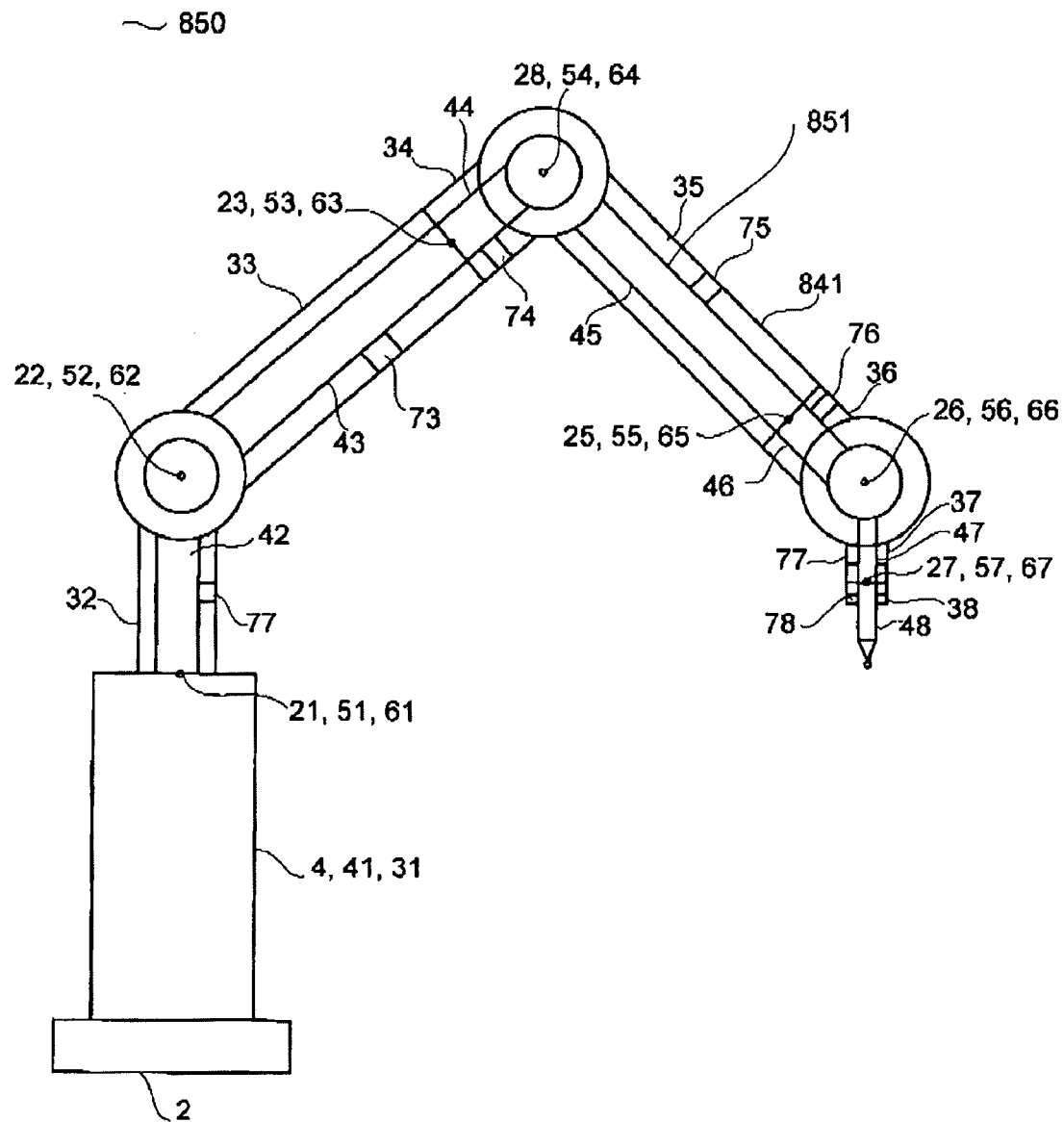
Figure 88:
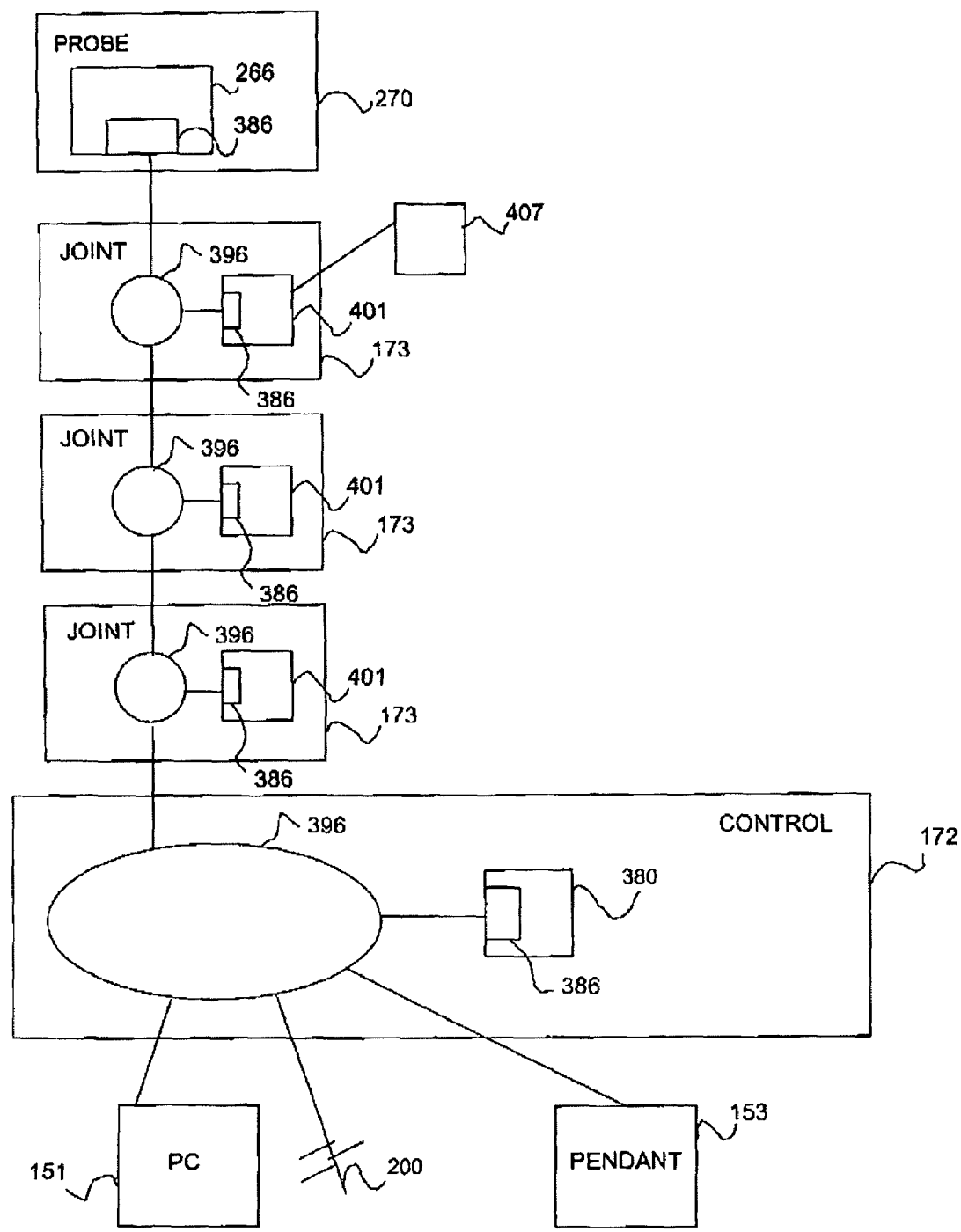
Figure 89A:
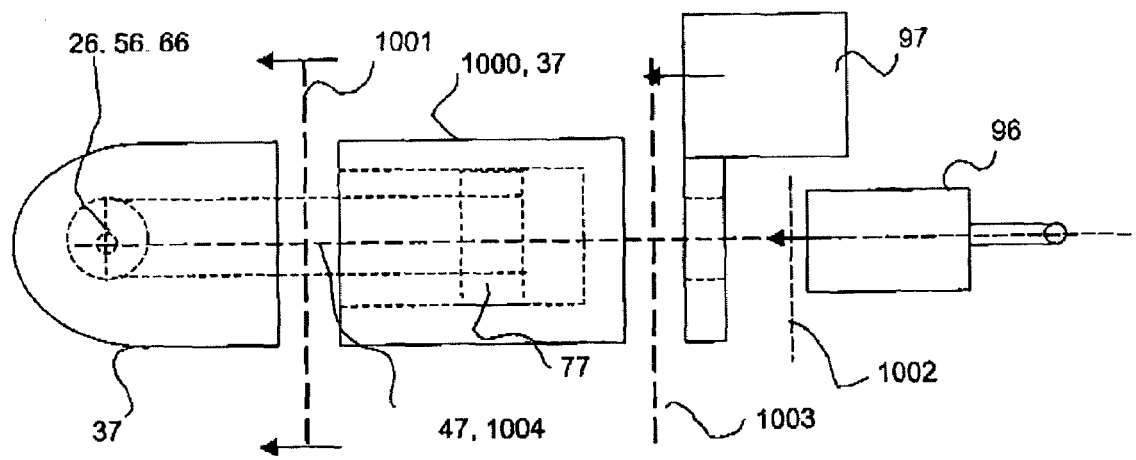
Figure 89B:
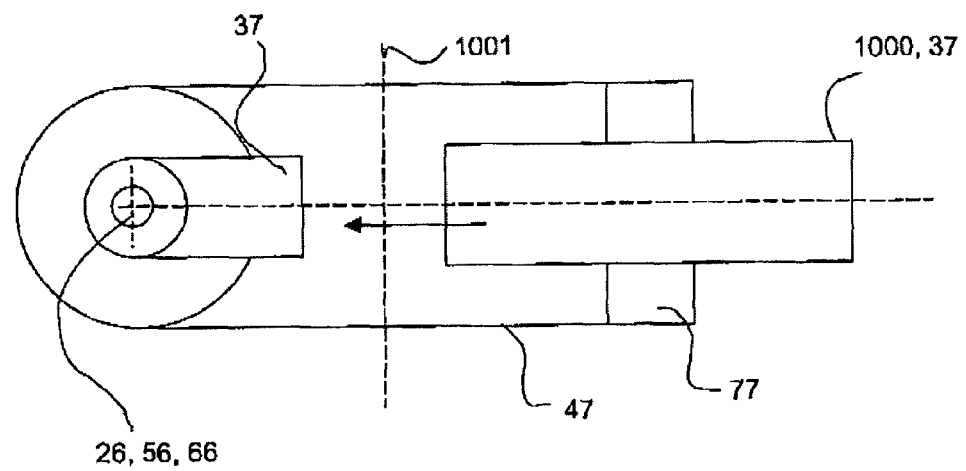
Figure 89C:
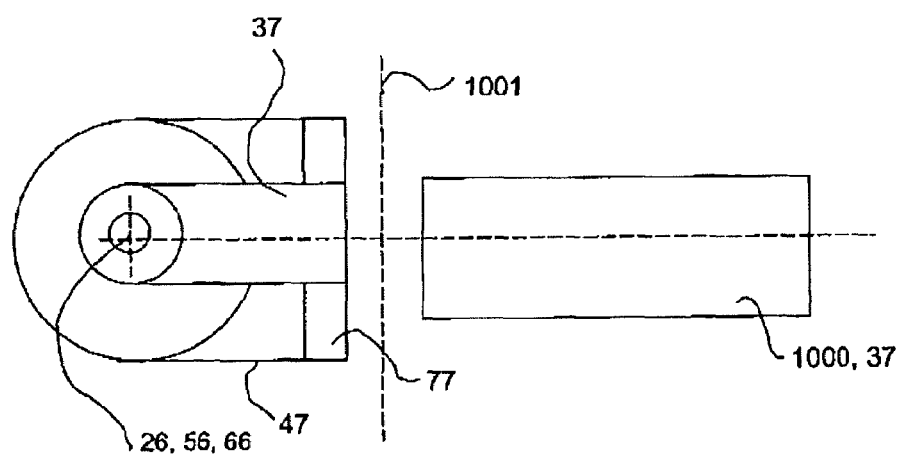
Figure 90A:
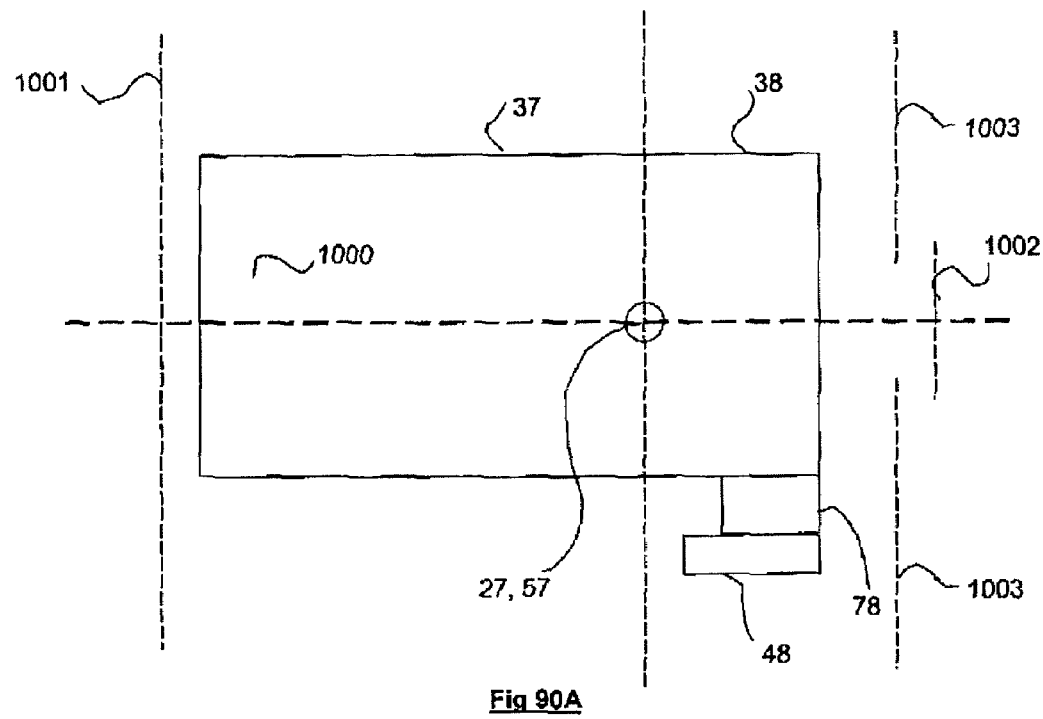
Figure 90B:
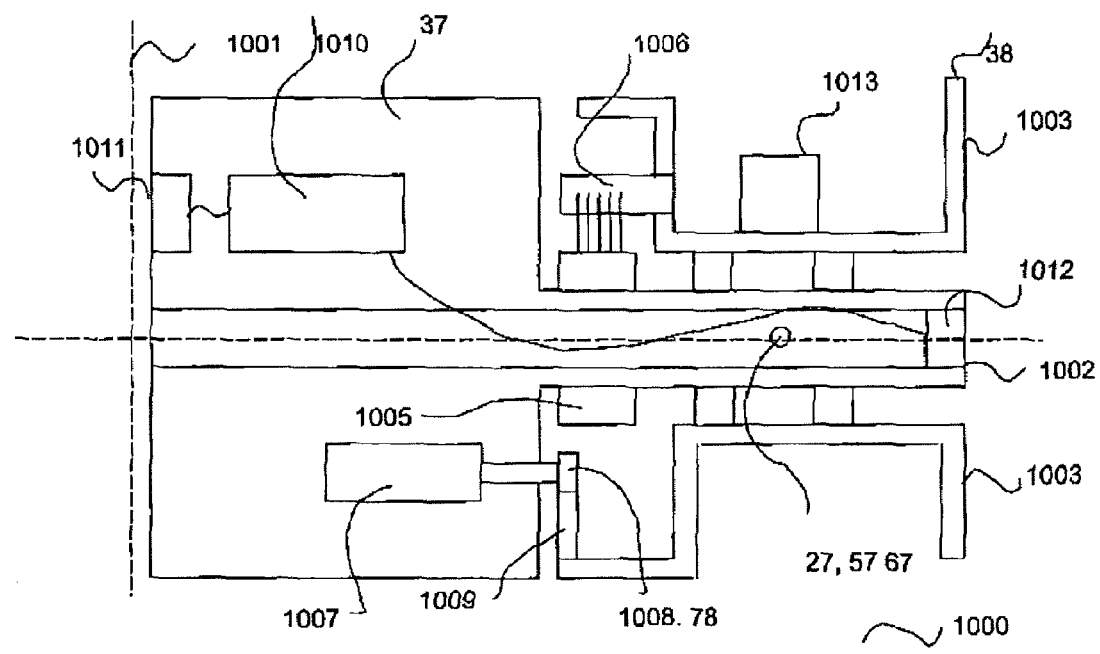

FIG. 82B is a schematic of an Optical Probe Cover as a handle;

FIG. 83A is a schematic of a Partial Exoskeleton;

FIG. 83B is a schematic of an Extended Partial Exoskeleton;

FIG. 83C is a schematic of a Protective Extended Partial Exoskeleton with different Internal CMM and Exoskeleton joint positions;

FIG. 83D is a flow diagram of a manual contact measuring process;

FIG. 83E is a flow diagram of an automatic contact measuring process;

FIG. 83F is a flow diagram of a non-contact scanning process;

FIG. 83G is a flow diagram of a contact scanning process;

FIG. 83H is a schematic of a modular robotic calibration rig;

FIG. 83I is a schematic of an external robot calibration rig;

FIG. 84 is a schematic of a Transportation case;

FIG. 85 is a layout for a Manual CMM Arm with Exoskeleton System;

FIG. 86A is a diagram of an unsupported Manual CMM Arm showing forces;

FIG. 86B is a diagram of a Manual CMM Arm with Exoskeleton showing forces;

FIG. 86C is a diagram of a Manual CMM Arm with Endoskeleton showing forces;

FIG. 87 is a schematic diagram of the Joints and Segments of the Robot Endoskeleton and the External CMM Arm;

FIG. 88 is a schematic of the Arm network;

FIG. 89A is a schematic of the Probe End Module interfaces;

FIG. 89B is a diagram of the Probe End Module exoskeleton support;

FIG. 89C is a diagram of the Probe End Module mounting;

FIG. 90A is a diagram of the 1-axis Probe End Module;

FIG. 90B is a section of the hybrid 0/1-axis Probe End Module.

DETAILED DESCRIPTION OF THE PREFERRED EMBODIMENTS

First Embodiment

Portable Robot CMM Arm

The first embodiment of this CMM Arm with Exoskeleton invention is a Portable Robot CMM Arm. This Portable Robot CMM Arm embodiment comprises an Internal CMM Arm guided by an Exoskeleton. The Exoskeleton supports and manipulates the Internal CMM Arm via transmission means such that it can measure accurately. This invention can be embodied in many Robot CMM Arm articulated arm layouts. There are two preferable layouts for a Robot CMM Arm in accordance with a first embodiment of the present invention: 6-axis with 6 joints and 7-axis with 7 joints.

Robot CMM Arm Joint and Segment Layout

FIGS. 1A and 1B are diagrams showing the preferable 6-axis and 7-axis layouts respectively for a Robot CMM Arm 1 in accordance with a first embodiment of the present invention. An articulated Robot CMM Arm 1 has a base end 2 and a probe end 3 and comprises a series of segments and rotating joints between the two ends. There are two types of joint: axial and orthogonal. An axial joint (labelled 'A' in FIGS. 1A, 1B) rotates about the common axis of its two adjoining segments. An orthogonal joint (labelled 'O' in FIGS. 1A and 1B) rotates as a hinge between its two adjoining segments. In FIG. 1A, the type of joints in order from the base end 2 to the probe end 3 is AOOAOA referring respectively to joint centres 21, 22, 24, 25, 26 and 27. In FIG. 1B, the type of joints in order from the base end 2 to the probe end 3 is AOAOAOA referring respectively to joint centres 21, 22, 23, 24, 25, 26 and 27. The 6-axis layout has the advantage of lower cost. The 7-axis layout has the advantage of increased flexibility for access to complex objects.

The preferable 7-axis Robot CMM Arm 1 layout of FIG. 1B is described in this first embodiment of the Robot CMM Arm 1 invention, but the invention is not limited to this joint layout or the preferable 6-axis layout of FIG. 1A and can have more or less joints than 7. For a simple application, 3 joints can be sufficient. This invention is not limited to only rotational axes of movement. As will be disclosed later, it can comprise one or more linear axes of movement to which the base end 2 is preferably attached.

FIG. 1c shows the Robot CMM Arm system 150 comprising a Robot CMM Arm 1, connected to a laptop 151 with a cable 152. The Robot CMM Arm 1 has a base end 2 and a probe end 3. It is mounted on a surface 7. A probe 90 is mounted on the probe end 3 of the Robot CMM Arm 1. An Optical probe 91 is also mounted towards the probe end 3 of the Robot CMM Arm 1. The Robot CMM Arm 1 comprises a base 4, an Internal CMM Arm 5, an Exoskeleton 6 and Transmission Means 10. The object 9 being measured is situated on the surface 7.

Figure 2:
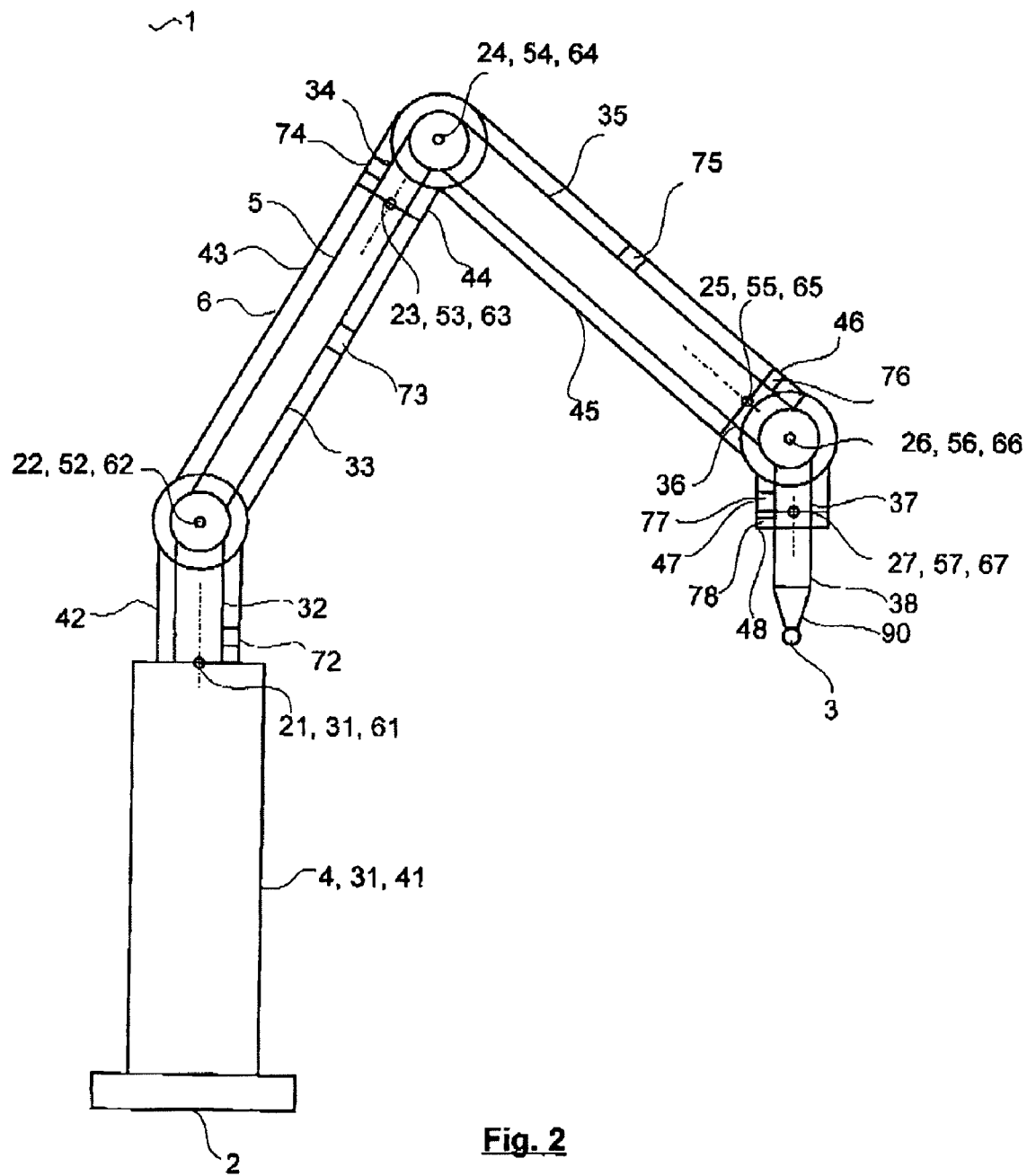
FIG. 2 is a schematic diagram of the Joints and Segments of the Exoskeleton and the Internal CMM Arm.

FIG. 2 shows the two main parts of the Robot CMM Arm 1: the Internal CMM Arm 5 and the Exoskeleton 6 sharing a common base 4 and common joint centres 21, 22, 23, 24, 25, 26 and 27. The Internal CMM Arm 5 comprises segments 32, 33, 34, 35, 36, 37 and 38 referred to in the text as CMM Segment2-8 respectively. CMM Segment8 38 reaches to the probe end 3 of the Robot CMM Arm 1. The common base 4 is also referred to as CMM Segment1 31. The Internal CMM Arm 5 further comprises joints 51, 52, 53, 54, 55, 56, 57 referred to in the text as CMM Joint1-7 respectively. The Exoskeleton 6 comprises segments 42, 43, 44, 45, 46, 47 and 48 referred to in the text as Exoskeleton Segment2-8 respectively. Exoskeleton Segment8 48 does not reach to the probe end 3 of the Robot CMM Arm 1. The common base 4 is also referred to as Exoskeleton Segment1 41. The Exoskeleton 6 further comprises joints 61, 62, 63, 64, 65, 66 and 67 referred to in the text as Exoskeleton Joint1-7 respectively. The Robot CMM Arm 1 further comprises Transmission Means 72, 73, 74, 75, 76, 77 and 78 referred to in the text as Transmission Means2-8 respectively, attaching Internal CMM Arm 5 to Exoskeleton 6. Transmission Means2 72 attaches CMM Segment2 32 to Exoskeleton Segment2 42. Transmission Means3 73 attaches CMM Segment3 33 to Exoskeleton Segment3 43 and so on correspondingly for Transmission Means4-8 74, 75, 76, 77 and 78.

Internal CMM Arm Joint and Segment Layout

The segments and joints of the Internal CMM Arm 5 in the Robot CMM Arm 1 are named and laid out in general terms as follows.

| Segment | Name | Location description | Comparative Length |
|---|---|---|---|
| CMM Segment 1 | Base | Between base end and Joint 1 | Short |
| CMM Segment 2 | Shoulder | Between Joint 1 and Joint 2 | Short |
| CMM Segment 3 | Upper Arm | Between Joint 2 and Joint 3 | Long |
| CMM Segment 4 | Elbow | Between Joint 3 and Joint 4 | Short |
| CMM Segment 5 | Lower Arm | Between Joint 4 and Joint 5 | Long |
| CMM Segment 6 | Hand | Between Joint 5 and Joint 6 | Short |
| CMM Segment 7 | Wrist | Between Joint 6 and Joint 7 | Short |
| CMM Segment 8 | Probe | Between Joint 7 and probe end | Short |

| Joint | Name | Type | Rotation |
|---|---|---|---|
| CMM Joint 1 | Base | Axial | >360 degs |
| CMM Joint 2 | Shoulder | Orthogonal | >180 degs |
| CMM Joint 3 | Pre-elbow | Axial | >360 degs |
| CMM Joint 4 | Elbow | Orthogonal | >180 degs |
| CMM Joint 5 | Pre-wrist | Axial | >360 degs |
| CMM Joint 6 | Wrist | Orthogonal | >180 degs |
| CMM Joint 7 | Sensor | Axial | >360 degs |

Figure 3:
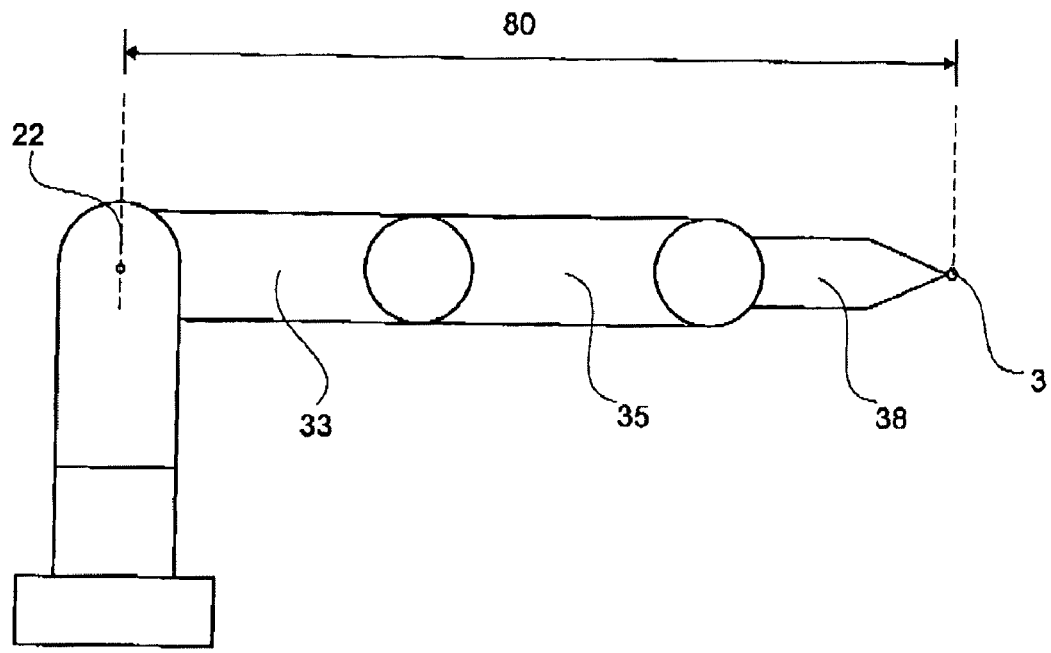
FIG. 3 is a schematic diagram of the reach of a Robot CMM Arm.

Referring now to FIG. 3, the Reach 80 of the Robot CMM Arm 1 is defined as being from Joint Centre2 22 to the probe end 3 of CMM Segment8 38, when the CMM Joints3-7 are rotated to maximise this distance. The bulk of the Reach 80 of the Robot CMM Arm 1 comprises the sum of the lengths of CMM Segment3 33 and CMM Segment5 35.

Figure 4:
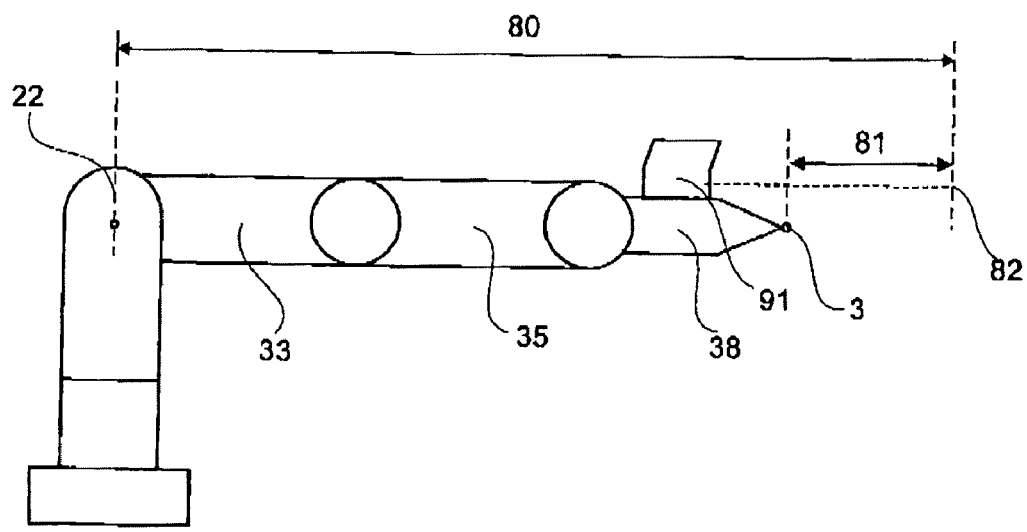
FIG. 4 is a schematic diagram of the virtual reach of a Robot CMM Arm with an Optical probe.

Referring now to FIG. 4, in the case where an Optical probe 91 is mounted on CMM Segment8 38, the reach 80 is increased with a virtual reach 81 of the distance between the probe end 3 of CMM Segment8 38 and the Optical measuring mid-point 82 of the measuring depth over which measurements can be taken.

Each CMM Segment has a high stiffness. Any loads on the Internal CMM Arm 5 resulting in bending or torsion in a segment will reduce the accuracy of the Internal CMM Arm 5. Gravity is a continuous source of load and the effect of gravity is different for different spatial orientations of the Robot CMM Arm 1. A typical maximum angular torsional slope in a long CMM segment of the Robot CMM Arm in normal use is 0.25 arc-second, but could be more or less, particularly depending on the length of the CMM Segment. A typical maximum angular bending slope in a long CMM Segment of the Robot CMM Arm in normal use is 0.5 arc second, but could be more or less, particularly depending on the material, length and diameter of the long CMM Segment.

Each CMM Segment comprises one or more significant items:

| Segment | Item | Joints | Description |
|---|---|---|---|
| CMM Segment 1 | Base | 1 | Machined aircraft aluminium |
| CMM Segment 2 | Shoulder | 1, 2 | Machined aircraft aluminium |
| CMM Segment 3 | Housing | 2 | Machined aircraft aluminium |
|  | Link | 0 | Woven carbon fibre |
|  | Housing | 3 | Machined aircraft aluminium |
| CMM Segment 4 | Elbow | 3, 4 | Machined aircraft aluminium |
| CMM Segment 5 | Housing | 4 | Machined aircraft aluminium |
|  | Link | 0 | Woven carbon fibre |
|  | Housing | 5 | Machined aircraft aluminium |
| CMM Segment 6 | Hand | 5, 6 | Machined aircraft aluminium |
| CMM Segment 7 | Wrist | 6, 7 | Machined aircraft aluminium |
| CMM Segment 8 | Probe | 7 | Machined aircraft aluminium |

Figure 5A:
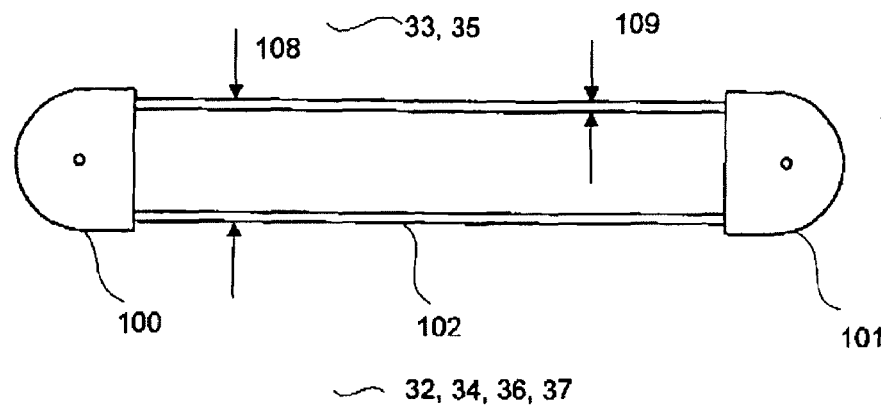
FIG. 5A is a schematic diagram of a long CMM Segment.
Figure 5B:
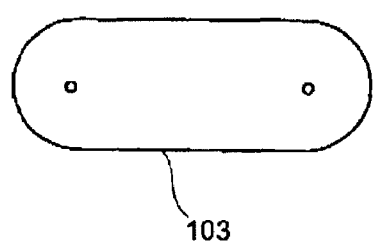
FIG. 5B is a schematic diagram of a short CMM Segment.

Referring now to FIG. 5A, CMM Segments3, 5 33, 35 comprise a Link Member 102 with diameter 108 and wall thickness 109 between two End Housings 100, 101 housing one joint each Referring now to FIG. 5B, CMM Segments2, 4, 6 and 7 32, 34, 36 and 37 comprise a Double Housing 103 housing two joints, one at each end. Referring now to FIG. 5C1, CMM Segment8 38 comprises a Probe End Housing 105 housing CMM Joint7 57 at one end with CMM Probe Mounting Means 39 at the other end to which a Probe 90 is attached ending in Probe end 3. It will be appreciated that there are different options for providing an orthogonal joint for CMM Joints 2,4,6 52,54,56. Referring now to FIG. 5C2, a cantilever option and an in-line option are shown for CMM Joint2 52. The preferred option for CMM Joints 2,4,6 52,54, 56 is in-line. The scope of the Robot CMM Arm 1 is not limited to either of these joint options but could include any other design of orthogonal joint.

Exoskeleton Joint and Segment Layout

The segments and joints of the Exoskeleton 6 in the Robot CMM Arm 1 are named and laid out in general terms as follows.

| Segment | Name | Location description | Comparative Length |
|---|---|---|---|
| Exoskeleton Segment 1 | Base | Between base end and Joint 1 | Short |
| Exoskeleton Segment 2 | Shoulder | Between Joint 1 and Joint 2 | Short |
| Exoskeleton Segment 3 | Upper Arm | Between Joint 2 and Joint 3 | Long |
| Exoskeleton Segment 4 | Elbow | Between Joint 3 and Joint 4 | Short |
| Exoskeleton Segment 5 | Lower Arm | Between Joint 4 and Joint 5 | Long |
| Exoskeleton Segment 6 | Hand | Between Joint 5 and Joint 6 | Short |
| Exoskeleton Segment 7 | Wrist | Between Joint 6 and Joint 7 | Short |
| Exoskeleton Segment 8 | Probe | Extending from Joint 7 | Short |

| Joint | Name | Type | Rotation | Brake |
|---|---|---|---|---|
| Exoskeleton Joint 1 | Base | Axial | >360 degs | No brake |
| Exoskeleton Joint 2 | Shoulder | Orthogonal | >180 degs | Brake |
| Exoskeleton Joint 3 | Pre-elbow | Axial | >360 degs | Brake |
| Exoskeleton Joint 4 | Elbow | Orthogonal | >180 degs | Brake |
| Exoskeleton Joint 5 | Pre-wrist | Axial | >360 degs | Brake |
| Exoskeleton Joint 6 | Wrist | Orthogonal | >180 degs | Brake |
| Exoskeleton Joint 7 | Sensor | Axial | >360 degs | Brake |

Each Exoskeleton Segment comprises one or more significant items:

| Segment | Item | Joints | Description |
|---|---|---|---|
| Exoskeleton Segment 1 | Base | 1 | Machined aircraft aluminium |
| Exoskeleton Segment 2 | Shoulder | 1, 2 | Machined aircraft aluminium |
| Exoskeleton Segment 3 | Housing | 2 | Machined aircraft aluminium |
|  | Link | 0 | Aluminium tube |
|  | Housing | 3 | Machined aircraft aluminium |
| Exoskeleton Segment 4 | Elbow | 3, 4 | Machined aircraft aluminium |
| Exoskeleton Segment 5 | Housing | 4 | Machined aircraft aluminium |
|  | Link | 0 | Aluminium tube |
|  | Housing | 5 | Machined aircraft aluminium |
| Exoskeleton Segment 6 | Hand | 5, 6 | Machined aircraft aluminium |
| Exoskeleton Segment 7 | Wrist | 6, 7 | Machined aircraft aluminium |
| CMM Segment 8 | Probe | 7 | Machined aircraft aluminium |

Base Layout

Figure 5D:
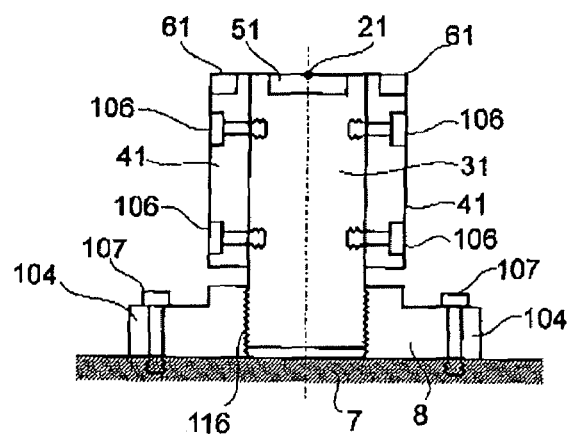
FIG. 5D is a schematic diagram of the base.
Figures 5E, 5F, 5G, 5H:
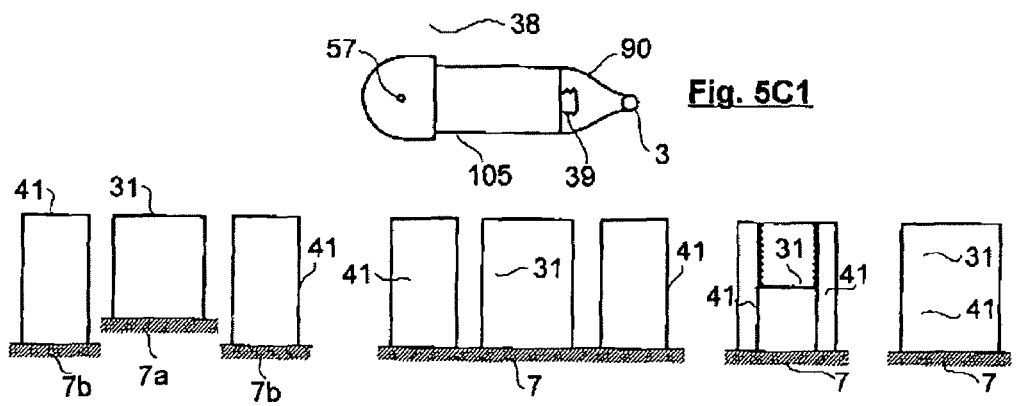
FIG. 5E is a layout of separate base segments that are separately mounted.
FIG. 5F is a layout of separate base segments that are mounted on the same surface.
FIG. 5G is a layout of the Exoskeleton base mounted on a surface.
FIG. 5H is a layout of a common base.

Referring now to FIG. 5D, the Base 4 comprises CMM Segment1 31 housing CMM Joint 1 51 with Joint Centre 21 screwed into Mounting Plate 8 by means of a standard 3.5" heavy duty thread 116 and, Exoskeleton Segment1 41 housing Exoskeleton Joint1 61 with Joint Centre 21 rigidly attached to CMM Segment 1 31 with bolts 106. The Mounting Plate 8 is attached to the Surface 7 by Mounting means 104 such as Mounting Bolts 107. Both the Internal CMM Arm 5 and the Exoskeleton 6 have base segments 31, 41 respectively. In this first embodiment, Exoskeleton Segment1 41 is rigidly attached to CMM Segment1 31 with counter-bored bolts 106. Referring now to FIG. 5E, in another embodiment of this Robot CMM Arm 1 invention, CMM Segment1 31 can be mounted to a first surface 7a and Exoskeleton Segment1 41 can be mounted to a second surface 7b in such a way that CMM Segment1 31 is not attached to Exoskeleton Segment1 41. Referring now to FIG. 5F, in a further embodiment of this Robot CMM Arm 1 invention, both the CMM Segment1 31 and the Exoskeleton Segment1 41 can be independently mounted to the same Surface 7. CMM Joint1 51 can be raised higher above the surface 7 by providing a base extension section between the surface 7 and the base 2. Such a base extension section is preferably based on a lightweight tube made of woven carbon fibre with a low Coefficient of Thermal Expansion typically 0.075 ppm/degC. This means that the measurement of the Robot CMM Arm 1 with a base extension tube relative to the surface 7 will not be significantly affected by changes in temperature. Referring now to FIG. 5G, in a further embodiment of this Robot CMM Arm 1 invention, CMM Segment1 31 can be attached, rigidly or flexibly to Exoskeleton Segment1 41 which is mounted on a surface 7. Referring now to FIG. 5H, in a further embodiment of this Robot CMM Arm invention, CMM Segment1 31 and Exoskeleton Segment1 41 can be the same base item 4 mounted on surface 7 to which both CMM Segment2 32 and Exoskeleton Segment2 42 are attached via CMM Joint1 51 and Exoskeleton Joint1 61 respectively. It is a purpose of this Robot CMM Arm invention that there can be any form of base mounting.

Robot CMM Arm Reach

This Robot CMM Arm 1 invention is provided in this first embodiment as a range of portable Robot CMM Arms with different reaches. The portable Robot CMM Arm Reach 80 varies from 0.6 m to 3 m. The scope of this invention is not limited to reaches within this range and the Reach 80 could be less than 0.6 m or more than 3 m.

Internal CMM Arm Structure

Stiffness and Mass

It is an object of this invention to minimise the mass of the Internal CMM Arm 5. This in turn allows the mass of a portable Robot CMM Arm 1 to be minimised because it requires less stiffness and motor power to move the Internal CMM Arm 5, thereby making the Robot CMM Arm 1 more portable. Experience has shown there to be a beneficial multiplier effect and that for each 100 g of mass removed from the Internal CMM Arm 5, some 250-400 g can be removed from the Robot CMM Arm 1 design. A typical weight for the moving parts of a medium reach Internal CMM arm 5 is 2.54 kg. The Exoskeleton 6 supports and drives the Internal CMM Arm 5 so as to minimise stresses on the Internal CMM Arm 5 and in particular on the Internal CMM Arm Joints 51-57. In use, the only loads on the Exoskeleton 6 should be gravity and the loads transferred through the Transmission Means 10. The Exoskeleton 6 always supports the Internal CMM Arm 5 in the same places, providing repeatable loadings at the same spatial orientation. By comparison, a state of the art Manual CMM Arm is designed for additional stresses applied to it by the operator, which are significantly higher than those on the Internal CMM Arm 5 and are also applied at different loading locations and directions depending on where and how the operator grips it. This means that an Internal CMM Arm 5 does not need as high stiffness as a Manual CMM Arm of similar reach and is lighter than it.

Link Member Diameter and Thickness

The larger the Link Member diameter 108, the stiffer it is and the more accurate it is. With advances in materials science, the stiffness to weight ratio for arms is increasing as new stiffer and lighter materials become available. The Internal CMM Arm 5 has two long Link Members 102 in the upper arm and lower arm: CMM Segment3 33, CMM Segment5 35. The Link Member diameter 108 of the Internal CMM Arm 5 is in the range 40 mm-70 mm. The scope of this Robot CMM Arm 1 invention is not constrained to this Link Member diameter; Link Member diameters more than 70 mm or less than 40 mm can be used. During handling by an operator, the forces and torques on a state of the art Manual CMM arm come from, amongst others: gravity which is related to the combination of joint angles at that instant in time, the compensating device, the accelerations, and the operator induced forces and torques. The operator can apply bending forces on either link. For this reason, a Manual CMM arm typically has the same link diameter for both segments. The Exoskeleton 6 supports all segments 32-38 of the Internal CMM Arm 5 approximately equally. For this reason, the Internal CMM Arm 5 of this first embodiment has the same Link Member diameter 108 for both segments 33 and 35. The scope of this Robot CMM Arm invention is not constrained to a uniform Link Member diameter and Link Member diameters can be different. The Link member 102 is essentially a simple beam supported at either end by joints or transmission means. The main mode of deflection is under the gravitational force when horizontal. Assuming there are no undesirable moments on the link member 102, then the deflection of the Link member 102 is largely independent of the Link Member thickness 109. It follows that the Link member thickness can be very small and this is consistent with the objective of minimum mass for the Internal CMM Arm 5. The Link Member thickness 109 of the Internal CMM Arm is preferably 1 mm to 1.5 mm for both segments 33 and 35. For longer reach arms, Link Member thickness 109 and/or the Link Member diameter 108 are typically increased to maintain stiffness. The Link Member diameters and thicknesses are parameters that are optimised in the design process for different design specifications and manufacturing constraints.

Shape

The Exoskeleton Segments2-8 42-48 pass down over the Internal CMM Arm segments during assembly. The shape of the CMM Segments 32-38 of the Internal CMM Arm is constrained to have as small a maximum radial dimension as possible. Any reduction in maximum radial dimension enables the Exoskeleton Segments2-8 42-48 to be reduced in size and this makes the Robot CMM Arm invention smaller and more flexible in its application.

Exoskeleton Structure

Performance

It is an object of this first embodiment that the Robot CMM Arm 1 is portable and that the weight be minimised. This object is not compatible with requirements of minimising cycle times and the correspondingly high angular accelerations at the joints. Performance in terms of maximum angular velocities and accelerations are higher for a short reach Robot CMM Arm 1 than for a long reach Robot CMM Arm 1. Maximum joint angular velocities are typically in the range 20 deg/sec to 400 deg/sec. Exoskeleton Joints1-4 61-64 have lower maximum angular velocities than Exoskeleton Joints 5-7 65-67 because the Torques are higher. In the case of a long Reach 80 of 3 m and a Robot CMM Arm weight of below 35 kg, then Joint 2 can typically have a maximum angular velocity of 20 deg/sec. In the case of a short Reach 80 of less than 1 m and a Robot CMM Arm weight of above 20 kg, then Joint 7 can have a maximum angular velocity of 400 deg/sec. The scope of this Robot CMM Arm invention is not constrained to this range of maximum angular velocities and the maximum angular velocity of a joint can be higher than 400 deg/sec or lower than 20 deg/sec.

Mass and Stiffness

The Exoskeleton structure is less stiff than the Internal CMM Arm since high stiffness is not required for the functions of support and drive. The Exoskeleton structure is therefore light, making the Robot CMM Arm more portable. There is a virtuous circle in that for given performance criteria, a reduced mass in any moving segment requires less powerful drive systems that in turn weigh less. Typical masses for a range of portable Robot CMM Arms vary from 18 kg for a 1 m Reach to 35 kg for a 3 m Reach. The scope of this Robot CMM Arm invention is not constrained to this range of masses and the maximum mass can be higher than 35 kg or lower than 18 kg.

Shape

The Exoskeleton structure is compact and lies close to the Internal CMM arm. This means that the Robot CMM Arm can access difficult areas for measurement such as car interiors. The Robot CMM Arm can thus be applied to applications that cannot be tackled without extensive preparation of the object such as when a car seat cannot be measured in situ but must be first removed from the car. The Exoskeleton Segments 42-48 form a sealed shape to protect the Internal CMM Arm Segments 32-38 from exposure to damaging solids, liquids or gases during use. The Exoskeleton Segments 42-48 are hollow to fit over the Internal CMM Arm Segments 32-38. The Exoskeleton shape also serves the functions of making the Robot CMM Arm manually usable and protects parts of the Internal CMM Arm in the event of a collision. Parts of the Exoskeleton structure have non-functional surface shape for reasons of aesthetics. One of the largest factors determining the Exoskeleton shape is the size and location of the motor and gearbox drive elements.

Materials

Internal CMM Arm Materials

The Housings 100, 101, 103, 105 are made of aircraft aluminium; the aluminium is anodised. The Link members 102 comprise a thin-walled tube made of a woven carbon fibre-epoxy composite material such as Toray T700 that provides a near-zero coefficient of thermal expansion, high stiffness and low density. Link members 102 can be attached to End Housings 100, 101 by an adhesive such as epoxy, whilst being supported in a precision jig as will be well understood by a person skilled in the art.

Exoskeleton Materials

The joint housing items are made of aircraft aluminium. The aluminium is anodised. The link items comprise a precision moulding of carbon-fibre. The link items are attached to joint housing items by an adhesive such as epoxy, whilst being supported in a precision jig.

Robot CMM Arm Mounting

It is an object of this invention that the Robot CMM Arm can be mounted onto a number of different structures in different orientations using a number of different mounting means to suit the application that it is used for.

Mounting Means

Mounting the Robot CMM Arm 1 to a surface 7 can be by many means 104 including bolting down with bolts 107, magnetic mounting, vacuum mounting and clamping. It is important that the mounting means 104 used is stiff enough so as not to introduce movement between the mounting plate 8 and the surface 7 during operation of the Robot CMM Arm 1, thus rendering the Robot CMM Arm 1 less accurate.

Horizontal Surfaces with Vertical Robot CMM Arm Orientation

Figure 6:
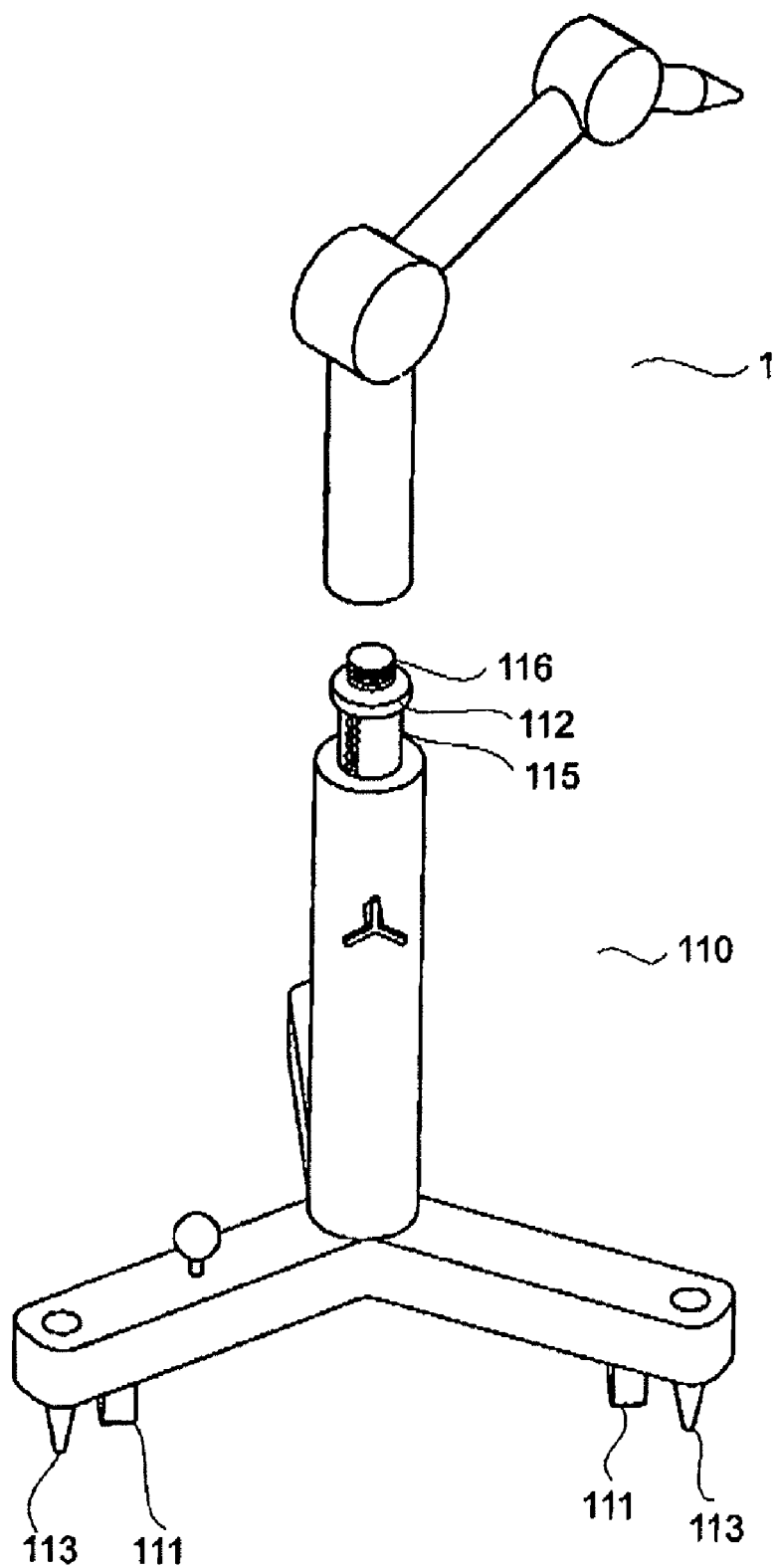
FIG. 6 is a schematic diagram of a stand.
Figure 7H:
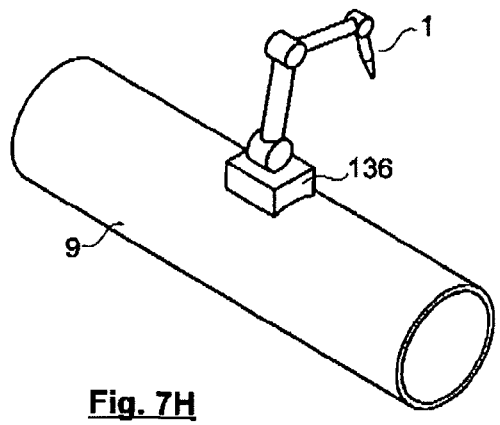
FIG. 7H is a layout of a Robot CMM Arm mounted on an object.
Figure 7I:
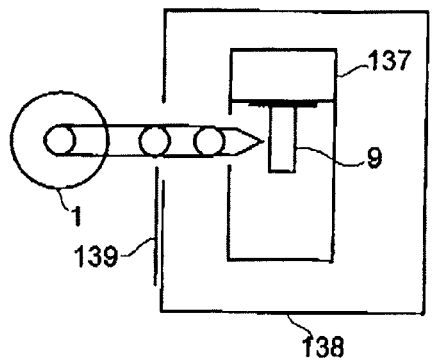
FIG. 7I is a plan view of a Robot CMM Arm mounted adjacent to a processing machine.
Figure 7J:
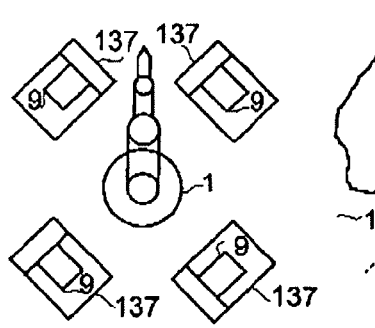
FIG. 7J is a layout of a Robot CMM Arm mounted between several processing machines.
Figure 7K:
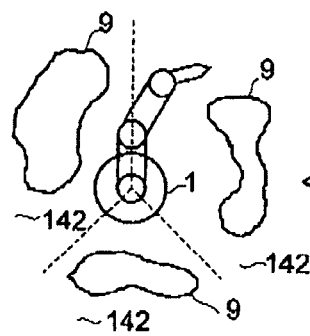
FIG. 7K is a layout of a Robot CMM Arm mounted between several work areas.
Figure 7L:
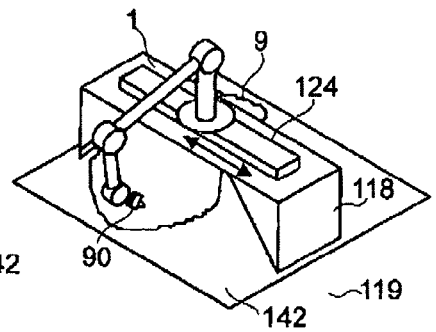
FIG. 7L is a layout of a Robot CMM Arm on a bridge over the object.

Referring to FIG. 6, the Robot CMM Arm 1 is normally mounted on the horizontal mounting surface 112 of a portable stand 110 using a standard 3.5"×8 thread 116. The stand 110 has three wheels 111 that can be locked. The stand 110 has retractable feet 113. The stand 110 has a large footprint to avoid it toppling over. The footprint is larger than for a corresponding Manual CMM Arm because the operator takes part of the arm load of a Manual CMM Arm through his feet, which reduces the torque on the stand 110. The mass of the stand 110 is larger than for a corresponding Manual CMM Arm stand because the Robot CMM Arm 1 is heavier than a corresponding Manual CMM Arm. The stand 110 has an extensible vertical member 115 to raise or lower the base of the Robot CMM Arm. The stand 110 must be used on a stiff floor surface and not on a carpet or compressible floor covering material. The stand 110 will preferably be heavy so that the dynamics of the Robot CMM Arm do not cause it to rock; the control of a portable Robot CMM Arm mounted on a stand limits angular accelerations and velocities to avoid rocking the stand 110 and losing accuracy. An example of a stand 110 for short reach Robot CMM Arms is stand number 231-0 weighing approximately 100 kg and manufactured by Brunson Instrument Company (US) that is suitable for short and medium reaches. Additional weights may be rigidly attached to the base of the stand 110 to increase its stability. Long reach Robot CMM Arms require a larger and sturdier stand. Referring to FIG. 7A, the Robot CMM Arm 1 can be rigidly mounted on a stable table 120 such as an optical bench or granite block that can be isolated from vibrations travelling through the floor 119 by vibration absorption means 121 situated above the supports 122. Referring to FIG. 7B, the Robot CMM Arm 1 can be mounted directly to the floor 119. Referring to FIG. 7C, the Robot CMM Arm 1 can be mounted onto a surface plate 123 mounted on the floor 119. Referring to the plan view of FIG. 7D, the Robot CMM Arm 1 is mounted on a rail axis 124 on which it travels across the floor 119. The Robot CMM Arm 1 is shown in three different positions A, B, C along rail axis 124. This means that the Robot CMM Arm 1 can measure a much larger volume of a large object 9. A second Robot CMM Arm 1 is mounted on a second rail axis 124 and is shown in two different positions D and E. The two rail axes are preferably parallel. This means that two Robot CMM Arms 1 can move independently and measure both sides of a large object 9 such as a motorcycle, car or large vehicle. The rail axis 124 is preferably linear. The rail axis 124 is preferably mounted above the floor 119 such that it can be removed and reinstalled in a different location; alternatively, the rail axis 124 can be permanently embedded in the floor 119. The rail axis 124 can be manually driven, motor driven in response to manual actuation preferably via a button, or preferably CNC driven. The Robot CMM Arm 1 will not be as stable whilst translating along the rail axis 124 as when stationary. It is preferable that the Robot CMM Arm 1 does not measure whilst translating along the rail axis 124 and instead the rail axis 124 is used to move the Robot CMM Arm 1 from one measurement location to another such as from A to C via B. However, the Robot CMM Arm can measure during translation along the rail axis 124 but the accuracy will normally be reduced; this situation is most likely when the rail axis 124, is part of a large machine to which the Robot CMM Arm 1 is mounted. Referring now to FIG. 7E, two Robot CMM Arms 1 can be mounted on the same rail axis 124 and move independently. Each Robot CMM Arm 1 movement along the rail axis 124 can be manually driven, motor driven in response to manual actuation preferably via a button, or preferably CNC driven. A suitable application is the measurement of a car prototype in a design studio. This means that the productivity of a measuring installation with four Robot CMM Arms 1, two moving independently on each of two rails 124, can be double that of a measuring installation in which there is only one Robot CMM Arm on each rail axis 124. Referring now to FIG. 7F, the Robot CMM Arm 1 is mounted on a vertical axis 133 that can move the base of the Robot CMM Arm 1 vertically upwards and downwards. The vertical axis 133 can move horizontally on a rail axis 124. The vertical axis 133 can be manually driven, motor driven in response to manual actuation preferably via a button, or preferably CNC driven. The vertical axis 133 can be provided for one or both Robot CMM Arms 1 in the twin opposing Robot CMM Arm configuration shown in FIG. 7D or the vertical axis 133 can be provided for one or both arms in the Robot CMM Arm configuration shown in FIG. 7E. Referring now to FIG. 7G, two Robot CMM Arms are mounted on a moving multiple arm base 134 that moves on the rail axis 124. The two Robot CMM Arms are separated by a suitable distance S such that the working overlap is sufficient to eliminate any unreachable gap between the robots in the working volume. This means that high productivity can be achieved with a lower cost and simpler installation involving only one moving multiple arm base 134 instead of two independent Robot CMM Arms 1. As disclosed previously, shorter Robot CMM Arms are more accurate than longer CMM arms. It is an object of this embodiment that the horizontal rail 124 and vertical axis 133, either separately or in combination, will mean that a shorter Robot CMM Arm can be used. This means that, since the horizontal rail 124 and the vertical axis 133 are more accurate over longer distances than a Robot CMM Arm, the total accuracy of the measuring installation will be increased by using a horizontal rail 124 and a vertical axis 133, either separately or in combination. A person skilled in the art, can optimise the specification of Robot CMM Arm length, horizontal axis and vertical axis to maximise the accuracy. Referring now to FIG. 7H, the Robot CMM Arm 1 is mounted on the object 9 to be measured. An adaptor 136 is used. An example of such an object 9 is a section of pipe in a gas pipeline that is being measured in and around surface areas that have been corroded; in this example it is easier and less expensive to mount the Robot CMM Arm 1 on the pipe than to build a temporary structure of sufficient stability adjacent to the pipe. The adaptor 136 can be a magnetic mount for ease of mounting and dismounting of the Robot CMM Arm 1 or any other mounting means 104 may be used. For some objects 9, an adaptor 136 is not required and the Robot CMM Arm 1 may be mounted directly onto the object 9. Referring now to FIG. 7I, the Robot CMM Arm 1 is mounted adjacent to a processing machine 137 to which an object 9 is mounted. The processing machine 137 is surrounded by an enclosure 138 with an automatically operated sliding door 139. The Robot CMM Arm 1 can measure the object 9 in the machine 137. The enclosure 138 and sliding door 139 are required for processing machines 137 in which environmental pollution that may be harmful to the Robot CMM Arm 1 is contained within the enclosure during processing. Some processing machines 137 do not generate environmental pollution harmful to a Robot CMM Arm 1 and do not require enclosures 138 with sliding doors 139. A smaller Robot CMM Arm 1 with a short reach 80 can be mounted directly onto the machine 137 such that the Robot CMM Arm 1 is closer to and within reach of the object 9; a sliding door is needed to protect the Robot CMM Arm 1 mounted on the processing machine 137 if the processing machine 137 generates harmful environmental pollution. Referring now to FIG. 7J, the Robot CMM Arm 1 is mounted between four processing machines 137 such that the Robot CMM Arm 1 can measure an object 9 mounted in each of the four processing machines 137. There may be an arrangement of any number of processing machines 137 around the Robot CMM Arm 1. Referring now to FIG. 7K, the Robot CMM Arm 1 is mounted between three work areas 142. Each work area can contain one object 9. At any one time, a work area 142 may contain one of: no object 9, an object 9 to be measured, an object 9 being measured, an object 9 that has been measured, an object 9 that is being transferred into or out of the work area 142. There can be any number of work areas 142 around a Robot CMM Arm 1. An object 9 in a work area 142 may be precisely located on a jig in a known position and orientation relative to the Robot CMM Arm coordinate system 363; alternatively it may be approximately located by some means such as aligning the object 9 by human eye to markings on the floor. An object 9 may be located in the work area by any method known to those skilled in the art. Each object 9 in each work area 142 may be a different part with a different part number or each object may be the same part with the same part number. One advantage of having several work areas 142 around the Robot CMM Arm 1 is that work may be loaded for automatic measuring overnight, thus increasing the utilisation of the Robot CMM Arm 1. A second advantage is in keeping the Robot CMM Arm 1 fully utilised by replacing a measured object 9 with an unmeasured object 9 at a first work area 142, whilst the Robot CMM Arm 1 is measuring another object 9 at a second work area 142. Referring now to FIG. 7L, the Robot CMM Arm 1 is mounted on a low, robust bridge 118 traversing a work area 142 on which an object 9 is situated. The Robot CMM Arm 1 and the Bridge 118 are designed in such a way that all of the upper side of the object 9 can have an operation performed on it by a probe 90 mounted at the probe end 3 of the Robot CMM Arm 1. An object 9 must be comparatively flat to fit under the bridge 118 and still have an operation performed on any area of it. The bridge 118 is stiff, robust and firmly mounted to the floor 119 such that there is no significant deflection as the Robot CMM Arm 1 moves. A major application area for this embodiment in which the Robot CMM Arm 1 is mounted on a bridge is the optical inspection of sheet metal. In a first step, the object 9 which may be a sheet metal item undergoes an upstream process such as being formed in a press. In a second step, the object 9 is manually transferred to and placed in the work area 142. Alternatively, a mechanism such as an automatic conveyor or material handling robot may automatically place the sheet metal in the work area 142. In a third step, the object 9 is inspected by at least one probe 90 mounted on the Robot CMM Arm 1. In a fourth step, there is a data output from the inspection process. The data may be created from an automatic comparison of the captured data in the inspection process with a CAD model of the ideal object 9. The data output may be either statistical data or complete inspection data. In a fifth step, the object 9 is removed from the workplace either manually or automatically. In an optional step, the data output is used to directly or via the collection and analysis of process statistics make changes to the parameters controlling the upstream process. In an alternative optional step, the data output is used to physically change the tooling used in the upstream process. In a further embodiment, a linear rail 124 is provided on top of the bridge 118 for moving the Robot CMM Arm 1 to inspect a larger object 9. In an alternative embodiment, instead of being mounted on a bridge 118, the Robot CMM Arm 1 is mounted on the end of a protruding support that is mounted to one side of the work area 142 and positions the Robot CMM Arm 1 above the middle of the work area 142.

Displaceable and Moving Objects

Figure 7M:
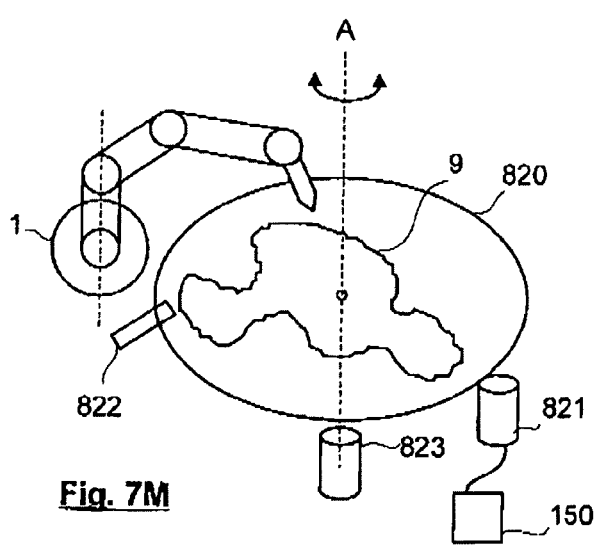
FIG. 7M is a layout of a Robot CMM Arm adjacent to an object mounted on a rotary table.
Figure 7N:
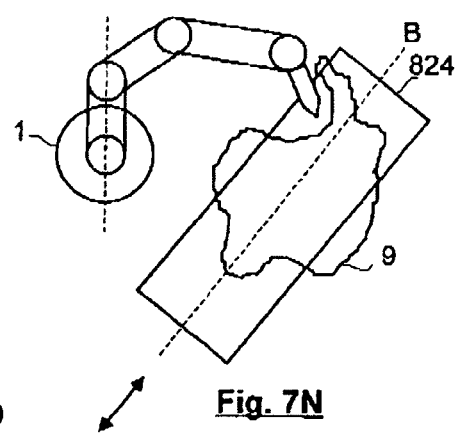
FIG. 7N is a layout of a Robot CMM Arm adjacent to an object mounted on a linear table.

It is a further purpose of this invention that the Robot CMM Arm 1 can perform an operation on an object 9 that is situated on an object displacing means and that the object 9 is displaced at least once during the operation. Referring now to FIG. 7M, the Robot CMM Arm 1 is mounted adjacent to a rotary table 820 on which the object 9 is located rotating about Axis A. The rotary table 820 can be manually rotated and locked in a new position with a clamp 822. Alternatively, the rotary table 820 can be rotated by motorised means 821 such as a motor or a servo drive. Automated rotation of the rotary table 820 can be controlled by the Robot CMM Arm System 150 or any other means such as manual actuation via a button or a slave control means. An angular position recording device 823 such as an encoder is typically attached to the axis A of the rotary table 820. In a typical process, the object 9 is displaced four times by moving the rotary table to four positions at 90 degree intervals to give the Robot CMM Arm 1 access to perform an operation on all quadrants of the object 9. In this embodiment, the Robot CMM Arm 1 does not carry out an operation such as measurement whilst the object 9 is moving. An advantage of rotating the object 9 on a rotary table 820 is that an operation may be performed on an object 9 that is larger than the reach 80 of the Robot CMM Arm 1; it is particularly suitable to wide and or tall objects. A second advantage of rotating the object 9 on a rotary table 820 is in the case of a complex object 9 to give different access orientations to the Robot CMM Arm 1 to access difficult to enter parts of the object 9. Referring now to FIG. 7N, the Robot CMM Arm 1 is mounted adjacent to a linear table 824 on which the object 9 is located linearly displacing along axis B. The linear table 824 has similar position measurement possibilities, control possibilities and advantages to the rotary table 820. In other embodiments, multiple-axis tables with 2 or more axes may be used to displace the object. It will be understood by an expert in the field that each type of table axis or axis combination will have different advantages for different classes of object size and shape. In a further embodiment, the Robot CMM Arm 1 is stationary and carries out an operation such as non-contact measurement or a contact operation with a tool whilst the object 9 is moving. In a further embodiment, both the Robot CMM Arm 1 and the object 9 move simultaneously whilst an operation such as non-contact measurement or a contact operation with a tool is being performed. Where both Robot CMM Arm 1 and the object 9 move relative to the floor, further control algorithms are required to transform coordinate systems to a common coordinate system such as the object coordinate system. In all embodiments the object 9 may or may not be clamped or otherwise attached to the table so as to eliminate relative movement between the object 9 and the table. In all table embodiments in which the object 9 moves during the operation, the table must be accurate and the object must not move relative to the table to enable accurate operations to be performed. Tables of the necessary size and accuracy are normally expensive items.

Other Robot CMM Arm Orientations

Figures 8A, 8B, 8C:
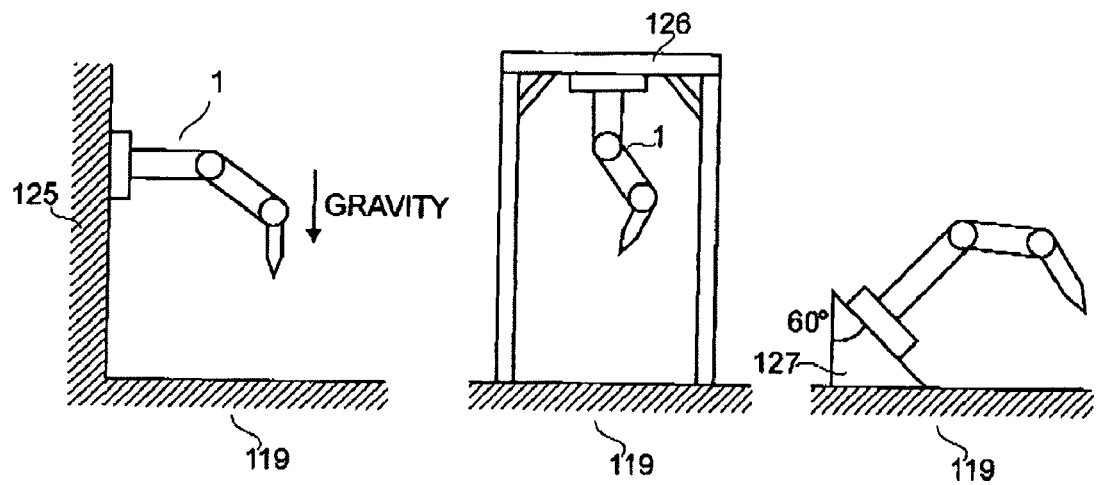
FIG. 8A is a layout of a Robot CMM Arm mounted on a wall.
FIG. 8B is a layout of a Robot CMM Arm mounted on a gantry.
FIG. 8C is a layout of a Robot CMM Arm mounted on an inclined platform.
Figures 8D, 8E:
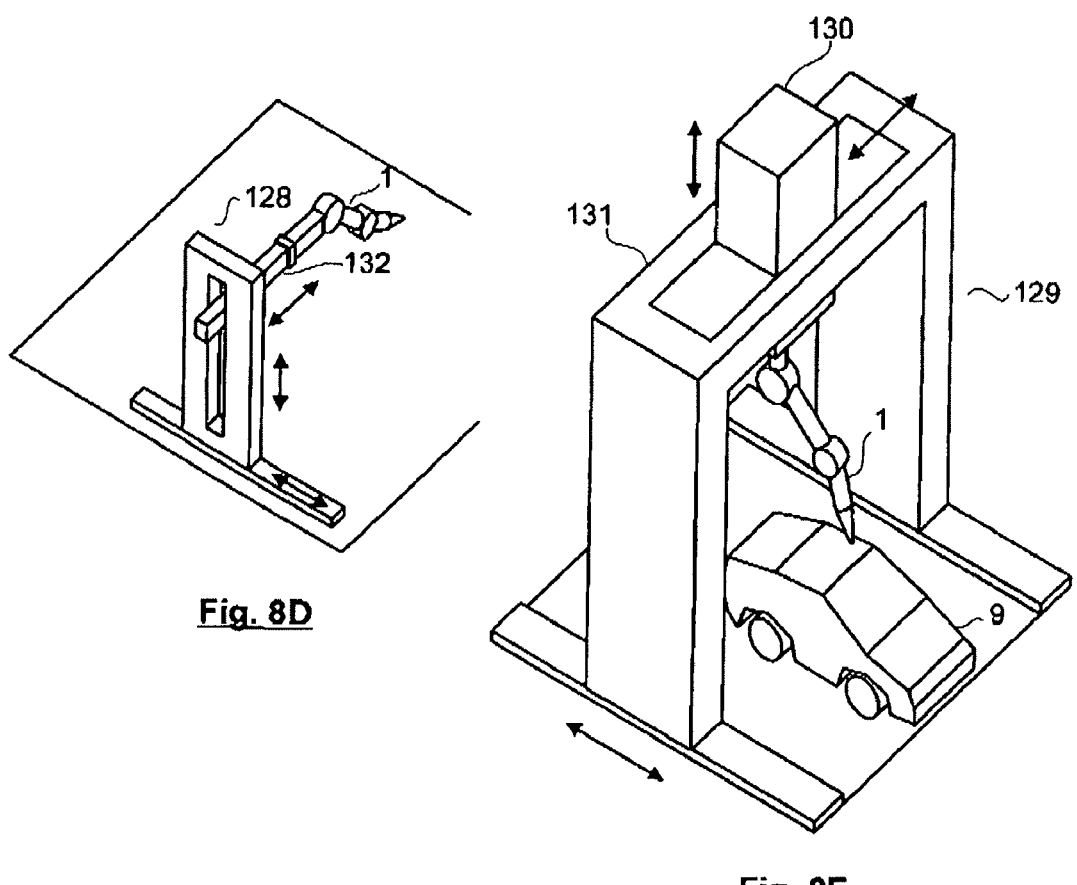
FIG. 8D is a layout of a Robot CMM Arm mounted on a horizontal arm CMM.
FIG. 8E is a layout of a Robot CMM Arm mounted on a moving bridge CMM.
Figure 8F:
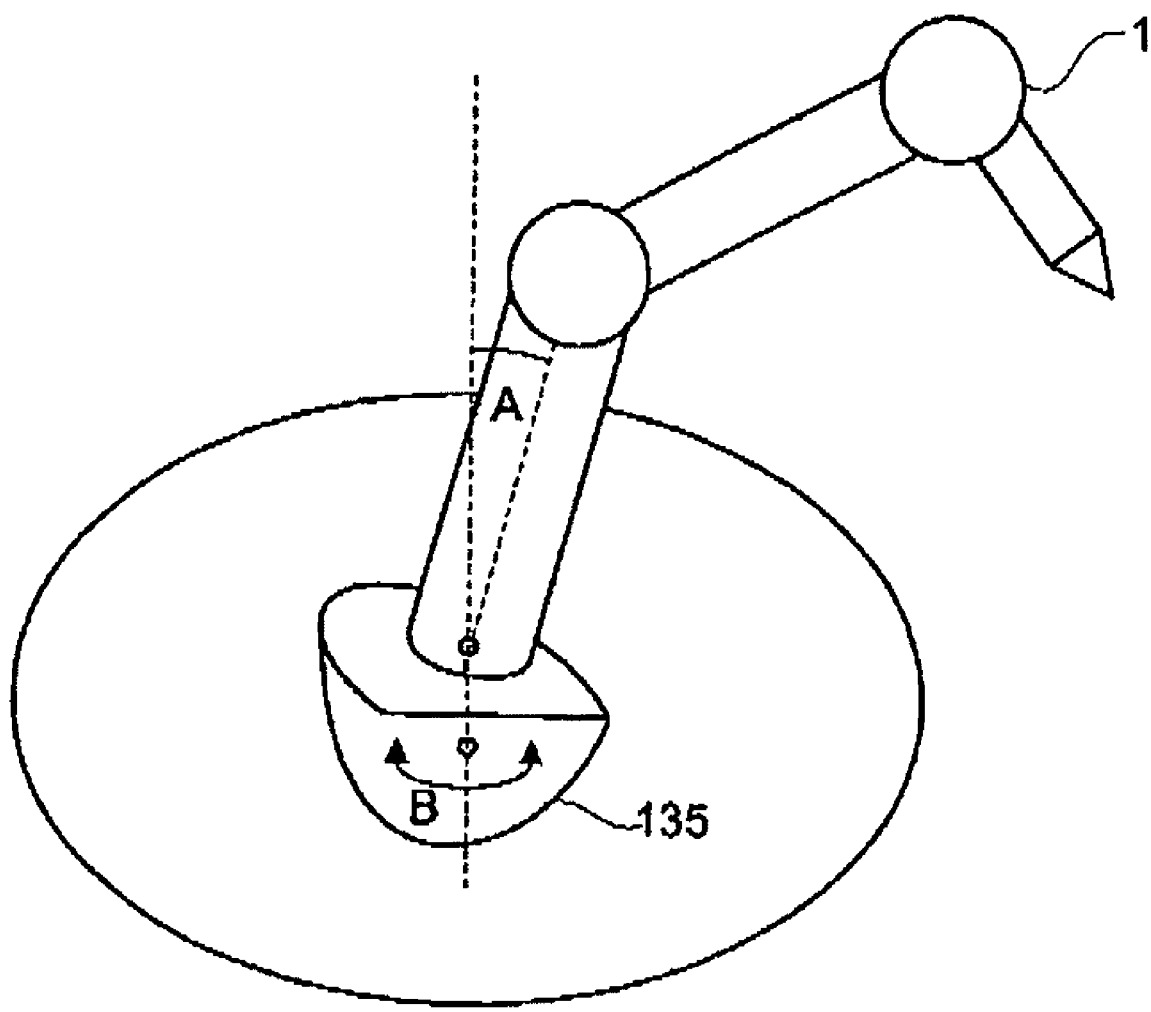
FIG. 8F is a layout of a Robot CMM Arm mounted on a rotating wedge.

For some applications, the Robot CMM Arm 1 is mounted in an orientation that is not a horizontal surface and in which the Robot CMM Arm 1 is not approximately vertically upright. Referring to FIG. 8A, the Robot CMM Arm 1 is mounted orthogonal to a wall 125. Referring to FIG. 8B, the Robot CMM Arm 1 is supported from a gantry 126; alternatively it could be Supported form a ceiling. Referring to FIG. 8C, the Robot CMM Arm 1 is mounted on a platform 127 with a surface at 60 degrees to the vertical. Referring to FIGS. 8D and 8E, the Robot CMM Arm 1 is mounted on a large, 3-axis conventional CMM such as are employed in automotive companies. There are many types of 3-axis conventional CMM including the Horizontal arm CMM 128 and the Moving bridge CMM 129. The Robot CMM Arm 1 has significant mass, it is typically expected to weigh from 18-32 kg depending on its accuracy and the reach of the arm, but it could weigh more or weigh less. For mounting on a conventional CMM, a light Robot CMM Arm based on this present invention could be designed with a mass substantially below 12 kg. For automotive applications in which the Robot CMM Arm 1 is mounted on a conventional CMM, as shown in FIG. 8E, the Robot CMM Arm is preferably attached to a Moving bridge CMM 129 and Supported vertically downwards from the Vertical column 130 of the Bridge 131. In this mode, by a combination of the movement of the Moving Bridge CMM 129 and the Robot CMM Arm 1 movement, the Robot CMM Arm 1 can access all parts of the object 9 being measured. The scope of this invention is not limited to the Robot CMM Arm 1 being mounted vertically downwards from the vertical column 130 of a bridge type conventional 3-axis CMM 131 with 3 linear axes or from the horizontal arm 132 of a Horizontal Arm CMM 128 also with 3 linear axes. The Robot CMM Arm 1 can be mounted from any substantial conventional CMM in any orientation with any number of axes. Referring now to FIG. 8F, the Robot CMM Arm 1 is mounted on a rotating wedge base 135 at angle A to the vertical axis of rotation B.

The scope of this invention is not limited to the embodiments of the installation of the Robot CMM Arm shown in FIGS. 7A-G and FIGS. 8A-F. It is a purpose of this invention that the Robot CMM Arm 1 can be mounted at any orientation in free space. It is a further purpose of this invention that the Robot CMM Arm 1 can be mounted from either a fixed or a movable structure. It is a further purpose of this invention that the Robot CMM Arm 1 can be mounted on any moving structure to translate or orientate the Robot CMM Arm in six degrees of freedom. The moving structure can move at any time during or between measurements. It is a further purpose of this invention that Robot CMM Arms 1 can be provided in an installation in any quantity and any arrangement.

Rigid and Non-rigid Mounting

Figure 9:
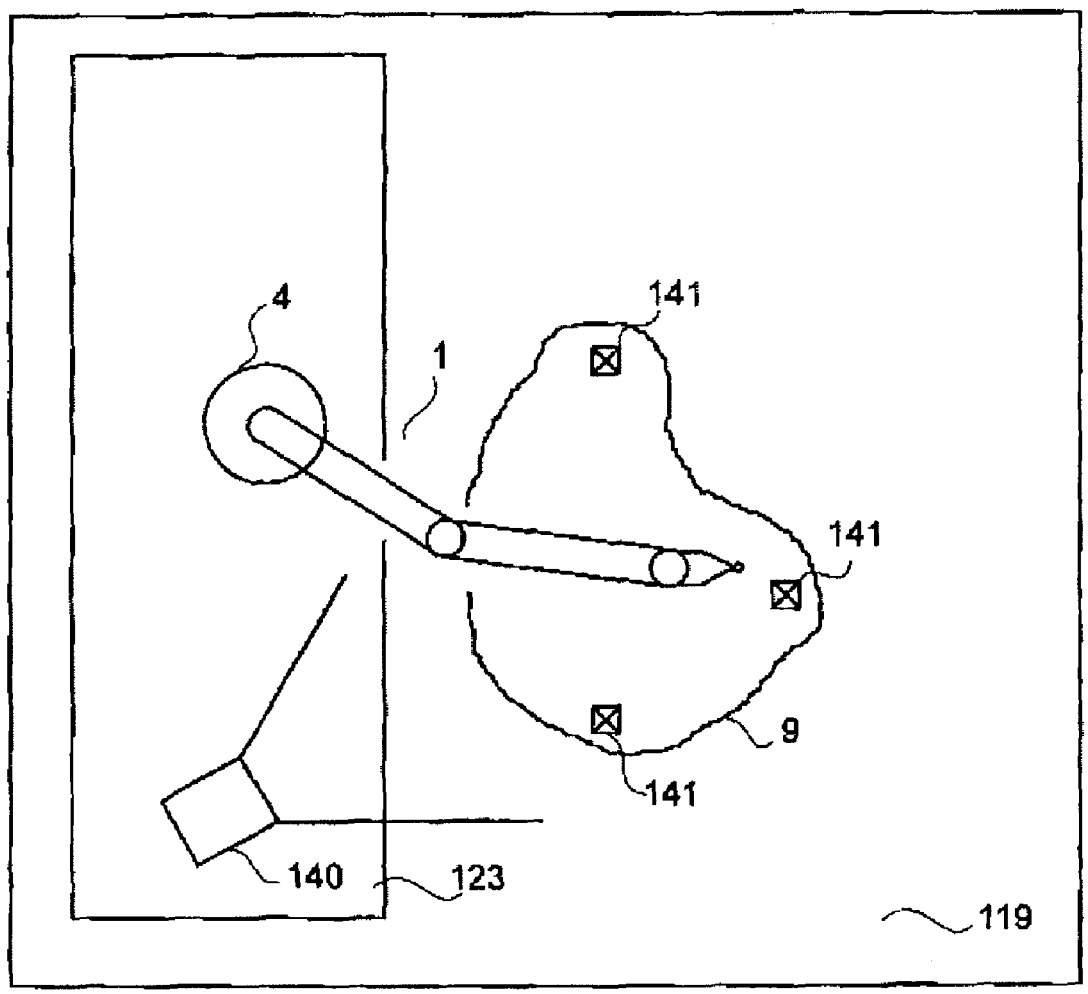
FIG. 9 is a layout of a Robot CMM Arm with a photogrammetric tracker.

The Robot CMM Arm 1 is preferably mounted to a surface 7 that is rigid with respect to the object 9 being measured. In some cases, there can be a continuous relative movement between the Robot CMM Arm 1 and the object 9 being measured such as caused by large machinery operating nearby that transmits vibrations through the floor. Or there can be an occasional relative movement between the Robot CMM Arm 1 and the object 9 being measured such as caused by a lorry driving by or an accidental knock to the object being measured. Or there can be slow relative movement between the Robot CMM Arm 1 and the object 9 being measured such as caused by thermal expansion of the structure on which the Robot CMM Arm and the object are mounted. Referring to FIG. 9, that shows the case of relative movement between the base end 4 of the Robot CMM Arm 1 and the object 9 being measured by the Robot CMM Arm 1, the relative movement in 6 degrees of freedom can be measured by an independent measuring device. Examples of such an independent measuring device are the laser tracker by Leica and, preferably, a Photogrammetric tracker 140 by Krypton. The Robot CMM Arm 1 and the Photogrammetric tracker 140 are mounted on a surface plate 123. The object 9 is mounted on a floor 119 subject to movement such that there is significant relative movement between the object 9 and the surface plate 123. Photogrammetric targets 141 are attached to the object 9 such that a minimum of 3 targets and preferably more are visible to the Photogrammetric tracker 140 at any time during the measuring process. It is important that the Photogrammetric Tracker 140 measurements of the relative movement are synchronised in time with the Robot CMM Arm 1 measurements. Time synchronisation can be by any method commonly known to an expert in the trade including the triggering of measuring devices simultaneously, time stamping all measurements to a common clock for later processing. Such processing can include temporal interpolation when the relative movement measurement and the Robot CMM Arm measurement are not taken at the same instant. The process of calibrating the Photogrammetric Tracker 140 measurements to the Robot CMM Arm 1 measurements is well known to a person skilled I the trade. The result is measurements of Object 9 that are corrected for measured relative movement between the Robot CMM Arm 1 and the object 9.

Robot CMM Arm Range

The reach 80 of the Robot CMM Arm 1 depends on the application. The Robot CMM Arm 1 of this first embodiment is provided as a range of portable Robot CMM Arms 1 with different reaches 80. For exemplary reasons only, these reaches 80 might be from 0.5 m to 5 m with reaches 80 of 1 m and 1.5 m likely to be the most requested by component customers, reaches 80 of 2 m to 3.5 m to be those requested most by automotive customers, and reaches 80 of 2.5 m to 5 m to be those requested most by aerospace customers. The reach 80 of the Robot CMM Arm 1 invention is not constrained in this disclosure; Robot CMM Arm reach 80 can be longer or shorter than the ranges quoted. The use of the Robot Exoskeleton to support the Internal CMM Arm means that Robot CMM Arms can have longer reaches than the 2 m effective limit of Manual CMM Arms. This means that applications requiring reaches longer than 2 m (for which Manual CMM Arms are not practicably supplied) can be carried out by Robot CMM Arms. This first embodiment of a Robot CMM Arm 1 is a portable system and is not designed for high angular velocities and accelerations in order to limit the weight of the Robot CMM Arm 1. Other embodiments of a Robot CMM Arm 1 can be designed for much higher angular velocities and accelerations. In order to keep the same drive system elements across the range of Robot CMM Arms 1, a lower maximum angular velocity for longer reaches is accepted in this first embodiment. The key difference across the range is a variety of lengths of the links 102. There can also be two or more ranges of portable Robot CMM Arm e.g. 0.6-1.2 m and 1.5 m-3 m reach 80.

Robot CMM Arm System Overview

Figure 10:
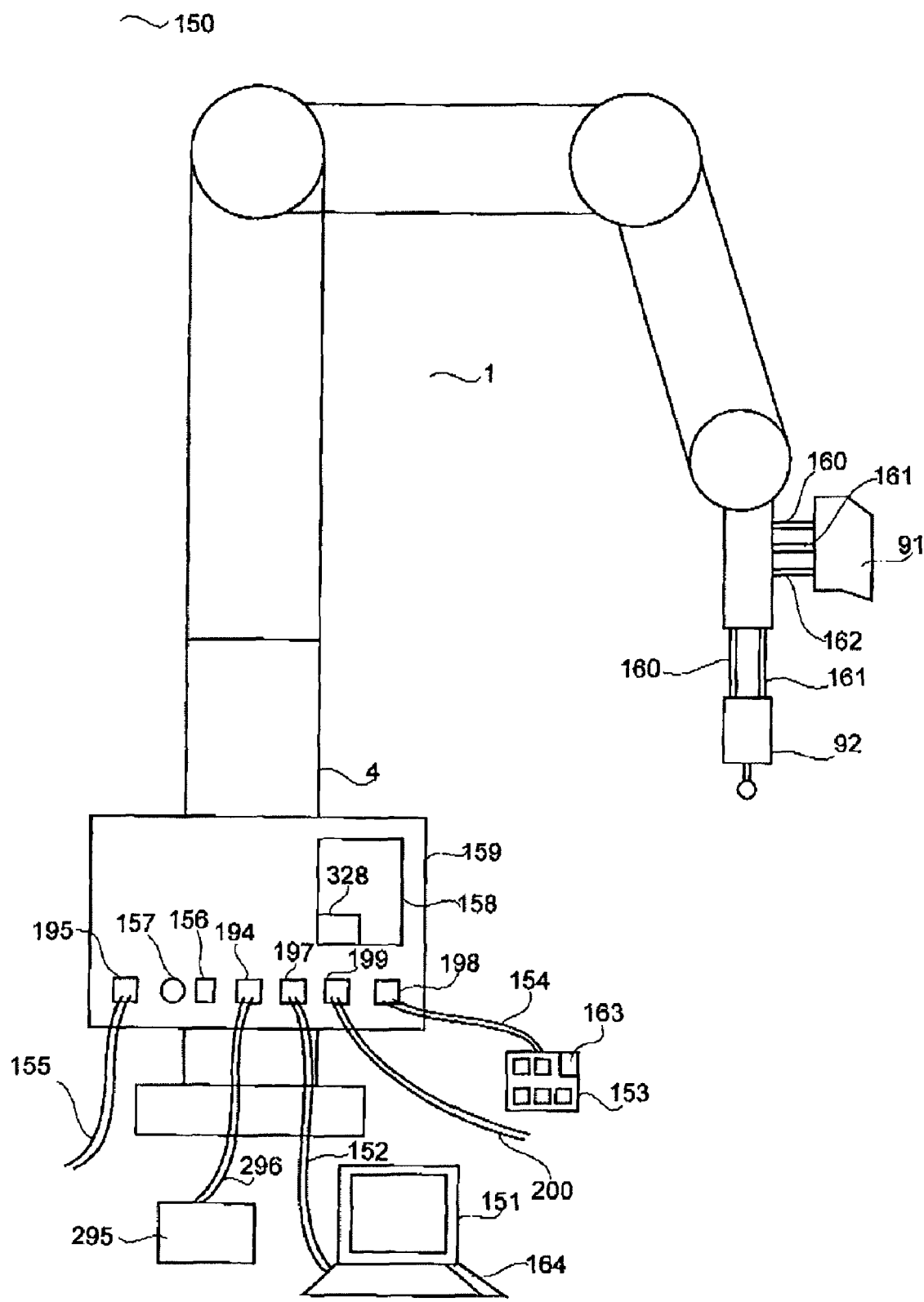
FIG. 10 is a detailed layout for a Robotic CMM Arm system.

Referring now to FIG. 10, the architecture of this first embodiment of the Robot CMM Arm System 150 is described. A Control Box 159 is mounted onto the Base 4 of the Robot CMM Arm 1. Power is supplied by means of a power cable 155 connected to a power connector 195. A power switch 156 and power LED 157 are provided. An interface connector 194 is provided for, amongst other things, connecting to a probe box 295 via a probe box to arm cable 296. A laptop 151 is connected by means of a Laptop communication cable 152 to laptop connector 197. A Pendant 153 is connected by means of a Pendant communication cable 154 to pendant connector 198. A network 200 is connected via network connector 199. Both the Pendant 153 and the laptop 151 can operate for a period from batteries 163, 164. The pendant battery 163 is recharged by placing the pendant in a recharge point 158 with electrical contacts 328; power connections are automatically made when the pendant is correctly placed in the recharge point. The laptop battery 164 is recharged from mains electricity. A touch trigger probe 92 makes automatic power connection 160 and trigger connection 161 when mounted on the Robot CMM Arm 1. An Optical probe 91 makes automatic power connection 160, trigger connection 161 and probe communications connection 162 when mounted on the Robot CMM Arm 1.

Figure 11A:
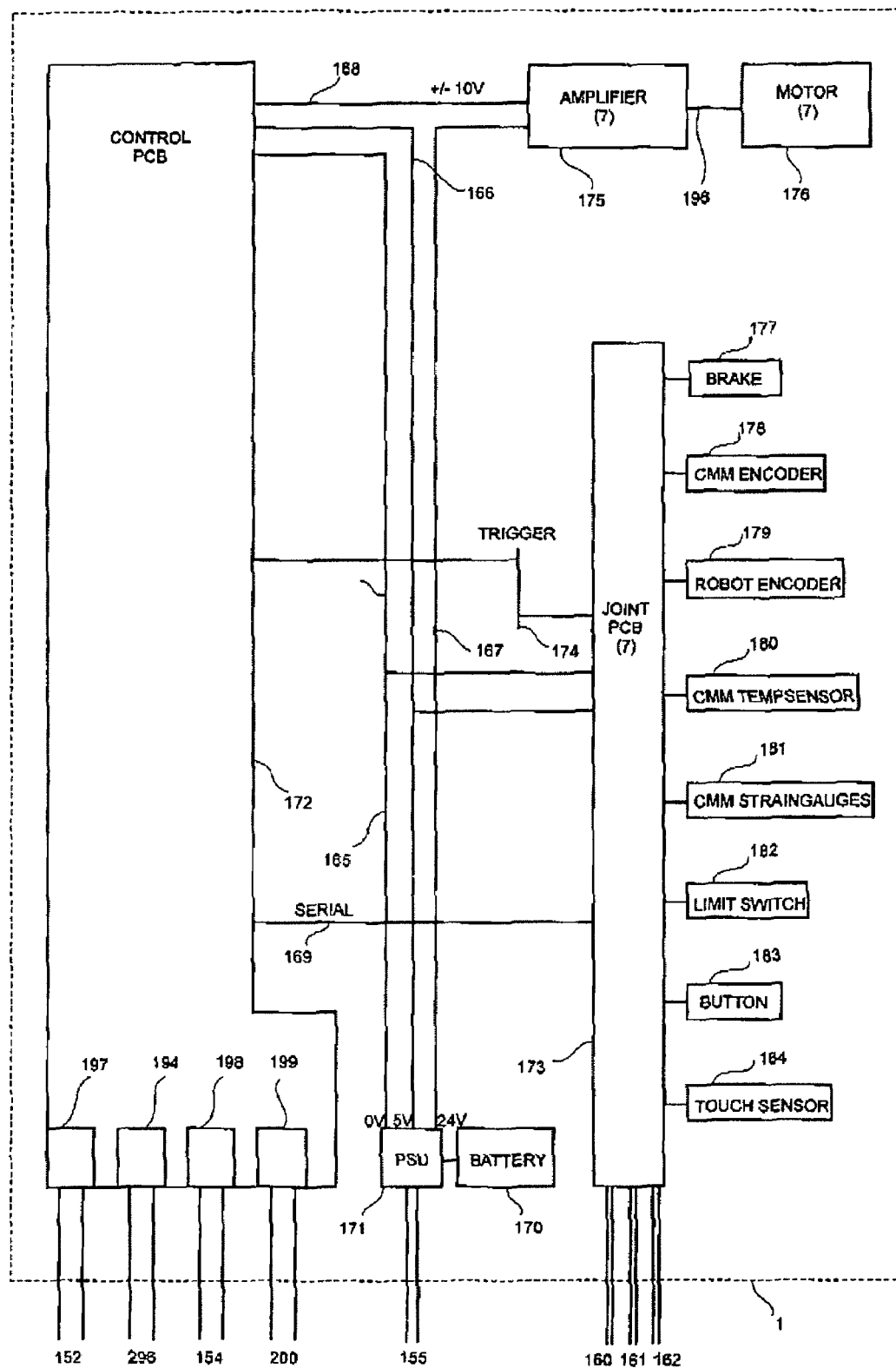
FIG. 11A is a diagram of the architecture of a Robotic CMM Arm.

Referring now to FIG. 11A, the internal architecture of the Robot CMM Arm 1 is described. A Control PCB 172 is connected to ground line 165 and +5 Volt power rail 166. Seven motors 176, one driving each Exoskeleton Joint1-7 61-67, are connected to seven amplifiers 175 by motor cables 196 and are driven from seven +/−10V control signals 168 output from the Control PCB 172 to the amplifiers 175. The Control PCB 172 is connected to seven Joint PCBs 173 by a serial bus 169. The Control PCB 172 has two further communication connections 152 and 154 for communicating with the laptop 151 and the pendant 153 respectively. A +24 Volt power rail 167 provides power to the amplifiers 175. A power supply unit 171 is connected to a power supply cable 155, a battery 170, ground 165 and power rails 166, 167. At least one Joint PCB 173 is connected to a probe 90 with power 160, trigger 161 and, where applicable, communications 162. All seven motors 176 have brakes 177 which are driven by signals from the Joint PCBs 173. The Internal CMM arm 5 comprises seven CMM encoders 178 attached to the joint PCB 173. Seven encoders 179 mounted on the seven motors 176 driving the Exoskeleton 6 are attached to the joint PCB 173. A thermocouple 180 mounted on the Internal CMM Arm 5 is connected to each Joint PCB 173. A strain gauge 181 mounted on the Internal CMM Arm 5 is attached to each Joint PCB 173. Two limit switches 182 are connected to each Joint PCB 182. Two operator Buttons 183 are connected to the Joint PCB 173 of the $7^{th}$ joint. Touch sensors 184 are connected to each Joint PCB 173. Each Joint PCB 173 is connected to ground line 165 and +5 Volt power rail 166. A trigger bus 174 is connected to each Joint PCB 173 and the Control PCB 172; it is used for latching the seven CMM encoders 178.

Figure 11B:
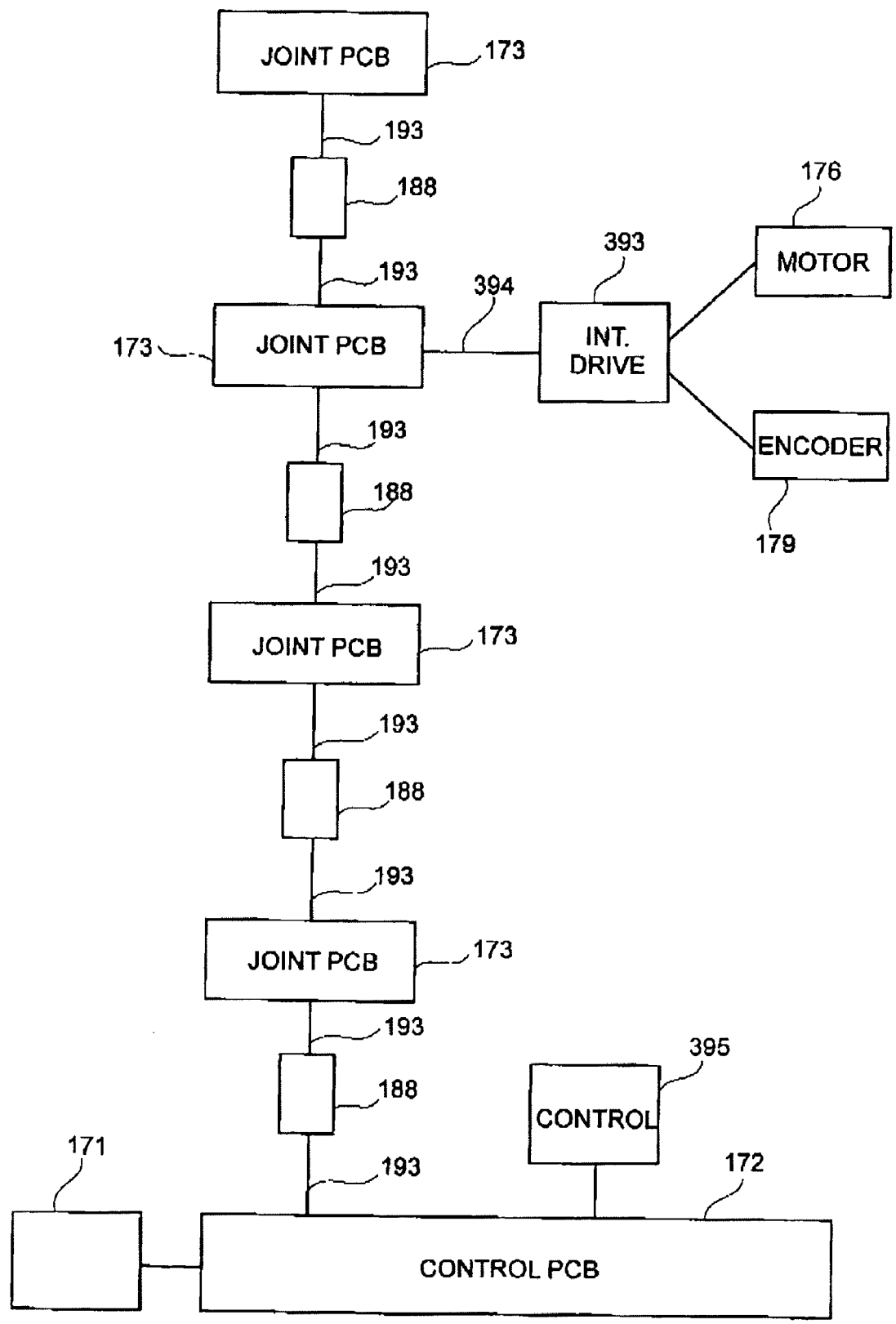
FIG. 11B is a diagram of an alternative architecture of a Robotic CMM Arm.

Referring now to FIG. 11B, an alternative system embodiment for the internal architecture of the Robot CMM Arm 1 is described that has less cabling, permits infinite rotation axial joints and is lighter, cheaper and more robust. A Control PCB 172 and four Joint PCBs 173 are connected in series with a Bus 193 passing through four Slip-ring units 188 located at each axial CMM Joint1,3,5,7 51,53,55,57. From one to three joints are driven by each Joint PCB 173 and the Control PCB 172 can also drive one or more joints. Each Slip-ring unit 188 has the capacity for 28-wires, but the number of wires could be more or less than 28. The Bus 193 also has 28 wires. These 28 wires in the Bus 193 carry power voltages, grounds, serial buses, control buses and signal wires for all the functionality of the components that are located after JointCentre1 21 in the Internal CMM Arm 5, the Exoskeleton 6 and any Probes 90. A Control bus 394 is incorporated in the Bus 193 and uses 5 wires. The Control bus 394 can be proprietary or can be a standard such as the CAN bus. The CAN bus is a high-speed low latency control bus. The CAN bus and associated circuitry has limitations when driving 7 axes. A faster control solution is to use two CAN buses and drive 4 axes with the first CAN bus and 3 axes with the second CAN bus. The use of two CAN buses at the expense of an extra 5 wires permits a fast 1 msec servo loop. Intelligent drive amplifiers 175 are located next to each motor 176 and connected to a Joint PCB 173 or a Control PCB 172 by a Control bus 394 as well as 24V power and 0V ground. Examples of Intelligent drive amplifiers 175 are the EPOS 24/1 and 24/5 supplied by Maxon Motor, USA. Alternatively, the intelligent drive amplifier functionality can be integrated into the Joint PCB 173 and the Control PCB 172. The control functionality including servo loop closure takes place in the Control 395. The Control 395 is the PCI 208 supplied by Trio Motion Technology, UK. The PCI 208 has two Control bus 394 outputs permitting fast servo control; these Control bus 394 outputs are the CAN bus standard. The 5 or 10 wires of the CAN buses replace around 10 wires for each of the seven motor/encoders that are normally wired directly all the way from the Motor 176 to the Control 395. Since the number of wires in a Slip-ring 188 is limited by practical considerations such as size and weight, the use of a Control bus 394 that reduces the number of wires in the arm by around 60 wires, permits the use of Slip-rings 188 providing infinite rotation in the axial CMM Joints1,3,5,7

51,53,55,57. The Bus 193 provides power, signal and communications to one or more Probes 90 that might be contact or non-contact of which a Stripe probe 97 is most commonly used. For attaching third party proprietary Probes 90 to the Robot CMM Arm 1, it is a purpose of this invention to provide a through channel from the Probe 90 via the Bus 193 and out through interface connector 194. In this way, the provider of a third party probe 90 can use the through channel for any combination of power, ground, signals and buses that is required within the wiring specification limitations of the Robot CMM Arm System 150. A typical number of wires provided in the through channel is 9 but could be less than 9 or more than 9. The interface connector 194 can also provides synchronisation signal connections for synchronising the Robot CMM Arm 1 and the Probe 90.

Referring now to FIG. 88, a preferred system embodiment based on Ethernet for the internal data communications bus of the Robot CMM Arm 1 is described. A Control PCB 172, three Joint PCBs 173, a PC 151, a Pendant 153, a network 200 and an Optical Probe PCB 270 are connected together by means of an Ethernet network. A novel feature of this embodiment of the Robot CMM Arm invention is the use of a daisy-chain Ethernet arrangement wherein an Ethernet switch 396 is provided at each intermediate PCB in the daisy-chain. This means that the number of cables running up the Robot CMM Arm 1 is reduced by 4 ways for each intermediate PCB, in this case a reduction of 12 ways. The Control PCB 172 contains an Ethernet Switch 396 such as the 5-way Micrel KS8995. Each Joint PCB 173 is a dual axis Joint PCB and can have up to two joints connected to it. Each Joint PCB 172 contains an Ethernet Switch 396 such as the 3-way Micrel KS8993. Each PCB has a processor with an MCA Ethernet Controller 386. The Ethernet used is 100BaseT; its bandwidth is not significantly reduced by the use of slip-rings.

The scope of this invention is not limited to the architecture of the Robot CMM Arm System 150 disclosed in this first embodiment but includes all architectures that have the technical effect of the Robot CMM Arm System 150. For instance, in a further embodiment, the Control Box 159 is separate from the Robot CMM Arm 1 and connected to the base 4 of the Robot CMM Arm with a cable. This architecture can be necessary for Robot CMM Arms where the items in the Control Box 159 require the Control Box 159 to be too big to sensibly fit at the base 4 if the Robot CMM Arm is to be portable. The architecture of the first embodiment is preferred because the portable Robot CMM Arm is a single unit without the increased manufacturing cost and location footprint of a separate control box 159. In an additional embodiment, a full size personal computer is used instead of a laptop 151 and the Control PCB 172 is mounted in the personal computer on a standard bus such as the PCI bus; alternatively a network of several computers in a rack are used. In a further embodiment, the pendant is not supplied and the laptop 151 is used to control the Robot CMM Arm 1. In a further embodiment a connector is supplied for connecting one or more external axes to the Robot CMM Arm 1, that are driven by the Control 395. Examples of such external axes are a linear rail or a turntable. In a further embodiment, each CAN bus 394 may be configured to use just 3 wires. In a further embodiment, a CAN bus 394 is made available for the systems integrator to interface to by means of a connector in the control panel 159. Digital IO from the Trio Control 395 can also be made available for the systems integrator to interface to by means of a connector in the control panel 159. In a further embodiment, the Emergency Stop circuit is passed all the way up the arm and can be actuated by sensors or processors in the Joint PCBs 173 or an attached Optical Probe 91. The Emergency Stop circuit may be provided for the systems integrator to interface to by means of a connector in the control panel 159. Fuses may be provided in the control panel 159 for replacing or resetting; they may be accessible from the control panel or by removing the control panel. Connector jumpers may be provided for any connector through which the Emergency Stop circuit runs. Alternatively, the Control 395 functionality can be integrated into the Joint PCB 173 or the Control PCB 172 or an Intelligent Drive Amplifier 175.

Internal CMM Arm Encoders

Figure 12A:
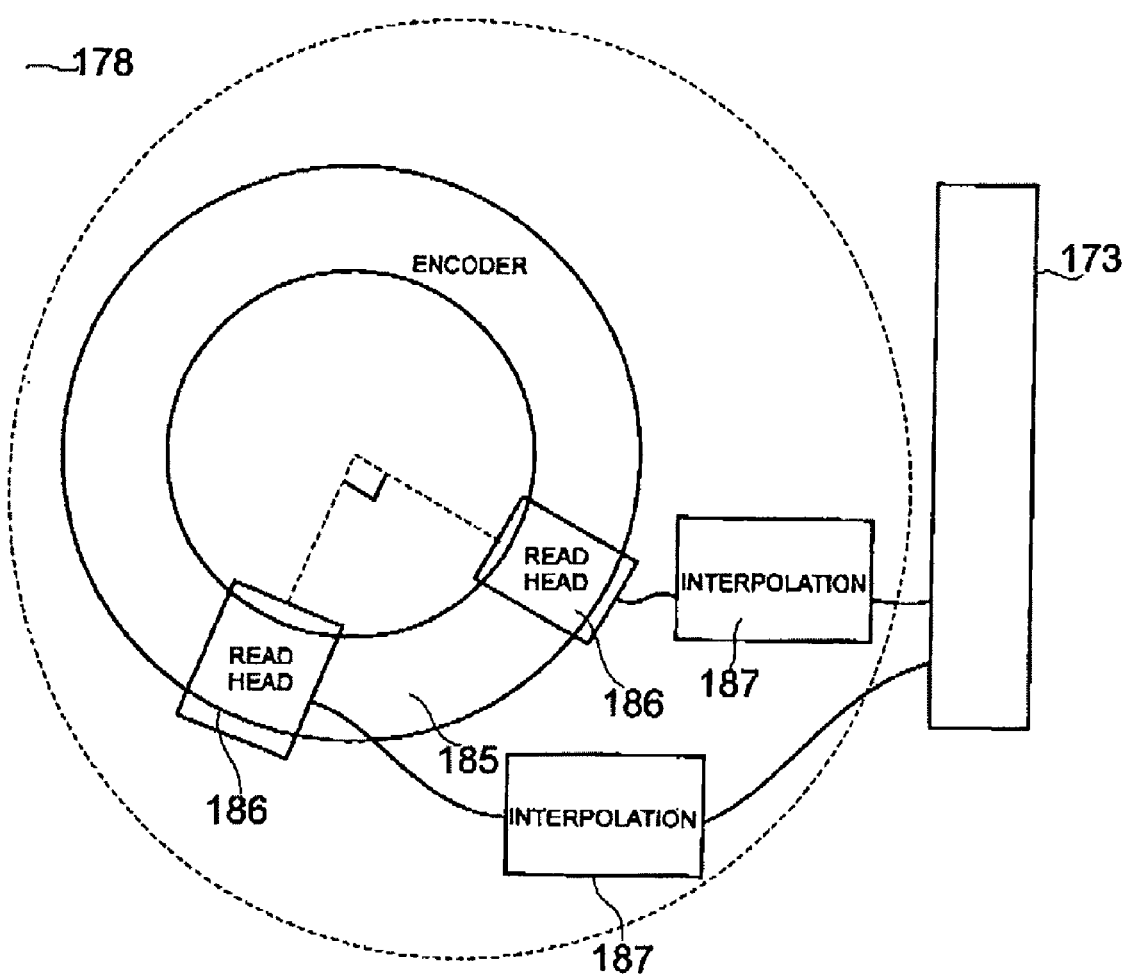
FIG. 12A is a schematic diagram of an encoder.

The Internal CMM Arm S comprises angular encoders 178 at each CMM joint 51-57. The scope of this invention is not limited to angular encoders or to any particular design of angular encoders but can utilise any accurate form of angle measuring device. The resolution and accuracy of an angular encoder is limited by several factors including: the diameter of the encoder, the number of printable edges, the linearity of the edges, the linearity of the read head, the amount of interpolation and irregularities in the encoder. In order to optimise the accuracy of the Robot CMM Arm 1 it is desirable to have more accurate angular encoders towards the base end 2 than towards the tip end 3 of the Internal CMM Arm 5. This is because a small rotation at a base end joint such as 21, 22 will cause a big movement at the tip end 3. Whereas a small rotation at a tip end 3 joint such as 25, 26 or 27, will cause a small movement at the tip end 3. The movement at the tip end for a given joint rotation, is proportional to the distance of the joint from the tip end 3, if all other factors are controlled. The Internal CMM Arm S uses CMM encoders 178 such as those manufactured by Renishaw or Micro-E Systems, USA. The CMM joints 21, 22 towards the base end 2 of the Internal CMM arm 5 have larger diameter encoders because there is a longer distance from the CMM encoder 178 to the probe end 3. The intermediate joints 23-24 at the elbow of the Internal CMM Arm 5 have medium diameter encoders because there is a medium distance from the encoder 178 to the probe end 3. The far joints 25-27 at the wrist of the Internal CMM Arm 5 have small diameter encoders because there is a small distance from the encoder 178 to the probe end 3. The smaller encoder diameters reduce the weight of the arm carried by the operator at full stretch, make it compact and easy to handle. In the case where there is a large virtual reach 81 caused by the optical probe 91, it can be important to have higher resolution encoders at the joints 23-27 towards the probe end of the arm. It is expected that the technology behind angular encoders will improve and angular encoders with a given accuracy will reduce in diameter and weight. Referring now to FIG. 12A, an Internal CMM Arm encoder 178 comprises Renishaw RESR Angular encoders 185 with a 20 micron scale pitch are used together with one or more Renishaw RGH20 read heads 186 per joint. When two or more read heads 186 are mounted per encoder 185, they are mounted at either 90 degs to each other as shown in FIG. 12 or preferably 180 degs to each other, but the read heads could be at any other angle to each other. A 52 mm diameter RESR with 8192 counts is used on each of CMM Joints 23-27 providing a quoted accuracy of +/−5.6 arc seconds per joint. A 150 mm diameter RESR with 23,600 counts is used on each of CMM Joints 21 and 22 providing a quoted accuracy of +/−1.9 arc seconds per joint. The output of each Renishaw read head 186 goes to a Renishaw RGE interpolator 187. The output from each Renishaw interpolator 187 feeds into the Joint PCB 173. The advantage of using two or more read heads is twofold. Firstly, errors from any of: eccentric mounting of the encoder, poor alignment of read heads, edge printing non-linearity, read head non-linearity, irregularities and other mechanical/alignment errors can be improved or compensated for by simple averaging. Secondly, in operation, the averaging of readings from the two or more interpolators 187 for the same encoder 185 can take place in the Joint PCB 173, giving some improvement in encoder accuracy. In an alternative embodiment, an angular encoder system can be provided as a single unit comprising encoder, one or more read heads, interpolator, averaging and error mapping, with one connection from the angular encoder system to the Joint PCB 173. It is expected that companies such as Renishaw will in the future provide such an angular encoder system of around 50 mm diameter with accuracies of 0.1 arc second.

Dual Pattern Encoder

Figure 12B:
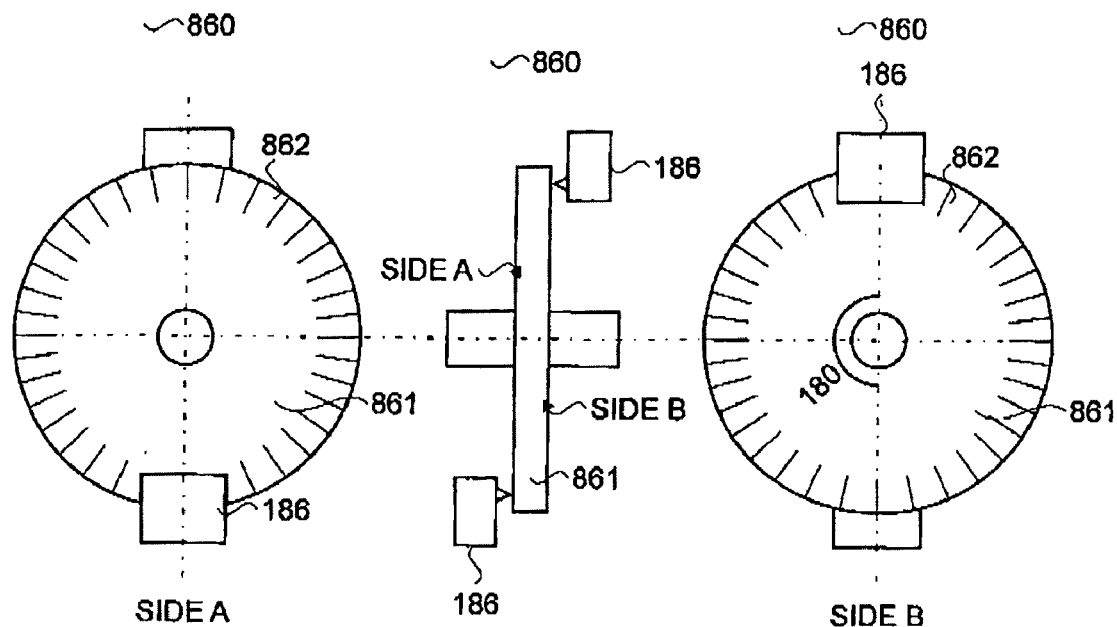
FIG. 12B is a schematic diagram of a Dual pattern encoder.
Figure 12C:
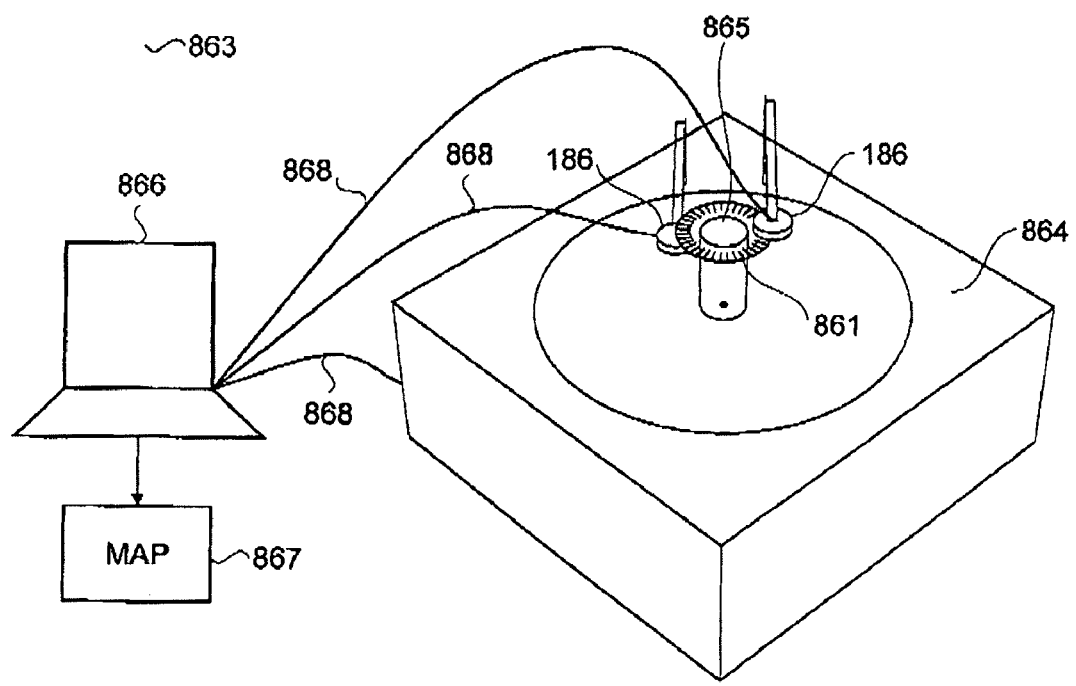
FIG. 12C is a schematic diagram of a Dual pattern encoder mapping apparatus.
Figure 12D:
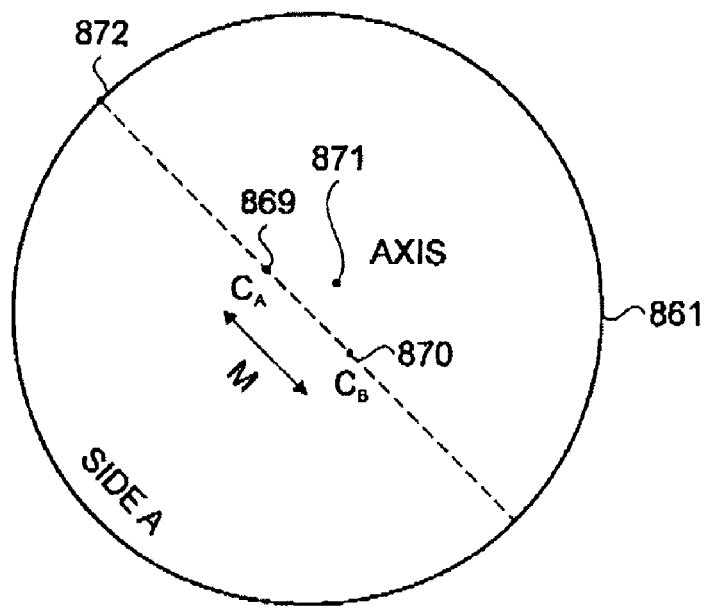
FIG. 12D is a schematic diagram of axis and pattern centres.

The accuracy of the encoders provided on this Robot CMM Arm 1 invention is a significant factor in the accuracy of the Robot CMM Arm 1. It is a purpose of this invention to provide a novel dual pattern encoder with one read-head per pattern that is more accurate than a single pattern encoder with two read-heads. Referring now to FIG. 12B, a Dual pattern encoder 860 comprises an encoder Disk 861 that has an edge Pattern 862 printed around the circumference of each of its two sides A, B, one read-head 186 reading the Pattern 862 on Side A and a second read-head 186 reading the Pattern 862 on Side B, the two read-heads being situated approximately 180 degrees apart. Referring now to FIG. 12C, a Dual pattern encoder mapping apparatus 863 is provided comprising an Accurate rotational stage 864 such as the ABR1000 provided by Aerotech Inc, US, a rotating Clamping mechanism 865 such as a specially shaped bolt for clamping a Disk 861 onto the rotating part of the Accurate rotational stage 864, two stationary Read-heads 186 situated at approximately 180 degrees to each other and on opposite sides of the Disk 861 such that a first Read-head 186 can read a first Pattern 862 on side A and a second Read-head 186 can read a second Pattern 862 on side B as the Patterns 862 move relative to the stationary Read-heads 186, and a Mapping system 866 connected to the Accurate rotational stage 864 and the Read-heads 186 with Cables 868. The Accurate rotational stage 864 is much more accurate than the accuracy to which the Dual pattern encoder 860 is expected to perform. The Mapping system 866 (a) controls the movement of the Accurate rotational stage 864, (b) reads signals from the Read-heads 186 and (c) outputs a Map 867. Referring now to FIG. 12D, a Disk 861 is shown on which the Centre of Pattern A 869, the centre of Pattern B 870 and the Centre of rotation 871 of the axis of the joint carrying the Dual pattern encoder 860 are represented. The Map 867 is a digital file and contains mapping information providing (i) the Magnitude M of the misalignment of the two Patterns 862 relative to each other, (ii) the Orientation 872 of the misalignment, (iii) an error map for each Pattern 862 mapping the angular errors between the Accurate rotational stage 864 and the printed edges on each Pattern 862 and covering at least print non-linearities of the edges on each Pattern 862. The two Patterns 862 are printed to be in reasonable axial alignment with a typical axial misalignment M of 10 microns but this misalignment M could be much more than 10 microns or much less than 10 microns. The Orientation 872 of the misalignment M is marked manually on the Disk 861. The Sides A and B are marked manually on the Disk 861. The Orientation 872 of the misalignment is typically known with reference to absolute reference marks on the Pattern 862 read by Read-head 186. The process of generating the Map 867 is well known to those skilled in the art. Reference marks on each Pattern 862 are provided to reference the error map.

Up to seven mapped Dual pattern encoders 860 can be provided in a Robot CMM Arm 1. A Map 867 is provided for each Dual pattern encoder 860. In an encoder calibration process, a Joint of the Robot CMM Arm 1 in which there is a Dual pattern encoder 860 is stepped from one rotational axis limit to the other using steps of typically 5 degrees but the step could be more or less than 5 degrees. Readings from each Read-head 186 are taken at each step to form a set of Readings. The set of Readings are corrected using the error maps of the Map 867 to provide Corrected readings. The Corrected readings are processed using the misalignment and misalignment orientation information in the Map 867 to calculate the position of the Joint centre 871 relative to the Centres of Pattern A 869 and Pattern B 870 in a process well understood to those skilled in the art. After calibration, when the Robot CMM Arm 1 is in use, the calibrated position of the Joint centre 871 relative to the Centres of Pattern A 869 and Pattern B 870 is used to correct readings from the Dual pattern encoder 860 and make the Robot CMM Arm 1 more accurate. The calibrated Dual pattern encoder 860 provides angles more accurately than an equivalent single pattern encoder with two read-heads because (a) there are effectively two, independent error-mapped encoder systems rather than one and the results of these two systems provide a better average than for an encoder system with one pattern, (b) errors from non-perpendicularity of the Disk 861 relative to the Joint axis are automatically averaged out. The Dual pattern encoder 860 has the same number of components, weighs the same and occupies the same volume as an equivalent single pattern encoder with two read-heads. In an alternative embodiment, the Dual pattern encoder 860 may be provided with both patterns 862 on the same side of the Disk 861 in the form of inner and outer radial patterns. In a further embodiment for a lower cost Dual pattern encoder 860, if the Patterns 862 are aligned in the manufacturing process of the Disk 861 to a small enough misalignment M, then it is not necessary to have the extra process of mapping the Dual pattern encoder 860 whilst still gaining the benefits of automatically averaging out any axial misalignment in fitting to a joint of the Robot CMM 1. In an alternative embodiment for a more accurate Robot CMM 1, two Dual pattern encoders 860 are provided at each joint, preferably located either side of the joint centre.

Exoskeleton Drive System Structure

Environmental Emissions

It is a purpose of this invention that the portable Robot CMM Arm operates quietly and can be used in office environments. It is important that the level of emitted audible noise is kept to a minimum in the design. Inherently low-noise drive systems including motors and gearing methods are selected to minimise the emission of audible noise. Fundamentally, the level of audible noise output increases with the velocities and accelerations at which the Robot CMM Arm is driven. Reducing the velocities and accelerations has little impact on cycle time in many applications. This is because typically 90% of the cycle time is taken up with measuring which is a slow process and only 10% can be reduced by means of increasing speed. Where minimising the level of emitted audible noise is a key usage criteria, the control system can be set by the user to scan quietly with low velocities and accelerations. The Robot CMM Arm minimises the emission of electromagnetic radiation by incorporating drive system components with low electromagnetic radiation and providing shielding around the components emitting the most electromagnetic radiation.

Heat Transfer

Figure 13A:
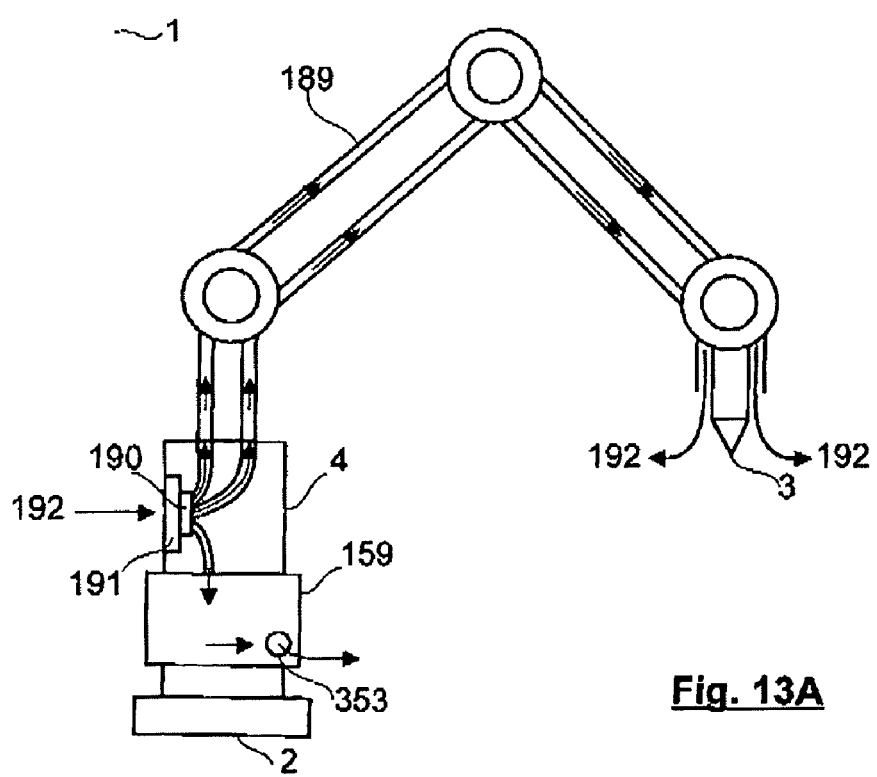
FIG. 13A is a schematic diagram of forced air circulation.

It is an object of this invention that the heat transfer to the Internal CMM Arm 5 from the motors 176 and other drive components in the Exoskeleton 6 is minimised, resulting in the Internal CMM Arm 5 being more accurate due to a comparatively stable and uniform temperature. It is disclosed that:

there are no direct heat conductive links of significance from the Exoskeleton motors 176 to the Internal CMM Arm 5 to eliminate heat transfer by conduction; the transmission means 10 are small and their materials have a low coefficient of thermal conductivity; none of the hot items in the control box 159 are directly attached to the base 4 of the Robot CMM Arm; that means there is no conduction between the hot items in the control box 159 and the base 4 of the Robot CMM Arm;

the Internal CMM Arm segments 32-38 are coated to minimise heat transfer by radiation to the Internal CMM Arm 5 from the motors 176;

the motors are well ventilated and provided with heat sinks to maximise heat transfer by convection and minimise their operating temperatures; the angular velocities of the joints during operation are programmed to avoid the motors 176 overheating;

referring now to FIG. 13A, there is a duct 189 between the Internal CMM Arm segments 32-38 and the Exoskeleton Segments 2-8 42-48; a low-capacity fan 190 with a large filter 191 situated in the base 4 sucks in air 192 and blows it along the duct 189 between the Internal CMM Arm 5 and the Exoskeleton 6; the majority of the air 192 exits at the tip end 3 between Internal CMM Arm segment 38 and Exoskeleton Segment8 48. This forced circulation of air provides efficient cooling by convection. The fan 190 is selected to run quietly in an office environment. The filter 191 is large and fie; in operation in an office environment, the filter 191 should not need replacement or cleaning for 5 years. Part of the air 192 sucked in by the fan 190 passes through the control box 159 and exits through the vent 353 in the control box; this air circulation removes heat from the control items including the control PCB 172, the PSU 171 and the amplifiers 175.

Exoskeleton Drive Systems

The Robot CMM Arm 1 is driven by electric motors 176 that are brushed DC servo motors with encoders. The drive systems in this invention are not limited to electric motors of any kind, but can be driven by a range of different power systems including hydraulics or pneumatics. Hydraulics and pneumatics can introduce less vibration into the Robot CMM Arm than electric motors with encoders. Electric motors 176 can be AC or DC servo motors, stepper motors or other forms of motor; the motors 176 can be brushed or brushless. A high speed control loop is provided in which the electric motors 176 and encoders 179 close the loop; this high speed loop is satisfactory for traversing the Robot CMM Arm 1. When contact measurement takes place, the hard probe on the end of the Internal CMM Arm 5 will stop moving when contact is made whilst the Robot CMM Arm carries on. A high accuracy control loop is provided for contact measurement in which the CMM encoders 178 are used to close a slower higher level loop outside the high speed control loop. To reduce manufacturing cost, reduce the weight of the Robot CMM Arm and to produce a more compact design, the CMM encoders 178 can be used for position feedback; the Exoskeleton encoders 179 are not then required. To further reduce manufacturing cost, stepper motors can be used in an open loop format without any position sensing in the control loop. Some applications require only low accelerations of the Robot CMM Arm and require less powerful drive systems. Other applications require high accelerations and require more powerful drive systems. Applications on a car production line require sturdy Robot CMM Arms 1 that can survive an impact with a car body. Due to the presence of the Internal CMM Arm 5, for most applications it is not essential to have low backlash in the drive train elements. Low cost and low mass drive train components such as belt drives can be used. In this embodiment, one motor 176 is used to drive each joint 61-67.

Robot Dynamics

It will be appreciated by a person skilled in the field that it is beneficial wherever possible to minimise the Moments of Inertia of the Robot CMM Arm. For a given performance specification defining the angular acceleration and maximum angular velocity of joints, a Robot CMM Arm with lower Moment of Inertia than another Robot CMM Arm will use less energy to perform a process. Drive units such as motors tend to be heavy with concentrated masses. It is beneficial to (a) situate drive units as close to the base end of the Robot CMM Arm as possible; (b) reduce the mass of the drive units; (c) reduce the mass of the segments of the Robot CMM Arm. In moving a drive unit closer to the base end of the Robot CMM Arm, it is possible to reduce the specification of the drive units situated between the moved drive unit and the base because these previous drive units do not have to work as hard moving the drive unit that has been positioned closer to the base end. Each reduced specification drive unit is lighter and in turn may require other less performant drive units elsewhere. Another benefit from moving a drive unit closer to the base end come from the reduced stress on some Exoskeleton segments enabling them to be designed to be lighter. It can thus be seen that there is a compounding beneficial advantage from moving just one drive unit closer to the base end. It is an object of this invention that the Robot CMM Arm be optimised to minimise its weight and energy consumption for a defined specification, by means including positioning drive units as close to the base end as possible.

Referring now to FIG. 13B, in a high inertia embodiment of the Robot CMM Arm 1, JointCentres3,5 [23,25] and their motors 176 are far from the base end 2 compared to a low inertia embodiment of the Robot CMM Arm 1, in which JointCentres3,5 23,25 and their motors 176 are nearer the base end 2. The motors do not have to be adjacent to the joint centres; in alternative embodiments, JointCentres3,5 23,25 are distant from the base end 2, the motors 176 are closer to the base end 2 and a torque transmission means transmits the motor torque along ExoskeletonSegments3,5 43,45 from the motors 176 to JointCentres3,5 23,25. Typical savings from the positioning of drives closer to the base end can be greater than 1 kg in Robot CMM Arm mass and more than 10% savings in power consumption.

Transmission Means

In this first embodiment, the base 41 of the Exoskeleton 6 is rigidly attached to the base 31 of the Internal CMM Arm 5 such that there can be no significant relative movement between the two bases 41 and 31 and that forces and torques are transmitted through this rigid attachment. A number of Transmission means 72-78 are provided, which may be none, one or more than one for each CMM Segment 32-38. Each of the Transmission means 72-78 is in physical contact with the corresponding Exoskeleton Segment 42-48 and the corresponding CMM segment 32-38. During operation, the centres and axes of the CMM Joints 51-57 and the Joints 61-67 are in substantially the same positions. Factors resulting in slight misalignments of these joint centres and axes include:

different strains of the CMM Segments2-8 32-38 compared to the Exoskeleton Segments2-8 42-48 elastic deformation of the Transmission means2-8 72-78; in this first embodiment, all of the Transmission means2-8 72-78 comprise an elastic means and do not rigidly attach the Internal CMM Arm 5 and the Exoskeleton 6. In this first embodiment, the only rigid attachment between the Internal CMM Arm 5 and the Exoskeleton 6 is at the base end 2; in particular, there is no rigid attachment between the Internal CMM Arm 5 and the Exoskeleton 6 at the Probe end 3 auto-rotation of segments as will be presently discussed misalignments due to build up of manufacturing and assembly tolerances Preferred Arrangement of Transmission Means It will be appreciated by those skilled in the art that there are many factors to be taken into account in the choice and design of the number, location and type of discrete or continuous Transmission Means 10. The arrangement of Transmission Means 10 will be different for 6-axis and 7-axis Robot CMM Arms 1. The arrangement of Transmission Means 10 will be different for short reach and long reach Robot CMM Arms 1. The arrangement of Transmission Means 10 will be different for different joint arrangements including different positions and orders of joint.

Number of Transmission Means

Any number of Transmission Means can be used from one discrete Transmission Means to a continuum of contact throughout the length of the Robot CMM Arm.

One Transmission Means: in order to position and orient the probe 90, if there is only one Transmission Means, it must be Transmission Means8 78 between CMM Segment8 38 and Exoskeleton Segment8 48. However, a 6 or 7 axis arm has redundancy and the elbow is then free to move under gravity or inertial accelerations. This free movement will result in a second 'inadvertent' Transmission Means where the CMM Joint4 54 impacts the Exoskeleton Joint4 64.

Two Transmission Means: as discussed, the first Transmission Means must be Transmission Means8 78. The second Transmission Means must be situated between the JointCentre2 22 end of CMM Segment3 33 and the JointCentre6 26 end of CMM Segment6 36 in order to control the elbow. If the second Transmission Means is towards JointCentre2 22, then the drives on the Exoskeleton 6 will need to be heavy and powerful all the way to the first Transmission Means where the weight of most of the arm is supported; this will result in a much heavier than necessary Robot CMM Arm 1. If the second Transmission Means is remote from JointCentre4 24, then a significant bending moment will be required through the Internal CMM Arm 5 to lift the weight of the elbow; this will reduce the accuracy of the Robot CMM Arm or require significant extra weight in stiffening CMM Segment 3 33.

Three Transmission Means: Three Transmission Means in addition to the rigid base connection is the preferred number of Transmission Means of the first embodiment of the Robot CMM Arm 1. The Three Transmission Means are located: near and before JointCentre4 24, near and before JointCentre6 26 and Transmission Means8 78 before the probe end 3. This arrangement of Transmission Means has the following advantages:

- The long segments CMM Segments3,5 33,35 are simply supported near either end and this reduces the deflection of the beams under the gravitational force
- The power and weight of the motors and gearboxes are minimised to provide a minimum weight Robot CMM Arm 1
- The quantity of Transmission Means is optimised; any more adds cost, weight and complexity Four to Seven Transmission Means: the design complexity of a Robot CMM Arm 1 with 4-7 Transmission Means 10 increases with each additional Transmission Means. The possibility of Transmission Means working against each other and applying undesirable moments on the Internal CMM Arm 5 increases.

Continuous Transmission Means: a continuous elastic medium can be provided between the Internal CMM Arm 5 and the Exoskeleton 6. The intermediate volume between the CMM Arm 5 and the Exoskeleton 6 could be filled with a quantity of small rubber spheres that are coated in adhesive such that they adhere to each other and do not flow down or around the intermediate volume in different spatial orientations. The intermediate volume could be filled with a material such as bubble-wrap in which pockets of air are trapped in a plastic sheet. The medium can be specified to minimise the forces and torques transmitted to the Internal CMM Arm 5. The medium can also be specified to minimise the misalignment of the joints of the Internal CMM Arm 5 with the joints of the Exoskeleton 6. The medium can be specified so that it exhibits desired elasticities in the three component directions: radial, axial and torsional. The medium may be continuous throughout the intermediate volume or may be discontinuous such as to resemble discrete Transmission Means. A continuous medium may exhibit discontinuous properties; for example the radial, axial and torsional elasticities in different regions of the intermediate volume may vary, perhaps substantially.

Undriven Segment Auto-Rotation

Referring again to FIG. 2, in the 7-axis Robot CMM Arm 1, there are four cases when one or more segments may auto-rotate under gravitational force without motive power from drive elements. Such CMM Segment auto-rotation is undesirable because if a joint could be oriented at 90 degrees to the angle necessary for a subsequent driven rotation and this may result in damage to the CMM arm or loss of calibration in the CMM arm due to the joint locking.

Case 1: Auto-rotation can occur if Orthogonal Hinge Joint2 22 is straight. Auto-rotation involves CMM Segments2,3 32,33 rotating together between CMM Joints1,3 51,53. This is unlikely since the Robot CMM Arm is normally mounted in the vertical orientation and there is no off-centre mass to be accelerated by gravity.

Case 2: Auto-rotation can occur if Orthogonal Hinge Joint4 24 is straight. Auto-rotation involves CMM Segments4,5 34,35 rotating together between CMM Joints3,5 53,55. This is likely if there is an off-axis centre of gravity in CMM Segments4,5 34,35 to be accelerated by gravity and Orthogonal Hinge Joint4 24 is not in a vertical orientation.

Case 3: Auto-rotation can occur if Orthogonal Hinge Joint6 26 is straight. Auto-rotation involves CMM Segments6,7 36,37 rotating together between CMM Joints5,7 55,57. This is likely if there is an off-axis centre of gravity in CMM Segments6,7 36,37 to be accelerated by gravity and Orthogonal Hinge Joint6 26 is not in a vertical orientation. Cases 1, 2 and 3 can be prevented either by a Rotation restraining element built into an overlapping Drive Transmission Means or a separate Rotation Restraining means 940.

Case 4: Auto-rotation can occur if CMM Segment8 has an off-axis centre of gravity and is not driven by a Transmission Means. However, a Transmission Means8 78 is essential and gives a Torsional drive so Case 4 can be neglected.

Orthogonal Hinge Joint Locking

There are a number of cases of spatial orientation of the Robot CMM Arm 1 in which Orthogonal hinge joints lock and undesirable forces, moments or torques could be applied to the Internal CMM Arm 5 from the effects of gravity, misalignment and abuse loads. Three example locking cases are:

LockingCase 1: Orthogonal Hinge Joints2,4,6 22,24,26 are straight with their axes horizontal. The arm is vertical if the base axis is vertical. Misalignments may result in bending moments applied to the Internal CMM Arm 5 by the Transmission means. An abuse load might result in bending moments applied to the Internal CMM Arm 5 by the Transmission means. Careful design of the Transmission Means and the stiffness of the Exoskeleton can minimise or eliminate this effect. LockingCase 2: Orthogonal Hinge Joints4,6 24,26 are straight with their axes vertical. If the segments of the Robot CMM Arm 1 after Joint2 22 are horizontal then there is the situation that CMMSegments3-8 33-38 form a single stiff 'locked' beam lying horizontally under gravity and supported in two or more locations. When supported at each end, the 'locked' beam will deflect significantly in the middle. When supported in 3 or more locations, it is likely that bending moments will arise and worse deflections be exhibited. Misalignments may result in bending moments applied to the Internal CMM Arm 5 by the Transmission means. An abuse load might result in bending moments applied to the Internal CMM Arm 5 by the Transmission means. This is the worst spatial orientation case to be considered in terms of undesirable forces and moments on the Internal CMM Arm 5. Careful design of the Transmission Means and the stiffness of the Exoskeleton can minimise or eliminate this effect. Alternatively, steps may be taken such that the Robot CMM Arm 1 is not moved into this LockingCase 2 spatial orientation whilst measuring. For instance, a 90 degree rotation at Joints3,7 23,27 leaves the arm in the same spatial orientation, unlocks both Orthogonal Hinge Joints4,6 24,26 with respect to Gravity, removes all undesirable moments and makes the arm suitable for measuring.

LockingCase 3: Orthogonal Hinge Joint6 26 is straight and its axis is vertical. This is a sub-case of LockingCase 2. The deflections are less. LockingCase 3 may be resolved in a similar manner to LockingCase 2.

The locking of any of CMMJoints2,4,6 32,34,36 in the above example Locking cases or any other Locking Case can be avoided by either of: 1. Putting hard stops in the Exoskeleton 6 to prohibit the joint reaching 180 degs; 2. Not moving the Robot CMM into spatial orientations where locking takes place.

Preferred Arrangement of Transmission Means

Figure 14:
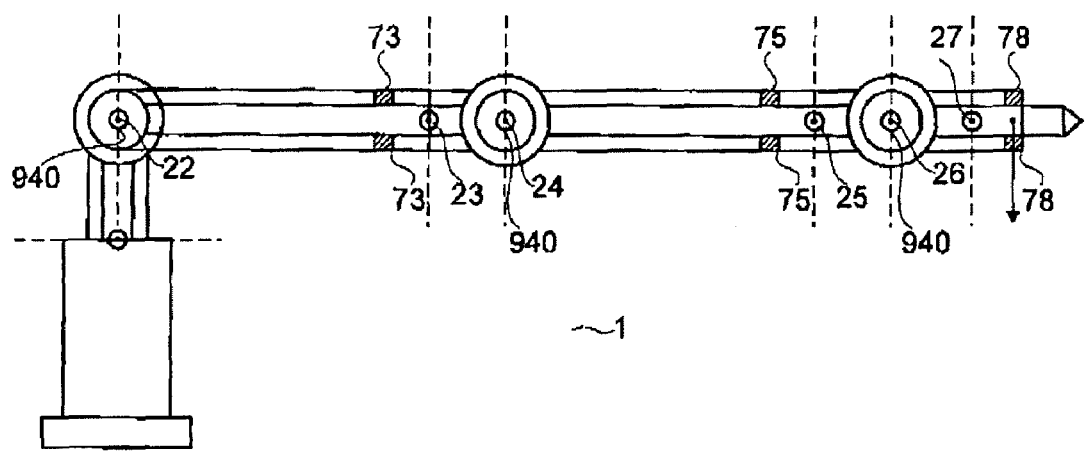
FIG. 14 is a schematic diagram of the location of all the transmission means.

Referring now to FIG. 14, the preferred arrangement of Transmission Means for a Robot CMM Arm 1 is described. The Robot CMM Arm 1 is static in the horizontal spatial orientation from Joint 2 onwards. Three Transmission Means3,5,8 73, 75, 78 are provided. Transmission Means3 73 is located just before JointCentre3 23. Transmission Means5 75 is located just before JointCentre5 25. Transmission Means8 78 is located after JointCentre7 27. Rotation Restraining means 940 are provided adjacent to Joint Centres2,4,6 22,24,26.

Figure 15:
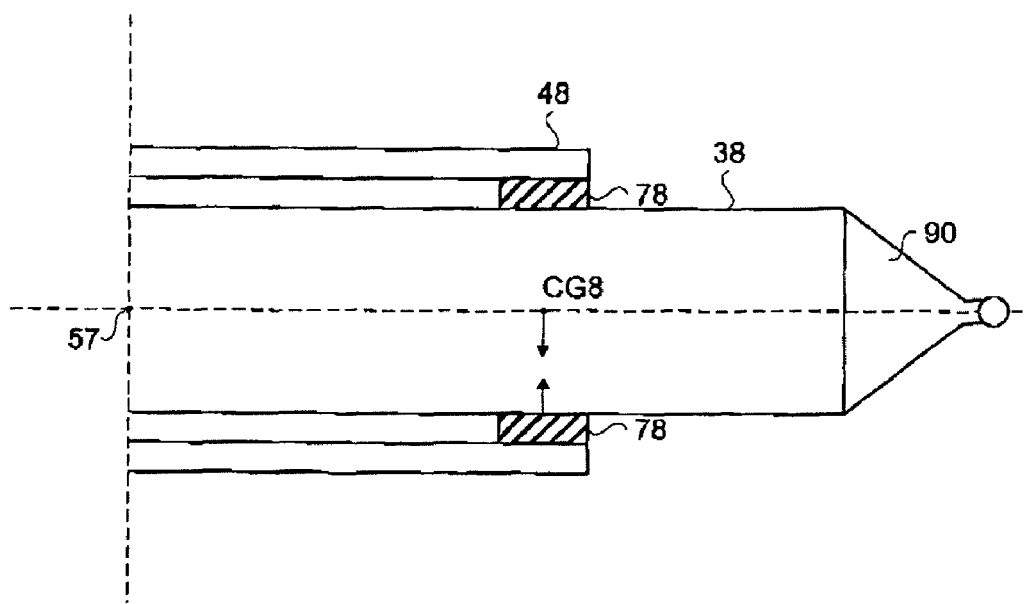
FIG. 15 is a schematic diagram of the location of the Segment 8 transmission means.

Referring now to FIG. 15, the location of Transmission Means 8 78 is described. CMM Segment8 38 and standard probe 90 rigidly mounted to CMM Segment8 38 are supported by Transmission Means8 78 at Centre of Gravity CG8 such that there are negligible resultant forces or torques on CMM Joint7 57. Centre of Gravity CG8 is the centre of gravity of CMM Segment8 38 combined with standard probe 90 rigidly mounted to CMM Segment8 38. This is a desirable state since one of the objects of this Robot CMM Arm 1 invention is to maximise accuracy by reducing forces and torques on the joints of the Internal CMM Arm 5. In practice, probes 90 including optical probes 91 of various masses, centre of gravity positions and moments of inertia will be attached to the probe end 2 of the Robot CMM Arm 1. In an ideal situation, all probes 90 will be designed such that when mounted on CMM Segment 38, the position of the Centre of Gravity of the combined probe 90 and CMM Segment8 38 is centred on the axis of CMM Segment 38 in the centre of the Transmission Means8 78. In this way, attaching a probe 90 of high mass centred on Centre of Gravity CG8 will not reduce the accuracy of the Robot CMM Arm because the extra mass is fully supported by the Exoskeleton 6 via the Transmission Means8 78.

Figure 16:
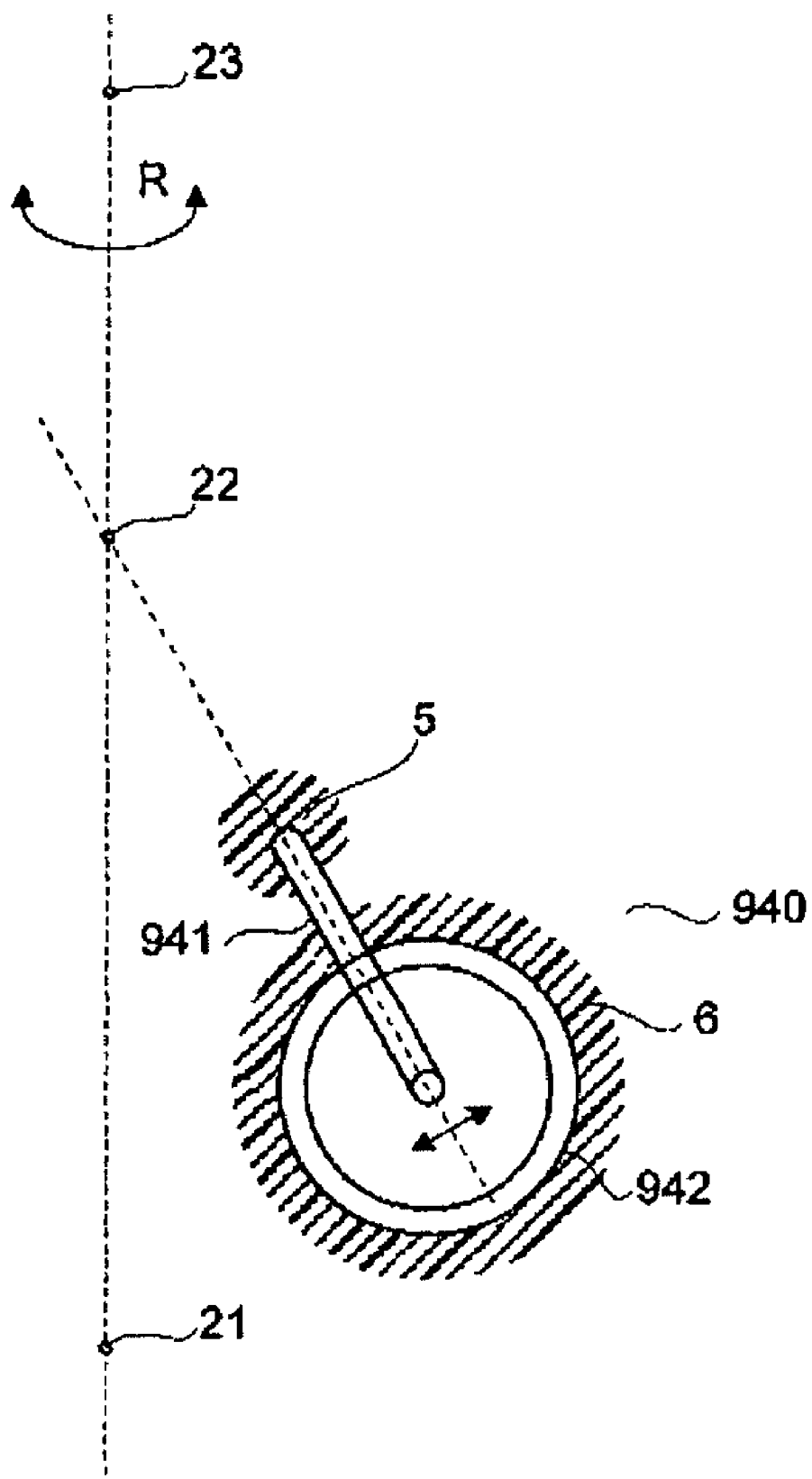
FIG. 16 is a schematic diagram of rotation restraining means.

Referring now to FIG. 16, Rotation Restraining means 940 is described. Rotation Restraining means 940 comprises a Pin 941 and an embedded rubber O ring 942. The Pin 941 is rigidly attached to the Internal CMM Arm 5 and protrudes from the axis of CMM Joint2 52. The O ring 942 is rigidly embedded in the Exoskeleton 6 and is aligned with the axis of Exoskeleton Joint2 62. The outside diameter of the Pin 941 is significantly less that the inside diameter of the O ring 942 such that when CMM Joint2 52 and Exoskeleton Joint2 62 are aligned, there is a uniform radial air gap between the Pin 941 and the O ring 942. The object of the Rotation Restraining means 940 is to prevent auto-rotation R of CMM Segments2,3 when CMM Joint2 52 is straight. If auto-rotation R starts, it will soon be halted by the Pin 941 swinging round the Axis of JointCentre2 22 and colliding with the O ring 942. The air gap is maintained in normal motion of the Robot CMM Arm and prevents undesirable forces or torques being applied to the Internal CMM Arm 5 via the O ring 942 and the Pin 941.

Figure 17:
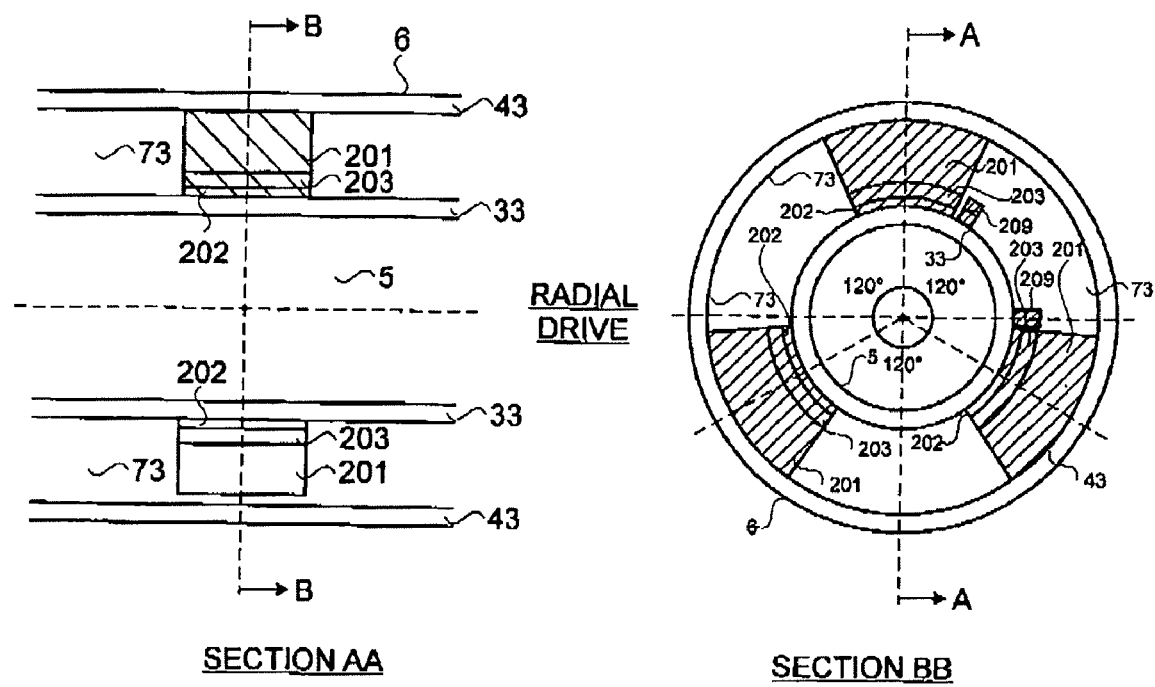
FIG. 17 is two sections of radial transmission means.

Referring now to FIG. 17, the principle of the Transmission Means3 73 is shown in Longitudinal Section AA and Axial Section BB. The drive transmission of Transmission Means3 73 is radial. CMM Segment3 33 is moved by means of radial forces through Transmission Means3 73 from Exoskeleton Segment3 43. The Transmission Means3 73 comprises three Transmission Blocks 201 at 120 degree spacing rigidly attached to the inside of Exoskeleton Segment3 43; the Transmission Blocks 201 are made from a light material such as Aluminium. Bonded to the inner surface of the three Transmission Blocks 201 are two layers: an elastic material layer 203 such as neoprene and a low-friction material layer 202 such as PTFE that contacts with CMM Segment3 33. The Transmission Means3 73 do not transmit axial force because the low-friction material layer 202 permits slip between the CMM Segment3 33 and the Exoskeleton Segment3 43 in the axial mode. The elastic material layer 203 is in constant compression when the Transmission Means3 73 is assembled in position. The elastic material layer 203 has a combined cross-sectional area, thickness and stiffness that enables it to remain within its design elastic range without rapidly increasing in stiffness during normal use or compressing a significant distance. The elastic material layer 203 is much wider than the misalignment under abuse loads of the Internal CMM Arm 5 and the Exoskeleton 6 at that location; this protects the Internal CMM Arm from receiving high forces or torques. The stiffness of the elastic material layer 203 is low such that it significantly compresses when supporting the maximum weight. It will be appreciated by those skilled in the art that the specification of the cross-sectional area, thickness and stiffness is a known procedure requiring accurate modelling of many factors including misalignment tolerance build-up and deflection of the Exoskeleton under abuse loads. A benefit from the use of low-friction material 202 is that heat is not generated through friction; this means that the required drive power is minimised and the accuracy of the Internal CMM Arm 5 is maintained by eliminating thermal distortion due to frictional 'hot' spots. Two Bump stops 209 are provided to prevent auto-rotation. The Bump-stops are attached to CMM Segment 3 33. In normal operation, there is an air gap between Bump stop 209 and the Transmission Block 201. The Bump Stop 209 has a rubberised surface to reduce impact. If auto-rotation commences, then it is soon stopped by Bump-stop 209 hitting Transmission Block 201. Transmission Means5 75 is similarly arranged for radial drive transmission.

The drive transmission of Transmission Means8 78 is torsional and radial. Transmission Means8 7 comprises two neighbouring units a torsional drive and a radial drive. The radial drive is similar to that of FIG. 17. Referring now to FIG. 18, the torsional drive of the Transmission Means8 78 is shown in Longitudinal Section AA and Axial Section BB. CMM Segment8 38 is rotated by means of a torque through Transmission Means8 78 from Exoskeleton Segment8 48. The Transmission Means8 78 comprises a Collar 204 bonded to CMM Segment8 38. The Collar 204 further comprises three Driven flanges 209 spaced at 120 degrees, extending outwards radially and extending longitudinally. Three Slotted Transmission Blocks 205 at 120 degree spacing drive the driven flange. Each Slotted Transmission Block 205 comprises two pads of elastic material 203 bonded to the two drive faces of the slot of the Slotted Transmission Blocks 205. The Slotted Transmission Blocks 205 are attached to Exoskeleton Segment8 48 with bolts 206 using washers 207. The Slotted Transmission Blocks 205, the collar 204 and the washers 207 are made from a light material such as Aluminium. The elastic material 203 has an external low-friction material layer 202 such as PTFE that contacts with the Driven flanges 209. The Transmission Means8 78 do not transmit axial forces because the low-friction material layer 202 permits some slip between the CMM Segment8 38 and the Exoskeleton Segment8 48 in the axial mode. The Transmission Means8 78 partially transmits radial forces because although the low-friction material layer 202 permits some slip between the CMM Segment8 38 and the Exoskeleton Segment8 48 in the radial mode, the Driven flanges 209 are situated at 120 degrees and react together to provide a correcting force to any radial movement between the CMM Segment8 38 and the Exoskeleton Segment8 48. The elastic material layer 203 is in constant compression when the Transmission Means8 78 is assembled in position. The elastic material layer 203 has a combined cross-sectional area, thickness and stiffness that enables it to remain within its design elastic range without rapidly increasing in stiffness during normal use or compressing a significant distance. It will be understood by those skilled in the art that an integrated torsional and radial drive could be provided as a lighter and more compact unit than the two neighbouring torsional and radial drives which have been discussed separately to better disclose the principals behind the invention.

General

It will be appreciated by an expert skilled in the field, that the Exoskeleton 6 can transmit forces and torques to the Internal CMM Arm 5 using a wide range of transmission means 10 that all achieve the objective of minimising forces and torques on the Internal CMM Arm 5 so as to maximise the accuracy of the Robot CMM Arm 1. The scope of this Robot CMM Arm 1 invention is not limited to the disclosed preferred arrangement of transmission means 10, but provides for all transmission means 10 of transmitting forces and torques to an Internal CMM Arm 5 from an Exoskeleton 6 such that the Robot CMM Arm 1 is automatically driven and accurate. For example, in alternative embodiments, the number of discrete transmission means 10 can be two or more; continuous transmission means may be used; a combination of discrete and continuous means may be used. The scope of this Robot CMM Arm 1 invention is not limited to elastic transmission means. In further embodiments, transmission means 10 can rigidly attach the Internal CMM Arm 5 and the Exoskeleton 6 at one or more locations such that forces and torques transmitted to the Internal CMM Arm 5 from the Exoskeleton 6 do not affect the accuracy of the Robot CMM Arm 1. It will be further appreciated by an expert skilled in the field, that future apparatus arriving in the marketplace can appear to have a combined Internal CMM Arm and Exoskeleton and can be claimed to be a conventional robot rather than a Robot CMM Arm. The scope of this present invention covers all apparatus having the technical effect of reducing the forces and torques on the CMM bearings and segments.

Robot CMM Arm Compensation

Compensating the Internal CMM Arm

If a compensating device were employed in the Internal CMM Arm 5, the stress increases in the joint through which it acts and can also induce bending moments, both of which either cause reduced accuracy or require increase weight to counteract. The joints of the Internal CMM Arm 5 of the Robot CMM Arm 1 invention will typically be used for more cycles than a Manual CMM Arm because the Robot CMM Arm can be used up to 24 hours a day, 365 days a year less maintenance periods and shutdowns. If a joint has a high stress and is used continuously, then the compensating device will generate more heat and the temperature of that joint in the arm will be higher than compared to low usage. This potentially increases the inaccuracy of the arm. The bearings on that joint of the Internal CMM Arm 5 need to be designed to be stiff for a much larger number of lifetime cycles. Loose bearings are a significant cause for inaccuracy in the Internal CMM Arm 5 and cannot be compensated for. It is a purpose of this invention that the Exoskeleton 6 carries the Internal CMM Arm 5 in such a way as to be an external compensating device. This external compensation minimises most of the forces and torques on the Internal CMM Arm 5 during motion and removes the disadvantages of an internal compensating device. This means that the Internal CMM Arm 5 does not need a compensating device and the Robot CMM Arm 1 will be lighter, simpler and cost less to manufacture without a compensating device. The scope of this invention is not limited to Robot CMM Arms 1 without a compensating device on the Internal CMM Arm 5 but also includes Robot CMM Arms 1 with a compensating device on the Internal CMM Arm 5.

Exoskeleton Compensating Device

The Robot CMM Arm 1 can be mounted with its base 4 in any orientation. In base orientations that are either vertically upwards or downwards, the Exoskeleton 6 preferably has a compensating device in Exoskeleton Joint2 62 that compensates for the weight of both the Exoskeleton 6 and the Internal CMM Arm 5. A compensating device is a device that does not directly consume power from a power source such as electrical voltage, pneumatic or hydraulic pressures. This means that the drive system in Exoskeleton Joint2 62 can be less powerful, weigh less and consume less energy in most duty cycles. In a typical design of Robot CMM Arm 1, the presence of a compensating device can reduce power consumption by 10-25% and reduce the weight of the Robot CMM Arm by 5-12%.

Figure 19:
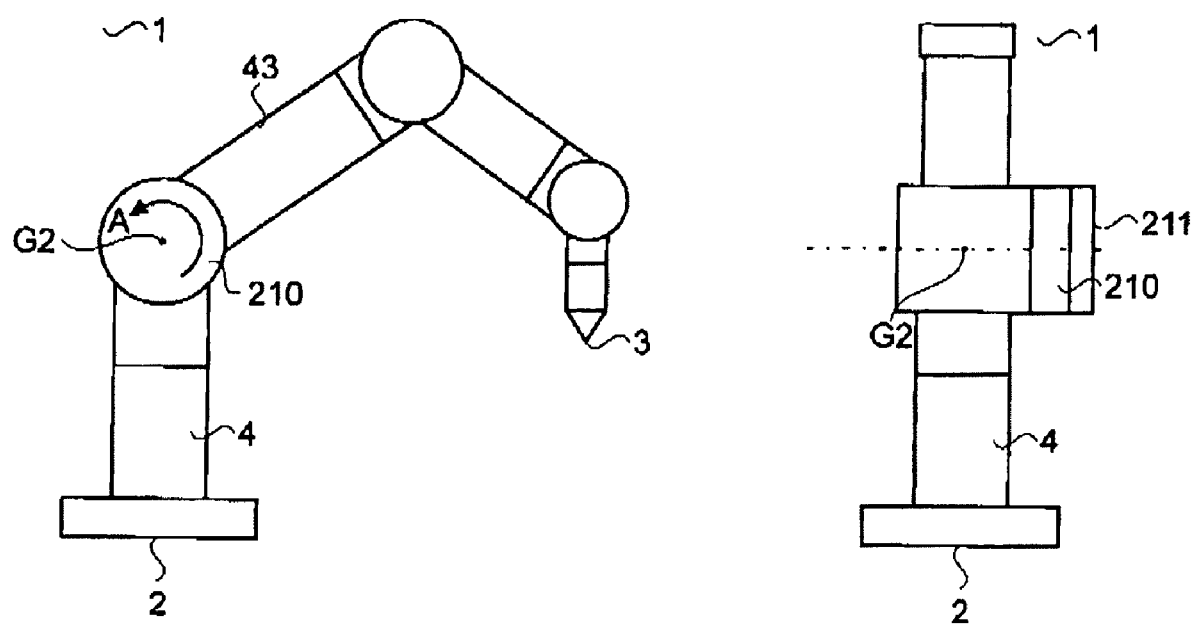
FIG. 19 is a schematic of a compensating device.

Referring now to FIG. 19, the Base 4 of the Robot CMM Arm 1 is mounted vertically upwards and the direction of application A of the Compensating device 210 is to lift ExoskeletonSegment3 43 of the Exoskeleton 6 upwards against gravity towards a vertical position. The Compensating device 210 is situated at one end of the axis of Exoskeleton Joint2 62. With the base 4 of the Robot CMM Arm 1 mounted vertically downwards, for example when hanging down from the column of a moving bridge 3-axis CMM 129, the direction of application of the Compensating device 210 is to lift ExoskeletonSegment3 43 of the Exoskeleton 6 upwards against gravity towards a horizontal position. Preferably a single Compensating device 210 acts to provide a torque through Exoskeleton Joint2 62. The Compensating device 210 is preferably a machined coil spring. The Compensating device 210 is set to the optimum value to minimise the maximum torque required to rotate Exoskeleton Joint2 62 in any orientation of Exoskeleton Joint2 62. This Compensating device 210 means that a smaller and lighter drive system can be provided to drive Exoskeleton Joint2 62. In ideal circumstances, the Compensating device 210 should act directly through the centre of Exoskeleton Joint2 62 to avoid applying bending moments to Exoskeleton Joint2 62. In this Robot CMM Arm invention, CMM Joint 2 of the Internal CMM Arm 5 is situated in the middle of Exoskeleton Joint2 62. The Compensating device 210 is therefore situated off-centre and applies a bending moment to Exoskeleton Joint2 62. The structure of the Exoskeleton 6 and in particularly the components around Exoskeleton Joint2 62 is stiff enough to counteract the bending moment from the Compensating device 210 and keep the bending of the Exoskeleton 6 within desired limits. The direction of the torque compensation of the Exoskeleton Joint2 62 is the opposite for either vertically upward or vertically downward Robot CMM Arm base 4 orientation. The Compensating device 210 provided can be turned so as to apply its torque in the opposite direction when the base 4 orientation of the Robot CMM Arm 1 changes direction. In a further embodiment of this invention, the Compensating device 210 further comprises a Damper 211.

In an alternative embodiment, a selection of two Compensating devices 210 are provided for the arm, the first for application when the Robot CMM Arm 1 has a vertically upwards base 4 orientation and the second for application when the Robot CMM Arm 1 has a vertically downwards base 4 orientation; the appropriate Compensating device 210 is fitted for the orientation of the base 4 of the Robot CMM Arm 1. In a further embodiment, a Compensating device 210 with manual setting for the two different orientations is provided that is set up manually during installation of the Robot CMM Arm 1. In an alternative embodiment of this invention, two Compensating devices 210 are provided situated on either side of Exoskeleton Joint2 62 and set to approximately the same torque, such that the bending moment across Exoskeleton Joint2 62 is negligible.

In other base orientations such as with the base of the Robot CMM Arm mounted horizontally, for example when mounted on a wall, it is preferable not to have a Compensating device 210 at Joint 2, unless the application is constrained such that it can be useful. In an alternative embodiment, this Robot CMM Arm invention can function without any Compensating device 210 in the Exoskeleton 6.

Joint Limits

This first embodiment of the Robot CMM Arm 1 invention has infinite rotation on the axial joints and hard limits to the rotation of each orthogonal joint. A hard joint limit is a physical stop beyond which the joint will not rotate in the direction of the hard joint limit. It is a purpose of this invention to pass power and signals through slip-rings in the Internal CMM Arm 5 that can service both the electronics of the Internal CMM Arm 5 and the drive systems of the Exoskeleton 6. In a 6-axis Robot CMM Arm 1, the three axial axes are infinitely rotating and in a 7-axis Robot CMM Arm 1, the four axial axes are infinitely rotating. This means that the arm is more robust since cables do not need to be continuously coiled and uncoiled through 360 degrees in the region of each axial joint.

Internal CMM Joint Hard Limits

In this first embodiment, there are no built-in hard joint limits in the Internal CMM Arm 5. Axial joints may rotate infinitely. The inherent orthogonal joint limits are all slightly in excess of the hard joint limits of the Exoskeleton 6 such that the Exoskeleton cannot force the Internal CMM Arm 5 onto a hard joint limit in normal operation. Simple rubber stops are located to avoid damage during assembly when the Internal CMM Arm 5 is unsupported by the Exoskeleton 6. These rubber stops are not used in operation once the Robot CMM Arm 1 has been built.

Exoskeleton Joint limits

In this first embodiment, each Exoskeleton Joint2,4,6 62,64,66 has first and second hard joint limits. Each hard joint limit is preferably a mechanical stop with a shock absorber element made of rubber attached to at least one impact side to soften any impact. For larger sizes of the Robot CMM Arm 1 invention, in which an impact involving an orthogonal joint could be considerable, the impact energy force is dissipated by axially compressing a partially pre-crumpled tube so situated as to absorb the impact. Pre-crumpling removes the initially high shock stress of impact onto a rigid body. After impact, the tube is simply replaced. The tube is preferably 100 mm long, made of pure aluminium, with 7 mm in diameter and 1.5 mm wall thickness and pre-compressed by 5% within a 9.5 mm diameter jig, so as to fit within a 10 mm bore in an orthogonal joint of a Robot CMM Arm 1. Adjustments are made to these specifications for different size Robot CMM Arms with different quantities of impact energy to absorb. It will be appreciated that any other appropriate way of absorbing impact energy through plastic deformation or other mode could equally be used, such as by shearing rather than crumpling a material. In this first embodiment, each Exoskeleton Joint2,4,6 62,64,66 has first and second soft joint limits. Each soft joint limit is preferably a limit switch 182.

Optimum Base Orientation Direction

The base 4 of the Robot CMM Arm 1 preferably has an optimum orientation direction marked on it. The base optimum orientation direction is the direction in which the base 4 should be oriented towards the centre of the working area in which the Robot CMM Arm invention is to be used. In the optimum orientation for embodiments without infinite rotation, Exoskeleton Joint1 61 can be rotated by equal amounts to either side before hitting hard limits.

Exoskeleton Joint 1 Limits

In this first embodiment, Exoskeleton Joint1 61 is an axial joint. For embodiments without infinite rotation, hard limits are required. Referring to FIG. 20, the total angular rotation of Exoskeleton Joint1 61 between the first and second physical joint limits is 630 degrees. The Exoskeleton Joint1 61 first hard joint limit pair 222A, 222B and second hard joint limit pair 223A, 223B are set at equal angles of 315 degrees to the base optimum orientation direction 221. The hard joint limits 222A and 223A rotate with Exoskeleton Segment2 42. The hard joint limits 222B and 223B remain static with Exoskeleton Segment1 41. The hard joint limits 222B and 223B each have a rubber shock absorber element 224 attached to the impact face. Two soft joint limit switches 182 are positioned so that the limit switch is contacted just before the joint reaches it hard limit. In a further embodiment, provision is made for the rotating hard joint limits 222A and 223A to be moved by the operator relative to Exoskeleton Segment2 42 to give an alternative total angular rotation of Exoskeleton Joint1 61 of 390 degrees. In alternative embodiments, the angular rotation of Exoskeleton Joint1 61 could be more than 630 degrees or could be less than 390 degrees. There could also be a plurality of joint limit settings up to a maximum total angular rotation. Similar hard joint limit means are provided for Exoskeleton Joints3,5,7 63, 65, 67. Similar soft joint limit switches 182 are provided for Exoskeleton Joints2-7 62-67.

Exoskeleton Joint 2 Limits

Figure 21C:
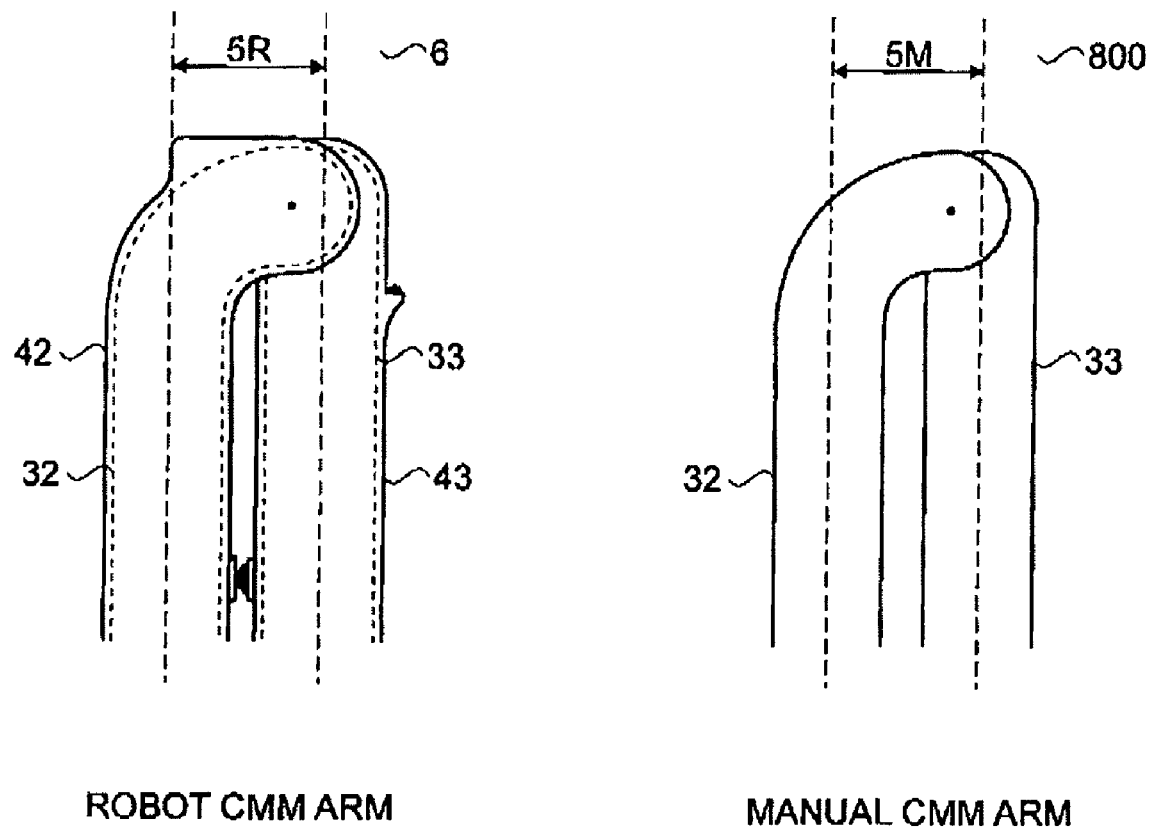
FIG. 21C is a schematic comparison of the axis separations for a Robot CMM Arm and a Manual CMM Arm.

In this first embodiment, Exoskeleton Joint2 62 is an orthogonal joint. Referring to FIGS. 21A, 21B, the angular rotation of Exoskeleton Joint2 62 is preferably 185 degrees. Referring to FIG. 21B, the Exoskeleton Joint2 62 rotation starts with Exoskeleton Segment3 43 at 5 degrees past vertically upwards and first hard joint limit pair 225A, 225B touching through rubber pad 224. Referring to FIG. 21A, the Exoskeleton Joint2 62 rotation finishes with Exoskeleton Segment3 43 vertically downwards and second hard joint limit pair 226A, 226B touching through rubber pad 224. When the Robot CMM Arm base 4 is oriented vertically upwards, the Compensating device 210 on Exoskeleton Joint2 62 acts to rotate Exoskeleton Segment3 43 upwards towards the first hard joint limit pair 225A, 225B. When the Robot CMM Arm base is oriented vertically downwards (not shown in FIGS. 21A, 21B), the Compensating device 210 on Exoskeleton Joint2 62 is reversed in direction of action and acts to rotate Exoskeleton Segment3 43 towards the second hard joint limit pair 226A, 226B. Similar hard joint limit means are provided for Exoskeleton Joints4,6 64, 66. Referring to FIG. 21C, for an arrangement of a Robot CMM Arm 1 with in-line orthogonal joints in which the axis separation SR of a Robot CMM Arm 1 is greater than the axis separation SM for an equivalent but conventional Manual CMM Arm without Exoskeleton 790. In the Robot CMM Arm 1, CMM Segments2,3 32,33 are shown inside Exoskeleton Segments2,3 42, 43. The axis separation SR between the axes of CMM Segments2,3 32, 33 when CMM Segments2,3 32,33 are oriented parallel to each other is greater than the axis separation SM for the corresponding CMM Segments2,3 32,33 of an equivalent but conventional Manual CMM Arm without Exoskeleton 790 because room is required for the Exoskeleton Segments2,3 42, 43 of the Exoskeleton 6.

Joint Brakes

This Robot CMM Arm 1 invention is not supported against gravity by an operator. If the power to the drive systems is cut, then without brakes 177, the Robot CMM Arm 1 will fall under gravity and can be damaged or damage one or more people or objects. In this first embodiment, all the Exoskeleton Joints1-7 61-67 have fail-safe brakes 177 that automatically apply in the event of a power cut. In this way, all the Exoskeleton Joints1-7 61-67 are locked in the event of a power cut and this locking will work at any base mount orientation and any robot arm spatial layout. In an alternative embodiment, in which the Robot CMM Arm 1 should only be mounted with its base vertically upwards or vertically downwards, Exoskeleton Joint1 61 does not have a brake 177. In this case Exoskeleton Joint1 61 has a constant orientation and the effect of gravity will not cause acceleration of Exoskeleton Joint1 61. In alternative embodiments, Exoskeleton Joints5-7 65-67 are not supplied with brakes since the permitted moment and movement at the wrist under gravity is very small. This has the benefit of a more compact wrist design and a lighter Robot CMM Arm 1.

Joint Bearings

Figure 22:
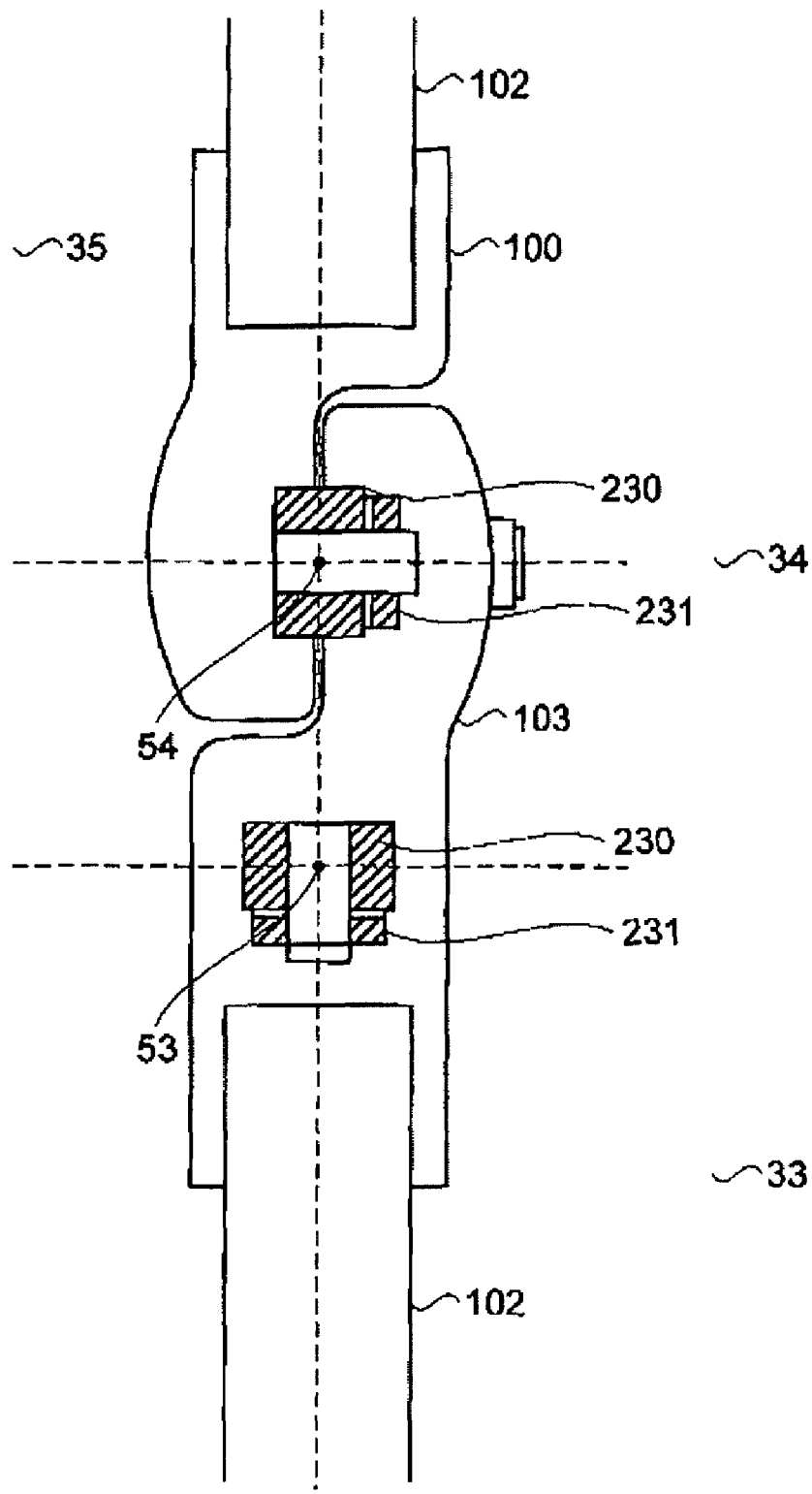
FIG. 22 is a schematic diagram of bearings.

The bearings in CMMJoints1-7 51-57 are a crucial item in the provision of a highly accurate Robot CMM Arm 1. The CMM encoders 178 can provide the angle of each joint but the CMM encoders 178 cannot measure errors introduced by the bearings in CMMJoints1-7 51-57. The bearings and their arrangements in CMMJoints1-7 51-57 must maximise stiffness and minimise bearing rumble whilst minimising weight and joint size. Low friction bearings are used in the CMM Joints 1-7 51-57 of the Internal CMM Arm 5 to minimise the amount that the Internal CMM Arm 5 warms up, especially with heavy duty cycles. The stress on the bearings in the Internal CMM Arm 5 is typically less than for a Manual CMM Arm because the Exoskeleton compensates for most of the weight of the arm. Referring now to FIG. 22, pairs of pre-stressed ceramic taper roller bearings 230 such as from Barden Corp, USA are provided in CMM Joint3 53 an axial joint and CMM Joint4 54 an orthogonal joint. The taper roller bearings 230 provide high stiffness and compactness. The taper roller bearings 230 are pre-stressed by applying a predetermined torque to a nut 231. The bearings 230 are fitted into housings 100 and 103 using an interference fit, performed using a thermal shrink-fit process in which the bearings are first cooled to −45 C before insertion and result in a strong interference fit at room temperature. In a similar arrangement, pre-stressed taper roller bearings 230 are provided in each CMM Joint1-7 51-57. There are many ways of providing bearing arrangements in this invention. The scope of this invention is not limited to the use of pre-stressed taper roller bearings with thermal interference shrink-fits. Any type of bearings and methods of fitting and adjusting bearings can be used that satisfies at least the requirements of low weight, low friction and high stiffness. The bearing runout error can be reduced by using angular contact ball bearings such as bearing B71906 from FAG, Germany that has a contact angle of 15 degrees and external/internal radial runouts Kea/Kia both of 2.5 microns, or B71903 also from FAG with external/internal radial runouts Kea/Kia both of 1.5 microns. Air bearings have very low runouts compared to ball bearings and are most appropriate in the lower joints where bearing error has the largest effect on accuracy of the Robot CMM Arm 1. Air, electric power, signals and communications may be transferred through infinite rotating joints by combined air/electrical contact slip-rings that are well known to those skilled in the art of robotics. Different types of bearing can be used in different joints. For example, Joint 1 and 2 can be air bearings with low runouts and Joints 3 onwards can be angular contact ball bearings that do not require the provision of air further up the arm.

The bearings in ExoskeletonJoints1-7 51-57 are not a crucial item in the Robot CMM Arm 1 in terms of accuracy but preferably have a life longer than the design life of the Robot CMM Arm 1 to avoid expensive replacement costs. Cross roller bearings can be used on the axial joints; they are compact but relatively heavy; segments of around 100 degrees are removed for assembly of the Internal CMM Arm 5 into the Exoskeleton 6; these segments must be well aligned on assembly. To ease assembly, solid polymer bearings can be used in which a low-friction cylindrical material is inserted between internal and external housing surfaces; 100 deg segments can be removed from the bearing material and the two housing surfaces; the polymer bearing approach provides for easy assembly at the expense of reduced bearing stiffness and life. Another alternative is the provision of upper and lower sets of three rolling elements that roll on a hard surface such as steel; a removable segment can again be provided.

Probe End Module

In a further embodiment of this first embodiment, a 6-axis Robot CMM Arm 1 is supplied with a Probe End Module such that a customer can convert a standard Robot CMM Arm 1 from 6-axis to 7-axis by removing a 0-axis Probe End Module without an axis and replacing it with a Probe End Module with an additional axis. The Probe End Module concept has advantage to the supplier in that the supplier has one standard 6-axis Robot CMM Arm 1 product that may be simply configured between 6-axis and 7-axis versions by shipping the appropriate Probe End Module. The concept has advantage to the user in that the user can purchase a Robot CMM Arm for 6-axis use and later upgrade to 7-axis use. The Probe End Module is situated at the far end of the Robot CMM Arm 1 and is likely to be subject to accidents in use. If the Probe End Module is damaged, it may be simply replaced, with little loss of production time. Without the Probe End Module concept, the Robot CMM Arm 1 needs to be swapped out on a production line or cell and a more expensive repair process carried out either onsite or offsite.

Interfaces and Transmission Means

The Probe End Module can be moved by the Exoskeleton 6 using any of three broad embodiments:

Internal endoskeleton finger and transmission means;
External exoskeleton and transmission means;
Mounting interface rigid transmission means;

as is now disclosed with reference to FIGS. 89A,B,C using a 0-axis Probe End Module but not limited to a 0-axis Probe End Module. Referring to FIG. 89A, a Probe End Module 1000 is driven by an Internal endoskeleton finger 1004 through transmission means 77. The Probe End Module 1000 has three mounting interfaces: Arm Interface 1001, Contact Probe Interface 1002 and Optical Probe Interface 1003. The Probe End Module 1000 is rigidly mounted across Arm Interface 1001 to the Internal CMM Arm 5 at CMMSegment7 37 using appropriate fastening means such as bolts. Once mounted, the Probe End Module 1000 is effectively part of CMMSegment7 37. The Touch Trigger Probe 96 that is preferably of type Renishaw TP-20 is magnetically mounted across Contact Probe Interface 1002 to the Probe End Module 1000. Stripe Probe 97 which is preferably a 3D Scanners ModelMaker is mounted across Optical Probe Interface 1003 to the Probe End Module 1000. Referring now to FIG. 89B, a Probe End Module 1000 is driven by ExoskeletonSegment7, 47 through transmission means 77. Referring now to FIG. 89C, a Probe End Module 1000 is driven through its mounting Arm Interface 1001.

Types of Axis

Three types of Probe End Module 1000 are disclosed, although the scope of this invention is not limited to these three types but includes all types of Probe End Module 1000:

0-axis
1-axis
Hybrid 0/1-axis

Referring again to FIG. 89A, the Probe End Module 1000 is 0-axis and is a module between the Robot CMM Arm 1 and one or more Probes 90 preferably a Touch Trigger Probe 96 and a Stripe Probe 97. Referring now to FIG. 90A, the 1-axis Probe End Module 1000 is a module between the Arm Interface 1001 and Probe Interfaces 1002, 1003 to one or more Probes 90 such as a Touch Trigger Probe 96 and a Stripe Probe 97 such that all Probes 90 rotate on an axis through CMMJoint7 27,57 contained within the Probe End Module 1000. Referring now to FIG. 90B, the Hybrid 0/1-axis Probe End Module 1000 is a module between the Arm Interface 1001, fixed Contact Probe Interface 1002 and rotating Optical Probe Interface 1003, such that at least one Probe 90 can rotate about a CMMJoint7 57 contained within the Probe End Module 1000. Contact Probe Interface 1002 is located on CMMSegment7 37. Optical Probe Interface 1003 is located on CMMSegment8 38. A through-bore slip-ring is provided comprising static Slip-ring 1005 and rotating Brush block 1006 so that power, signals and communication networks can be continually fed through to a Probe 90 attached via Optical Probe Interface 1003 undergoing unlimited rotation about CMMJoint7 57. An electronics module 1010 is contained in Probe End Module 1000 and has a number of tasks including encoder signal processing, motor drive, trigger connections and probe communications. The electronics module 1010 is connected to the Robot CMM Arm 1 via a connector 1011 in the Arm Interface 1001 of the Probe End Module 1000. The electronics module 1010 is connected to a fixed Probe 90 via a connector 1012 in the Contact Probe Interface 1002 of the Probe End Module 1000. The electronics module 1010 is connected to a rotating Probe 90 via the slip-ring 1005 and brush lock 1006 to a connector 1013 adjacent to the Optical Probe Interface 1003 of the Probe End Module 1000.

External Actuation of CMMJoint7

CMMJoint7 27,57 contained within Probe End Module 1000 can be driven externally or internally. Referring again to FIG. 90A, the Probe End Module 1000 is driven externally through TransmissionMeans8 78 by ExoskeletonSegment8 48. The 6-axis Robot CMM Arm 1 has an exoskeleton and the 1-axis Probe End Module 1000 is rigidly attached to the Internal CMM Arm 5 at Arm Interface 1001 such that CMMSegment7 37 has one part on the Internal CMM Arm 5 and a second part in the 1-axis Probe End Module 1000.

Internal Actuation of CMMJoint7

It is a purpose of this invention to provide an internally driven 1-axis or Hybrid 0/1-axis Probe End Module 1000. Referring again to FIG. 90B, the Probe End Module 1000 is driven internally without an Exoskeleton by Motor 1007 attached to CMMSegment7 37 through a spur gear 1008 that is also TransmissionMeans8 78 to a gear ring 1009 on CMMSegment8 38. The 6-axis Robot CMM Arm 1 has an exoskeleton and the Hybrid 0/1-axis Probe End Module 1000 is rigidly attached to the Internal CMM Arm 5 at Arm Interface 1001 such that CMMSegment7 37 has one part on the Internal CMM Arm 5 and a second part in the Hybrid 0/1-axis Probe End Module 1000. This internally actuated arrangement for driving CMMJoint7 57 in removable Probe End Module 1000 does not include the Exoskeleton concept for CMMJoint7 57. In effect, the Exoskeleton 6 is a partial Exoskeleton that terminates at TransmissionMeans7 77. After CMMSegment7 37, the Internal CMM Arm 5 includes means to drive CMMJoint7 57. In another embodiment, referring again to FIG. 90A, the 1-axis Probe End Module 1000 is provided with the motor actuation of FIG. 90B. In this embodiment, both Probe Interfaces 1002 and 1003 rotate about CMMJoint7 57.

Further Embodiments and Uses

The concept of the Probe End Module 1000 mounted between a Robot CMM Arm 1 and one or more Probes 90 is not limited to the embodiments disclosed above. For example, it is applicable to the mounting of one or more tools 98 or any combination of measuring probes 90 and tools 98. The 1-axis and Hybrid 0/1-axis Probe End Module 1000 is not limited to provision on Robot CMM Arms 1. For example, the 1-axis and Hybrid 0/1-axis Probe End Module 1000 can also be provided on conventional 3-axis CMMs such as moving gantry or horizontal arm CMMs; it can also be provided on accurate robots. Any of the interfaces 1001,1002,1003 may be fixed with strong fixings, sacrificial/breakable fixings that break rather than the Probe End Module being damaged, or magnetic force. Fixings can be provided in a standard arrangement to fit with the wrist design of the machine on which the Probe End Module 1000 is to be mounted; or in non-standard arrangements; or in a flexible design in which it can be mounted in 2 or more different ways. A central fixing can be provided or multiple fixings towards and around the perimeter of the mounting face. Fixings can be non-repeatable or repeatable. Fixings such as bolts may be removable or may be trapped such that they cannot be lost. Contact Probe Interface 1002 and Optical Probe Interface 1003 can be provided with automatic clamping and unclamping means for probe autochanging. Other drive means may be used instead of the motor with spur gear and ring gear. The 1-axis Probe End Module 1000 can be positioned to any programmed angle to the resolution limits of the system; alternatively the Probe End Module 1000 can be provided with increments such as 15 degs at which it locks in position to a high repeatability; these increments can be datumed. The 1-axis Probe End Module 1000 can be restricted to rotation between two defined angular position either by hard stops or by software means A datum switch provides an angular reference position. Encoder means are provided for measuring the angle of the CMMJoint7 within the Probe End Module 1000. Connectors 1011, 1012, 1013 may automatically make electrical contact with the Robot CMM Arm 1 or Probe 90 when an interface 1001, 1002, 1003 is mechanically made. Alternatively Connectors 1011, 1012, 1013 may be manually made in a separate operation. Markings for the angle of rotation may be made either side of the rotating boundary if the 1-axis Probe End Module 1000, to enable a user to see approximately what angle the axis has rotated to. The Probe End Module 1000 can contain sensors that will cause an emergency stop on sensing an impact and thereby limit damage. The Probe End Module 1000 can be provided with a curved shape to minimise damage caused in impact by encouraging a sliding movement between the surface of the Probe End Module 1000 and the object with which it is in collision. The scope of the Probe End Module 1000 concept is not limited to apparatus but also includes methods of mounting and using the Probe End Module 1000.

Arrangements without the Probe End Module Concept

It will be appreciated by those skilled in the art that the embodiments of the Probe End Module can be provided in a Robot CMM Arm 1 without Arm Interface 1001. For example, referring again to FIG. 90A, the externally actuated arrangement for driving CMMJoint7 57 located within removable 1-axis Probe End Module 1000 that is mounted on a 6-axis Robot CMM Arm 1 has the same technical effect as a 7-axis Robot CMM Arm 1 with the same arrangement but without an Arm Interface 1001 separating CMMSegment7 37 into two parts. In a further example, referring to the arrangement of FIG. 90B but without the Arm Interface 1001, a 7-axis Robot CMM Arm 1 is provided without Arm Interface 1001 and has the same Technical effect as a 6-axis Robot CMM Arm 1 with Hybrid 0/1-axis Probe End Module 1000. The scope of this invention includes all arrangements whether they comprise a complete Robot CMM Arm 1 or a Robot CMM Arm 1 with a Probe End Module 1000 attached at Arm Interface 1001.

Internal Actuation and Support of Multiple Axes

The concept of an Exoskeleton supporting and driving an Internal CMM Arm has increasing accuracy advantage with increasing distances from the Probe End. For example, increasing Exoskeleton support from the elbow to the start of the wrist has more accuracy advantage than increasing Exoskeleton support from the start of the Wrist to the end of the Wrist. In partial Exoskeleton embodiments that are not full-Exoskeletons, the partial Exoskeleton will extend from the Base end towards the Probe End and at some transition point the Internal CMM Arm becomes self-supporting for one or more joints and segments. The Wrist can be designed to be self-supporting and driven. This Robot CMM Arm invention is not limited to embodiments of 1-axis of self-supporting rotation. For example, 2-axes of self-supporting rotation can be provided on Robot CMM Arms 1 with 4-axes or 5-axes of exoskeleton support and 3-axes of self-supporting rotation can be provided on Robot CMM Arms 1 with 4-axes of exoskeleton support. Each axis of self-supporting rotation can be either internally actuated or externally actuated. It is preferred that an Exoskeleton provides both support and drive through each Transmission Means. However, this invention is not limited to embodiments in which all Transmission Means provide both support and drive and the scope of this invention includes embodiments in which one or more Transmission Means provide just support and/or in which one or more Transmission Means provide just drive. Where a Transmission Means provides just support to the Internal CMM Arm, drive may be provided by means of internal actuation. Where a Transmission Means provides just drive, support may be provided by means of Internal CMM Arm self-support. Where there is a Probe End Module 1000, it may contain any number of axes or rotation. The Arm Interface 1001 can be situated in any segment from the Base end to the Probe End.

Impact Protection

The Robot CMM Arm 1 is portable. It is expected that it will suffer impacts during operation, mounting, dismounting and transport. Protruding aspects of the shape of the Robot CMM Arm 1 have bump pads made of plastic attached to them to absorb knocks. During operation, the axis following errors are monitored to minimise damage from impact by stopping motion on impact. The Robot CMM Arm 1 is first moved by the control PCB 172 to a specially designated spatial layout for transport before being powered down during which the brakes 177 actuate. The specially designated spatial layout for transport is a spatial layout in which the arm is as compact in dimension as possible, permitting the minimum size of rigid case. Referring again to FIG. 21C, a spatial layout where the orthogonal joints permit a parallel orientation of the neighbouring segments is useful for minimising the size of the rigid case. During handling, the brakes 177 on the motors 176 are active; this makes the Robot CMM Arm 1 a rigid device; this makes it easy to handle the Robot CMM Arm 1 since parts of the Robot CMM Arm 1 do not rotate whilst handling.

Assembly Processes

It is a purpose of this invention to provide processes for assembling the Robot CMM Arm 1. There are productivity advantages based on the minimum steps for maximum quality from first assembling, calibrating and testing the Internal CMM Arm 5 before fitting the Exoskeleton 6. There are also service advantages from being easily and quickly able to remove the Exoskeleton 6 from the Internal CMM Arm 5.

In the first step of a preferred 'sock' process for the assembly of the Robot CMM Arm 1, the Internal CMM Arm 5 and the Exoskeleton 6 are each assembled to a significant degree whilst separate from each other. In a second step, the Exoskeleton 6 is passed over the Internal CMM Arm 5 from probe end to base end like a sock. This assembly process effectively requires the Internal CMM Arm 5 to be designed like a cone and for the Exoskeleton 6 to be designed with a hollow cone inside it. Transmission Means 10 may be positioned before or after the Exoskeleton 6 is passed over the Internal CMM arm 5.

In the first step of an 'insert' process for the assembly of the Robot CMM Arm 1, the Internal CMM Arm 5 and the Exoskeleton 6 are each assembled to a significant degree whilst separate. In a second step, the Exoskeleton 6 is opened. In a third step the Internal CMM Arm 5 is inserted into the open Exoskeleton 6. In a fourth step the Exoskeleton 6 is closed onto the Internal CMM Arm 5.

In the first step of a 'clad' process for the assembly of the Robot CMM Arm 1, the Internal CMM Arm 5 and the Exoskeleton 6 are each assembled to a significant degree whilst separated. In a second step, the Exoskeleton 6 is clad around the Internal CMM Arm 5. Both the insert and clad processes require items such as Exoskeleton bearings to split open. Such a design has several disadvantages in terms of increased component count and complexity.

In the first step of a 'built around' process for the assembly of the Robot CMM Arm 1, the Internal CMM Arm 5 is assembled to a significant degree. In a second step, components or subassemblies of the Exoskeleton 6 are assembled around the Internal CMM Arm 5, one after another. In the first step of a 'built over' process for the assembly of the Robot CMM Arm 1, the Internal CMM Arm 5 is assembled to a significant degree. In a second step, components or subassemblies of the Exoskeleton 6 are passed over the Internal CMM Arm 5, one after another. These built processes provide poor serviceability for the Robot CMM Arm because the Exoskeleton 6 must be disassembled to allow access to the Internal CMM Arm 5.

The scope of this invention is not limited to the assembly processes disclosed, but extends to any process, manual or automated, for assembling a Robot CMM Arm 1 or for disassembling it. It will be appreciated by a person skilled in the field that there are many other steps in the complete manufacturing and assembly schedule for a Robot CMM Arm 1 and that these processes precede, interleave and succeed the assembly process steps disclosed here.

Probes and Tools

Mounting

The Robot CMM Arm 1 has a base end 2 and a probe end 3. It can comprise one or more measuring probes 90 or tools 98 preferably mounted at its probe end 3 after CMM Joint7 57. A measuring probe 90 can be manually removed or automatically removed. Automatic removal is preferably by means of a probe change system such as a rack with locations for two or more probes 90 and an accurate mounting mechanism for repeatably releasing a probe 90 and locking a probe 90. The Robot CMM Arm 1 can have one or more accurate mounting mechanisms.

Referring now to FIG. 23, in this first embodiment, probe mounting means 240 are provided at the probe end 3 of the Robot CMM Arm 1 invention after CMM Joint7 57 for attaching up to two probes 90 employing two of three probe mounting means 240: first probe mounting means 244, second probe mounting means 247 and third probe mounting means 251. The first probe mounting means 244 comprises a M8×1.5 female thread 241 from a first mounting face 242 and an electrical contact means 243. The second probe mounting means 247 comprises a M20 male thread 245 from a second mounting face 246. The third probe mounting means 251 comprises a M30 female thread 248 and a third mounting face 250 with three precision grooves 249 at 120 degree intervals; a recessed probe connector 255 is situated in third mounting face 250. An additional recessed probe connector 258 is situated on CMM Segment8 38 for connecting a probe 90 when the recessed probe connector 255 cannot be used; connectors 255 and 258 are mechanically and electrically identical.

Referring now to FIG. 24, a Renishaw TP20 probe body 93 is mounted on CMM Segment8 38 using first probe mounting means 244 by screwing it into thread 241 until it meets first mounting face 242; electrical contact is made between the Renishaw TP20 probe body 93 and the electrical contact means 243. A Renishaw TP20 probe module 94 is mounted on the Renishaw TP20 probe body 93 using the magnetic kinematic mount.

Referring now to FIG. 25, a solid contact probe 95 is mounted on CMM Segment8 38 using second probe mounting means 247 by screwing it onto thread 245 until it meets second mounting face 246. To mount the solid contact probe 95, it is not necessary to remove the Renishaw TP20 probe body 93, but it is necessary to first lift off the Renishaw TP20 probe module 94 at the magnetic kinematic mount. This means that it is not necessary to recalibrate the Robot CMM Arm 1 with the Renishaw TP20 probe body 93 on each removal of the solid contact probe 95. An Optical probe 91 mounted on a bracket 253 with three cylinders 252 located at 120 degree intervals is mounted on third probe mounting means 251 after passing it over solid contact probe 95 over which bracket 253 has clearance by means of a larger internal diameter than the solid contact probe 95 external diameter. This means that the Optical probe 91 can be removed without first removing the solid contact probe 95 and has the advantage that it is not necessary to recalibrate the Robot CMM Arm 1 with the solid contact probe 95 on each removal of the Optical probe 91. In a similar way, the solid contact probe 95 or the Renishaw TP20 probe body 93 can be removed without realigning the Optical probe 91. The Optical Probe 91 has a centre of gravity 96 that is offset by distance 'd' from the axis of CMM Segment8 38. An example of an Optical probe 91 is a ModelMaker X70 from 3D Scanners (UK). Referring now to FIG. 26, the bracket 253 has a bracket connector 256 with a cable 257 connecting the bracket connector 256 and the Optical probe 91. The three cylinders 252 of bracket 253 locate in precision grooves 249 and are held in place by nut 254 which screws onto thread 248. Bracket connector 256 automatically locates into recessed probe connector 255 as the cylinders 252 of bracket 253 locate in precision grooves 249 and is held in place by the nut 254. The location of the bracket 253 and hence the Optical probe 91 is repeatable in position and orientation relative to CMM Segment8 38 to an accuracy of the order of 0.025 to 0.05 mm (+/−2 Sigma). The bracket can be positioned in three different orientations at 120 degrees intervals, but only one preferred position makes an automatic connection with the recessed probe connector 255. In a further embodiment, two or more sets of three precision grooves 249 are provided in face 250. This means that with two sets of three precision grooves 249, the bracket 253 can be oriented in six different orientations at 60 degrees intervals.

In this first embodiment, each probe's 90 centre of gravity preferably lies approximately on the axis of CMM Segment8 38 to minimise the effort to rotate the CMM Joint7 57 and to minimise any bending moments on CMM Joint7 57, but the probe centre of gravity 96 can also be offset from the axis of CMM Joint7 57 such that this first embodiment is fully operable up to a maximum permissible torque caused by an offset probe oriented at its worst position relative to the gravitational force.

In an alternative embodiment, a probe 90 may be mounted to any segment of the Robot CMM Arm 1 including the base end segment, the probe end segment and any segment in-between; one or more additional joints are provided between the mounting to a segment of the Robot CMM Arm and the probe.

In a further embodiment, an actuated kinematic mount such as the Autojoint from Renishaw is provided for automatic probe change. In a further embodiment, a side mounting means is provided for attaching a further probe offset to the side of the axis of the probe end. It will be appreciated to someone skilled in the field that any design of probe mounting means and any combination of probe mounting means in any feasible locations can be provided in alternative embodiments.

Multiple Probe Use

In a measurement application it is often useful to have two probes 90 mounted on the Robot CMM Arm 1 for dual use either for use simultaneously or for use one at a time. This invention is not limited to one or two probes mounted on the Robot CMM Arm but can include a plurality of probes.

An example of dual probe use is when both a contact probe 95 and an Optical probe 91 are mounted on the Robot CMM Arm 1 for 3D scanning a tool of an automotive part in the car body coordinate system. The contact probe 95 is useful for referencing the object to be measured using reference artifacts such as tooling balls or cones in known positions/orientations relative to the car body coordinate system. The Optical probe 91 collects data on the surface of the object 9.

In this first embodiment of the Robot CMM Arm invention, provision is made for multiple probe use of the Robot CMM Arm in which a plurality of probes are attached to the probe end of the Robot CMM Arm and can be used alternately to perform their functions without needing to attach or detach a probe. This means that time is saved in the automated measuring cycle and neither the expense and probable inconvenience of a probe changing system, nor the need for manual intervention is required. In a further embodiment, a plurality of mounted probes 90 can be used simultaneously to perform their functions. In a further embodiment, a combination of at least two of a plurality of mounted probes can be used simultaneously to perform their functions.

Probe Types

There are many contact measuring probe types for dimensional measurement that can be mounted to the Robot CMM Arm including but not limited to:
- solid touch contact probes 95;
- touch trigger contact probes with at least one switch that emit an electrical signal on contact with an object such as the Renishaw TP6 and the Renishaw TP20;
- force sensing probes with at least one strain gauge such as the Renishaw TP200;
- electrical contact probe in which a circuit is made on contact of the probe with an object that is conductive, the object and the Robot CMM Arm being connected by a cable;

such solid, touch, electrical contact and force contact measuring probes having tips of varied shapes such as spherical, point, flat or custom shapes. An example of a custom shape is a contact measuring probe with a V shaped groove used for measuring bent tube. A further example of a custom shape is a contact measuring probe with two orthogonal curved surfaces for measuring the edge of sheet metal.
- wall thickness measuring probes such as ultrasound;
- contact measuring probes to measure other dimensional quantities such as coating thickness There are many non-contact measuring probe types for dimensional measurement that can be mounted to the Robot CMM Arm including but not limited to:
- point trigger probes
- point distance measurement probes
- stripe probes of all types
- area probes of all types
- wall thickness probes such as ultrasound that send signals through an air, gas or liquid layer situated between the probe end of the Robot CMM Arm and the surface of the pipe Non-contact optical probes can use monochromatic light or white light. In the case of monochromatic light from a laser, the power of the laser is preferably low such that it is eye-safe and an operator does not have to wear laser safety goggles or the robot's work-area requires safety guarding.

There are many contact and non-contact measuring probe types for non-dimensional quantity measurement that can be mounted to the Robot CMM Arm including but not limited to:
- temperature;
- surface roughness;
- colour;
- vibration;
- hardness;
- pressure;
- density;
- flaw, inclusion detection in welds, bonds.

Tools

There are many tools 98 that can be mounted on the Robot CMM Arm 1 including but not limited to:
- marking out with a marking out device such as a pen or bubble jet printer head; the location of the markings to be placed on the object being marked out are determined in a preparatory process using 3D software such as a CAD system; the locations are determined employing a model of the object that is either a CAD design model of the object from which the object was made, or a reverse engineered model of the actual object, or a reverse engineered model of another similar object; the operator of the 3D software uses 3D software tools to digitally define the location of the required markings; alternatively, the location of the required markings can be measured from another similar object in an interactive data acquisition process; in assembly processes of mating parts such as those in the aerospace industry, the location of the required markings such as the centres of drilled holes may be measured from a male part and then marked onto a female part or measured from a female part and then marked onto a male part; the 3D software generates a path program for the Robot CMM Arm 1 on which a marking out device is mounted; as the path program is automatically executed on the Robot CMM Arm 1, the marking out device marks the object in the desired locations; the Robot CMM Arm 1 has high utility for marking out because it can mark out more accurately than an industrial robot and has more flexibility than a conventional CMM; furthermore, using a Robot CMM Arm 1 for marking out can eliminate the need for marking out fixtures
- painting with a paint applying device such as an airbrush, bubble jet printer head assembly including a colour bubble jet printer head assembly
- cutting, grinding, drilling, hammering, bonding, welding, milling
- placement of stickers The tools 98 can be static or can be power tools with a translation or rotation element and for which power is provided along the arm.

Probe Mass

Contact probes typically weigh 50-200 g. Optical probes typically weigh 100-2000 g. A combination of probes could weigh in excess of 3 kg.

Probe Architecture and Identity

Figure 27A:
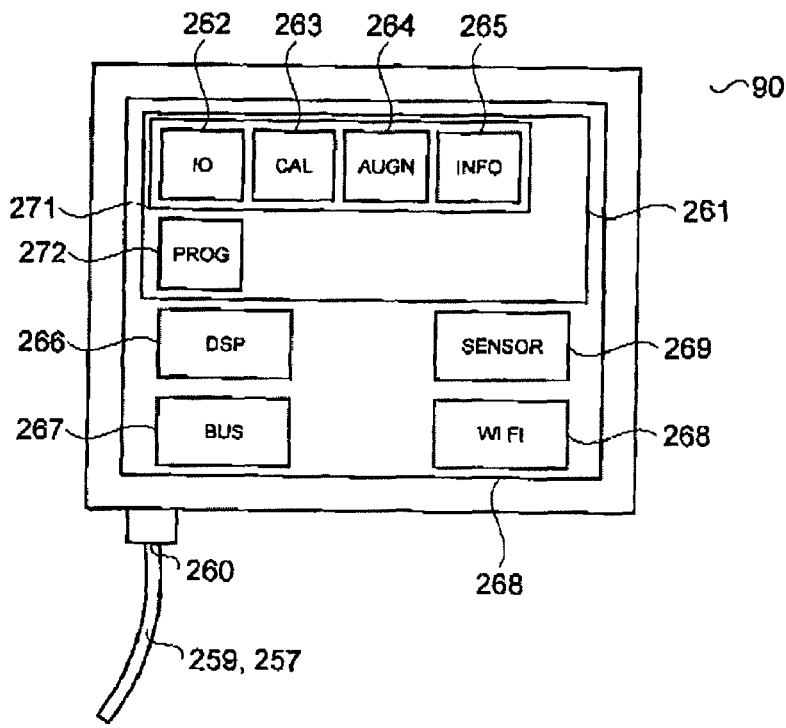
FIG. 27A is a diagram of the architecture of the probe.

Probes 90 vary considerably in complexity and power. Architecture for an Optical probe 91 that is provided to mount on this Robot CMM Arm 1 invention is disclosed. Referring now to FIG. 27A, an Optical probe 91 has a probe connector 260 for a probe cable 259 or a bracket cable 257. A probe PCB 270 is provided with probe static memory 261, a probe processor 266, a probe bus controller 267, a probe wireless unit 268 and a probe sensing device 269. Resident in the probe static memory 261 is a Probe Program 272 and a probe identity 271 comprising: a Probe identity number 262, Probe Calibration data 263, Probe Alignment data 264 and Probe information 265. Probe calibration data 263 is data related to calibration of a probe 91 for measurement irrespective of what the probe 91 is mounted on. Probe Alignment data 264 is data related to the alignment of the probe 91 with the Robot CMM Arm 1. Probe information 265 can include but is not limited to: probe type, probe weight, probe centre of gravity position and moments of inertia relative to the mounting reference point, last calibration date, manufacturing date, manufacturer, accuracy and serial number. This first embodiment provides for any probe 90 to have a probe identity 271 stored inside it. The probe identity 271 can be read after the probe 90 has been mounted onto the Robot CMM Arm 1. It can be read along a wired connection or by means of a wireless connection. This means that, each time the probe 90 is calibrated, the probe calibration data 263 stays with the probe 90 and the chances of it being lost or incorrectly replaced with older probe calibration data 263 in an organisation's IT system are reduced. The probe program 272 can be automatically updated from the laptop 151 or even remotely over the Internet or intranet via the laptop 151 or the probe wireless unit 268. This first embodiment further provides that simple probes 90 that do not have a digital identity stored in them can also be used. The probe digital identity is not limited to being stored in probe static memory 261; it can be stored in any form of digital memory with a life in excess of the probe 90 design life without electrical power. There is processing of raw data from the probe sensor 269 by the probe processor 266 and further processing by the laptop 151. In some probe architectures, the probe processor 266 does most or all of the processing. In other probe architectures, most or all of the processing is done by the laptop 151.

Probe Connections and Probe Cables

Figure 27B:
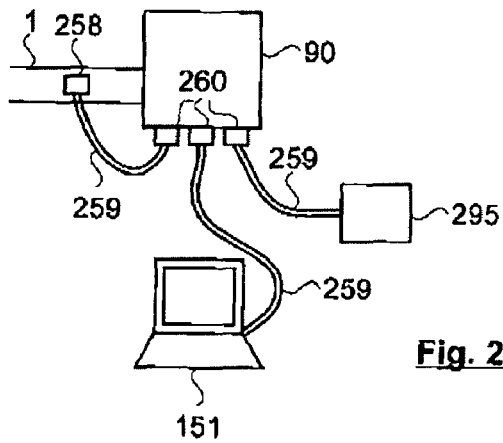
FIG. 27B is a schematic diagram of a probe connected to three cables and a probe box.
Figure 27C:
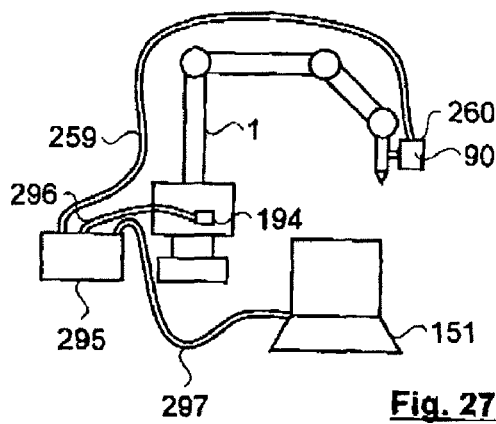
FIG. 27C is a layout of a probe with one cable to a probe box running exterior to the Robot CMM Arm.
Figure 27D:
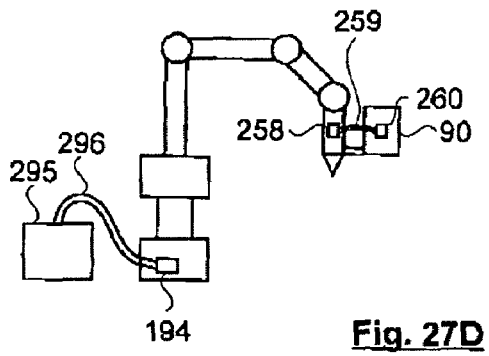
FIG. 27D is a layout of a probe with a probe box connected through the Robot CMM Arm.

Most probes available on the market and particularly Optical probes 91 have proprietary connections, but custom Optical probes 91 are often developed to interface onto localisers. The first Probe Mounting Means 244 provides a Renishaw M8×1.5 mm threaded hole with automatic electrical contact for a wide range of Renishaw probes. The second probe mounting means 247 provides a standard thread, but no electrical contact. The third probe mounting means 251 provides a proprietary mechanical mounting and automatic electrical connection arrangement through recessed probe connector 255, which can only be used with permission of the owners of the intellectual property for the design of the third probe mounting means 251. Manual connection of a probe can be made by plugging a short probe cable 259 into additional recessed probe connector 258 situated on CMM Segment8 38. In a not preferred embodiment, a probe cable 259 can be run down the exterior of the Robot CMM Arm 1 and connected into the interface port 194 at the base 4 of the Robot CMM Arm 1. Those skilled in the field will know that cabling is invariably a problem with articulated arm robots and that running a cable from the probe end of the Robot CMM Arm where no provision has been made for proper routing around the joint is undesirable. The connector and connections of interface port 194 are preferably the same as for recessed probe connector 255 and additional recessed probe connector 258. Probe electrical connection means 243, 255, 258 and 194 provide one or more of the following: power, ground, trigger and data. Referring now to FIG. 27B, in a further embodiment, three probe connectors 260 are provided on the probe 90; three probe cables 259 connect the probe 90 to: the Robot CMM Arm 1 via probe electrical connection means 258; the laptop 151 and a probe control box 295. The probe control box 295 is required where it is necessary to minimise the size and weight of the probe 90 and it is practical to remove items from the probe 90 to a separate probe control box 295. Referring now to FIG. 27C, in a further embodiment, a probe cable 259 connects to the probe connector 260 on the probe 90 and is run along the outside of the Robot CMM Arm 1 to the probe control box 295. A probe box to laptop cable 297 connects the probe control box 295 to the laptop 151. A probe box to arm cable 296 connects the probe control box 295 to the interface connector 194 on the Robot CMM Arm 1. Referring now to FIG. 27D, a preferred embodiment for interfacing a probe control box 295 to the Robot CMM Arm 1. A probe cable 259 connects to the probe connector 260 on the probe 90 and to the recessed probe connector 258 on the Robot CMM Arm 1. A probe box to arm cable 296 connects the probe control box 295 to the interface connector 194 on the Robot CMM Arm 1. The scope of this invention is not limited by the probe electrical connections and cables disclosed, but includes all types of probe wired and wireless connections. For instance, a probe 90 can send data directly to the laptop 151 by means of a wireless communication such as IEEE 802.11b (WiFi).

Probe Specification and Performance

Figure 28:
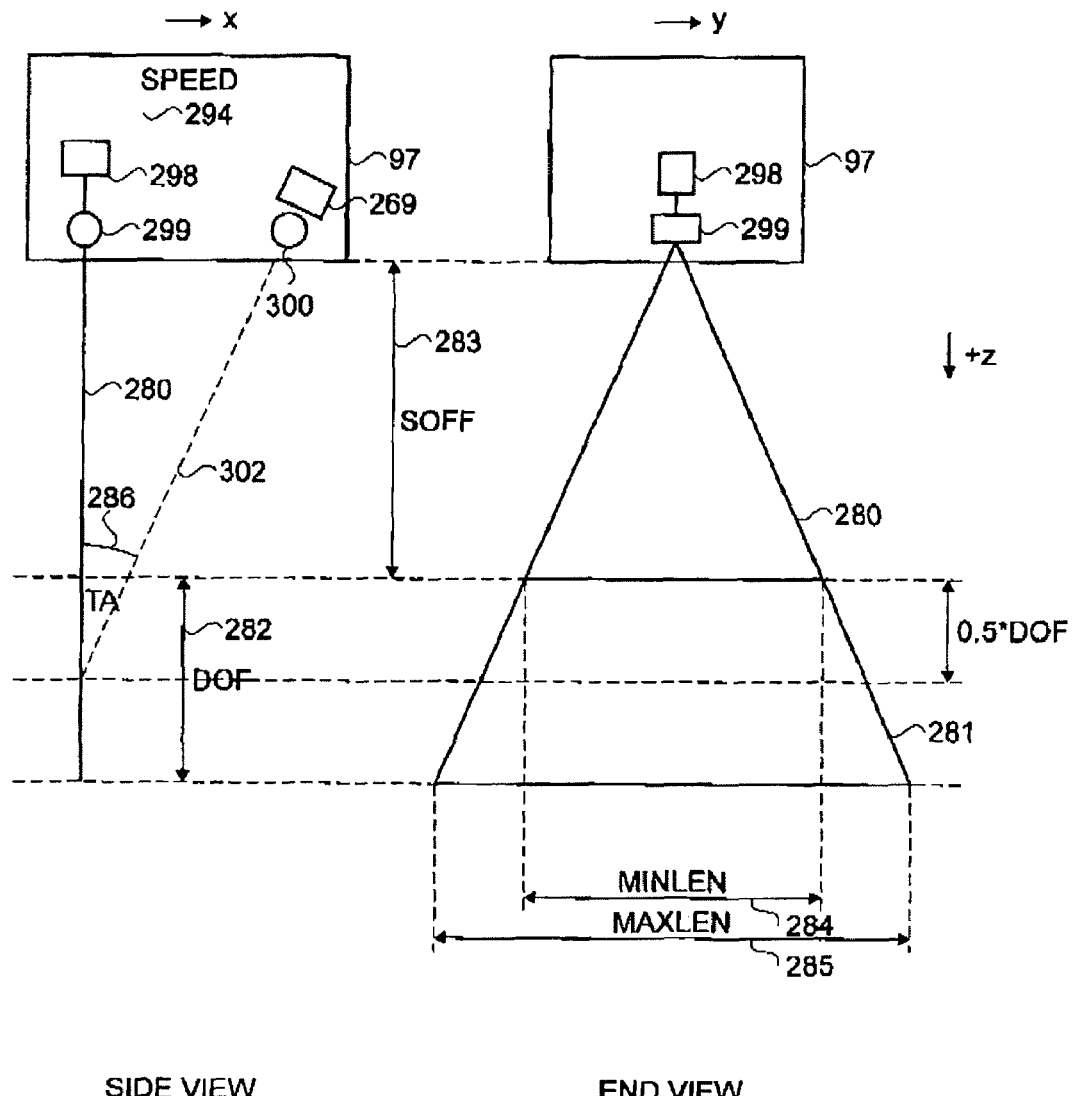
FIG. 28 is a two view schematic diagram of the principle of a stripe probe.

The specification and performance of the probe 90 to a large extent determines how the Robot CMM Arm 1 conveys the probe 90 in a measuring task. As previously disclosed, there are many general types of probe 90 that can be used in this Robot CMM Arm invention and for each general type, there are a wide range of designs. A preferable optical probe 91 mounted on a Robot CMM Arm 1 is a Stripe probe 97. Referring now to FIG. 28, a Stripe probe 97 contains a laser light source 298 and a plane generating optic 299 that projects laser light 280 fanned out to either side of the direction +Z, approximately represented by a triangular segment of a plane. Measuring takes place within a polygonal segment 281 constructed from a minimum stripe length 284 closer to the Stripe probe 97 and a maximum stripe length 285 further from the Stripe probe 97. The distance between the minimum stripe length 284 and the maximum stripe length 285 is the depth of field 282. The standoff distance 283 is the distance from the Stripe probe 97 to the middle of the polygonal segment 281. A sensing device 269 in the Stripe probe 97 collects the laser light 280 via a lens 300 in a view 302 at a standoff triangulation angle 286 and with a scanning rate 294 in stripes captured per second. Referring now to FIG. 29, a Stripe probe 97 mounted on a Robot CMM Arm 1 scans an object 9 by moving relative to it in direction X at surface speed 293 in mm/second. A stripe 287 is formed on the surface of the object 9 by the projected laser light 280. Measurements are made along the stripe 287, providing it lies within the polygonal segment 281. Referring now to FIG. 30, the stripe 287 on the object 9, is divided into a sequence of N small areas 288 in the Y direction that correspond to individual 3D measurements output by the probe. The average point separation 289 between neighbouring small areas 288 along the stripe 287 is distance DY. Referring now to FIG. 31, a series of stripes 287 in the direction X on an object 9 are captured. The average stripe separation 290 is distance DX. The series of stripes 287 form a scanned patch 291. Referring now to FIG. 32, an object 9 is scanned in a series of overlapping scanned patches 291 with a nominal overlap distance 292. Referring now to FIG. 33A, a two-view stripe probe 301 comprises two sensing devices 269 and lenses 300 with two opposing views 302 and 303. Referring now to FIG. 33B, the two-view stripe probe 301 views an object 9 with a step 304. First view 302 has a clear path to the stripe 287 where laser stripe 280 illuminates the object 9. Second view 303 has a path to the stripe 287 that is occluded by the step 304 in the object 9 and cannot see image the stripe 287 in this location. Referring now to FIG. 34A, a two-stripe probe 308 comprises a central sensing device 269 and lens 300 with a view 302, two laser light sources 298 and plane generating optics 299 that projects a first laser light plane 305 and a second laser light plane 306 crossing at line 307. Referring now to FIG. 34B, the two-stripe probe 308 views an object 9 with a step 304. First laser light plane 305 illuminates the face of the step 304 of the object 9 forming stripe 287 and view 302 has a path to the stripe 287.

The following parameters of the probe affect at least the programmed movement of the Robot CMM Arm 1 and are disclosed in more detail:

stripe length: a stripe probe 97 is usually specified by maximum stripe length 285; in practice, the actual stripe length will vary depending on the distance from the stripe probe 97 to the object 9; for a flat object 9 of height 500 mm, with a maximum stripe length of 75 mm from the probe 97 and an overlap of up to 25 mm, the object can be scanned in ten patches with a 50 mm increment between each patch; the longer the stripe length, the smaller the number of patches required; stripe lengths typically vary from 10 mm to 200 mm but can be more or less; stripe lengths overlaps typically vary from 5% to 50% of the stripe length depending mainly on the shape of the object 9 but can be more or less average point separation: a stripe is actually output as a discrete series of 3D points; a typical number of points in a stripe N is currently of the order of 750, although this is expected to increase in the future; if a stripe length is 75 mm, then the average point separation along the stripe is 0.1 mm; objects 9 with detailed features can require scanning with a smaller average point separation of 0.01-0.05 mm or less; large objects 9 with few features can require scanning with an higher average point separation of 0.25-1 mm or more scanning rate (stripes/second): typical current scanning rates 294 are from 25 to 60 stripes per second; scanning rates are expected to increase in the future; there are a variety of possible scanning rates:

constant scanning rate: the time between any two stripes is always the same; this is common for a sensing device 269 that is a video sensor two alternative constant scanning rates: this is common for a sensing device 269 that is an interlaced video sensor; CCIR rates of 25 or 50 stripes per second are common; NTSC rates of 30 or 60 stripes per second are common; the higher scanning rate produces lower resolution data; the operator can select which scanning rate to use at a time any constant scanning rate up to a maximum scanning rate: the operator sets the rate he wants triggered variable rate: the time between stripes can vary; another event can trigger the stripe probe 97 processing variable rate: the time between stripes can vary; the processing time of each stripe can vary; the next stripe is not captured until the previous stripe has been processed surface speed: there are a variety of possible surface speeds:

constant surface speed: stripe probe 97 moved over object 9 at a constant surface speed 293; the stripe probe 97 can be at a constant orientation or a changing orientation; the stripe probe 97 is moving relative to the object whilst measuring takes place variable surface speed: the surface speed 293 varies during scanning; there can be many methods for varying surface speed; for instance if a surface is featured in some areas and smooth in other areas, then it is often desirable to scan featured areas more slowly stepwise: the stripe probe 97 is moved from position to position by the Robot CMM Arm 1; at each position the stripe probe 97 is static whilst measuring takes place;

stepwise scanning is used to achieve the highest accuracy measuring; in the case of a moving object 9, the stripe probe 97 is in a constant position relative to the object 9 whilst measuring takes place average stripe separation: if the Robot CMM Arm is moving in a direction orthogonal to the stripe at a surface speed 293 of 30 mm/second, then at a scanning rate of 60 stripes/sec, the average stripe separation 290 will be 0.5 mm; objects 9 with detailed features can require scanning with a smaller average stripe separation of 0.05 mm or less; in this case, the speed of the Robot CMM Arm must be reduced to 3 nm/second; large objects 9 with few features can require scanning with an higher average stripe separation of 1 mm or more evenness of stripe separation: Robot CMM Arms can scan at a constant surface speed; operators of Manual CMM Arms cannot scan at a precise and constant surface speed; this means that a Robot CMM Arm can provide a more even stripe separation than a Manual CMM Arm;

uniform 3D point density: this is desirable in some applications; Robot CMM Arms can achieve uniform 3D point density by setting a surface speed such that the average stripe separation is equal to the average point separation; uniform 3D point density can also be achieved by sampling points along the stripe to increase the average point separation depth of field: 3D points can be measured over a depth of field 282 that is typically between 50 and 200 mm deep; in general, the larger the depth of field, the worse the Root Mean Square (RMS) Z noise of the 3D points from the stripe probe 97; current stripe probes have a RMS of around 1/10,000 of the depth of field; for example a stripe probe 97 with 70 mm maximum stripe length and 100 mm depth of field has an RMS of 10 microns in the Z direction access: some objects 9 such as gearbox casings provide limited access to a probe 90 on the Robot CMM Arm 1 for scanning features inside the object; access can often be achieved by passing the probe 90 through a narrow penetration in the housing; in this case, the probe 90 must be as small as possible and may be mounted on an extension such as a tube from the probe end 3 of the Robot CMM Arm 1; in addition, the probe 90 may be oriented at an angle such as 45 degs or 90 degs from the direction of the extension; the ability to configure the probe 90 at an angled orientation provides the capability for scanning a larger amount of the surface of the object 9 standoff: the standoff 283 is typically between 75 and 300 mm; ideally, the standoff should be large to (a) reduce the risk of collisions between the Robot CMM Arm 1 and the object 9 and (b) maximise penetration into deep regions such as slots; as the standoff increases, so does the virtual reach 81 of the Robot CMM Arm; as the virtual reach 81 of the Robot CMM Arm increases, the accuracy of the Robot CMM Arm and the accuracy of the probe 91 both decrease; in some applications with poor access where the sensor has an enforced and small maximum distance from the surface dictated by the design of the object 9, a small standoff can be desirable; in other applications with poor access where the sensor has an enforced and large minimum distance from the surface dictated by the design of the object 9, a large standoff can be desirable; the selection of standoff is thus a compromise between accuracy and application occlusion: a two-view stripe probe 301 mounted on a Robot CM Arm 1 has the advantage over a stripe probe 97 with one view of capturing more data from stripes 287 on an object 9 that has steps or similar features causing occlusions; there are more cases for the stripe probe 97 than for the two-view stripe probe 301 in which an area has to be re-scanned in a different orientation to reach surface areas of the object 9 that were occluded in the first patch captured; this means that the total measurement time is reduced for the two-view stripe probe; however, the two-view stripe probe 301 is more bulky and heavier than the stripe probe 97. A preferred two-stripe laser probe 308 mounted on a Robot CMM Arm 1 has the advantage over a stripe probe 97 or a two-view probe 301 in that it can capture data on a vertical step wall 304. It will be understood by a person skilled in the art, that stripe probes with three or more stripes oriented at angles not orthogonal to the scanning direction, can capture data all the way around the internal wall of a cylindrical bore in one linear scanning pass. Such stripe probes will have two or more cameras to increase the viewpoints. Stripe probes with multiple stripes and cameras have the advantage of being able to gather more comprehensive data on vertical walls in one scanning pass, whereas stripe probes with just one stripe and one camera can require the Robot CMM to pass the same feature two or more times to complete the scan automation: the Robot CMM Arm is automated and can scan continuously for more than 24 hours; by comparison, the operator of a Manual CMM Arm gets tired; this means that the Robot CMM Arm can scan more and better quality data from an object 9 than a Manual CMM Arm used by an operator The laser source 298 is a laser diode of 30 mW power of approximately 660 nm wavelength as can be purchased from a variety of suppliers including Toshiba Japan. The optics 300 is a Light Pen from Rodenstock, Germany. The sensor 269 is a CCD NTSC video sensor chip as can be purchased from a variety of suppliers including Sony either as a chip or a board camera. The scope of this invention is not limited in any way to this design of optical probe but can incorporate any suitable design of optical probe. Projected light sources can include light of any type such as: white light; laser radiation that is invisible, infra-red, ultraviolet, partially visible or fully visible. Multiple projected light sources can be employed of different specific wavelengths or different wavelength bands that can be later differentiated by bandpass filters and multiple sensors 269. Projection optics 299 and imaging optics 300 can be static or dynamic. Dynamic optics includes amongst others galvanometer mirrors and rotating polygonal multi-mirrors. The projected light sources can be at constant power or the power can vary. Light projection can be always on or strobed. Sensing devices 269 include amongst others devices made of CCD and CMOS technologies. Sensing devices 269 can be analogue devices such as 1D and 2D PSD devices. Sensing devices 269 can be digital devices with pixels such as a 1D line of pixels or a 2D array of pixels. Sensing devices 269 can have different fill factors and can employ microlenses. Sensing devices 269 can have fixed or variable shutter speeds. Strobing of light projection can have the light on over all or part of the shutter open time.

Power Supply

The electric power consumption of a Robot CMM Arm disclosed in this first embodiment is typically less than 1 kW and in most cases less than 2 kW. This means that home/office mains supply of 80-240V can be used and there is no need for 3-phase supplies running at higher voltages. A standard IEC socket 195 is provided for mains power connection via cable 155. For site applications such as scanning corroded gas pipes, provision is made for Robot CMM Arm operation from 24V DC that is supplied by one or more 24V DC batteries, for example of the type used in vehicles. A 24V DC socket 195 and a 24V cable 155 that is 20$m$ long are provided. A rechargeable battery 170 is provided as a backup power supply enabling backup activities such as saving encoder positions to take place in the event of a sudden power cut, such that operation of the Robot CMM Arm can resume immediately that full mains power is restored without having to carry out initialisation procedures. The battery 170 is removable. A built-in charger for the battery 170 is provided.

In a further embodiment, the Power Supply Unit 171 has a 24V DC output and is external to the Robot CMM Arm 1; this arrangement has the advantages of (a) removing a heat source from the base of the Robot CMM Arm 1, (b) making the Robot CMM Arm 1 lighter and more portable, (c) permitting the use of a factory 24V power supply, (d) reducing the manufacturing cost of the Robot CMM Arm 1. In a further embodiment, two different 24V power supplies are used for the servo drives and the computer processing. In this way, the computer processing and sensing equipment is not affected by sudden changes in the servo drive power consumption. In particular, the processors do not lose power when the servo drives are cut off during a safety button actuation. These two power supplies are fed all the way up the bus 193 of the Robot CMM Arm 1. Alternatively, power could be supplied at 60V DC, transmitted through the arm at that voltage and stepped down locally. This means that more power can be transmitted through a slip-ring of limited current capacity and that larger motors can be used whilst retaining the advantages of the common bus and infinitely rotating slip-rings.

Robot CMM Arm Cables and PCB Positions

Internal cables 165, 166, 167, 169, 174 and 196 run along the Robot CMM Arm 1 from the control box 159 to the probe end 3 connecting the Joint PCBs 173 and motors 176. The Internal cables 165, 166, 167, 169, 174 and 196 run between the Internal CMM Arm 5 and the Exoskeleton 6. This means that all the cables are protected within the exterior surface of the Robot CMM Arm 1. The Joint PCBs 173 are situated between the Internal CMM Arm 5 and the Exoskeleton 6. Most of the devices 177-184 local to the Joint PCBs 173 are mounted on either the Internal CMM Arm 5 or the Exoskeleton 6. Each Joint PCB 173 is connected to at least one of the local devices 177-184 by wires, ribbon cables or circular-section cables that run between the Internal CMM Arm 5 and the Exoskeleton 6. The Internal cables 165, 166, 167, 174 and 196 as well as the wires connecting devices 177-184 to the Joint PCBs are of standard and robust formats, commonly used in the art. The gauge of the cables is kept to a minimum to reduce weight. The serial cable 169 is a IEEE-1394 Firewire cable. Probe box-arm cable 296 is a customised cable provided for the specific requirements of the probe box or other interface device related to the services supplied by the Robot CMM Arm 1 through interface connector 194. Laptop cable 152 is a Firewire IEEE-1394 cable from a Firewire connector 197. Network connector 199 is a 100 Mbps Ethernet connector and connects to Ethernet network 200 of standard CAT5 cabling. Pendant cable 154 is a Firewire IEEE-1394 cable from a Firewire connector 198.

Referring again to FIG. 88, Joint Memory 407 such as an EPROM can be provided at each joint for storing joint information including ID, joint calibration data, usage history, maintenance history. The Joint Memory 407 is physically mounted on the joint by means such as a PCB screwed to the joint and leaves the arm with a joint if it is replaced in a maintenance process. When a joint is installed, a cable is connected from the Joint Memory 407 to the Joint PCB 173 or Control PCB 172. A processor can be provided with the Joint Memory 407 to enable it to be read and written to remotely. With an ethernet based embodiment, the information in each Joint Memory 407 can be read and written from any other Ethernet node via the Joint PCB 173. The Joint Memory 407 and associated processor can be part of an Encoder PCB on the Joint carrying one or more Encoder Read heads 186 and a Temperature Sensor 180. The scope of this invention is neither limited to the internal cabling disclosed, nor to the PCB arrangements disclosed. Optical probes are increasing in bandwidth of output data to be transferred to the processing unit. High bandwidth serial cables are available such as those specified in IEEE-1394b Firewire B that has bandwidth of up to 3.2 GB/sec using optical signal cables but less bandwidth with electrical signal cables. Optical signal cables are largely immune to electrical noise and can carry signal for long distances without degradation. This makes them suitable for robot use in which both extended distances and cables routed close to noisy electric motors are a feature. Alternatively, all networks could be 100BaseT Ethernet and a hub or switch provided for device interconnection. As will be well understood by a person skilled in the art, the number and functionality of PCBs in the Robot CMM Arm can vary without affecting the technical effect of the present invention. For instance, instead of seven Joint PCBs 173, three Joint PCBs 173 can be provided that are located at the shoulder elbow and wrist of the Robot CMM Arm with devices such as encoders, thermocouples and drives associated with two or more Joints connected to a single Joint PCB 173.

User Interface

Laptop PC

Referring now to FIG. 35, a laptop PC 151 is preferably provided for the main user interface. An adjustable platform 310 is provided for the laptop PC 151 mounted off the base 4 of the Robot CMM Arm 1. A battery 164 in the laptop is provided for operation without mains power connection. Room on the platform is provided for a mouse 311. This invention is not limited to a laptop user interface. A full separate PC cabinet could be provided; a separate LCD screen could be connected to it. A tablet PC could be provided. A computer could be integrated in the single Robot CMM Arm 1 unit and an external display attached to it. The display could have a touch sensing capability. Where two or more Robot CMM Arms are working in a cell, a single laptop PC is preferably used to control all the Robot CMM Arms in the cell. A compact printer 312 is preferably provided connected to the laptop 151. It is used at least to print out measurement records. A place for the printer is provided on the platform 310 under the laptop 151.

Pendant

Referring now to FIG. 36, a hand-held pendant 153 is provided for local control of the Robot CMM Arm 1; it is provided with both wired 164 and wireless 324 connection to the Robot CMM Arm 1. A battery 163 in the pendant 153 is provided for operation without mains power connection. A recharging point 158 is provided on the Robot CMM Arm 1 where the pendant 153 can be left, typically overnight, for recharging; a feature of the recharging point 158 is that the connection is automatically made, the pendant is simply placed in the cradle at the correct position and orientation such that the pendant electrical contacts 327 make contact with the recharging point electrical contacts 328. The pendant 153 preferably has an 8" LCD display 322 but it could be smaller or larger; alternatively no display can be provided on the pendant. The pendant is provided with a microprocessor 323, Microsoft Windows CE operating system 326 in memory 325, pendant software 330 in memory 325 and 3D graphics chip 329. The pendant display 322 shows all the results from the use of the Robot CMM Arm 1 including real-time rendered 3D colour graphical displays of scanned data. Such real-time rendering provides help with teach programming. The pendant has a number of buttons 320 for controlling the two directions of movement of each axis. The buttons are fabricated in a membrane technology. A 3-axis joystick 321 is provided, although it can be more or less axes and there can be two or more joysticks or trackballs. The pendant 153 has two alternative modes: terminal mode in which the pendant 153 acts as a terminal for the laptop PC 151 or active mode in which the pendant 153 uses its own microprocessor 323 to run application software. In an alternative embodiment, the pendant 153 is not provided or is an option; software on the laptop is provided to carry out the user interface functionality of the pendant. Green LEDs 157 are provided on the Robot CMM Arm 1 and the pendant 153 to show that the power is switched on. All further operational information is shown on the display screens of the laptop 151 or pendant 153.

Head Mounted Control

Referring now to FIG. 37, a headset 340 is provided for the operator 11 with wired or wireless contact to the laptop 151. The headset 340 comprises a monocular display 341 of resolution of at least 800×600 pixels situated so that the operator 11 can view it with one eye. The operator 11 can still view the environment around with both eyes, although the eye that can view the monocular display 341 is somewhat obstructed. Monocular displays 341 with higher resolutions are becoming available and can be built into the headset 340. The headset 340 also comprises headphones 343 and microphone 342. The operator 11 uses a small dictionary of commands to control the Robot CMM Arm 1 by speaking into the microphone 342. Each operator 11 preferably teaches the Robot CMM Arm 1 the commands such that the voice recognition software on the laptop 151 will provide a higher rate of recognition. Voice synthesis software on the laptop 151 will voice speech to the operator 11 via headphones 343 to provide a closed loop voice-driven user interface.

Buttons

Figures 38A, 38B, 38C:
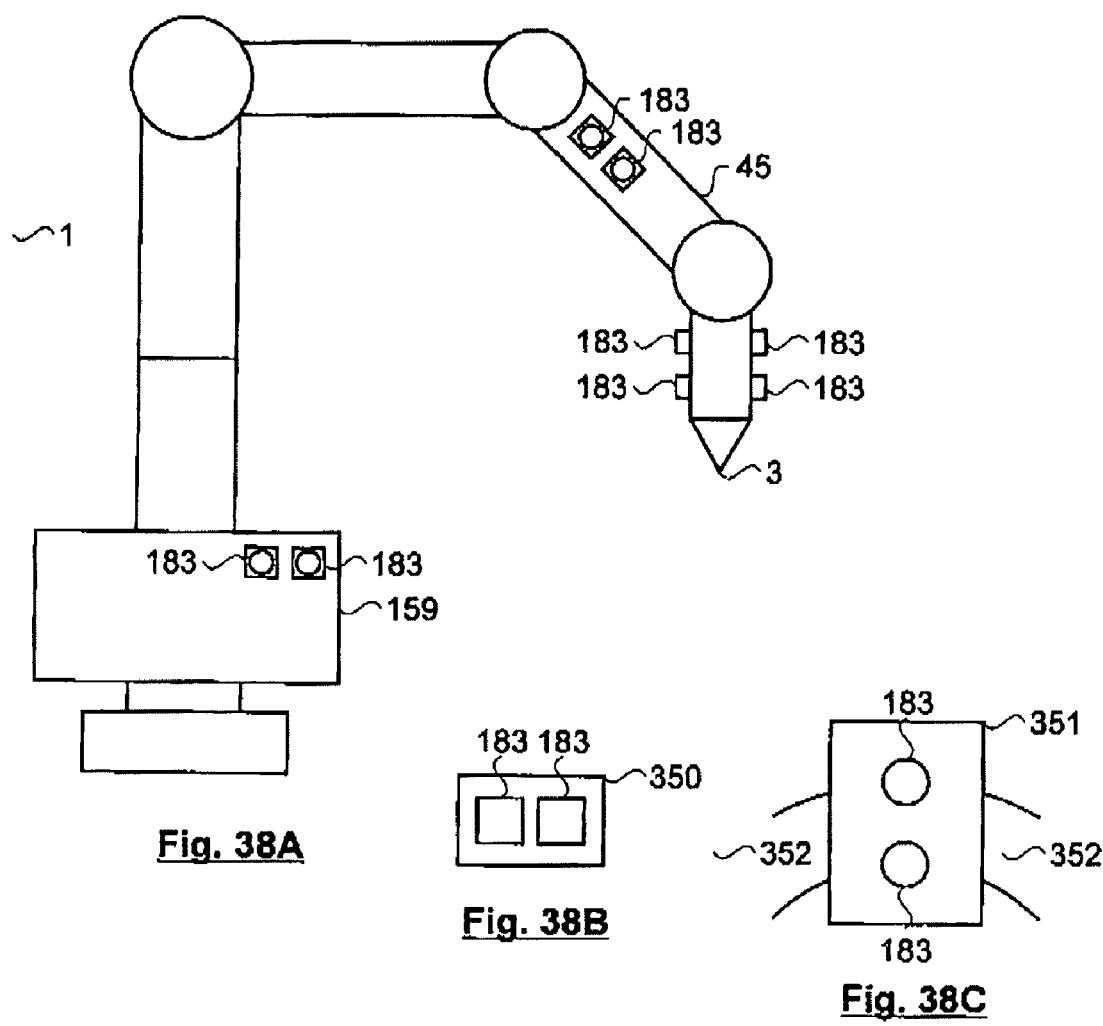
FIG. 38A is a layout of buttons on a Robot CMM Arm.
FIG. 38B is a layout of footswitches.
FIG. 38C is a layout of a remote control with strap.

Referring now to FIG. 38A, several sets of buttons 183 are fixed onto the Robot CMM Arm that operate in parallel. It is preferable that the set is a pair of buttons 183 for control. A pair of buttons 183 is situated at the probe end 3 of the Robot CMM Arm on Segment 8. The buttons are referred to as A and B, with A closest to the probe end 3. A is coloured Red and B is coloured Green. The buttons 183 are approximately 25 mm apart between centres and 11 mm diameter. The buttons 183 are recessed to reduce occurrences of accidental actuation. The buttons 183 are large diameter to suit the thumb or finger print size. The buttons 183 are used for control of the measuring of the Robot CMM Arm 1 and selection of software choices. Other pairs of buttons 183 that operate in parallel to the probe end pair are situated: at the probe end 3 on ExoskeletonSegment8 48 at the other side of ExoskeletonSegment8 48 from the first pair; on the control box 159 and between the elbow and the wrist on Exoskeleton Segment5 45. Referring now to FIG. 38B, wireless footswitches 350 are provided. Referring now to FIG. 38C, a wireless remote control 351 with buttons is provided; it is affixed to the Robot CMM Arm at the choice location of the operator 11 preferably with a strap 352; alternatively, the operator 11 can hold the remote control 351. This invention is not limited to the disclosed number of buttons 183 and their situation. The Robot CMM Arm could be operated without any buttons attached to it, using other means such as the pendant 153 or the laptop 151. Control can be achieved with a single button 183 or with 3 or more buttons in each set. A single set or multiple sets can be provided. Factors affecting the number of sets and their location include the reach of the Robot CMM Arm 1 and the application for which it is used.

Environmental Operation

The portable Robot CMM Arm 1 of this first embodiment is able to operate in temperature ranges of −10 to +50 degrees Celsius. Measuring applications such as Alaskan gas pipelines and Egyptian Tombs are envisaged where the Robot CMM Arm 1 is operating outside in conditions varying from frozen to direct sunlight. The Robot CMM Arm is weather resistant, with environmental sealing level IP62. Alternative embodiments of the Robot CMM Arm can be protected to IP64 level or even have special protection for specialist applications where the environment is harsh such as in radioactive areas. The portable Robot CMM Arm 1 can also typically operate in up to 90% humidity.

Robot CMM Arm Coordinate Systems

Referring now to FIG. 39, there is a multitude of Coordinate Systems 360 for the Robot CMM Arm system 150. These include but are not limited to:

Object coordinate system 361
  Object feature coordinate system 362
  Robot CMM Arm coordinate system 363
  Probe (or Tool) coordinate system 364
  Exoskeleton coordinate system 366

The Object coordinate system 361 can not be known unless there are datum features such as tooling balls 368 on the object 9 or any reference plate that the object 9 is mounted on that can be used to provide an Object coordinate system 361 for the object 9. The most common provision in the automotive industry is that of the car line object coordinate system 361. An object feature coordinate system 362 is provided for a feature 365. Often objects are manufactured with reference marks for an object feature coordinate system 365 that can be measured to determine the object feature coordinate system 365. In this first embodiment, the Robot CMM Arm coordinate system 363 that is also known as the Internal CMM Arm coordinate system and the Exoskeleton coordinate system 366 are identical because the Internal CMM Arm base 31 and the Exoskeleton base 41 are rigidly connected. A reference ball 367 that is 25 mm in diameter is provided in a repeatable magnetic mount 369 at the base 4. The centre of the reference ball 367 is nominated as the zero of the Robot CMM Arm coordinate system 363 and the Exoskeleton coordinate system 366. When the Exoskeleton has a different Exoskeleton base 41 from the Internal CMM Arm base 31, particularly if there is relative movement between the Exoskeleton base 41 and the Internal CMM Arm base 31, then the Exoskeleton coordinate system 366 is different from the Robot CMM Arm coordinate system 363; in this case, a second reference ball 367 is provided. As is commonly understood in the field of robotics, there is provided a different coordinate system for a probe 90 or tool 98 affixed to the probe end 3 of the Robot CMM Arm 1. It is referred to as the Robot CMM Arm probe coordinate system 364.

Control PCB

Figure 40:
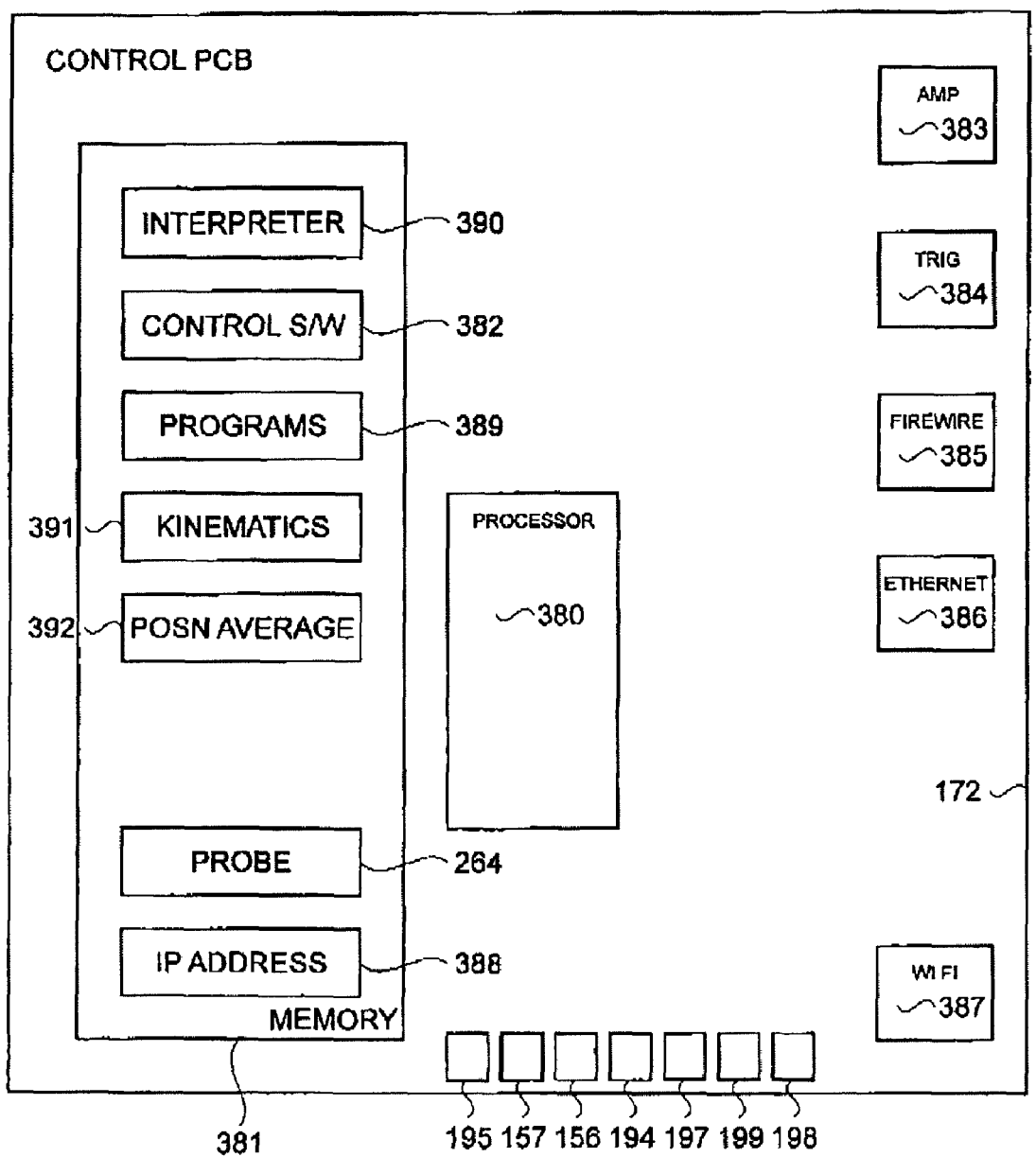
FIG. 40 is a diagram of the architecture of the Control PCB.

Referring now to FIG. 40, the Control PCB 172 controls the Robot CMM Arm 1. The external connectors, 156, 157, 194, 195, 197-199 are mounted on the Control PCB 172 and attach directly to the side of the control box 159. Interfacing to the arm is by means of amplifier analogue output circuitry 383, trigger circuitry 384, Firewire bus controller 385, Ethernet bus controller 386 and WiFi wireless unit 387. A DSP processor 380 runs control software 382 in memory 381. The control software can access kinematics software 391 and position averaging software 392 in memory 381. Programs 389 in a text format are interpreted by an interpreter 390. The Robot CMM Arm Internet Protocol (IP) address 388 is stored in memory 381. The probe alignment file 264 is stored in memory 381. The memory 381 is composed of sufficient static and dynamic memory.

Joint PCB

Figure 41A:
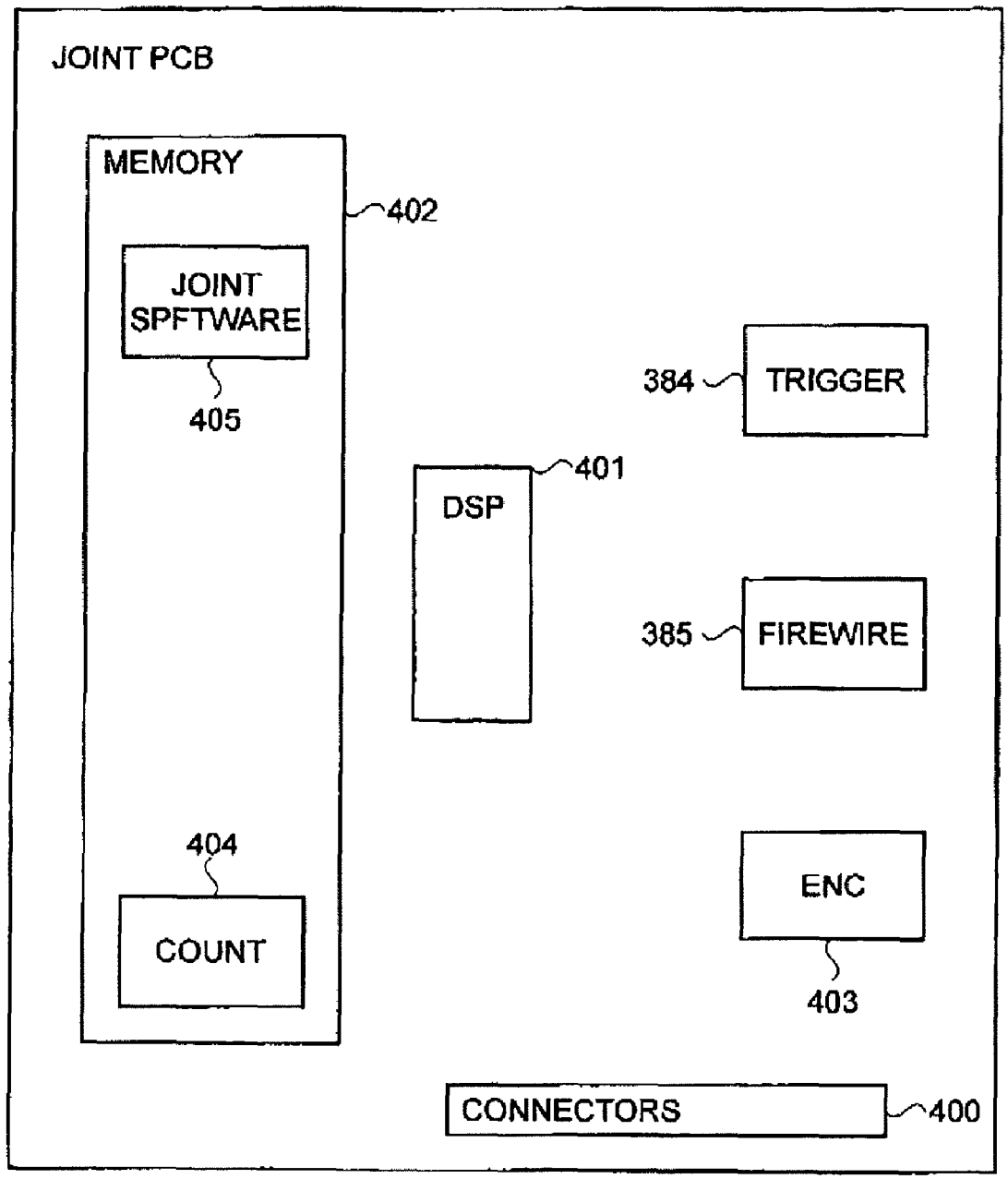
FIG. 41A is a diagram of the architecture of the Joint PCB.

Referring now to FIG. 41A and again to FIG. 11, the Joint PCB 173 has the functions of:

interconnecting a number of local devices 177-184, 90, buses 169, 174, 161, 162 and power lines 165, 166, 160 all via connectors 400 responding to trigger signals on the trigger bus 174 by latching an encoder 178 receiving data from a number of sensors 178-184, pre-processing the data, keeping the status of the data such as encoder counts and sending pre-processed data by serial bus 169 to the Control PCB 172 responding to status requests from the Control PCB 172

The Joint PCB 173 comprises a DSP processor 401, Memory 402, Joint software 405 resident in memory 402, trigger circuitry 384, Firewire bus controller 385 and encoder interfacing circuitry 403 that connects to the output of the Renishaw Interpolator 187. The count 404 of the interpolated signals from the Renishaw Interpolator is stored in the memory 402. In a simple mode of operation for determining the position of the Robot CMM Arm 1, when the encoders 178 are latched, one angular position count 402 is sent from each Joint PCB 173 to the control PCB 172 and these counts 402 are used by the Kinematics software 391 using techniques well known to an expert in the field to calculate the position of the Robot CMM Arm 1.

Position Averaging

Figure 41B:
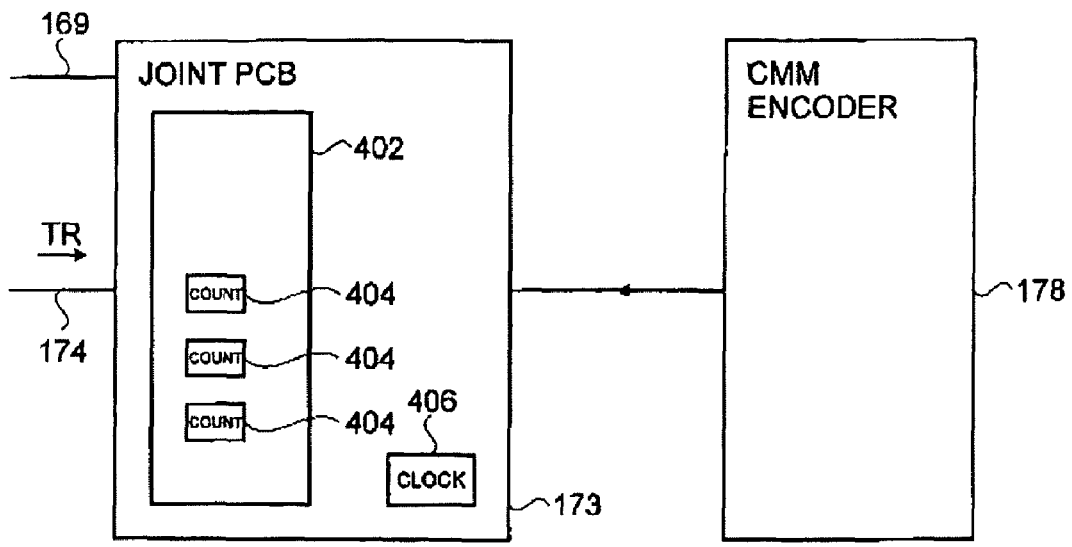
FIG. 41B is a diagram of the position averaging in the Joint PCB.
Figure 41C:
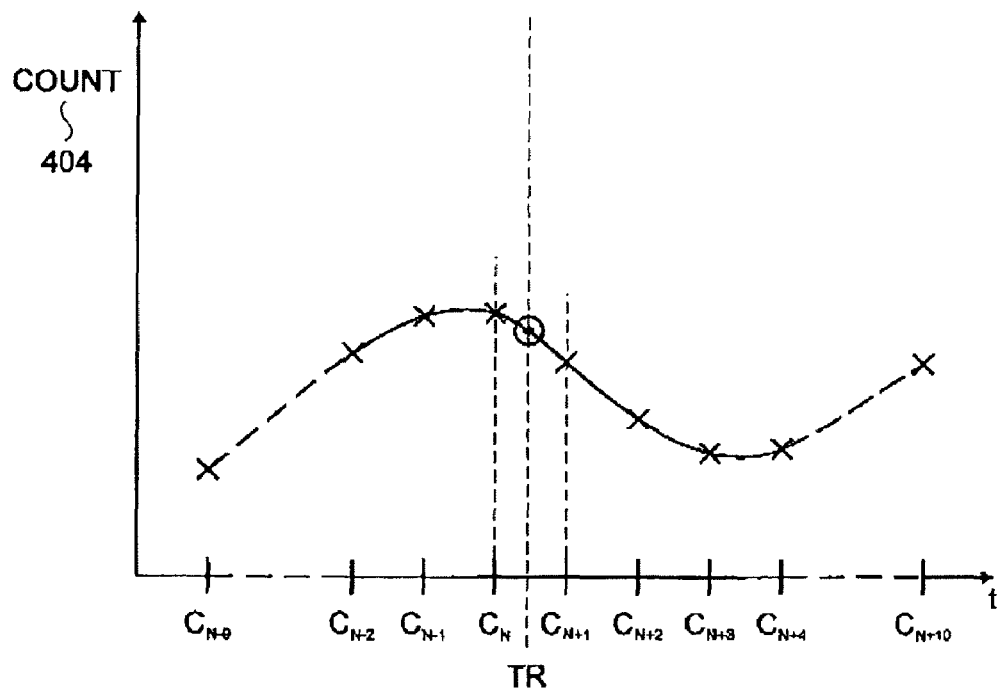
FIG. 41C is a timing diagram of the encoder counts and trigger pulse.
Figure 41D:
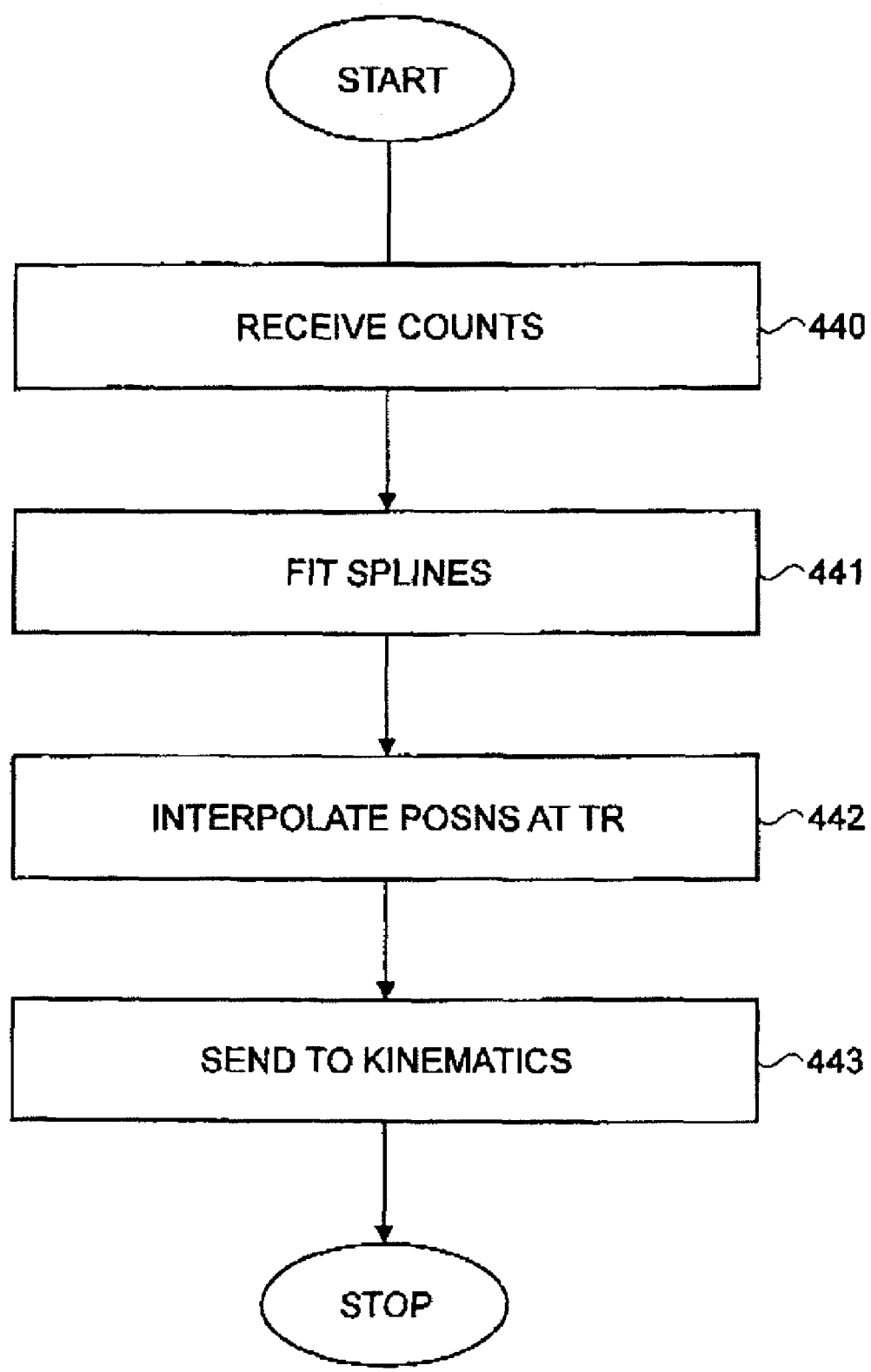
FIG. 41D is a flow diagram of a position averaging process.

Referring now to FIG. 41B, in a preferred mode of operation for determining the position of the Robot CMM Arm 1, an Encoder clock 406 is provided on the Joint PCB 173. The Encoder Clock 406 is used to time stamp each encoder count 404 as it arrives at the Joint PCB 173. Preferably twenty encoder counts 404 are maintained in memory 402 on a first in first out (FIFO) basis but more than 20 or less than 20 FIFO counts could be stored. When a Trigger pulse TR arrives at the Joint PCB 173 on the trigger bus 174 it is time stamped using the encoder clock 406. Referring now to FIG. 41C, the count 404 is shown over time t on a diagram. Each Count Cn−9 to Cn+10 is recorded, resulting in 20 time stamped counts in memory. Just after Cn a trigger pulse TR was received by Joint PCB 173 requesting an encoder position. The trigger pulse was time stamped by the encoder clock 406 on arrival. The Joint PCB 173 sends the 20 time stamped counts Cnx and the time that the trigger pulse TR was received along the serial bus 169 to the Control PCB 172. Referring now to the position averaging process of FIG. 41D:

In first Step 440, the Position averaging software 392 in the Control PCB 172 receives from each Joint PCB 173 as input resulting from a trigger pulse TR, a set of twenty time stamped counts from the encoder 178 and a time at which the trigger pulse TR was received at that encoder;

In second Step 441, the Position averaging software 392 fits one spline in the time domain through the twenty counts for each encoder resulting in seven splines for seven CMM encoders 178;

In third Step 442, the Position averaging software 392 interpolates one count at time TR for each CMM encoder 178;

In fourth Step 443, the seven interpolated counts are sent to the Kinematics software 391 from which the position of the Robot CMM Arm 1 is determined.

This position averaging process is an example of one method of improving the accuracy of the Robot CMM Arm by means of averaging and interpolation around the exact position at the time of the trigger pulse TR. This invention is not limited to this position averaging process, but includes all processes by which the position of the Robot CMM Arm can be determined more accurately through the acquisition and processing of more raw position data before and after the time of the trigger pulse TR. The location of the processing is unimportant and can take place at one or more processing locations including, for example, the encoders 178, the Joint PCBs 173, the Control PCB 172 and the laptop 151. The use of position averaging means that the position of the Robot CMM Arm 1 is determined more accurately than for the simple encoder of operation.

Thermal Compensation

It is an object of this invention to provide a Robot CMM Arm that is thermally compensated and does not require recalibration when the temperature of the Robot CMM Arm changes. Thermocouples 180 are bonded to the Aluminium of each of the housings, 100, 101, 103 of the Internal CMM Arm 5. The CMM Segments1-8 31-38 are designed using finite element software to expand/contract linearly with temperature and not to twist. Similarly, the CMM Segments1-8 31-38 are manufactured using well known processes and materials that do not result in stresses that might cause distortion with changes in temperature. Aluminium expands at a well-known rate with temperature. The thermocouples 180 are read every 10 seconds by the Joint PCBs 173 and the temperatures are sent to the Control PCB 172 along the serial bus 169. Some of the parameters in the 45-parameter kinematic model of the Internal CMM Arm are then adjusted in proportion to changes in temperature measured by the thermocouples 180 in each housing in ways predicted by the finite element thermal modelling. Where extremes in temperature are encountered such as in Alaska or the desert, it is recommended that a contact or non-contact probe alignment take place before the Robot CMM Arm is used.

Monitoring Forces and Torques

Figure 41E:
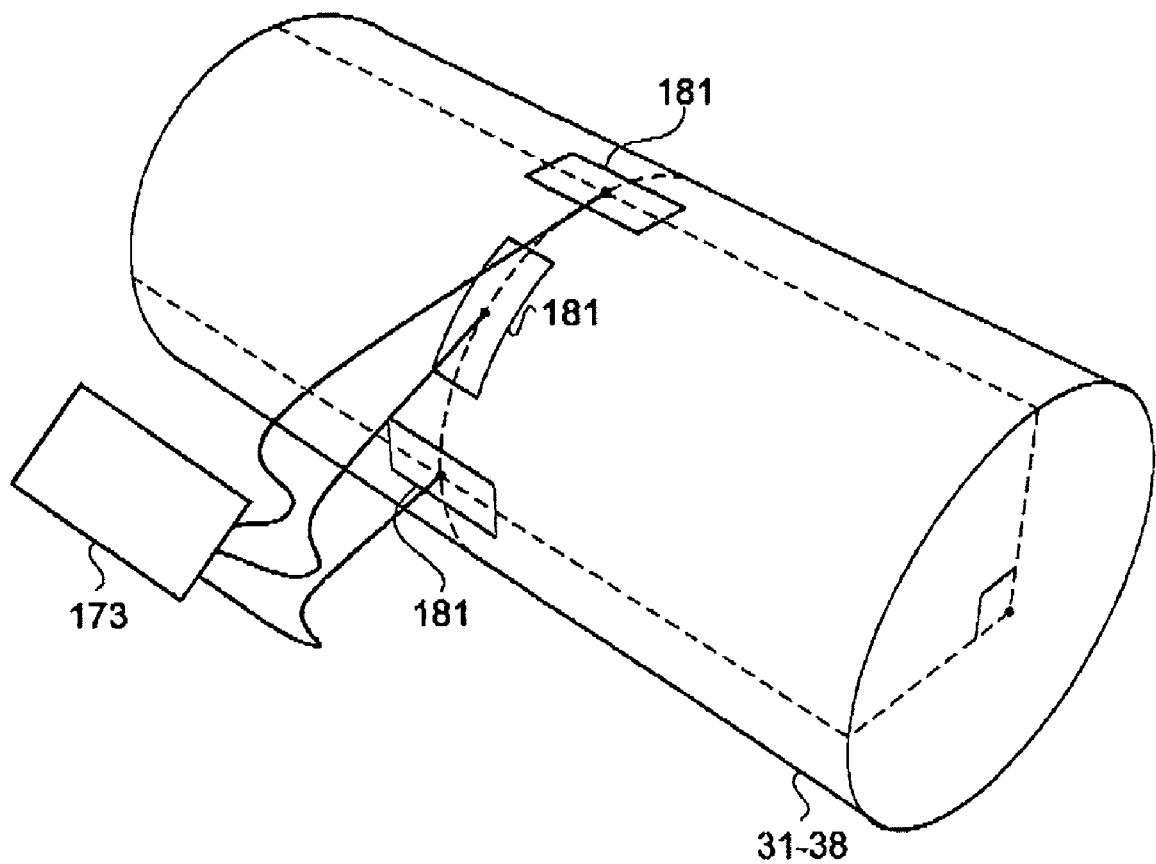
FIG. 41E is a diagram of a strain gauge system.

During measuring the Internal CMM Arm 5 is subject to forces and torques. Referring now to FIG. 41E, Strain gauges 181 mounted on CMM Segments1-8 31-38 sense the strains on the Internal CMM Arm 5 continuously. Three Strain gauges 181 are mounted orthogonally on each CMM Segment 1-8 31-38. The Strain gauges 181 are connected to the Joint PCBs 173. The Joint PCBs 173 send values read from each Strain gauge 181 to the Control PCB 172 five times per second. Strain values could be sent more often or less often than 5 times per second. During setup, after the manufacture of each Robot CMM Arm, a series of strain gauge test programs are run and the values output from each strain gauge are monitored during the execution of the program. Some of the test programs are designed to over-strain the Internal CMM Arm 5; one method used is to move the arm rapidly with a heavy dummy probe 90 mounted on CMM Segment8 38. In this way, the strain gauges 181 are calibrated with maximum acceptable compressive and tensile strains. In normal use, the strains from all the strain gauges 181 are monitored 5 times a second and if a maximum acceptable strain is exceeded, then action is taken. Actions include: generating an error message to the operator, automatically repeating some measurements at a slower speed to reduce the strain levels, logging the unacceptable strains and the conditions under which they are produced. In an alternative embodiment, Strain gauges 181 can be placed in the bearings of the CMM Joints1-7 51-57 located so as to measure specific bending strains. These bearing Strain gauges 181 may be used in addition to the Strain gauges 181 on the CMM Segments1-8 31-38 or instead of. To increase the reliability of strain measurements, multiple strain gauges are provided for each direction and the results processed using comparison and or averaging methods. The scope of this invention is not limited to a certain number of strain gauges positioned in certain locations. This invention includes the provision of any strain, pressure force, torque or any other measuring means in any location that can provide feedback to the Control PCB 172 on forces and moments in the Robot CMM Arm 1.

Timing

Measuring can take place on the fly or when the Robot CMM Arm is stationary. Precise timing between the Control PCB 172 in the Robot CMM Arm 1 and the Optical Probe 91 is crucial for maintaining high accuracy when measuring takes place on the fly. Two methods of ensuring precise timing between the Control PCB 172 and the Optical Probe 91 are preferably Synchronisation and also Time-stamping. The scope of this invention is not limited by these two methods and includes any method of ensuring precise timing between the Control PCB 172 in the Robot CMM Arm 1 and the Optical Probe 91.

Synchronisation

Figure 42:
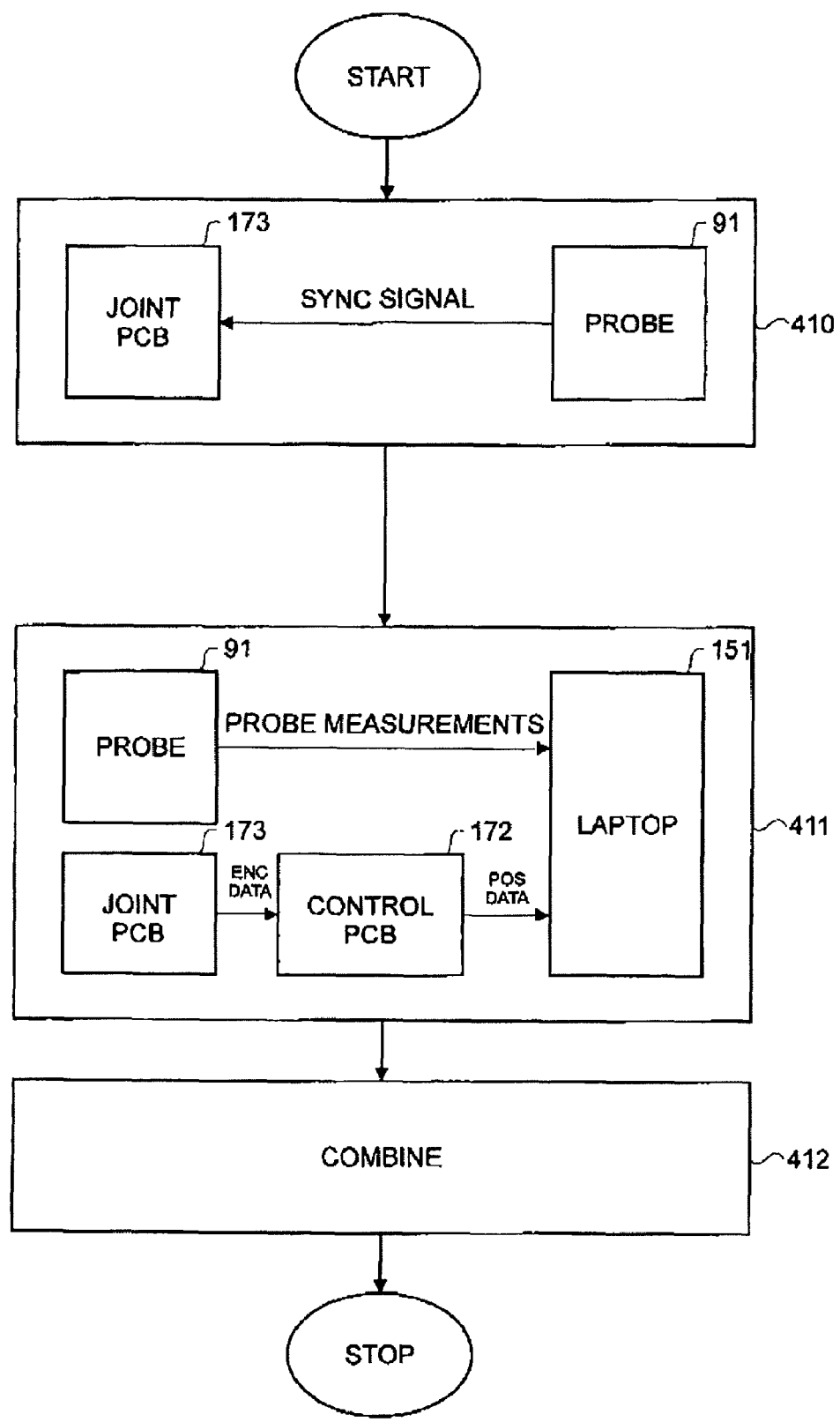
FIG. 42 is a flow diagram for a synchronisation process with the Probe as Master.

The Synchronisation method is characterised by pairs of synchronised measurements, the first measurement being the probe measurements and the second measurement being the position of the Internal CMM Arm 5. Referring now to the process of FIG. 42, when data from the Control PCB 172 and the Optical Probe 91 is synchronised then in a first synchronisation mode, the Optical Probe 91 is preferably the master and the Control PCB 172 is the slave. In a first step, Step 410, the Optical Probe 91 sends a synchronisation signal over the Trigger bus 174 to the seven Joint PCBs 173. The synchronisation signal travels fast over the Trigger bus 174 with a delay of less than 1 microsecond. In Step 411, probe measurements and position data are sent to the laptop 151. The Joint PCBs 173 send encoder data to the Control PCB 172. The Control PCB 172 assembles the seven encoder positions, calculates the position of the Internal CMM Arm 5 at the probe end 3 and sends the position to the Laptop 151. The Probe 91 sends probe measurements to the Laptop 151. In Step 412, the Laptop 151 combines the probe measurements and the position of the Internal CMM Arm 5 to provide measurements. This method works when the synchronisation signal has a delay longer than 1 microsecond to travel from the Optical Probe 91 to the Joint PCBs 173 providing the synchronisation method and apparatus has the technical effect of capturing probe measurements and encoder positions such that they can be combined to produce accurate measurements. Referring now to FIGS. 43A-C, the Optical Probe 91 is the master and the Control PCB 172 is the slave. Referring now to FIG. 43A, to measure, an active Optical Probe 91 must satisfy two conditions: light must be projected and the sensor shutter must be open to collect light. In the mode of FIG. 43A, measuring takes place when the laser is on. A synchronisation signal should be sent from the optical probe 91 to the Control PCB 172 at time T, which is the midpoint of the measuring period P. In this first embodiment, the Robot CMM Arm 1, on receipt of a synchronisation signal at time T, can latch the encoders in a repeatable time that is less than 1 microsecond. Referring now to FIG. 43B, the measuring period P is from the opening of the shutter to the laser switching off. Referring now to FIG. 43C, the measuring period P is when the shutter is open.

Figure 45:
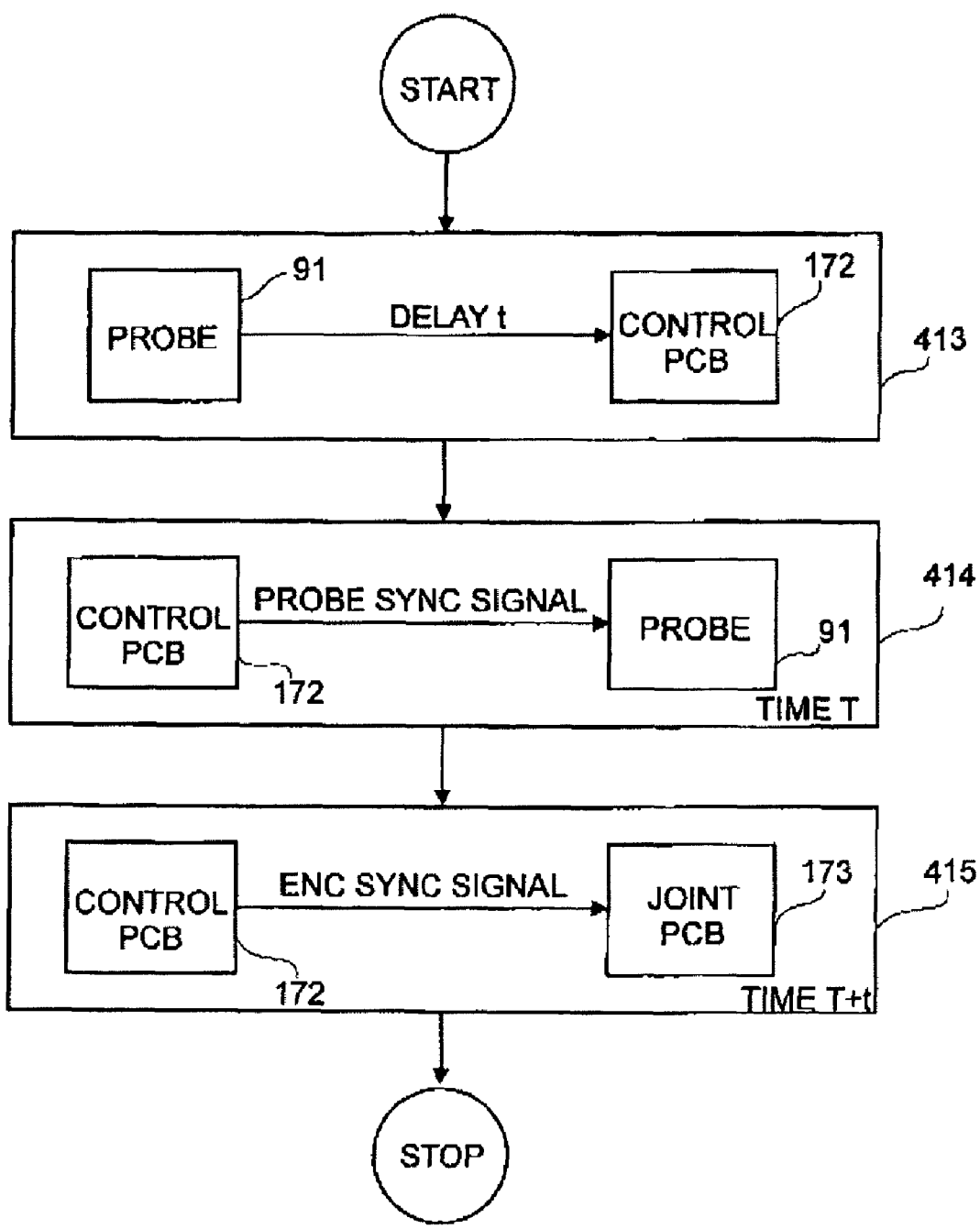
FIG. 45 is a flow diagram for a synchronisation process with the Probe as Slave.

Synchronisation can take place in a second synchronisation mode when the Control PCB 172 is the master and the Optical Probe 91 is the slave. An example of such synchronisation is when the scanning mode is to measure at regular arm increments and the Control PCB 172 is master. Referring now to FIG. 44, a synchronisation signal arrives at Optical probe 91 at time T from the Control PCB 172. It is preferable that both the laser turns on and the shutter opens within a short period of time after T. In the case of FIG. 44, the shutter determines the measuring period P and has a centre that is delayed by t microseconds after time T. In other cases the laser determines the measuring period P or a combination of the shutter and the laser determines the measuring period P. It is important that, in order to maximise the accuracy of the Robot CMM Arm 1 when scanning on the fly, delay t is known and repeatable for all measurements in this second synchronisation mode. In some Optical Probes 91, delay t is changed between measurements by the Optical Probe 91. In this case, the Optical Probe 91 communicates changes in the value of delay t over the serial bus 169 before the next synchronisation signal is received. Referring now to the process of FIG. 45, in a first step 413, the Optical Probe 91 sends a change in the value of delay t to the Control PCB 172. This step 413 is only executed if delay t has changed. In step 414, the Control PCB 172 sends a probe synchronisation signal to the Optical probe 91 at time T. In step 415, the Control PCB 172 sends an encoder synchronisation signal to the seven Joint PCBs 173 at time T+t. The Control PCB uses a means such as an internal clock to determine the correct moment to send the encoder synchronisation signal after the probe synchronisation signal. In the case when the Probe 90 is a multiple stripe probe such as a two-stripe probe 308 with two stripes 305, 306, then measurements from the stripes can be taken simultaneously with all stripes simultaneously illuminated or separately with one stripe illuminated at a time, or with groups of stripes illuminated at a time. In any case when stripes are illuminated at different times, if the Probe 90 is moving on the Robot CMM Arm, then the Robot CMM Arm will be at a different position when each stripe is illuminated and there will be separate synchronisation for each stripe. It is an object of this invention that in a first synchronisation mode of use, the Control PCB 172 is the master and the Probe 90 is the slave and in a second synchronisation mode of use, the Probe 90 is the master and the Control PCB 172 is the slave.

Time stamping and Interpolation

In some cases, it cannot be possible to precisely synchronise the Optical Probe 91 and the Control PCB 172 to produce a pair of measurements. For instance, synchronisation is not possible if means for sending or receiving a synchronisation signal are not provided. In the time-stamping scenario there are two cases: (i) the Optical Probe 91 and the Control PCB 172 have the same measurement rate (ii) the Optical Probe 91 and the Control PCB 172 have different and or variable measurement rates.

In Case (i) the measurements are made in pairs. It is important that the rates of measurement of the Optical Probe 91 and the Control PCB 172 are precise and do not drift over time. Two clocks in the Optical Probe 91 and the Control PCB 172 run accurately such that they show the same times at the start and at the end of the scanning. Measurements in the Optical Probe 91 and the Control PCB 172 take place at the same rate such that there is always the same time interval I between two neighbouring optical measurements and two neighbouring position measurements. Typical rates vary from 25 measurements per second to 1000 measurements per second but could be more than 1000 or less than 25. In Case (ii) the measurements stream out of the Optical Probe 91 at regular or irregular intervals and out of the Control PCB 172 at the same or different regular or irregular intervals.

Figure 46:
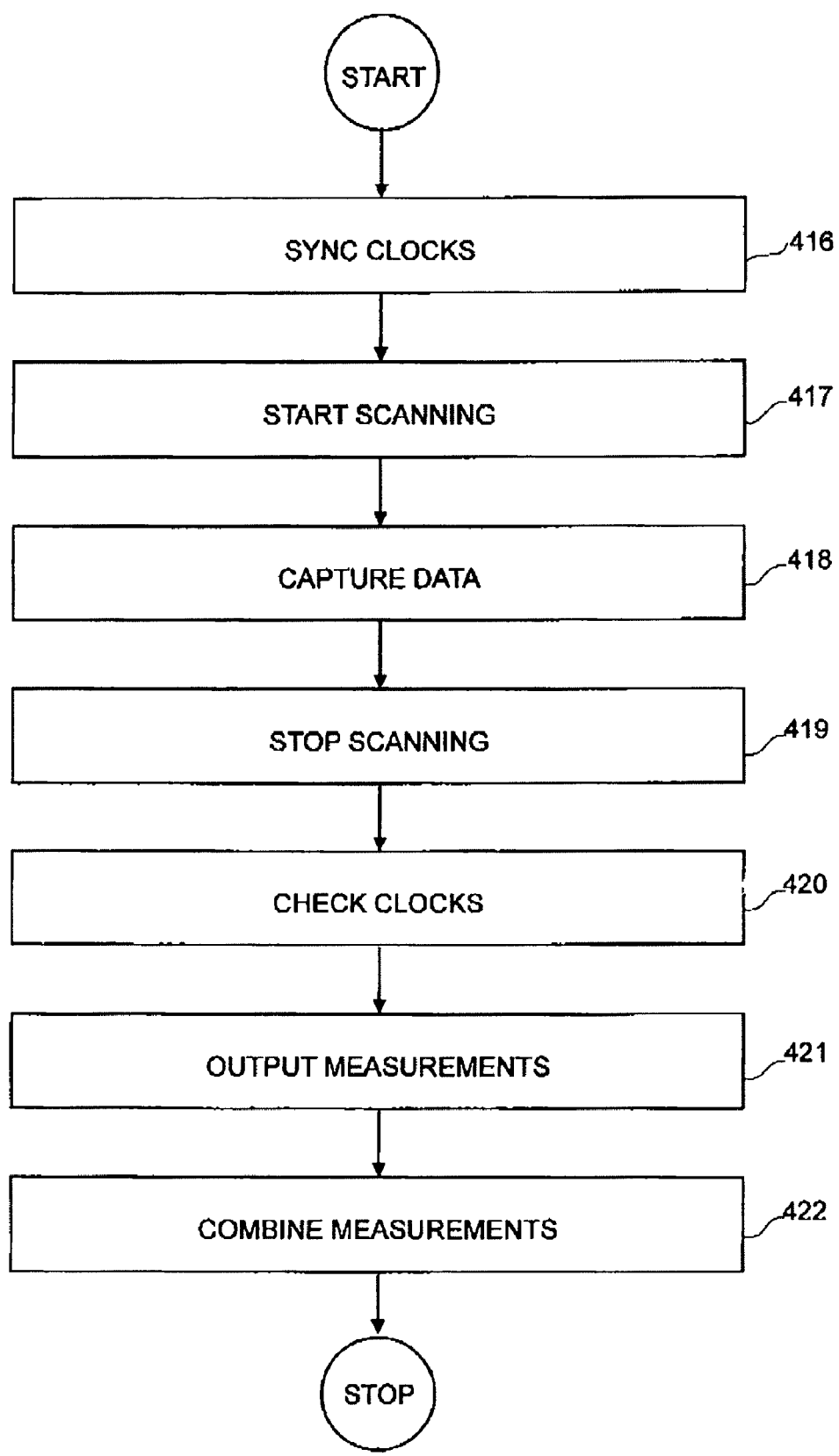
FIG. 46 is a flow diagram for a time stamping measurement process.

Referring now to the process of FIG. 46, the same process is used for both Cases (i) and (ii).

In first Step 416, the two clocks in the Optical Probe 91 and the Control PCB 172 are synchronised as closely as possible just before the scanning starts;

In Step 417, measuring is started by the Control PCB 172 requesting the Optical Probe 91 to start scanning;

In Step 418, position data is captured by the Control PCB 172; each position is time-stamped with the clock in the Control PCB 172. Measurements are captured in the Optical Probe 91;

each position is time-stamped with the clock in the Optical Probe 91;

In Step 419, The Robot CMM Arm scanning program stops and requests the Optical probe 91 to stop scanning;

In Step 420, the two clocks in the Optical Probe 91 and the Control PCB 172 are checked against each other;

In Step 421, the Control PCB 172 outputs a file of time-stamped positions. The Optical Probe 91 outputs a file of time-stamped measurements;

In Step 422, a combined measurement file is calculated by interpolating the Control PCB 172 positions to provide a best estimate of where the Internal CMM Arm 5 is for each Optical Probe measurement. Each Internal CMM Arm 5 position contains X, Y, Z position of the probe end 3 and I, J, K orientation vectors. Interpolation of the Internal CMM Arm 5 positions is by fitting a 3D polyline through the Internal CMM Arm 5 positions and interpolating along the 3D polyline in proportion to the timestamp timing differences.

Figure 47:
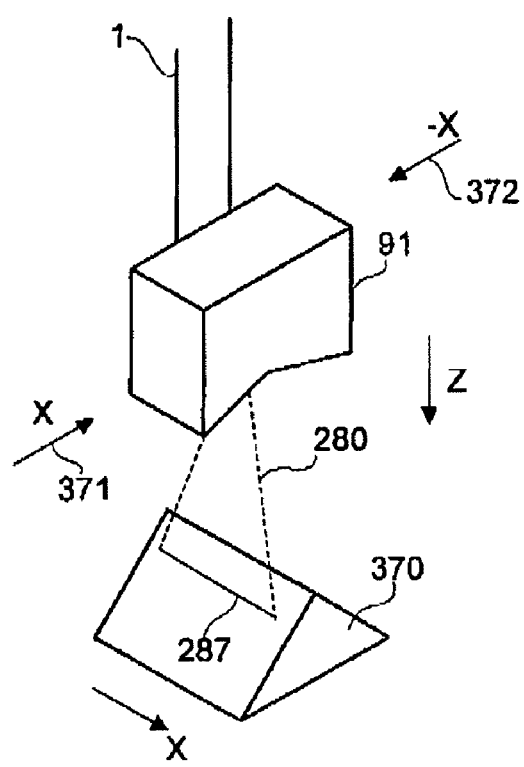
FIG. 47 is a schematic diagram of a probe scanning a ridged artefact.
Figure 48:
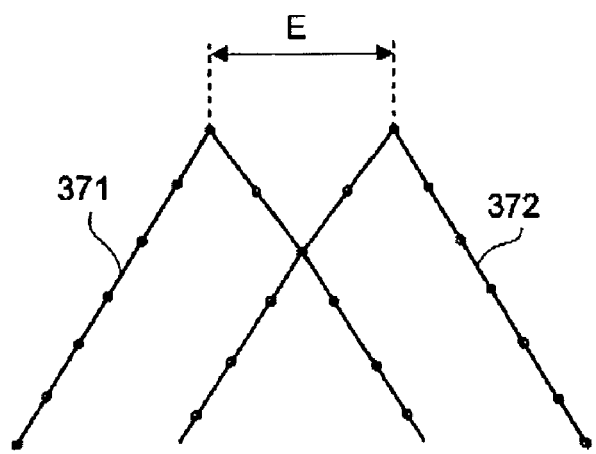
FIG. 48 is a diagram of +X and -X scans of the ridged artefact.

The scope of this invention is not limited to the process in FIG. 46 of time stamping and interpolation but includes any process involving time stamping and interpolation that achieves the same technical effect. For instance, where it is not possible to precisely synchronise the two clocks in the Optical Probe 91 and the Control PCB 172, then a method involving first scanning a known artefact is used. Referring now to FIG. 47, a ridge artefact 370 with two planes meeting at 90 degrees is positioned with the ridge approximately parallel to the laser stripe 287. Two scanning passes are made over the ridge artefact 370 by the Optical probe 91 mounted on the Robot CMM Arm 1. The first pass 371 is in the +X direction and the second pass 372 is in the −X direction. The probe measurements and the arm positions in the two time-stamped files are combined using an estimate of the synchronisation between the two clocks. Referring now to FIG. 48, when the two passes 371, 372 are compared then an error E as a distance in the X direction is calculated. The error E is used to accurately determine the difference in synchronisation of the two clocks. That difference is then used as a correction factor to the estimate of the synchronisation between the two clocks to provide an accurate synchronisation between the two clocks when an object 9 is subsequently measured.

Synchronisation Pulse Labelling

There are ambiguities in the synchronisation in the Robot CMM Arm System 150 that can be solved by a novel process of real-time synchronisation pulse labelling. In some cases, one or more measurements from one or more devices is lost due to a perturbation in the system operation, leading to ambiguity in the process of accurately putting together synchronised measurements from multiple sources which may result in the undesirable situations of a system either losing further data or providing incorrectly synchronised data. In other cases, there may be ambiguity as to the source of the synchronisation signal. It is a purpose of this invention to append a Synchronisation label to each synchronisation pulse from a Synchronisation signal issuing device comprising (i) an integer that is incremented with each successive synchronisation signal from that Synchronisation signal issuing device; optionally (ii) an unique device identification code for that Synchronisation signal issuing device; optionally (iii) a time stamp. The incremented integer is needed for all systems. A typical minimum for the incremented integer is 0 and a typical maximum is 255. When the maximum integer is reached, the next incremented integer is the minimum integer. After startup of the Robot CMM Arm System 150, the first integer output is 0. The format of the Synchronisation pulse and Synchronisation label can be defined by anyone skilled in the art. For example, the synchronisation pulse is a rising pulse with a 10 microsecond pulse width and the total label Synchronisation label length is 15 binary bits, each bit represented by the presence or absence of a 10 microsecond pulse. The Synchronisation label is encoded with a checksum bit. The unique device identification code for each Synchronisation signal issuing device is only required where there might be ambiguity between synchronisation signals from a number of Synchronisation signal issuing devices. The time stamp is an option available for the system developer to synchronise clock times between devices by means of a Trigger bus (174) and can be used for other purposes. There are several Synchronisation signal issuing devices connected to the Trigger bus (174) that can issue synchronisation signals with a Synchronisation label, including but not limited to one or more of each of:

| | |
|---|---|
| Optical probe (91) | Button under manual operation (183) |
| Quantity measuring probe (90) | Remote Control (351) |
| Touch trigger probe (92) | Control PCB (172) |
| Force probe in scan mode (99) | External control device |

There are also one or more Synchronisation signal receiving devices connected to the Trigger bus (174) that can receive synchronisation signals with a Synchronisation label including but not limited to one or more of each of:

| | |
|---|---|
| Optical probe (91) | Control PCB (172) |
| Quantity measuring probe (90) | External control device |
| Joint PCB (173) | |

There is at least one collation device that may also be a combining device for collating and combining the measurement data from two or more devices. The collation device can be an independent device or can be part of the Synchronisation signal issuing device or the Synchronisation signal receiving device.

A novel synchronisation pulse labelling method is disclosed for labelling synchronisation pulses. In a first step, the Synchronisation signal issuing device issues a synchronisation pulse on the trigger bus followed by a Synchronisation label containing (i) a Synchronisation signal issuing device incremented integer, optionally (ii) a Synchronisation signal issuing device identification code, optionally (iii) a Synchronisation signal issuing device time stamp. In a second step, a Synchronisation signal receiving device receives a trigger pulse on the trigger bus followed by the Synchronisation label. In a third step, the Synchronisation signal issuing device issues a Synchronisation signal issuing device data packet on a communication bus directly or indirectly to a collation device, the data containing at least: (i) a code to indicate that a sync pulse has been issued, (ii) data generated within the Synchronisation signal issuing device, a copy of the Synchronisation label issued from the Synchronisation signal issuing device containing (iii) a Synchronisation signal issuing device incremented integer, (iv) a Synchronisation signal issuing device identification code, and, optionally (vi) a Synchronisation signal issuing device time stamp. In a fourth step, the Synchronisation signal receiving device issues a Synchronisation signal receiving device data packet on a communication bus directly or indirectly to a collation device containing at least: (i) a code to indicate that a sync pulse has been received, (ii) a copy of the Synchronisation label that was received, (iii) data generated within the Synchronisation signal receiving device in response to the trigger pulse, (iv) a Synchronisation signal receiving device incremented integer, (v) a Synchronisation signal receiving device identification code, and, optionally (vi) a Synchronisation signal receiving device time stamp. In a fifth step, the collation device receives the Synchronisation signal issuing device data packet and the Synchronisation signal receiving device data packet in any order. In a sixth step, the collation device combines the data in the Synchronisation signal issuing device data packet and the Synchronisation signal receiving device data packet where the Synchronisation signal issuing device incremented integer are the same in both the Synchronisation signal issuing device data packet and the Synchronisation signal receiving device data packet.

This novel synchronisation label and method is not limited to the embodiment disclosed but includes any method of using a systematically changing label to avoid ambiguity in synchronisation. For example, in an alternative embodiment, the integer range could be less than 256 or larger than 256. In a further embodiment, the label could be changed in any systematic way. In the synchronisation pulse labelling method, Step 3 can occur at the same time as or before Step 2 or at the same time as or before Step 4.

Measurement Programming

Quick and easy programming of a Robot CMM Arm 1 is important because in general robots require skilled operators to program them and this is one of the challenges that will make a Robot CMM Arm 1 successful in the marketplace. Robot CMM Arm Programs 389 are interpreted in real-time by an Interpreter 390 and the Control Software 382 executes commands in a program 389. A program 389 can be generated in a number of different ways. A text editor is provided for the operator 11 to generate and edit a Robot CMM Arm program 389 on the laptop 151. A program 389 can be generated in an off-line programming system such as EMWorkplace from Tecnomatix. A program 389 can be taught by operator 11 remote activation of the Robot CMM Arm 1 using a pendant 153 or a laptop 151; this means that where access if difficult, teaching can be done remotely without needing to provide gantries for operator access to manually move the Robot CMM Arm.

Start-up Checks

The Robot CMM Arm 1 is powered up by connecting to mains cable 155 and switching on using switch 156. The Control Software 382 in the Control PCB 172 self-starts on power up. The first task of the Control Software 382 is to perform a series of start-up checks. It verifies that all aspects of the hardware and software within the Robot CMM Arm that can be checked are operating correctly. The Joint Software 405 in the Joint PCB 173 self-starts on power up. The first task of the Joint Software 405 is to perform a series of start-up checks. It verifies that all aspects of the hardware and software connected to the Joint PCB 173 that can be checked are operating correctly. The Pendant Software 330 in the Pendant 153 self-starts on power up under control of the Pendant operating system 326. The first task of the Pendant Software 330 is to perform a series of start-up checks. It verifies that all aspects of the hardware and software in the Pendant 153 that can be checked are operating correctly. After checking the directly connected hardware of the Control PCB 172, the Control Software 382 checks the seven remote Joint PCBs 173 by requesting a status report over the serial bus 169 from each one. The Control Software 382 then requests a status report over the serial bus 169 from any probe 90 that can be mounted on the Robot CMM Arm 1. When the internal start-up checks are complete, the Control Software 382 attempts to communicate on external buses to equipment including the footswitches 350, the remote control 351, the pendant 153 and the laptop 151. When the full start-up checks are complete, the Control Software 382 in the Control PCB 172 waits for instructions. It will be appreciated by a person skilled in the trade that start-up checks can be performed in many different sequences and can take a short or long time, but that it is undesirable for the Operator 11 to wait more than a few seconds whilst the start-up checking process is underway.

Referencing

It is desirable that the Robot CMM Arm always knows its joint angles. This can be achieved by using absolute encoders and interrogating them via the Joint PCBs 173 on start-up. When incremental encoders are used, it is desirable to maintain power via the battery 170. However, if the Control PCB 172 does not know the joint angles, then a referencing process is needed. The operator 11 initiates the automatic referencing process after first checking that it is safe to do so. During the referencing process, each joint is rotated until a reference position in reached.

Calibration

Automated Calibration Method and Artefact

Figures 49, 51B:
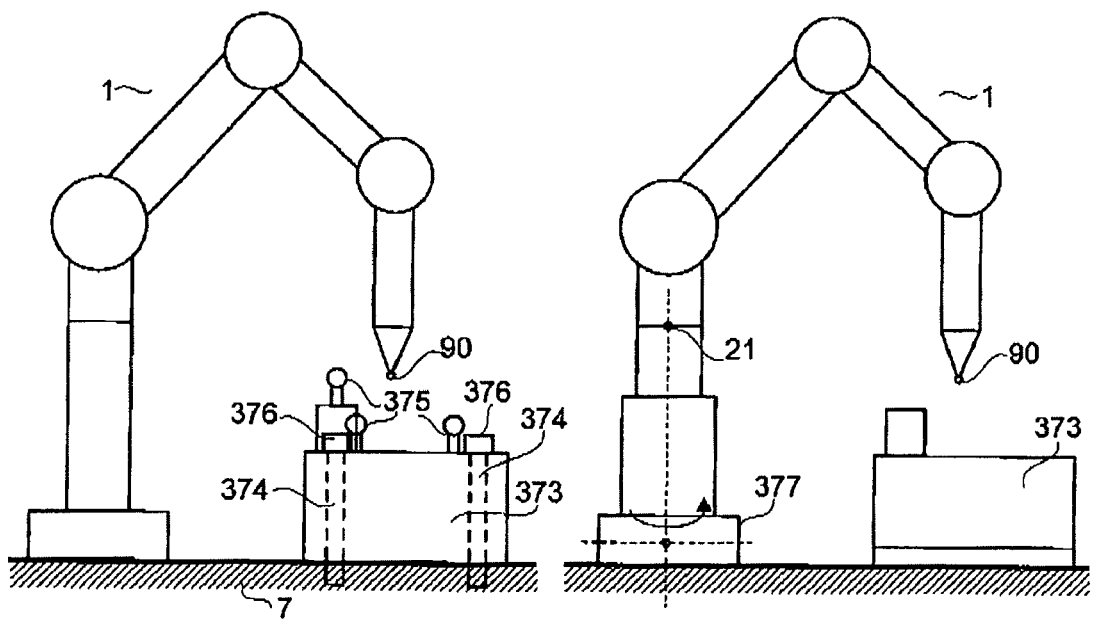
FIG. 49 is a layout of calibration equipment.
FIG. 51B is a layout of calibration equipment with a rotary axis.
Figure 50:
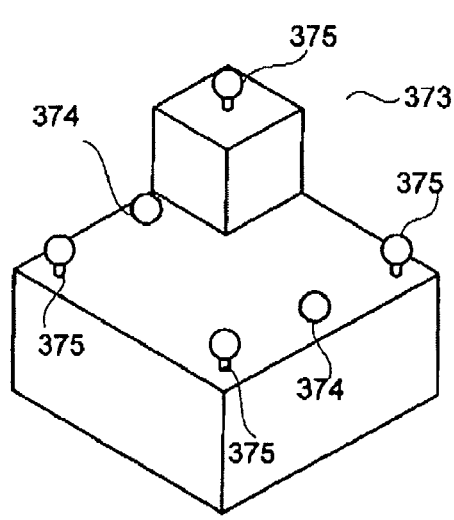
FIG. 50 is a diagram of a calibration artefact.
Figure 51A:
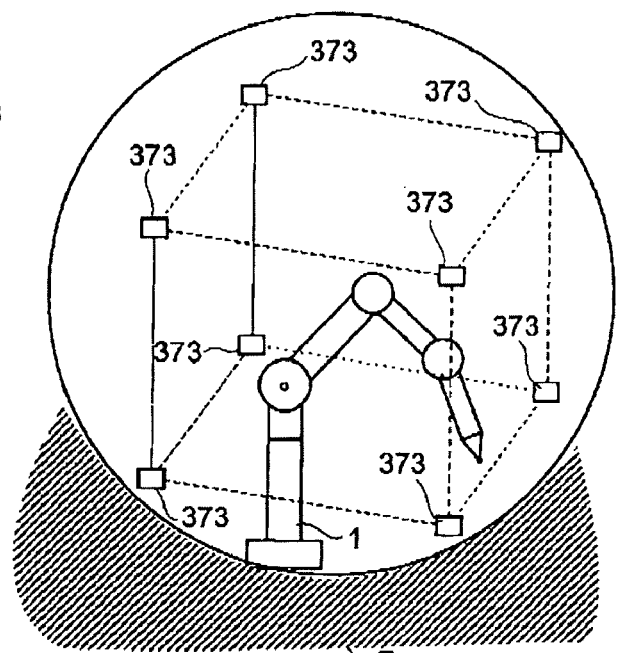
FIG. 51A is a location diagram for positioning the calibration artefact.

There are many ways of calibrating a Robot and many ways of calibrating a Manual CMM Arm known to those skilled in the trade and referenced in the background to this invention. Referring now to FIGS. 49 and 50, in this first embodiment, the calibration approach of automatically measuring a known calibration artefact 373 is used. A 45-parameter kinematic calibration model is adopted for the 7-axis Robot CMM Arm 1. The Robot CMM Arm 1 is rigidly attached to surface 7 and measures a calibration artefact 373 also rigidly attached to the surface 7. The calibration artefact 373 comprises a block with four 90-degree cones 375 of maximum diameter 6 mm. One of the four cones 375 is located higher than the other three cones 375 which are approximately co-planar. The calibration artefact 373 has been certified and the distances, orientations between the four cones 375 are known precisely. The calibration artefact 373 is stiff and made out of Invar, a material with a low coefficient of thermal expansion. The artefact 373 is rigidly attached to surface 7 by means of bolts 376 through holes 374 that screw into surface 7. In another embodiment, the artefact 373 is rigidly attached to the surface 7 by clamping. A touch trigger probe 92 that is a Renishaw touch trigger probe is mounted on the Robot CMM Arm 1. A calibration program is initiated by the operator 11 and executed by the Control PCB 172. It consists of taking ninety touch-probe measurements of each of the four spheres 375. The joints are exercised as much as possible during the three hundred and sixty touch-probe measurements; this means that measurements are taken with a wide combination of joint angles. None of the 360 touch-probe measurements have identical joint orientations. For each measurement, the seven encoder positions are recorded. Using a least squares process well-known by those skilled in the art, the 360 sets of encoder positions are used to optimize the 45 parameters of the kinematic model. This calibration approach can be used, preferably with a reduced number of measurements to speed it up, to align the probe coordinate system 364 of any contact probe 95 to the Robot CMM Arm coordinate system 363; during this contact probe alignment process, the Robot CMM Arm is preferably not recalibrated, but can also be recalibrated. Referring now to FIG. 51A, in a further embodiment, the artefact 373 is placed in eight locations approximating the eight corners of a cube within the measuring volume of the Robot CMM Arm 1. In each location, the artefact 373 is mounted rigidly with respect to the surface 7 and hence the Robot CMM Arm 1. In each location, 360 measurements are automatically taken. Using the same least squares process, the 8×360 sets of encoder positions are used to optimize the 45 parameters of the kinematic model. These calibration processes simultaneously calibrate the arm and the contact probe.

Calibration Axes

One or more separate axes of movement may be provided that move the coordinate system of the Robot CMM Arm and the calibration artefact relative to each other; these axes may be manually controlled or automatically actuated. They may be linear or rotational. For instance, referring now to FIG. 51B, the Robot CMM Arm 1 may be mounted on a servo controlled rotary axis 377, preferably with the servo controlled rotary axis 377 in line with the axis of Joint Centre1 21, enabling the Robot CMM Arm to be rotated to any number of angles, with further measurements of the artefact 373 taking place at each angular position. The servo controlled rotary axis 377 must be stiff so as not to introduce error due to the Robot CMM Arm 1 rocking on the servo controlled rotary axis 377. The provision of a servo controlled rotary axis 377 enables the complete calibration process to be automated. It has the advantage of the equipment being compact and does not require the construction of stiff structures to mount the artefact 373 in different positions in the measurement volume. A manual rotary axis may be provided instead of the servo controlled rotary axis 377 with the advantage of a simpler and more portable system that is semi-automated due to the periodic manual repositioning of the base orientation of the Robot CMM Arm 1.

Calibration Throughout the Measurement Volume

The Internal CMM Arm 5 of a Robot CMM Arm 1 is not perfectly stiff. Under gravity, a long CMM Segment in a horizontal spatial orientation will deflect by a certain amount. This deflection cannot be measured by the angular encoders in the Internal CMM Arm 5 and is a source of error. These errors may be measured by a calibration process and the calibration data used to correct for repeatable errors such as deflection under gravity in subsequent operation of the Robot CMM Arm 1. Another source of error is the deflection in the joint bearings. In a good calibration process, the Robot CMM Arm 1 is measured in a large number of points in the measurement volume in which it will be later used. The Robot CMM Arm 1 has redundancy in most parts of the measurement volume, in other words there are an infinite number of spatial orientations that the Robot CMM Arm 1 may be in to measure a single location. In a good calibration process, the Robot CMM Arm 1 is placed into a large number of spatial orientations for each point in the measurement volume. Within reason, the more points that are measured and the more spatial orientations of the Robot CMM Arm 1 measured at each point, the better the calibration process. The provision of automated calibration axes that move the coordinate system of the Robot CMM Arm and the calibration artefact relative to each other permit an automated process that measures a large number of points. This means that the Robot CMM Arm 1 will be more accurate due to a better calibration process.

The scope of this invention is not restricted to the automated calibration methods disclosed. For instance, the scope of this invention includes any automated, partially-automated or manual calibration method. Any contact or non-contact Probe 90 can be used. The method can be non-portable and carried out at the Robot CMM Arm manufacturing site or service center; alternatively, the method may be portable, advantageously enabling a Robot CMM Arm to be recalibrated on site. Axes of movement of any number, type, location or degree of automation can provide relative movement between the Robot CMM Arm 1 and the calibration artefact 373. There may be any number of calibration artifacts 373. A calibration artefact 373 may be mounted on a column of fixed height or adjustable in any of height, orientation and position such that the calibration artefact 373 is stiff when contacted by the probe 90. Each one or more calibration artefact 373 may be contacted by a contact probe 90 or measured without contact by a non-contact probe 90. Methods may be used that do not require an artefact. The scope of this invention includes any method that achieves the technical effect of an accurate and automatic calibration of the Robot CMM Arm 1.

Alignment of Optical Probe

There are many ways of aligning the coordinate system of a Manual CMM Arm and the probe coordinate system 364 of an Optical probe 91 known to those skilled in the trade and referenced in the background to this invention. The preferred way of aligning the coordinate system 363 of the Robot CMM Arm 1 and the probe coordinate system 364 of an Optical probe 91 is to scan a sphere with the Optical probe 91 mounted on the Robot CMM Arm 1 from a number of different probe directions and orientations. The sphere is preferably 25 mm in diameter, certified and with a matt surface finish; such spheres are supplied by Renishaw. In the case of a Stripe probe 97, five Stripe probe directions are used: +X, −X, +Y, −Y, −Z in the Robot CMM Arm Coordinate System 363. For each direction, the sphere is scanned by the Stripe Probe 97 at 45 degree increments in orientation of the stripe plane 280 resulting in 8 orientations from each direction. At each of the 40 direction/orientation combinations, a forward +X scanning pass and a backward −X scanning pass are executed where +X and −X are in the probe coordinate system 364. The resulting 80 sets of Optical probe measurements and arm positions are processed using a least squares algorithm well-known by those skilled in the art, to produce the alignment transformation matrix between the Robot CMM Arm Coordinate System 363 and the probe coordinate system 364. The scope of this invention is not restricted to the automated alignment method disclosed, but includes any automated, partially-automated or manual alignment method that achieves the technical effect of an accurate alignment of the Robot CMM Arm 1 and an Optical probe 91.

Datuming Object

It is often the case that an object 9 is datumed before it is measured. In the datuming process, the transformation matrix between the Robot CMM Arm coordinate system 363 and the object coordinate system 361 is measured. In many instances datum features such as cones, tooling balls and reference planes are provided in accurate locations on the object 9. In the case of datuming an object 9 to the Robot CMM Arm 1, the operator first specifies to the Robot CMM Arm user interface software on the laptop 151 or on the Pendant 154 which datuming method is to be used and the Robot CMM Arm adopts that method. Common datuming methods include: three orthogonal planes; two cones and a plane; three tooling balls. The operator then manually guides the Robot CMM Arm through the sequence of locations necessary to perform the datuming method and the Control PCB 172 applies automated techniques for each measurement once a location is reached.

Feature and Surface Inspection

The Robot CMM Arm is a measuring machine. Many but not all measurements are carried out for the purpose of inspection. The Robot CMM Arm is particularly appropriate for feature and surface inspection of non-prismatic objects. Typical objects for inspection include those made of sheet metal, plastic or fibreglass and the tools that make these items. The objects are manufactured for example in the automotive, aerospace, appliance and toy industries. The objects are typically made by stamping, cutting, bending and punching processes. Examples of features on the objects that can be inspected include: outside corner, square hole, rectangular hole, oval hole, circular hole, edge profile and inside-corner.

In many cases a CAD file of the object is available. The CAD file specifies the exact 3D location, orientation, shape of the object's surface and features. Both the object and any tooling used to, make it can be measured and compared to the CAD file. Measurements can be stored for Quality Assurance purposes. Objects can be measured by contact or non-contact probes 90; non-contact probes have the advantage of not touching the object. For the case where a CAD file does not exist or has been lost, a master object or tool can be reverse engineered to provide a master CAD file for subsequent use in inspection.

Control Software

The Control Software 382 comprises a variety of manual, semi-automatic and automatic methods of use such as functions and modes. Some of these methods are disclosed below. It will be appreciated by a person skilled in the art, that there are many methods that can be employed for using the Robot CMM Arm provided by the Control Software 382 and that the methods hereby disclosed are exemplary of all methods that can be employed in using the Robot CMM Arm. The following exemplary methods are listed for the Control Software 382:

Continuous scanning: the kinematics module 391 in the control software 382 controls the movement of the Exoskeleton along the path required by the program 389, using control algorithms well known t6 those skilled in the art of robot controls; this is most often used Stepwise scanning: the kinematics module 391 in the control software 382 controls the stepwise movement of the Exoskeleton along the path required by the program 389 stopping at points specified in the program 389

Transitioning: transitioning is a movement made during which no measurements are taken; the kinematics module 391 in the control software 382 controls the continuous movement of the Exoskeleton along the transitioning path required by the program 389 without monitoring the strain gauges Teach: the kinematics module 391 in the control software 382 acts on movement commands specified directly by the operator 11 received via the pendant 153, the headset 340 or the laptop 151

Thermal monitoring: the control software 382 monitors the thermocouples 180 and adapts the kinematic parameters to their temperatures; this has the advantage of keeping the temperature of the Robot CMM Arm within limits in different environmental conditions, whilst minimising the impact on the duty cycle time Strain monitoring: the control software 382 monitors the strain gauges 181 to check for excess strain values in the continuous scanning mode Collision monitoring: the control software 382 monitors the following error and if it becomes excessive, it applies an emergency stop and issues an error message that could include an audible alert emitted by the loudspeaker in the laptop 151 or through the headset 340

Zeroing coordinate system: the control software 382 zeros a Robot CMM Arm coordinate system 363 by measuring the reference ball 367 with preferably a touch-trigger probe 92 to find its centre and use the centre of the reference ball 367 as the zero point of the Robot CMM Arm coordinate system 363

Datum referencing an object: the control software 382 references the Robot CMM Arm coordinate system 363 to the Object coordinate system 361 through datums. This function is automatic if the control software 382 knows approximately where to pick up datums on the object 9. This function is semi-automatic if the operator 11 first has to teach the Robot CMM Arm where the datums are on the object 9.

Feature location: the control software 382 measures the location of one or more features on an object 9 relative to the Object coordinate system 361

Dimensional measurement: the control software 382 measures the dimensions of one or more features on an object 9; as will be appreciated by a person skilled in the art, a range of functions are provided for measuring a variety of types of dimension Surface measurement: the control software 382 measures the surface of all or parts of the Object 9

Figure 52:
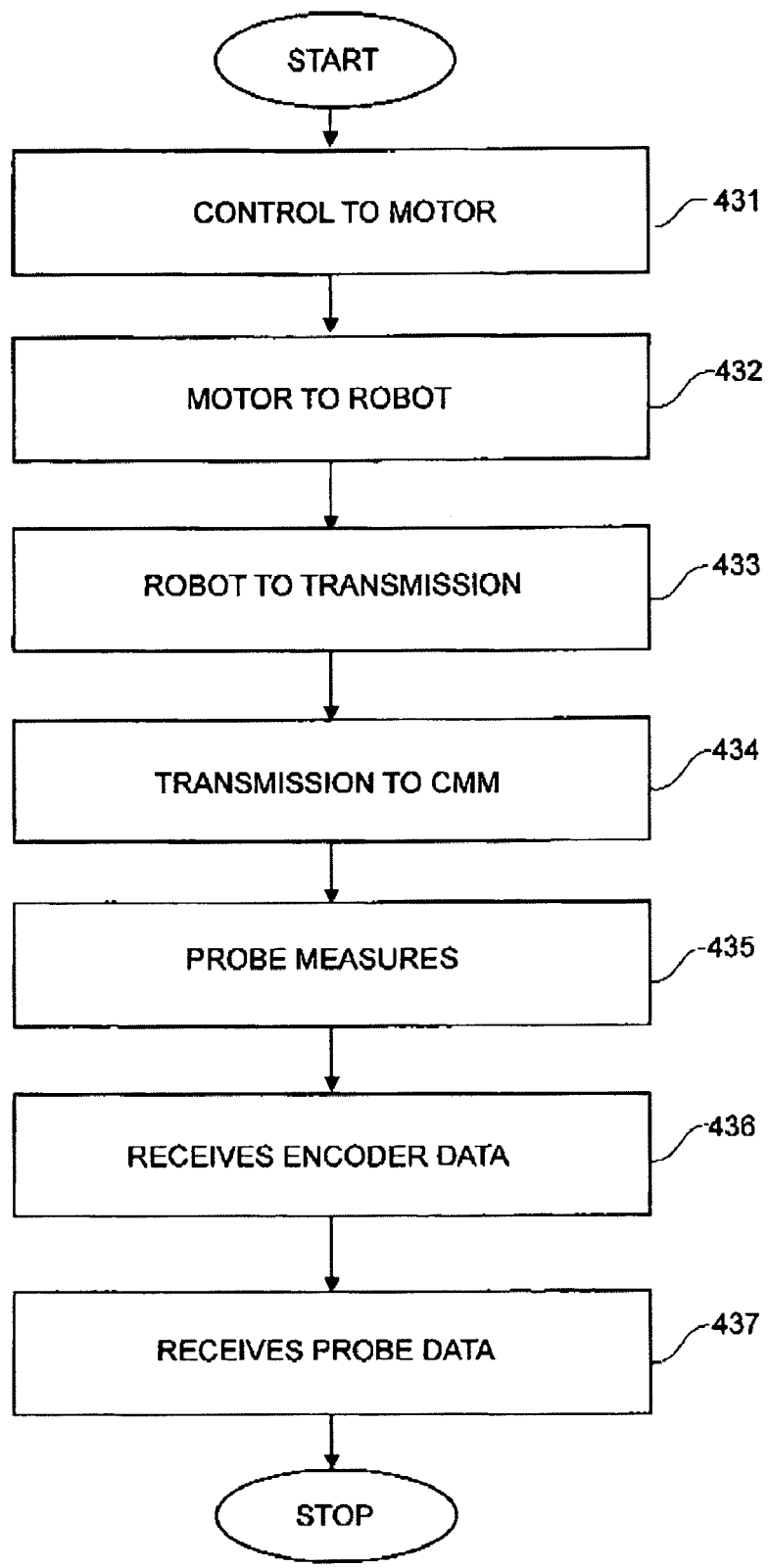
FIG. 52 is a flow diagram of a measuring process.

Software Referencing: the control software 382 references the measured surface data of the Object to the CAD model of the object 9 by a process of least squares fitting Error generation: the control software 382 compares the measured data of the surface of the Object with a CAD model of the object 9 and generates individual errors and error maps Report generation: the control software 382 automatically generates a report and/or pass/fail data on the variations of the measured data of the surface of the Object 9 from a CAD model of the object Statistical trends: the control software 382 compiles statistical trend information as to the location of one or more features on an object 9 relative to the Object coordinate system 361, the dimensions of one or more features on an object and to variations of the measured data of the surface of the Object from a CAD model of the object Method for Robot CMM Arm Measurement Referring now to FIG. 52, in a first step 431, the Control PCB 172 outputs a signal to at least one amplifier 175 that causes at least one motor 176 to output a torque. In Step 432, the drive of the motor causes torque on at least one Exoskeleton Segment 42-48. In Step 433, at least one transmission means 72-78 receives force from at least one Exoskeleton Segment 42-48. In Step 434, at least one transmission means 72-78 applies force to at least one CMM Segment 32-38 in locations near the centre of gravity of the CMM Segments 32-38. In Step 435, the probe 90 measures data. In Step 436, the Control PCB 172 receives encoder data from the Joint PCBs 173. In Step 437, the Control PCB 172 receives measurement data from the probe 90. In a method for synchronised Robot CMM Arm measurement, in an additional step, the probe 90 sends a synchronisation signal. In a method for time-stamped Robot CMM Arm measurement, the probe measurements and the positions are time-stamped.

Robot CMM Arm Advantages

It is a purpose of this invention that the Robot CMM Arms disclosed here can have longer reach and are more accurate than the equivalent Manual CMM Arms. Firstly, a Robot CMM Arm can have a reach longer than 2 metres because it is supported by a Exoskeleton and not by an operator who could not handle it. Secondly, the Exoskeleton supports the Internal CMM Arm at optimum positions such that the forces on it are minimised. Thirdly, the Internal CMM Arm uses larger diameter encoders with increased resolution and accuracy that might be awkward for an operator to handle. The combination of these three factors results in Robot CMM Arms that have longer reach and are more accurate than Manual CMM Arms. This means that with the long-running trend of increasing accuracy requirements from customers, a Robot CMM Arm provides more utility to its owner than a Manual CMM Arm.

A feature of this invention is its low weight compared to existing robots. Typical weights vary from 5 kg to 35 kg, depending on the reach of the arm. This means that smaller and mid-size versions of the Robot CMM Arm invention are light enough to be portable. The portable Robot CMM Arm of this first embodiment comprises a single compact unit; it can be transported by one person in a single case with wheels. A stand can be used which means that the Robot CMM Arm does not need to be bolted to the floor like robots are; this means that the Robot CMM Arm can be quickly moved from location to location.

Applicability

The Robot CMM Arm combines the accuracy benefits of a CMM arm with the flexibility and automation of a robot. This means that it is a preferable means for tackling a host of mid-accuracy measuring tasks for which existing solutions are inferior in one or more of accuracy, flexibility and automation. This Robot CMM Arm invention is both automated and accurate. It fits many requirements of the automotive industry for measurement. It is light and relatively low-cost to manufacture. Automated measurement by the Robot CMM Arm is performed more reliably than manual operation of a Manual CMM Arm, because there is not an operator applying forces and torques that make measurement inaccurate. On a production line, the Robot CMM Arm is lower cost to operate than a manual operator operating a Manual CMM Arm, particularly when working a 2 or 3-shift pattern. It is expected that this invention will be deployed as a general purpose measuring tool for a host of applications similar to the general purpose utility of conventional CNC CMMs.

There are two broad measurement applications: reverse engineering and inspection. This Robot CMM Arm invention is applicable to both, but will see greater deployment in inspection applications because Reverse Engineering is a comparatively rare event compared to regular inspection. The following applications are listed by means of example of the utility of this invention. The application of this invention is not limited to the applications listed below.

---

Inspection applications gap and flush measurement for automotive doors
verification of dimensional tolerances
riverbed analysis
VR simulation
tooling inspection
pre-production designs
development of foams
car body inspection on production line
seat inspection on seat production line
interiors of cars in situ
engine components removed and in situ
turbine blades
housings and cowlings
gas tank inspection
glass quality analysis
interior trims
prototype assembly of cars; verifying panel has been manually placed in the correct position
press die
scanning of bridge support
sheet metal components: features
sheet metal components: surface shape
external pipe corrosion measurement and pipe thickness measurement
Reverse Engineering military parts for spares where drawings have been lost
clay styling models for automotive designs
industrial design models
surface reconstruction
model of character or prop for film/broadcast/computer games
animation
precious artworks such as large sculptures, statues and artefacts for archiving, research, reconstruction and conservation
rapid prototyping
detailed objects for which it is too time consuming and arduous to measure manually

---

-continued

Medical breast reconstruction
neurosurgery
radiotherapy
robotic surgery
Other

Haptic Toy for playing with
research
teaching

---

A cell of several Robot CMM Arms is a superior installation to existing rigid structures of static Optical probes on automotive lines. The Robot CMM Arms are more flexible for dynamic reprogramming for different car models going down the line. For optical scanning of a one-off object, a Robot CMM Arm removes hard manual effort from operator and maximises dimensional accuracy by minimising forces on the Internal CMM arm. For applications involving objects that are difficult to access, a gantry is normally built to let the operator measure the object with a Manual CMM arm; often the operator is in an awkward position that cannot be safe and can lead to back strain. Applying this Robot CMM Arm invention will mean that the measuring can be manually controlled using a hand-held control panel. This means that a gantry does not need to be built and the operator does not need to get into awkward, unsafe and unhealthy positions for measuring.

Second Embodiment

Industrial Robot CMM Arm

Figure 53:
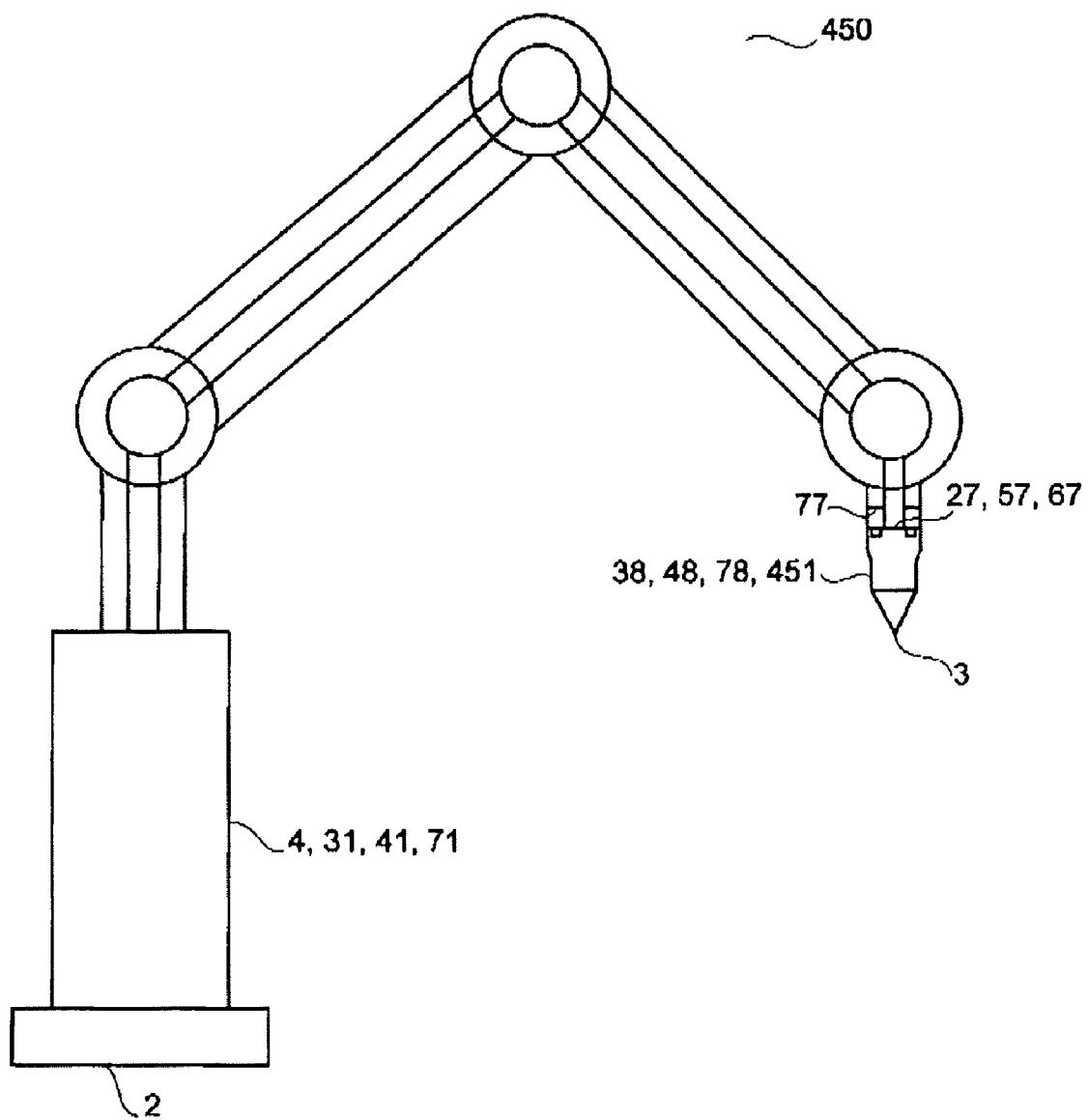
FIG. 53 is a schematic diagram for an Industrial Robot CMM Arm in accordance with a second xembodiment of the present invention.
Figure 54:
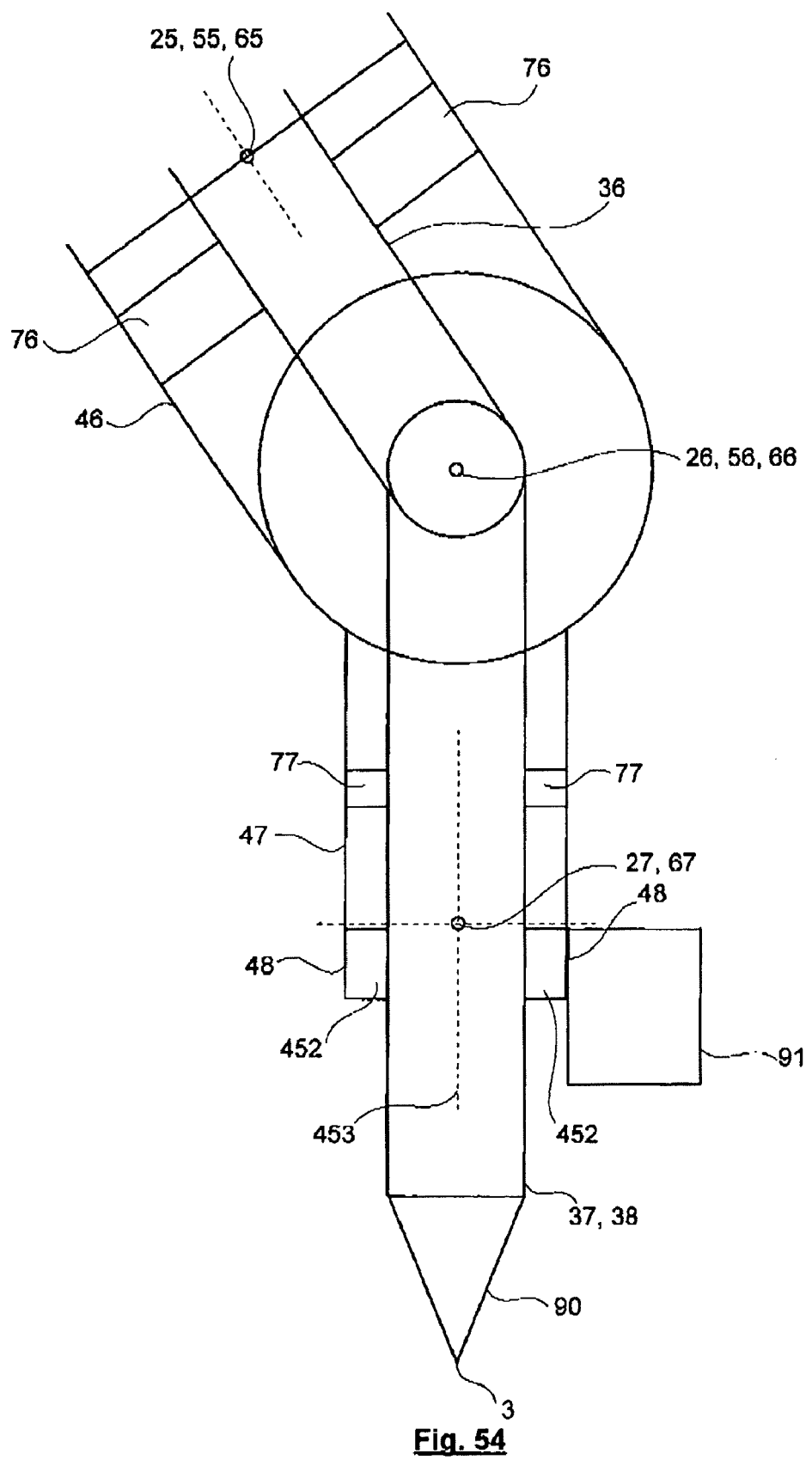
FIG. 54 is a diagram of a hybrid 6/7-axis Industrial Robot CMM Arm.

In this second embodiment, an Industrial Robot CMM Arm is disclosed for providing accurate robot movement. In this second embodiment, there is provided a seven-axis Industrial Robot CMM Arm with a common base Segment1 and a common probe segment8. The common probe segment can carry a heavy probe or tool and be subject to significant force whilst providing accurate position information. The Industrial Robot CMM Arm not only has better repeatability than existing industrial robots, but is also of the order of 10 times more accurate. Referring now to FIG. 53, the Industrial Robot CMM Arm 450 has a common base 4 that comprises CMM Segment1 31, Transmission Means1 71 and Robot Exoskeleton Segment1 41. The Industrial Robot CMM Arm 450 also has a common probe segment8 451 that comprises CMM Segment8 38, Transmission Means8 78 and Exoskeleton Segment8 48. In effect, this provides a Transmission Means8 78 that is rigid. CMM Segments2-7 32-37 of the Industrial Robot CMM arm 450 are connected to Exoskeleton Segments2-7 42-47 by Transmission means2-7 72-77. Transmission means2-7 72-77 are preferably not rigid as disclosed in the first embodiment. The main difference between the Portable Robot CMM Arm 1 of the first embodiment and the Industrial Robot CMM Arm 450 of this second embodiment, is that the TransmissionMeans8 78 of the Portable Robot CMM Arm 1 is not rigid and the TransmissionMeans8 78 of the Industrial Robot CMM Arm 450 is rigid. Referring now to FIG. 54, in a further embodiment of this second embodiment, the Industrial Robot CMM Arm 450 has two probes 90 and 91. It is provided in a hybrid six/seven-axis format with Probe 90 being positioned utilising 6 axes of rotation and Probe 91 being positioned utilising 7 axes of rotation. CMM Segment7/8 37/38 is a rigid unit that does not have a joint within it. The Probe 90 is an axially symmetric probe such as a solid probe or a touch trigger probe whose measuring action is largely independent of the radial direction of that action. This means that for the Probe 90 to be operable, it does not need the last joint before it to be an axially rotational joint. The Probe 90 has six CMM Joints1-6 51-56 between it and the base end 2 of the Industrial Robot CMM Arm 450. The Optical Probe 91 is rigidly attached to the Exoskeleton Segment8 48 after Exoskeleton Joint7 67. The Optical Probe 91 is preferably a Stripe probe 97. The measuring action of the Probe 91 depends both on its orientation relative to the arm and the radial direction of movement. This means that for the Probe 91 to be easily operable, it needs the last joint before it to be an axially rotational joint. The Optical Probe 91 has seven Exoskeleton Joints1-7 61-67 between it and the base end 2. A Exoskeleton bearing 452 between CMM Segment7/8 and Exoskeleton Segment8 48 permits axial rotation. The Probe 91, mounted on Exoskeleton Segment8 48 rotates on the seventh axis around the centre line 453 of the single CMM Segment7/8 37/38, driven by a motor 176. The Exoskeleton bearing 452 acts as a rigid Transmission Means 78 for transmitting force axially along the centre line 453, radial force normal to the centre line 453 and torque across the bearing in any non-rotating direction.

As will be understood by an expert in the field, this Industrial Robot CMM Arm 450 second embodiment can be provided in a variety of additional embodiments other than those described in this second embodiment, all of which have the same technical effect of this invention and the scope of this Industrial Robot CMM Arm 450 second embodiment is not limited to the embodiments disclosed above. For example, this second embodiment can be provided in a six axis format similar to that of FIG. 1A, but with a common probe segment8. In the case of the embodiment of FIG. 54, this second embodiment can be provided in a hybrid five/six axis format similar to that of FIG. 1A, but with a Exoskeleton bearing 452.

Robustness and Materials

The Exoskeleton 6 of the Industrial Robot CMM Arm 450 is stiff, strong and robust. It is built for high acceleration and to position to a high repeatability. From time to time, in complex environments such as car production lines, industrial robots accidentally collide with car bodies. Industrial robots are built to survive such collisions, with the car body suffering the damage. The Exoskeleton 6 of the Industrial Robot CMM Arm 450 is capable of surviving a collision with a car body on an automotive production line without having to be replaced or undergo significant repair. The materials used for the Exoskeleton 6 of the Industrial Robot CMM Arm 450 are similar to those used in industrial robots on automotive production lines. Aluminium castings are used for most segments. Compared to the Portable Robot CMM Arm 1, the drive systems of the Industrial Robot CMM Arm 450 are much more powerful to drive the higher mass of the Exoskeleton 6 and perform the higher accelerations required by the application. The Internal CMM Arm 5 of the Industrial Robot CMM Arm 450 is constructed in a similar way to the Internal CMM Arm 5 of the Portable Robot CMM Arm 1.

Thermal Environment

It is an object of this second embodiment, that The Industrial Robot CMM Arm 450 can be operated accurately from the moment that it is switched on and under a wide range of static and dynamic thermal conditions. The Industrial Robot CMM Arm 450 will be placed in production environments. The temperature of such production environments is not controlled precisely, if the temperature is controlled at all. The temperature could vary both by large amounts in excess of 15 C but also at steep temperature gradients in excess of 5 C per hour. In addition, the drive systems of the Industrial Robot CMM Arm 450 generate substantial heat. The Industrial Robot CMM Arm 450 takes of the order of one hour of operation to warm up and achieve thermal stability. Referring back to FIG. 13, the air 192 flow rate will be much more than for the Portable Robot CMM Arm 1; the filter 191 will be larger to accommodate the higher air 192 flow rate and will be better able to clean the dirtier air 192 from the production environment. In a separate embodiment, the air 192 can be recirculated internally and a combined heat exchanger and cooling unit provided in the base to cool it down; this prevents the ingress of dirt into the space between the Exoskeleton 6 and the Internal CMM Arm 5. The air 192 circulation will remove hot spots on the Internal CMM Arm 5 during the warm-up cycle and in continuous operation. The Internal CMM Arm 5 of the Industrial Robot CMM Arm 450 can thereby maintain its accuracy in this thermal environment. This means that, the Industrial Robot CMM Arm 450 maintains high accuracy from the moment it is switched on, throughout the warm-up cycle, under both light and heavy duty cycles and for all static and dynamic temperatures found in typical production environments.

Application

As discussed in the Background to this invention, industrial robots are repeatable but not accurate; this means that there are many potential applications for industrial robots that require accuracy that are not currently implemented because industrial robots are not accurate enough. The Industrial Robot CMM Arm 450 is accurate enough, repeatable enough and robust enough to satisfy the requirements of many of these applications. It is a further object of this second embodiment, that the Industrial Robot CMM Arm 450 can have both a Probe 90 and a Tool 98 mounted on common probe segment8 451. This means that a dual use cycle is provided in which the Industrial Robot CMM Arm 450 carries out work using the Tool 98 and measurement using the Probe 90 during a cycle. It is also a further object of the first embodiment, that the Portable Robot CMM Arm 1 can have a Tool 98 mounted on the Exoskeleton 6 and a Probe 90 mounted on the Internal CMM Arm 5. This means that a dual use cycle is provided in which the Portable Robot CMM Arm 1 carries out work using the Tool 98 and measurement using the Probe 90 during a cycle. This means that at a workstation, the Robot CMM Arm can both carry out a task and measure the result of said task, or carry out a task in one location and measure in another location. This also means that the accuracy of a Robot carrying out a task with a Tool 98 is increased by an order of magnitude over what has been done before. The Exoskeleton 6 of the Industrial Robot CMM Arm 450 is powerful enough to manipulate the tools required by the application. It is stiff, with high repeatability. It has powerful drive systems permitting large accelerations. It has a similar design specification to current ranges of industrial robots, excepting that due to this invention the Industrial Robot CMM Arm 450 is in the order of 10 to 100 times more accurate than an industrial robot. The Internal CMM Arm 5 of the Industrial Robot CMM Arm 450 is similar to that of the first embodiment, except that it is capable of sustaining larger accelerations acting upon it through the Transmission means 10 between the Exoskeleton 6 and the Internal CMM Arm 7.

Global Coordinate System

Figure 55:
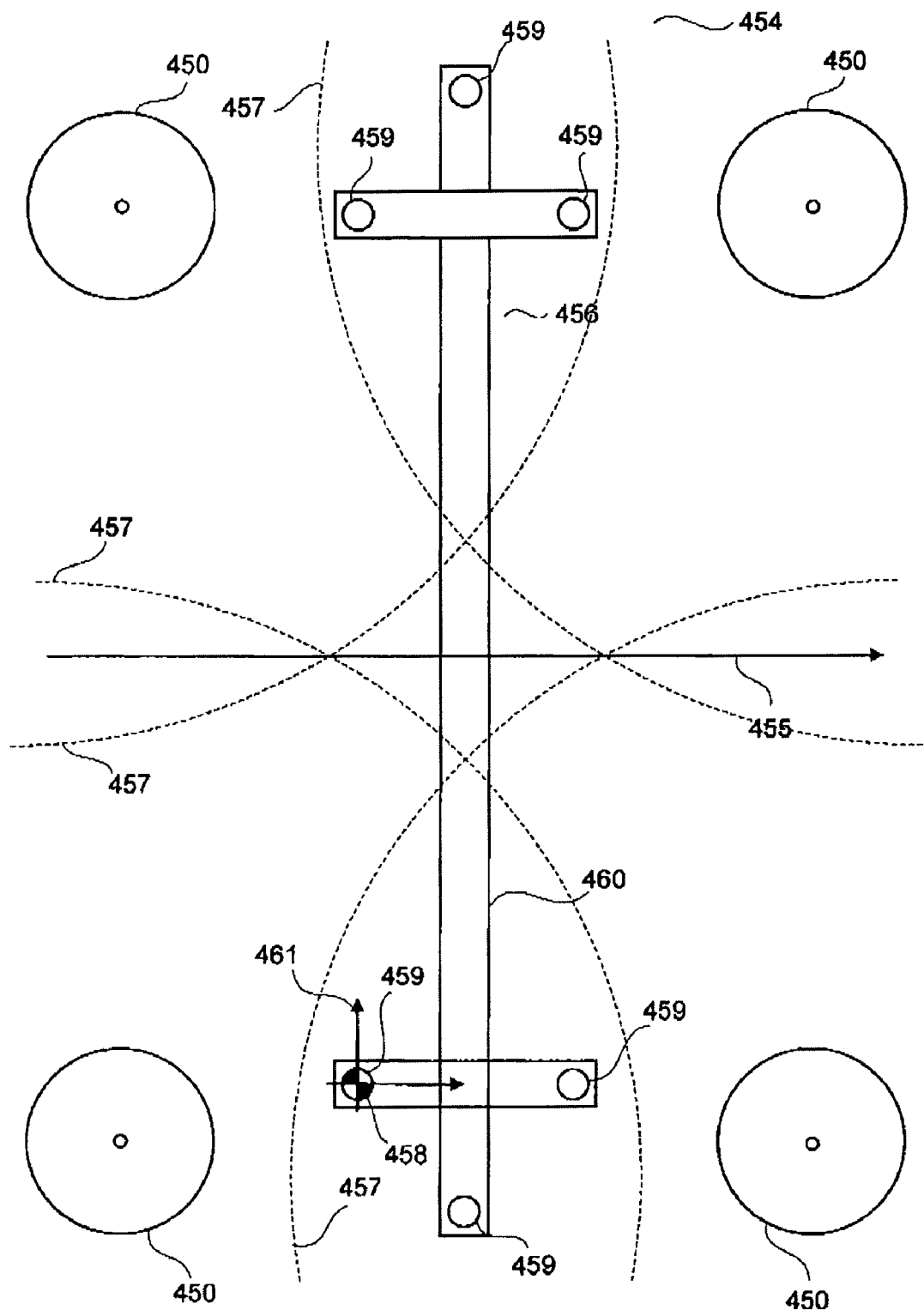
FIG. 55 is a schematic of a global coordinate system artefact in a multiple Robot CMM Arm cell.

For the case where two or more Industrial Robot CMM arms 450 are working together on a common object 9, it is useful to provide a Global Coordinate system 461 to which the Robot CMM Arm coordinate systems 363 can be referenced. One means of providing such a Global coordinate system is by providing a Global coordinate system artefact. Referring now to FIG. 55, four Industrial Robot CMM Arms 450 are situated in a cell 454 on a production line 455. A Global coordinate system artefact 456 is provided comprising two sets of three measurement spheres 459 on a rigid artefact structure 460 with a Global Coordinate System reference point 458 for the Global Coordinate system 461. The reach 457 and location of each Industrial Robot CMM Arms 450 is such that each Industrial Robot CMM Arms 450 can measure at least one set of three measurement spheres 459 and thereby reference its Robot CMM Arm coordinate systems 363 to the Global Coordinate system 461. The scope of this invention is not limited to the provision of a Global coordinate system 461 by providing a Global coordinate system artefact 456. As will be understood by a person skilled in the field, a Global coordinate system 461 can be provided by many means and methods. For instance, a laser tracker can be used. This invention includes any means of providing a Global coordinate system.

Methods

Whereas the Portable Robot CMM Arm 1 of the first embodiment is best suited to measurement, the Industrial Robot CMM Arm 450 of this second embodiment is suited to both accurate robot operation involving a tool carried by the robot in an industrial environment and measurement. A method comprises one or more steps. Control Software 382 executes the methods. General methods are disclosed in which this second embodiment can be used. The exemplary methods already described for the Robot CMM Arm 1 are available for the Industrial Robot CMM Arm 450. The following additional exemplary methods are provided in the Control Software 382 for using the Industrial Robot CMM Arm 450:

Datum referencing a feature: the control software 382 references the Industrial Robot CMM Arm coordinate system 363 to an Object feature coordinate system 362 feature Global referencing: the Industrial Robot CMM Arm coordinate system 363 to a Global coordinate system 461

Probe referencing: the control software 382 references the Industrial Robot CMM Arm coordinate system 363 to the measuring probe coordinate system 364 of a probe 90

Automatic tool change: the control software 382 organises an automatic tool change for the Tool 98 on the Industrial Robot CMM Arm 450; this is used when an automatic tool change system is provided with the Industrial Robot CMM Arm 450

Tool referencing: the control software 382 references the Industrial Robot CMM Arm coordinate 363 system to the tool coordinate system 364 of a tool 98; this is used for example after a tool has been changed Processing: the control software 382 carries out a process on an object 9 using a tool 98

Adjusting tool offsets: the control software 382 adjusts the tool coordinate system 364 of a tool 98

Figure 56:
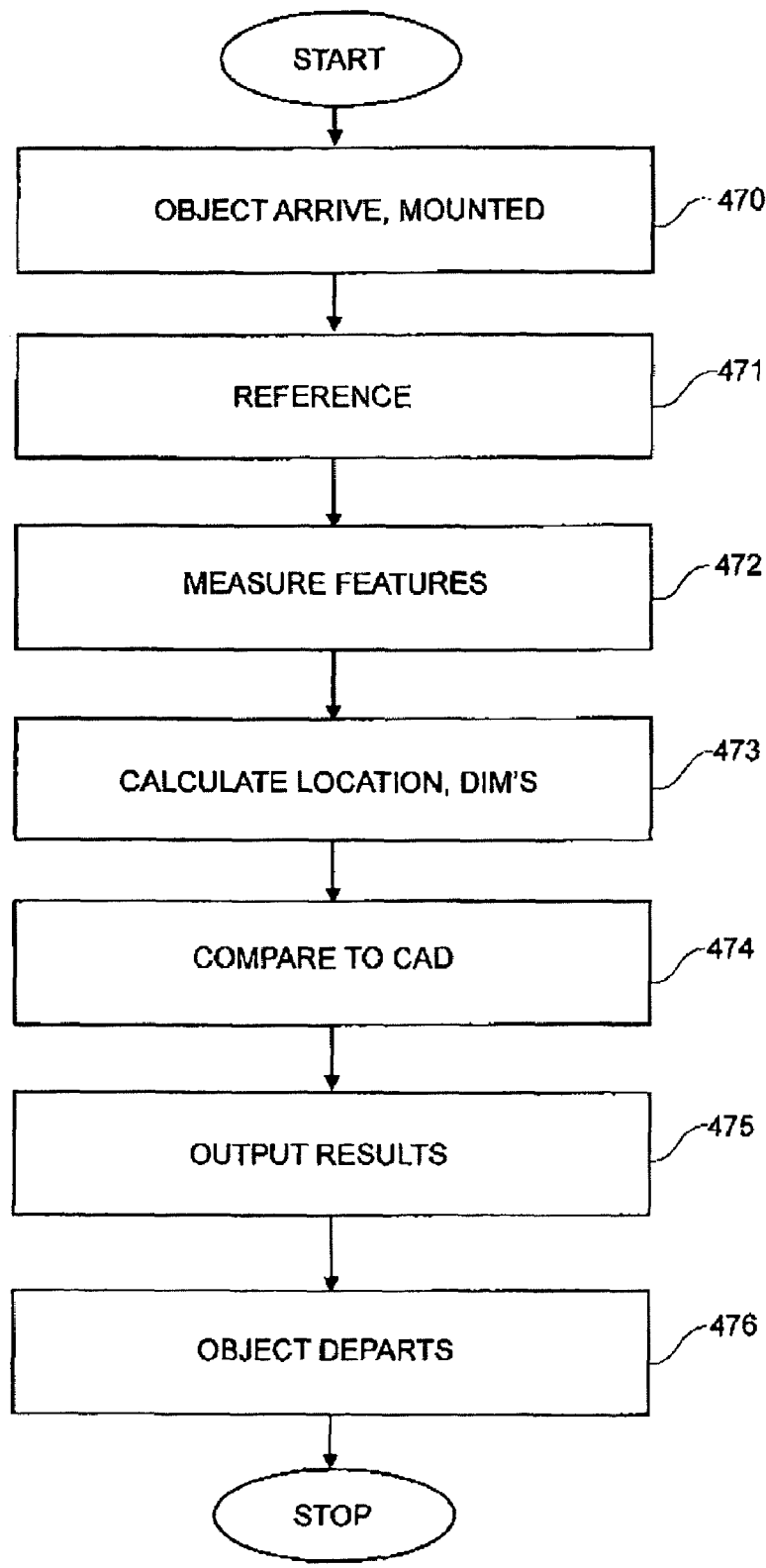
FIG. 56 is a flow diagram of a feature inspection process.

Handling: object transport to and from the Industrial Robot CMM Arm location; there are many means of handling objects including but not limited to: transport on a production line; transport by conveyor whilst on pallets; manual loading by an operator Mounting: objects can be mounted before undergoing other Industrial Robot CMM Arm operations; mounting can either be repeatable or non-repeatable; mounting can be rigid to withstand operation forces without the object moving or mounting can be simply at rest for optical inspection; in general, the Industrial Robot CMM Arm has a high flexibility of movement and the object need only be mounted in one location to provide access for the remaining operations; there are many means of mounting objects at the location including, but not limited to: non-repeatable placement of object on a surface; locking object to a pallet and pallet-locking at the location; object mounted on a production line; object mounted in a fixture Feature Inspection Method Referring now to FIG. 56, in a first step 470, the object 9 arrives at a location and is mounted within the reach of the Industrial Robot CMM Arm 450. In step 471, the Industrial Robot CMM Arm coordinate system 363 is referenced to the Object coordinate system 361. This step is not necessary if the object 9 is mounted in a precision fixture at a known location and orientation relative to the Industrial Robot CMM Arm. In step 472, the probe 90 on the Industrial Robot CMM Arm 450 measures one or more features 365 on the object 9 according to a measurement program 389. In step 473, the location and or dimensions of each feature 365 are calculated from the measurement data gathered during Step 472. In step 474, the locations and dimensions of each feature 365 are compared to the design locations and dimensions of each feature 365 and their tolerances, usually in the form of a CAD model and an inspection program. If the referencing process of Step 471 involves measuring features on the object 9, then Step 471 can be completed simultaneously as part of this step. In step 475, measuring results are output. In step 476, the object 9 departs from the location.

Surface Inspection Method

Figure 57:
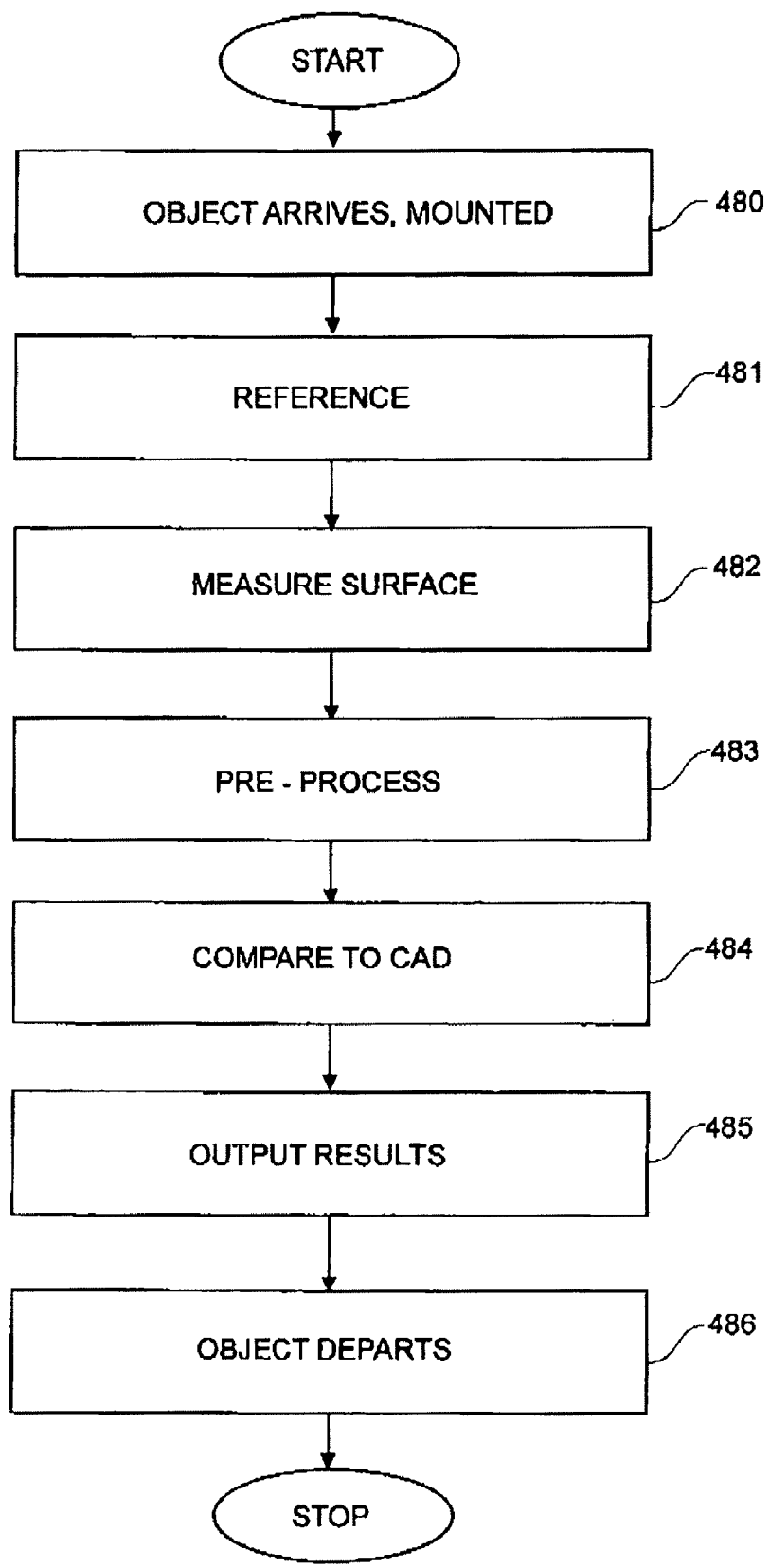
FIG. 57 is a flow diagram of a surface inspection process.

Referring now to FIG. 57, in a first step 480, the object 9 arrives at a location and is mounted within the reach of the Industrial Robot CMM Arm 450. In step 481, the Industrial Robot CMM Arm coordinate system 363 is referenced to the Object coordinate system 361. In step 482, the probe 90 on the Industrial Robot CMM Arm 450 measures the surface of the object 9 according to a measurement program 389. In step 483, the surface measurement data gathered during Step 482 is pre-processed. In step 484, the pre-processed surface measurement data of object 9 is compared to the design surface. In step 485, measuring results are output. In step 486, the object 9 departs from the location. An example of the applicability of this method is in a crankshaft inspection cell. An unmachined crankshaft is inspected against the CAD design to verify whether the crankshaft made in the forming process is within tolerance.

Tool Operation Method

Figure 58:
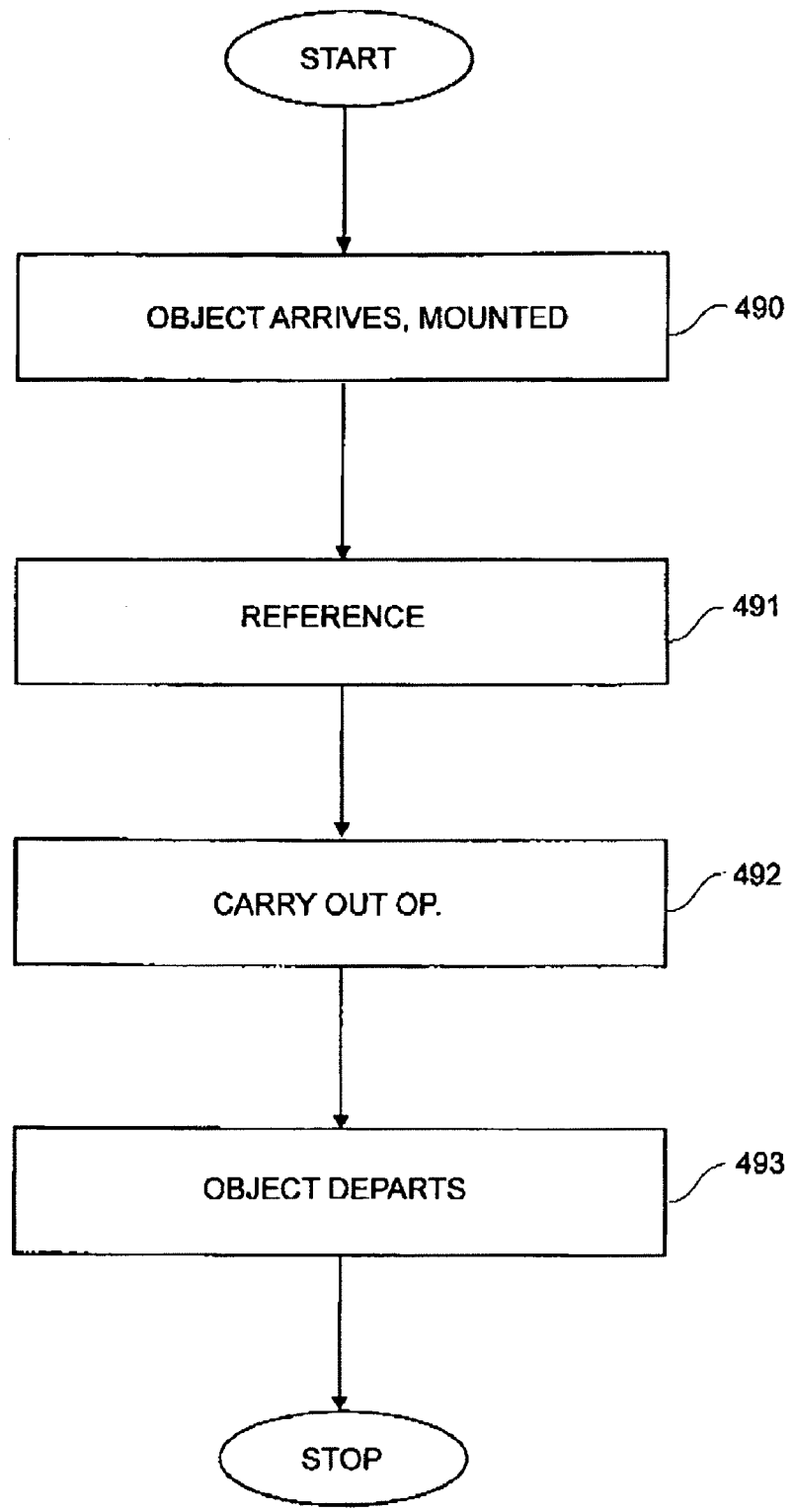
FIG. 58 is a flow diagram of a tool operation process.

Referring now to FIG. 58, in a first step 490, the object 9 arrives at a location and is mounted within the reach of the Industrial Robot CMM Arm 450. In step 491, the Industrial Robot CMM Arm coordinate system 363 is referenced to the Object coordinate system 361. In step 492, the tool 98 on the Industrial Robot CMM Arm 450 carries out an operation on the object 9 according to a robot program 389. The Industrial Robot CMM Arm 450 carries out the operation, using the known transformation between the tool coordinate system 364 and the Industrial Robot CMM Arm coordinate system 363. In step 493, the object 9 departs from the location.

Operation Inspection and Tool Adjustment Method

Figure 59A:
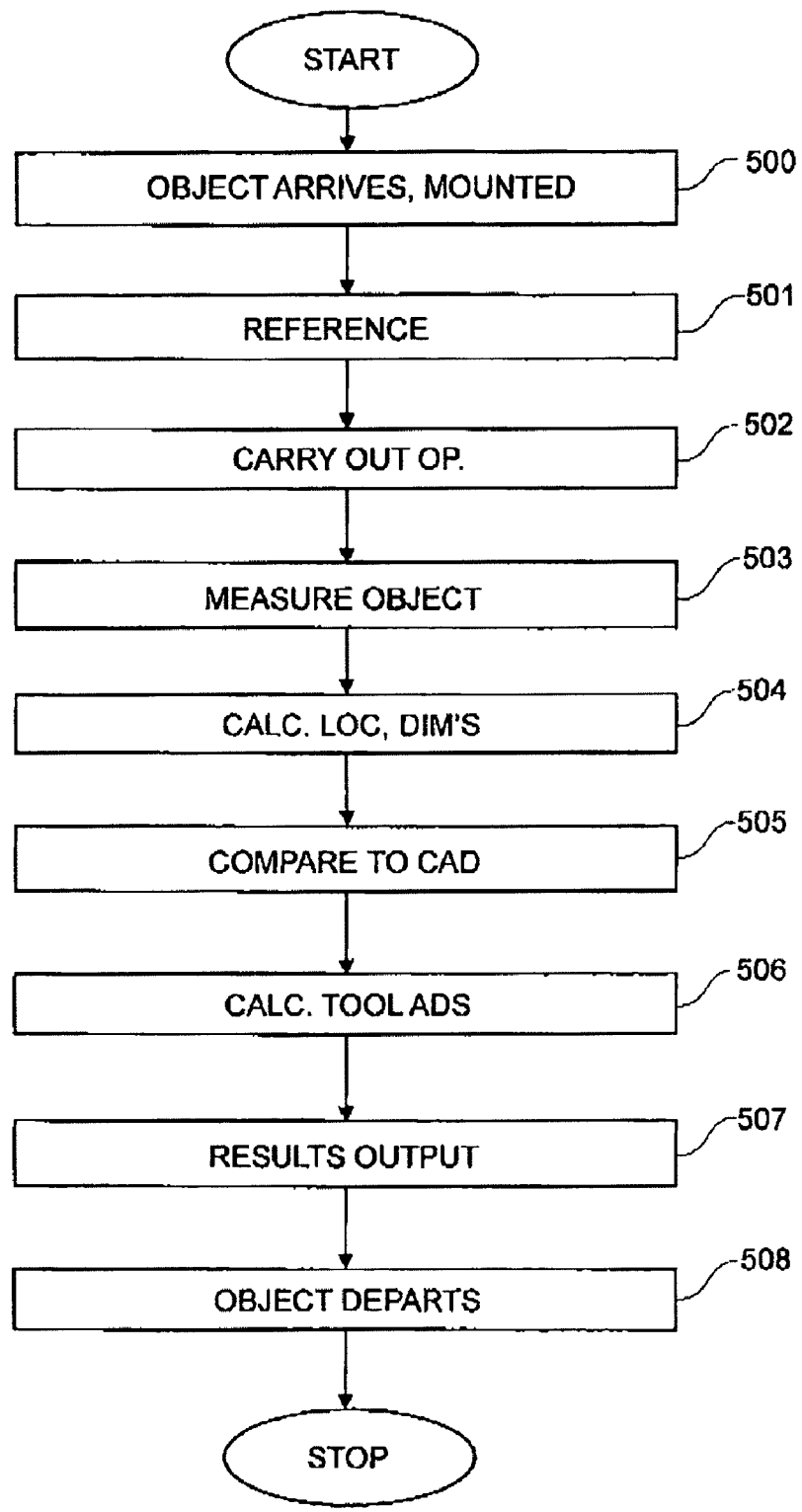
FIG. 59A is a flow diagram of an inspection and tool adjustment process.

This method requires at least one Tool 98 and one Probe 90 to be mounted on the Industrial Robot CMM Arm 450. Referring now to FIG. 59A, in a first step 500, the object 9 arrives at a location and is mounted within the reach of the Industrial Robot CMM Arm 450. In step 501, the Industrial Robot CMM Arm coordinate system 363 is referenced to the Object coordinate system 361. In step 502, the tool 98 on the Industrial Robot CMM Arm 450 carries out an operation on the object 9 according to a robot program 389. In step 503, the probe 90 on the Industrial Robot CMM Arm 450 measures one or more processed features 365 on the object 9 and or the surface of the object 9 according to a measurement program 389. In step 504, the location and or dimensions of each processed feature 365 are calculated, and or surface pre-processing takes place from the measurement data gathered during Step 503. In step 505, the locations and dimensions of each processed feature 365 and or the surface are compared to the design locations and dimensions of each processed feature 365 and their tolerances. In step 506, a tool adjustment is calculated from the results of Step 505 and the adjustment is used to adjust the tool coordinate system 364. The adjustment of the tool coordinate system 364 can be carried out on a statistical trend basis based on a statistically significant number of identical operations to identify and quantify any drift in error. In step 507, measuring results are output. In step 508, the object 9 departs from the location. This method can be used in three exemplary modes, but is not limited to these three modes:

inspection only (skip Step 506)
tool adjustment only (skip Step 507)
inspection with tool adjustment (as per Steps 500-508 inclusive)

It will be appreciated by a person skilled in the art, that there are many other methods that can be employed for using the Industrial Robot CMM Arm 450 to measure and carry out operations to a much higher accuracy than is currently achievable and that the methods hereby disclosed are exemplary of all methods that can be employed for using the Industrial Robot CMM Arm to measure and carry out operations to a much higher accuracy than before.

Production Line

The Industrial Robot CMM Arm 450 can be installed as a single unit at any suitable location on a production line, or a number of Industrial Robot CMM Arms 450 can be installed together in a cell or in several cells to accomplish a measuring task. An example is on an automotive production line. In general, cars on production lines move at a known and steady rate; however, accuracy is reduced when a moving object is measured. It is therefore preferable to construct a cell in which the car is static for the duration of the measuring cycle. Such a cell can alternatively be placed adjacent to the production line and sample a proportion of the objects being made. Typical production line measurement applications include: body-in-white, motor compartment, rear compartment, underbody and panel fixing. Typical features inspected include: edge and surface location, hole location, slot location, gap and flush measurements. Surface shape is also inspected. A production line will typically have a production line control system that initiates cycles of operation in cells on the production line. The one or more Industrial Robot CMM Arms 450 in the cell can be interfaced to the production line control system by any of the ways known to those skilled in the trade. The Control PCB 172 in the Industrial Robot CMM Arm 450 can receive signals and information and return signals and information. Signals and information from the production line control system to an Industrial Robot CMM Arm 450 typically includes by way of example: start cycle; emergency stop cycle; use program number XXX; program XXX itself; return measurements YYY; control parameters; status request. Signals and information from an Industrial Robot CMM Arm 450 to the production line control system typically include by way of example: status report; measurements; measurement reports; feedback control parameters.

The Industrial Robot CMM Arm 450 will usually be hard-wired into the emergency stop circuit for the production line. Measurements and feedback control parameters from an Industrial Robot CMM Arm 450 can be used to feed forward data to control or adaptively control other processes downstream on the production line. The demands of measurement on a flexible production line regularly require Industrial Robot CMM Arms 450 with reaches in excess of 2 m and occasionally in excess of 3 m. It is preferable that the Industrial Robot CMM Arm 450 has a minimum of 6 axes for flexibility in enabling access to the locations being measured. It is preferable that the Industrial Robot CMM Arm 450 can accelerate quickly to move between locations in the shortest possible time. Industrial Robot CMM Arms 450 have flexibility, agility and a relatively small footprint on the floor. Industrial Robot CMM Arms 450 can therefore be installed within an operation cell on a production line alongside and/or in-between production elements. Care must be taken that collision between the Robot CMM Arm and other items does not take place. This means that Industrial Robot CMM Arms 450 can be inserted in most locations along the production line and do not use up precious space as dedicated measurement cells in the production line. Industrial Robot CMM Arms 450 measure with high accuracy and can be located alongside or just upstream of operational elements such as welding robots. One or more operational elements can receive feedback data from one or more Industrial Robot CMM Arms 450 and thereby perform a more accurate operation that is adapted to the actual measured position of an object such as a sheet metal item. This means that more efficient processes that are quicker, better or cheaper but require higher accuracy can be deployed on the production line.

Component Adjustment Method

Figure 59B:
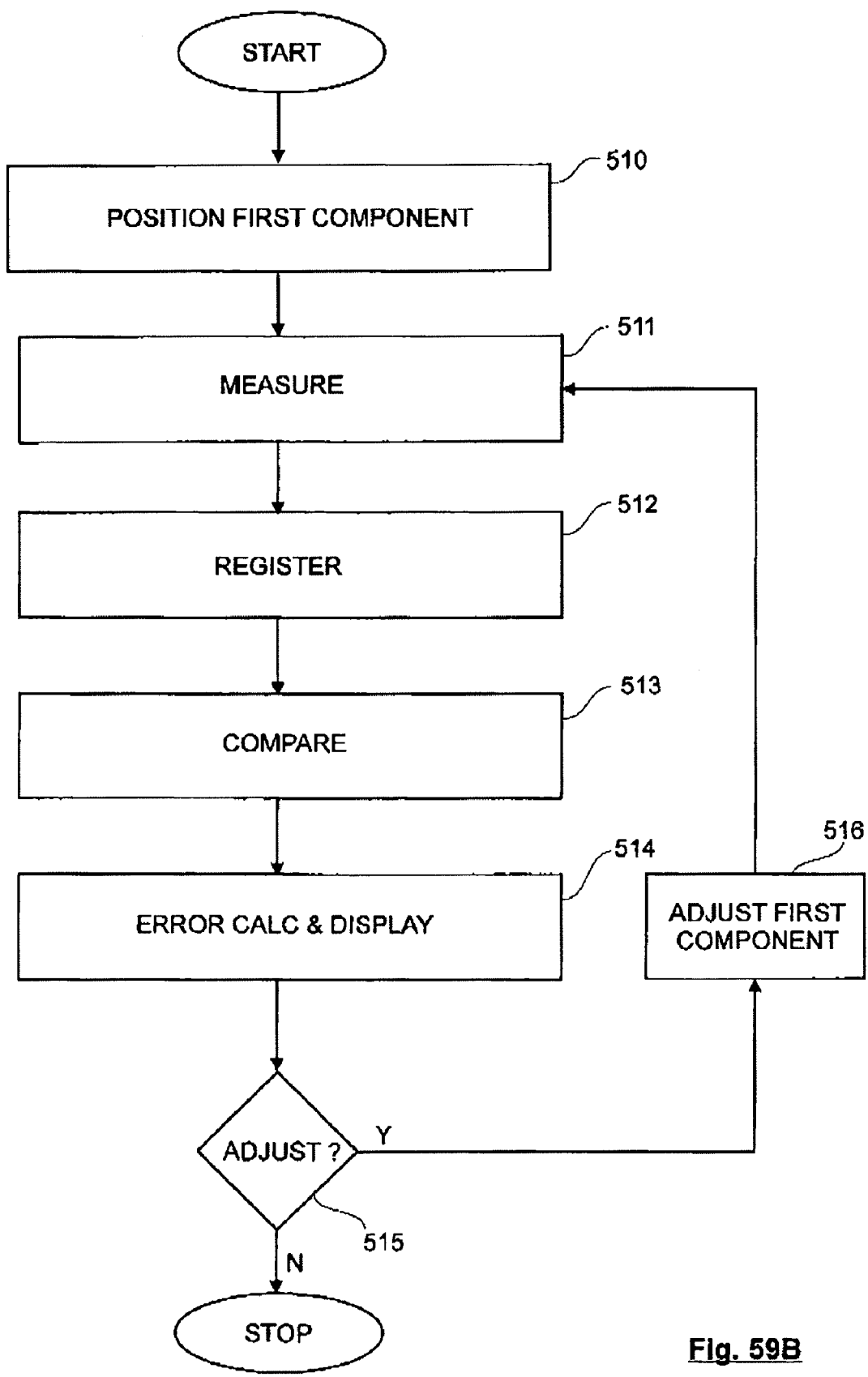
FIG. 59B is a flow diagram of a component adjustment process.

Industrial Robot CMM Arms 450 are particularly suited to the prototype production process in which typically 200-250 prototypes of a new car model are made. Due to the availability of integrated high accuracy measurement by the Industrial Robot CMM Arm 450 at a production cell, it becomes possible to change the approach to prototype tooling and/or to improve the accuracy of existing approaches. For example, by feeding back errors in the positioning of a sheet metal component prior to its welding or bonding, the sheet metal component can be adjusted either manually or automatically until it is in the correct position. This means that the Robot CMM Arm invention can thus save large investments in precision prototype production tooling by allowing simpler tooling to be used. A novel component adjustment method is disclosed. Referring now to FIG. 59B, in a first step 510, a movable first component is manually positioned by an operator relative to a second component. In step 511, the Industrial Robot CMM Arm 450 captures measurement data on the positions and orientations of the first component and the second component. In step 512, the measurement data from the second component is registered to a CAD model of the second component. In a step 513, the measurement data from the first component is compared to a CAD model of the first component; the CAD model of the first component is in the same coordinate system as the CAD model of the second component and the CAD model of the first component is located in the ideal design position relative to the CAD model of the second component. In step 514, the errors in the actual position and orientation of the first component from the ideal CAD position and orientation of the first component are calculated and displayed in such a way to provide useful information that may be acted upon by an operator. In step 515, the manual operator uses the displayed errors to decide either to further manually adjust the position and or orientation of the first component and goes to the first step or that the first component is well positioned and to stop. In step 516, the manual operator uses the displayed errors to manually adjust the position and or orientation of the first component; this seventh step is followed by going to the second step of this method. It will be appreciated by a person skilled in the art, that there are many other manual and automated methods that can be employed for using the Industrial Robot CMM Arm 450 to aid the positioning of a first component relative to a second component to a much higher accuracy than is currently achievable and that the methods hereby disclosed are exemplary of all methods that can be employed for using the Industrial Robot CMM Arm 450 to aid the positioning of a first component relative to a second component to a much higher accuracy than before. In an alternative embodiment, steps 510, 515 and 516 can be automated such that the whole component adjustment process is automated.

Body Repair Method

Industrial Robot CMM Arms 450 are suited to the car body repair process following an accident in which the car body is distorted. Industrial Robot CMM Arms 450 are firstly deployed in a diagnosis operation to quantify how distorted the car body is and to decide which components need replacing and corresponds to Steps 511-514. Industrial Robot CMM Arms 450 are used after each corrective process such as stretching, bending to measure the remaining error from the ideal shape; this corresponds to steps 511-516. Industrial Robot CMM Arms 450 are used during each replacement process in which a new component such as a car body panel replaces a damaged one to aid the correct alignment of that new panel; this corresponds to all the steps 510-516 of the component adjustment method. The diagnosis operation, corrective process and replacement process are specific examples of applications of the component adjustment method. The scope of this invention is not limited to the repair of car bodies but is applicable to the repair of any object of complex shape. This invention is applicable to repairing objects made entirely of one component or objects made of more than one component.

Processing Machine

Referring again to FIG. 7J, the Industrial Robot CMM Arm 450 can be mounted on or adjacent to one or more processing machines 137. In the case when two or more processing machines 137 form a production line, measurement and pass/fail inspection of objects 9 between high-value operations can reduce the wastage value % of the production line. Furthermore, the Industrial Robot CMM Arm 450 can provide the dual functions of measurement and material handling. In some applications, the Industrial Robot CMM Arm 450 can provide three operations: a measurement operation, a material processing operation with a tool and a material handling operation. An example application for an Industrial Robot CMM Arm 450 is in a turbine blade production line. The speed and precision of optical measurement by an Industrial Robot CMM Arm 450 can render this application cost effective compared to manual inspection.

Advantages of Deploying the Robot CMM Arm Invention on a Production Line

The following advantages are provided by way of example and the advantages of deploying the Robot CMM Arm invention on a production line are not limited to these advantages:

1. Robot CMM Arms can be installed in existing cells, where permitting, anywhere along the line and not just in a dedicated cell using up production line space
2. Robot CMM Arms can inspect surfaces and feed forward data to a subsequent process
3. Robot CMM Arms can inspect surfaces and feed back data after or during a process
4. Robot CMM Arms can increase the accuracy of processes such as joining
5. Robot CMM Arms can facilitate reducing the changeover time between products
6. Robot CMM Arms can become a common tool on production lines globally with all the advantages to production agility of standardisation of processes and tools
7. Robot CMM Arms can provide a more accurate set up of items before a joining process, enabling a more accurate joining process to be used
8. Robot CMM Arms can provide more accurate methods for assembly of a variety of tools, components in many industries including automotive and aerospace by example
9. Robot CMM Arms can provide real-time feedback loops to manual operators adjusting a component's location prior to another process
10. Robot CMM Arms can provide real-time feedback loops to movable members for automatic adjustment of a component's location prior to joining or another assembly process
11. Robot CMM Arms can automatically datum to a production line datum
12. Robot CMM Arms can automatically datum to the object reference datums such as to the car bodyline coordinate system at the cell
13. Robot CMM Arms can datum to each other in a common coordinate system
14. Robot CMM Arms can integrate with a production line control system
15. Robot CMM Arms can enable the deployment of different tooling approaches giving advantages such as lower tooling investment, increased process speed, increased product quality and increased process accuracy
16. Robot CMM Arms can improve the main production line process and the prototype production process
17. Robot CMM Arms can eliminate the need for check fixtures for automotive panels
18. Robot CMM Arms can eliminate human error
19. Robot CMM Arms are only slightly more expensive to manufacture than industrial robots, but provide additional value in excess of their additional cost.
20. Robot CMM Arms increase the accuracy of processes permitting more efficient processes to be used with less accurate tooling and saving room on the production line compared to having two stations.
21. A single Robot CMM Arms can handle one or more of the following operations: measurement, materials processing, materials handling; this provides additional utility over a robot that is not able to measure accurately.

Milling Machine

It is a purpose of this embodiment to provide an Industrial Robot CMM Arm 450 that is able to mill a complex shape. Standard CNC control systems are used to ensure path following with low error. Machining paths are generated from standard 7-axis CAD software packages. Precise position feedback from the CMM encoders 178 is used to calculate an accurate 6 DOF position and orientation and close the loop with the desired 6 DOF position and orientation, as is well known to those skilled in the art. This means that the Industrial Robot CMM Arm 450 is able to mill the complex shape more accurately than a standard industrial robot. The main advantage is that the machining errors of the Industrial Robot CMM Arm 450 will typically be an order of magnitude less than those of an industrial robot. Another advantage of using the Industrial Robot CMM Arm 450 for milling is that it eliminates the need for a further hand finishing operation where roughness such as steps due to inaccurate passes are smoothed manually. A further advantage is that the Industrial Robot CMM Arm 450 is able to mill complex shapes such as a large spherical form that could not be milled by a machining centre or a horizontal arm CMM. It is expected that the Industrial Robot CMM Arm 450 will find applicability in a broad range of industries for accurate machining of complex shapes.

Third Embodiment

In this third embodiment, an Actively Supported Robot CMM Arm is disclosed that has substantially reduced forces and moments acting on the joints and segments of the Internal CMM Arm 5 in all the spatial layouts to which it can be moved.

Forces and Moments on the Robot CMM Arm of the First Embodiment

At some spatial layouts of the Robot CMM Arm 1, there are significant loads on the Internal CMM Arm 5 such that the provided arrangement of seven motors 176 that act through the seven Exoskeleton Joints 1-7 61-67 of the Exoskeleton 6 do not provide sufficient control outputs to reduce these loads. In some spatial layouts, all the weight of the following segments of the Internal CMM Arm 5 acts on a joint. For example, when the Internal CMM Arm 5 is in a vertical spatial layout, the combined weight of CMM Segments2-8 32-38 bears directly down onto CMM Joint1 51. Similarly, the combined weight of CMM Segments3-8 33-38 bears directly down onto CMM Joint2 52 and similarly for CMM Joint3 53 to CMM Joint7 57 up the arm. The seven drive systems in the Exoskeleton cannot compensate for this loading on the bearings in the CMM joints. For CMM Joints1,3,5,7 51, 53, 55 and 57 that have an axial arrangement, when the Internal CMM Arm 5 is in a vertical spatial layout, the loading on these CMM Joints is through the axis of the axial CMM Joint. For CMM Joints2,4,6 52, 54 and 56 with an orthogonal arrangement, when the Internal CMM Arm 5 is in a vertical spatial layout, the loading on these CMM Joints is orthogonal to the axis of the orthogonal CMM Joint. In any spatial location of the Robot CMM Arm 1, a network of non-zero forces and non-zero moments act on the Internal CMM Arm 5 from the Exoskeleton 6, whether the Robot CMM Arm 1 is stationary or moving. These forces and moments reduce the accuracy of the measurements of the Robot CMM Arm 1 by straining the joints and segments of the Internal CMM Arm 5.

Actively Supported Robot CMM Arm

The Actively Supported Robot CMM Arm of this third embodiment comprises Strain Gauges to sense the forces and moments on the Internal CMM Arm 5 and Active Transmission Means with Active Support Control Software to counteract the forces and moments on the Internal CMM Arm 5. This means that the accuracy of the Actively Supported Robot CMM Arm is greater than that of a Robot CMM Arm 1 or an Industrial Robot CMM Arm 450 with the same reaches as the Actively Supported Robot CMM Arm. Furthermore, the reach over which the Actively Supported Robot CMM Arm can operate to a certain specified accuracy is increased compared to both the Robot CMM Arm 1 of the first embodiment and the Industrial Robot CMM Arm 450 of the second embodiment.

Figure 60:
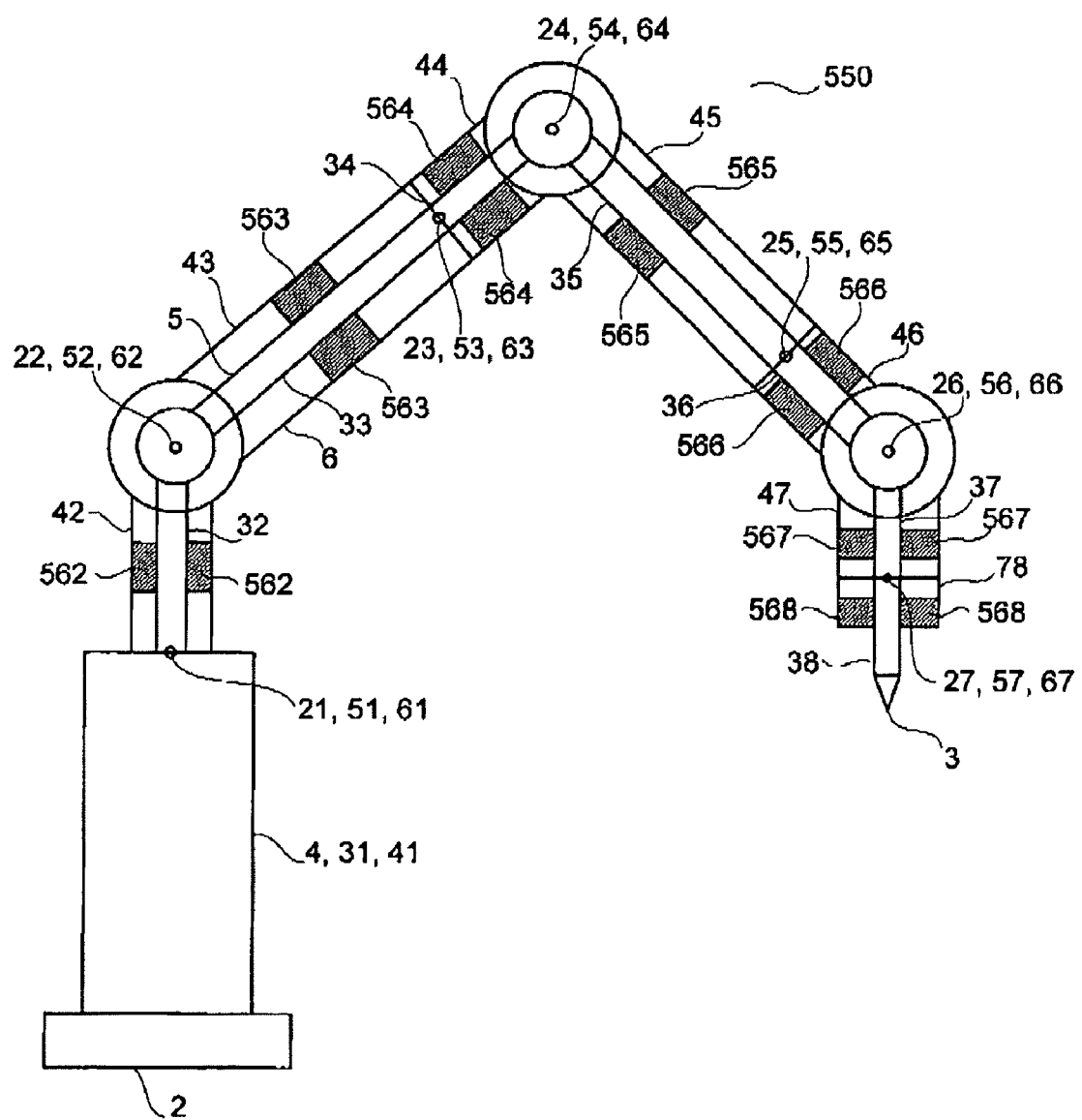
FIG. 60 is a schematic diagram of an Actively Supported Robot CMM Arm in accordance with a third embodiment of the present invention.

Referring now to FIG. 60, the Actively Supported Robot CMM Arm 550 comprises Active Transmission Means2-8 562-568 situated between the Exoskeleton 6 and the Internal CMM Arm 5. Strain gauges 181 are attached to the Internal CMM Arm 5 as previously disclosed and shown in FIG. 41E.

Active Transmission Means

Each Active Transmission Means2-8 562-568 provides one drive direction through TransmissionMeans2-8 72-78 respectively as previously disclosed in the first embodiment and one or more active Support directions to actively support the weight of the Internal CMM Arm 5. Each Active Transmission Means 562-568 is located at or near to the centre of gravity of its respective CMMSegment2-8 32-38; this reduces the support task for each CMM Segment to two active force components: radial and axial. No moments need to be applied actively because each Active Transmission Means 562-568 is located at or near to the centre of gravity of their respective CMMSegment2-8 32-38.

| Directions | Drive | Active Support Means |
|---|---|---|
| Active Transmission Means2 562 | Torsional | Axial, Radial |
| Active Transmission Means3 563 | Radial | Axial |
| Active Transmission Means4 564 | Torsional | Axial, Radial |
| Active Transmission Means5 565 | Radial | Axial |
| Active Transmission Means6 566 | Torsional | Axial, Radial |
| Active Transmission Means7 567 | Radial | Axial |
| Active Transmission Means8 568 | Torsional | Axial, Radial |

Active Transmission Means2 562 is the first transmission means and has a constant orientation with respect to gravity. The Transmission Means2 72 within Active Transmission Means2 562 is torsional and provides no active support in either radial or axial directions. In the usual case when the base orientation of Actively Supported Robot CMM Arm 550 is vertical, the only Active support required within Active Transmission Means2 562 is axial; in the case where the base orientation of Actively Supported Robot CMM Arm 550 is horizontal, the only Active support required within Active Transmission Means2 562 is radial. At any other base orientation, both axial and radial active support is required within Active Transmission Means2 562.

Active Transmission Means3 563 may be at any orientation. The drive through the Transmission Means3 73 within Active Transmission Means3 563 is radial; this means that a radial active support is not required in Active Transmission Means3 563. However, active support is required in the axial direction within Active Transmission Means3 563. The case of Active Transmission Means3 563 is similar for Active Transmission Means5,7 565, 567.

Active Transmission Means4 564 may be at any orientation. The drive through the Transmission Means4 74 within Active Transmission Means4 564 is torsional; this means that both radial and axial active support are required in Active Transmission Means4 564. The case of Active Transmission Means4 564 is similar for Active Transmission Means6,8 566, 568.

Axial Active Support

Active Transmission Means3,5,7 563, 565, 567 provide radial drive and active axial support. Referring now to FIG. 61, an Active Transmission Means such as Active Transmission Means3 563 comprises two parts: the passive Radial Drive Transmission Means3 73 as previously disclosed and exhibited in FIG. 17, and an Active Axial Support3 583. The Active Axial Support3 583 comprises two Support motors 571 that through Support gearbox 572 means and Support Ballscrew 574 means apply axial thrust through Support Ballrace 575 means to a CMM Segment Support Flange 570 mounted on CMM Segment3 33 of the Internal CMM Arm 5. The two Support motors 571 are arranged at 180 degrees to each other to provide an even axial thrust on the CMM Segment Support Flange 570. Support motor 571 is bolted to Support gearbox 572, which is bolted to Support Bracket 573. Support Ballscrew 574 runs from Support gearbox 572 and is supported by Support Bracket 573 at the far end. Support Ballrace 575 is situated between Support gearbox 572 and the Support Bracket 573 at the far end. Support Bracket 573 is attached to Exoskeleton Segment3 43 via an elastic material 203. A Support Encoder 579 is attached to each Support Motor 571. Support motor 571 can apply axial force in either relative direction between Exoskeleton Segment3 43 and CMM Segment3 33 as determined by Active Support control software. For instance, if CMM Segment3 33 is in a vertically upwards spatial orientation, then the axial force will be upwards on CMM Segment3 33 effectively counteracting the gravitational force downwards on CMM Segment3 33.

In this arrangement, the passive Radial Drive Transmission Means3 73 is located on one side along the axis of the CMM Segment3 33 from the Active Axial Support3 583. In another embodiment of this invention, the passive Radial Drive Transmission Means3 73 is situated on the other side of the Active Axial Support3 583. In a further embodiment of this invention, the passive Radial Drive Transmission Means3 73 and the Active Axial Support3 583 can be integrated such that the centre of effect of the radial drive through the passive Radial Drive Transmission Means3 73 and the centre of effect of the Active Axial Support3 583 are at the same location.

Axial/Radial Active Support

Figure 62:
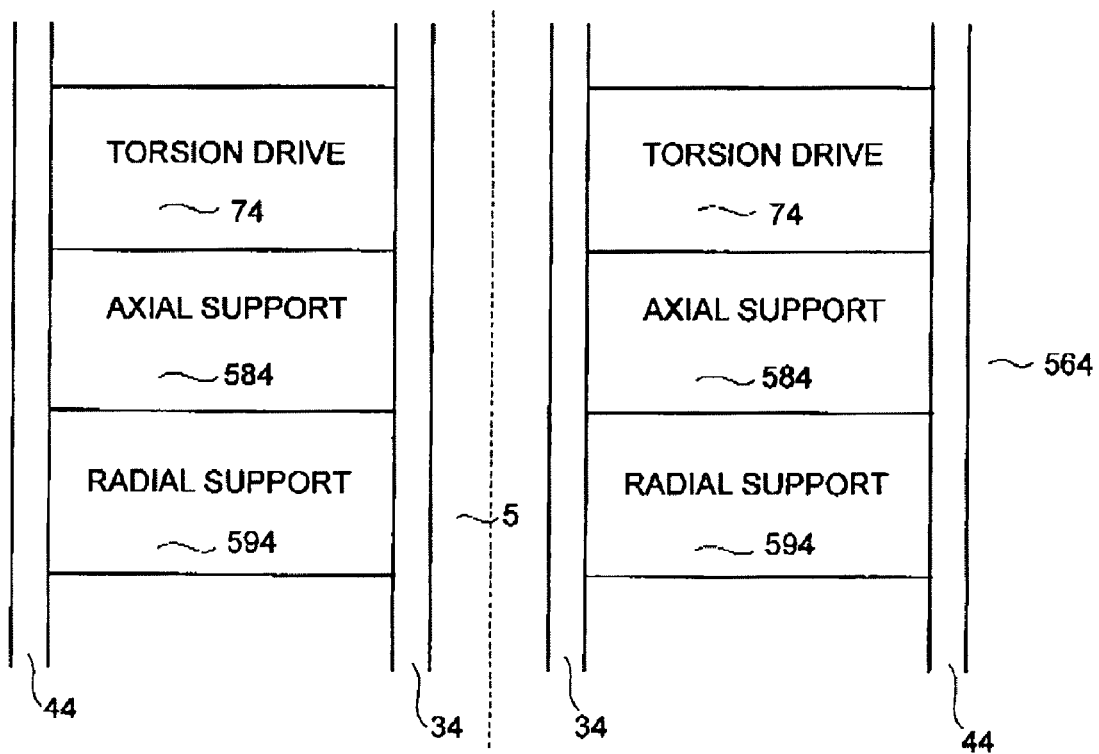
FIG. 62 is a schematic diagram of a torsional Active Transmission Means with Active Axial and Radial Support.

Active Transmission Means4,6,8 564, 566, 568 provide torsional drive, active axial support and active radial support. Referring now to FIG. 62, Active Transmission Means4 564 comprises three components: torsional Transmission Means4 74, Active Axial Support4 584 and Active Radial Support4 594. In this arrangement, these three components of the Active Transmission Means4 564 are provided in a row between CMM Segment4 34 and Exoskeleton Segment4 44 of the Actively Supported Robot CMM Arm 550. The scope of this invention is not limited to this arrangement. For instance, in another embodiment of this invention, these three components can be provided in any other order. In a further embodiment of this invention, these three components can be integrated such that the centre of effect of the torsional drive through the passive torsional Transmission Means4 74 and the centre of effect of the Active Axial Support4 584 and the Active Radial Support4 594 are at the same location. In another embodiment of this invention, any two of these three components can be integrated.

Referring now to FIG. 63, the Active Radial Support4 594 comprises three units 594A, 594B and 594C. Active Radial Support4 Unit 594A is shown in Sections AA and BB. Active Radial Support4 Unit 594B and 594C are shown in Section BB. In each Active Radial Support4 594 unit, a support motor 571 that through a Support gearbox 572, a Support 90 degree drive box 577 and a Support Ballscrew 574 applies radial thrust through a Support Ballrace 575 on a Radial Support Bracket 578 and through elastic material 203 and low-friction material 202 to CMM Segment4 34 of the Internal CMM Arm 5. The three Active Radial Support4 units 594A, 594B and 594C are arranged at 120 degrees to each other to provide directional control of the radial thrust on the CMM Segment4 34. Support motor 571 is bolted to Support gearbox 572 that is bolted to Radial Support Motor Bracket 576. Support gearbox 572 drives Support 90 degree drive box 577. Support Ballscrew 574 emerges from Support 90-degree drive box 577. Support Ballrace 575 receives thrust from Support Ballscrew 574 that is transmitted via Radial Support Bracket 578 and through elastic material 203 and low-friction material 202 to CMM Segment4 34 of the Internal CMM Arm 5. A Support Encoder 579 is attached to the Support Motor 571. The three units 594A, 594B and 594C of the Active Radial Support4 594 can supply radial force in any relative direction between Exoskeleton Segment4 44 and CMM Segment4 34 as determined by Active Support control software. For instance, if CMM Segment4 34 is in a horizontal spatial orientation, then the radial force will be upwards against gravity on CMM Segment4 34 effectively counteracting the gravitational force downwards on CMM Segment4 34.

The Number of Active Transmission Means

In the preferred embodiment of a 7-axis Actively Supported Robot CMM Arm 550 with the base in any orientation, there are eleven Active Support Means: Active Axial Support2-8 582-588 and Active Radial Support2,4,6,8 592,594, 596, 598. If the base is always vertical, then ten Active Support Means are sufficient and Active Radial Support2 592 is not required. In the embodiment of a 6-axis Actively Supported Robot CMM Arm 550 with the base in any orientation, there are nine Active Support Means since Active Transmission Means4 564 is not present. If the base is always vertical, then eight Active Support Means are sufficient and Active Radial Support2 592 is not required.

Some Active Support Means have more effect on the overall accuracy of the Actively Supported Robot CMM Arm 550 than others. For instance, the Active Support Means close to the probe end will have less effect on the overall accuracy than the Active Support Means for the heavier segments. The provision of just one Active Support Means can increase the accuracy of an Actively Supported Robot CMM Arm 550 over that of a similar Robot CMM Arm 1 without any Active Support Means. It is an object of this invention, that an Actively Supported Robot CMM Arm 550 has one or more Active Support Means.

In general, the forces and moments in the Actively Supported Robot CMM Arm 550 can be reduced by increasing the number of Active Transmission Means 560 resulting in a more accurate Actively Supported Robot CMM Arm 550. For example, two or more Active Transmission Means 560 can be provided to support each CMM Segment. In practice, there will be limited returns for each increase in the number of Active Transmission Means. In an additional embodiment of an Actively Supported Robot CMM Arm 550, two Active Transmission Means are provided for the longer CMM Segments3,5 33, 35 to provide more support. The scope of this invention includes any Actively Supported Robot CMM Arm 550 with one or more Active Transmission Means.

Construction Materials

The Internal CMM Arm 5 and the Exoskeleton 6 of the Actively Supported Robot CMM Arm 550 are preferably are made of the same material to minimise differential thermal expansion. The axes of the CMM Joints 51-57 and the Exoskeleton Joints 61-67 are also aligned. In this way, both the Internal CMM Arm 5 and the Exoskeleton 6 change length by the same amount in reaction to a change in temperature.

Active Support Control Software

Figure 64:
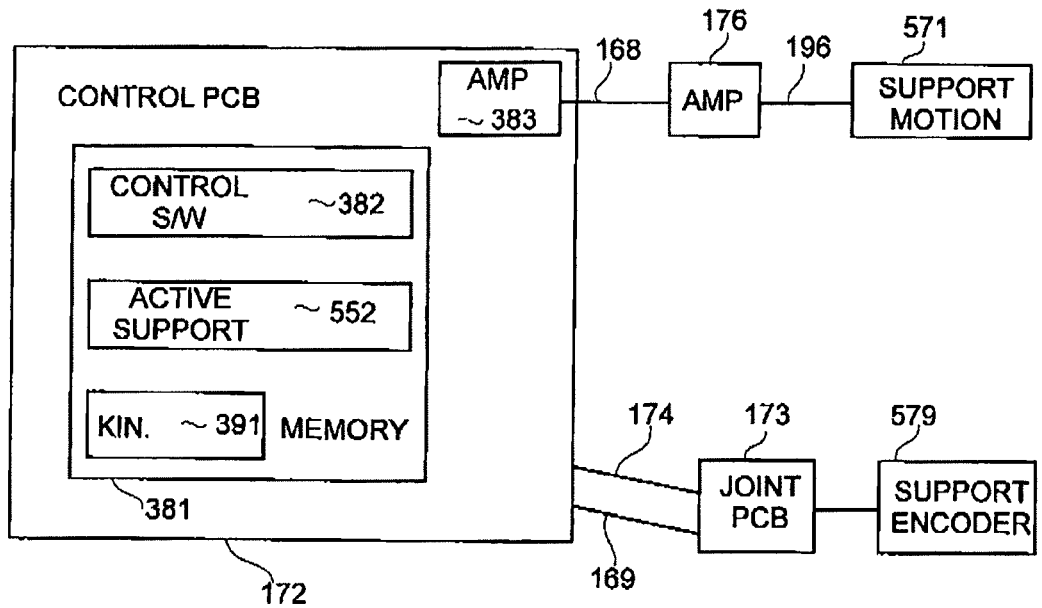
FIG. 64 is a schematic diagram of an Active Support Control System.

Referring now to FIG. 64, Active Support Control Software 552 is provided in the Memory 381 of Control PCB 172. The Active Support Control Software 552 optimises the active support of the Internal CMM Arm 5 by the Exoskeleton 6 for each spatial layout. The Support Motors 571 are driven by Amplifiers 176 from outputs of the Amplifier analogue output circuitry 383 in the Control PCB 172 determined by Control Software 382. Each Support Encoder 579 connects to a Joint PCB 173 that is connected to the Control PCB 172.

Figure 65:
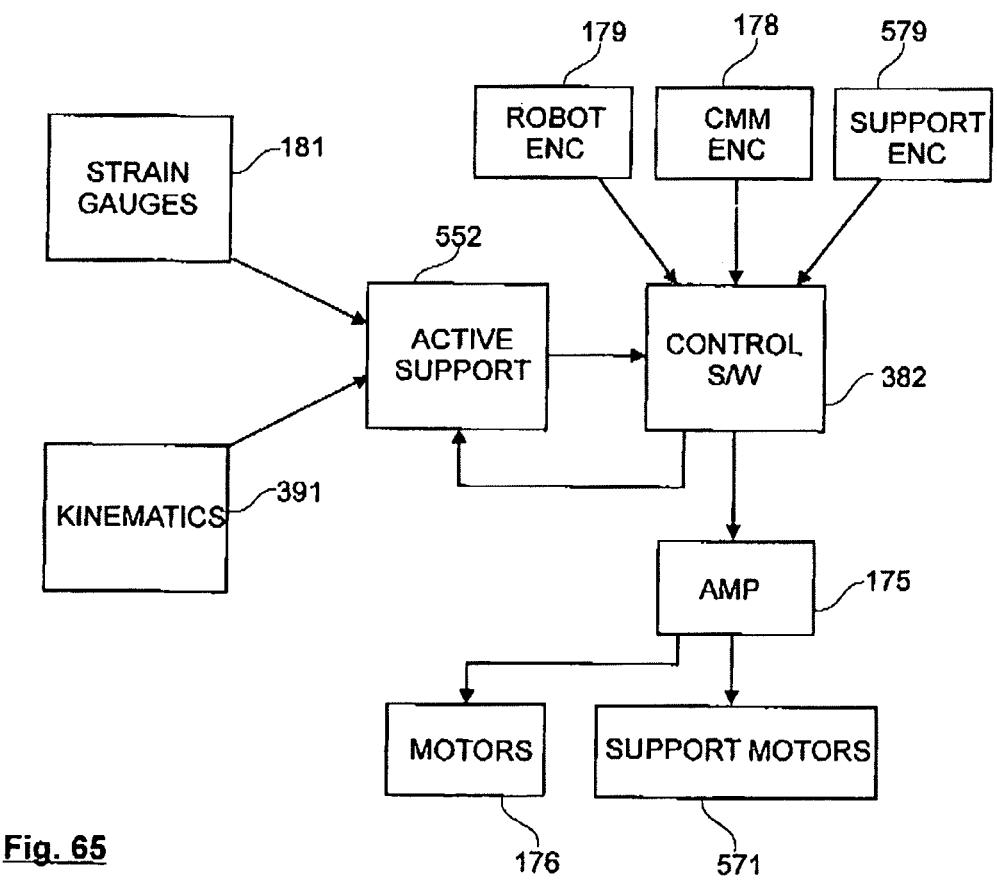
FIG. 65 is a schematic diagram of a Control loop with Active Support.

Referring now to FIG. 65, Active Support Control Software 552 has inputs from Strain Gauges 181, the Kinematics software 391 and the Control Software 382. The Strain Gauges 181 indicate the forces and moments on the Internal CMM Arm 5. The Kinematics software 391 supplies the spatial layout position, velocities and accelerations of the Actively Supported Robot CMM Arm 550. The Control Software 382 supplies the position, velocities and accelerations of Active Transmission Means2-8 562-568. The Active Support Control Software 552 has as output, the desired control demands for the Support Motors 571 to the Control Software 382. The Control Software 382 receives as input the positions of the Exoskeleton encoders 179, the CMM encoders 178 and the Support Encoders 579. The control Software 382 outputs drive signals to the Amplifiers 175 that drive the Motors 176 and the Support Motors 571. The Control Software 382 provides a single control loop for both the Motors 176 and the Support Motors 571 that avoids the generally undesirable situation of two competing control loops that are difficult to reconcile. It is a purpose of this invention to provide an accurate Actively Supported Robot CMM Arm 550 by means of Active Support Control Software 552 to minimise the forces and moments on the Internal CMM Arm 5 with input to the Active Support Control Software 552 from Strain gauges 181 that measure forces and moments in the Internal CMM Arm 5 and output from the Active Support Control Software 552 for controlling the Active Transmission Means2-8 562-568 that can apply forces and moments from the Exoskeleton 6 onto the Internal CMM Arm 5. In this way, the Internal CMM Arm 5 is fully supported by the mounting of its base CMM Segment1 31 and the Active Transmission Means2-8 562-568. It will be understood by those skilled in the art, that there are many ways of providing Active Support Control Software for the Actively Supported Robot CMM Arm 550 and integrating it with the main Control Software 382 to minimise the forces and moments on the Actively Supported Robot CMM Arm 550. It will be further understood by those skilled in the art, that the Active Support Control Software can automatically compensate for a heavy Probe 91 mounted on or near the probe end 3 of the Internal CMM Arm 5 and that at least two Active TransmissionMeans may be provided for supporting CMM Segment8 38 to compensate for Probes 91 that are not mounted near the centre of gravity of CMM Segment8 38.

Air Bearings in Transmission Means

Air bearings may be used to eliminate contact between the Internal CMM Arm 5 and the Exoskeleton 6. Referring again to FIG. 17, in the radial Transmission Means3 73, air bearings will be used instead of the low-friction material 202. Referring again to FIG. 18, in the torsional Transmission Means4 74, air bearings will be used as well as the elastic material 203. Referring again to FIGS. 61 and 63, in the Active Axial Support 563 and the Active Radial Support 594, air bearings will be used instead of the low-friction material 202. Air for the air bearings can be supplied by a compressor and conducted to the locations of the air bearings by flexible tubes running between the Internal CMM Arm 5 and the Exoskeleton 6. Air emerging from the air bearings can have the secondary function of cooling the Actively Supported Robot CMM Arm 550. A primary exhaust for the air is provided at the probe end and secondary exhausts are provided at appropriate distances from the air bearings in each segment. The main advantage of air bearings is the elimination of friction between the Internal CMM Arm 5 and the Exoskeleton 6; this ensures that a force applied in one direction does not have an undesirable component in another direction resulting from friction, resulting in an Actively Supported Robot CMM Arm 550 that is more accurate.

Elastic Material, Pressure Sensors and Active Support Control

Referring again to FIGS. 17, 18, 61 and 63, elastic material 203 is provided within each part of the Active Transmission Means2-8 562-568 at which contact between the Internal CMM Arm 5 and the Exoskeleton occurs. The elastic material 203 protects the Internal CMM Arm 5 by absorbing spikes in forces from the Exoskeleton 6. Forces across the elastic material 203 are created at least by the gravitational force, changes in spatial location of the Actively Supported Robot CMM Arm 550 due to its movement, inertial accelerations in the Actively Supported Robot CMM Arm 550, assembly interference fits, thermal expansion/contraction and the Support Motors 571. The thickness, cross-sectional area and material coefficient of elasticity of the elastic material 203 are carefully calculated at each location to optimise the relative expansion/contraction of the elastic material 203 with the extremes of force calculated for the spatial and inertial capabilities of the Actively Supported Robot CMM Arm 550.

In an alternative embodiment, pressure sensors are placed in the elastic material 203 instead of strain gauges 181 mounted on the Internal CMM Arm 5. The actual total force across the elastic material 203, whether compressive force, tensile force or shear force can be measured at each Active Transmission Means. Calculations based on the design of the Actively Supported Robot CMM Arm 550 are used to determine what the ideal total force across each elastic material should be at the current spatial location and inertial situation of the Actively Supported Robot CMM Arm 550. The Support motors 571 are actuated by a new Active Support Control Software algorithm to reduce or increase the actual total force across each elastic material 203.

Environmental Factors and Operating Performance

For the best accuracy, the Actively Supported Robot CMM Arm 550 should be used in a thermally controlled environment, free from external vibration. The best results are achieved when measuring takes place at relatively low velocities when the forces generated through accelerations are relatively low. However, users demand productivity from their measuring equipment and the speeds, accelerations that an Actively Supported Robot CMM Arm 550 is capable of are important factors. The Internal CMM Arm 5 is supported by multiple Active Transmission Means and the design characteristics of an Internal CMM Arm 5 that is supported by multiple Active Transmission Means can be different from that of a Manual CMM Arm that may be subject to significant forces and moments applied by the operator. This means that the masses/inertias of an Internal CMM Arm 5 in an Actively Supported Robot CMM Arm 550 can be low and the corresponding accelerations to which it can be subjected to whilst maintaining high accuracy can be high, rendering it a highly productive and accurate measuring apparatus.

Effectiveness of the Invention

The forces and moments on the Internal CMM Arm 5 resulting from the action of gravity and inertial forces are counteracted by Active Transmission Means. This Actively Supported Robot CMM Arm 550 can be so effective that it can support the Internal CMM Arm 5 such that the forces and moments at the mounting to its base CMM Segment 1 31 are one or more orders of magnitude less than the corresponding forces and moments without the provision of Active Transmission Means. Furthermore, this Actively Supported Robot CMM Arm 550 can be so effective that it can support the Internal CMM Arm 5 such that the forces and moments at each joint are one or more orders of magnitude less than the corresponding forces and moments without the provision of Active Transmission Means.

More Accurate than a Manual CMM Arm

This third embodiment makes it possible to reduce the forces and moments on the Internal CMM Arm 5 to around an order of magnitude less than on the correspondingly sized Manual CMM Arm. This means that an Actively Supported Robot CMM Arm 550 can be much more accurate than a Manual CMM arm of similar reach for which the forces and moments cannot be reduced to negligible amounts. With smaller forces and moments, the Internal CMM Arm 5 can be designed to be very much lighter; this has a double beneficial effect in that the Exoskeleton 6 can then be lighter and the drive systems can be lighter because they are less powerful.

Alternative Ways of Active Support

There are other ways of achieving active support and the scope of this embodiment is not limited to the means described above. For instance in a further embodiment for axial support, one motor 571 may be used to drive the two Support ballscrews 574 via drive transmission means such as a belt. In an alternative embodiment for axial or radial support, controllable linear actuators such as a Voice Coil Actuator may provide a desired linear force without the need to know the position of the Active Transmission Means; a simpler control loop is provided than for motors with encoders.

Fourth Embodiment

Measuring a Quantity

In this fourth embodiment, method and apparatus is disclosed for a further purpose of this invention: measuring a quantity, constructing a model of that quantity and analysing that model. Examples of quantities that can be measured by a suitable contact or non-contact Quantity Measuring Probe 90 include, but are not limited to: temperature; surface roughness; colour; vibration; hardness; pressure; density; flaw/inclusion detection in welds, bonds. An object 9, or the part of an object to be measured is located within the reach of the Robot CMM Arm 1. Either the object 9 can be brought to the Robot CMM Arm 1 or the Robot CMM Arm can be brought to the object. The quantity is measured with respect to the coordinate system of the Robot CMM Arm 363. Alternatively, an object coordinate system 361 can be set up as disclosed previously and the quantity is measured with respect to the object coordinate system 361. The Quantity Measuring Probe 90 is attached to the probe end 3 of the Internal CMM Arm 5, but could be attached to the probe end of the Exoskeleton 6. Where the probe end of the Internal CMM Arm 5 and the probe end of the Exoskeleton 6 are common, the Quantity Measuring Probe is attached to the common probe end.

Measuring Process, Timing and Multiple Probes

The measuring process takes place by the Robot CMM Arm 1 moving the Quantity Measuring Probe 90 relative to the object 9 and the Quantity Measuring Probe 90 taking measurements. As previously disclosed, positions/orientations of the probe end in X, Y, Z, I, J, K coordinates from the Robot CMM Arm and measurements from the Quantity Measuring Probe 90 can be synchronised or time stamped or otherwise coordinated on a time basis directly or by interpolation. Measurement takes place along a path of movement of the Robot CMM Arm 1. Measurement preferably takes place in a continuous scanning movement in which the Quantity Measuring Probe 90 takes measurements on the fly; this on the fly method of measurement suits Quantity Measuring Probes 90 where measurement takes place over a relatively short time, typically less than 100 msecs and often several milliseconds. Alternatively, measurement can take place stepwise in which the Quantity Measuring Probe 90 takes measurements when the Robot CMM Arm 1 is effectively stationary; this stepwise method of measurement suits Quantity Measuring Probes 90 where measurement takes place over a relatively long time typically greater than 100 msecs and often several seconds. The Quantity Measuring Probe 90 can be mounted on the Robot CMM Arm 1 with one or more other Probes 90, such that any combination of quantity and/or dimensional measurements can be taken. One example is the scanning of a pipe with a non-contact Optical probe 91 for dimensional measurement and a non-contact temperature measuring probe for temperature measurement. It will also be appreciated that a single probe 90 can make measurements of two or more different quantities. It will also be appreciated that two contact probes 95 preferably are not mounted on the Robot CMM Arm 1 since under preferable operation of the Robot CMM Arm only one contact probe 95 will make contact with the object 9, unless special provision is made in the design of the contact probes 95. Measurements from the mounted Probes 90 are preferably taken during a single measuring process along a single measuring path such that a trajectory is not repeated; this is most efficient in terms of minimising the time of the measurement process. The measurements from all the probes 90 can be synchronised during the measuring process such that all the probes 90 take measurements at effectively the same time and at the same rate. Alternatively, one or more of the mounted probes 90 can measure at different rates. As disclosed previously, the measurements from each probe 90 can be related to the position/orientation of the arm preferably directly using synchronisation or by interpolation. The data from the Robot CMM Arm 1 and the one or more probes including the Quantity Measuring Probes 90 are stored.

Quantity Measuring Probe Measurement Locations

Quantity Measuring Probes 90 have a number of different embodiments. They can be contact or non-contact. They can make one or more measurements at each Robot CMM Arm position/orientation. They can measure one or more different quantities, for example temperature and pressure. The location or locations of the measurements from the Quantity Measuring Probe can be known or can be known within a constrained relation to the Robot CMM Arm position/orientation. Examples of measurement locations include:

(a) the location of a single quantity measurement can be at the tip of the Quantity Measuring Probe;

(b) the location of a single quantity measurement can be at an unknown distance but a known orientation from the tip of the Quantity Measuring Probe;

(c) the location of a single quantity measurement can be at a known fixed distance and a known orientation from the tip of the Quantity Measuring Probe;

(d) the location of a single quantity measurement can be at a measured fixed distance and a known orientation from the tip of the Quantity Measuring Probe;

(e) multiple quantity measurements can be made simultaneously along a projected plane wherein each quantity measurement is at a known location relative to the tip of the Quantity Measuring Probe;

(f) multiple quantity measurements can be made simultaneously in a projected area wherein each quantity measurement is at a known location relative to the tip of the Quantity Measuring Probe;

(g) multiple quantity measurements can be made simultaneously in a projected area wherein each quantity measurement is at a known orientation but unknown distance relative to the tip of the Quantity Measuring Probe.

Multiple mounted Probes 90 preferably have different measuring locations relative to the Robot CMM Arm coordinate system 363 so that the measuring processes do not interfere with each other; the different measuring locations are preferably close to minimise extra measuring movement. Multiple mounted Probes 90 preferably have the same orientation relative to the Robot CMM Arm coordinate system 363 to make movement path planning simpler. Where there are three or more mounted probes 90, then these probes are preferably situated such that all measurements are co-planar. For multiple mounted Probes of the single point type, but measuring different quantities, the path and orientation of the Robot CMM Arm is preferably determined such that the location of all the measurements fall along the same paths rather than in paths alongside each other. For multiple mounted Probes of the single point type measuring the same quantity, the path and orientation of the Robot CMM Arm is preferably determined such that the location of all the measurements fall in paths alongside each other, enabling the Robot CMM Arm to be more productive by measuring along several approximately parallel paths simultaneously.

Quantity Measuring Probe Calibration and Alignment

The Quantity Measuring Probe 90 is aligned to the coordinate system of the Robot CMM Arm by a method largely determined by the design of the Quantity Measuring Probe. Preferably, the supplier of the Quantity Measuring Probe pre-calibrates the measurements in some way to an unambiguous and adequately precise probe datum arrangement that can be simply fitted to the Robot CMM Arm with a known offset/orientation relative to the Robot CMM Arm coordinate system; this offset/orientation is supplied as a Quantity Measuring Probe calibration file; the use of the calibration file provides an alignment of the Quantity Measuring Probe to the coordinate system of the Robot CMM Arm. It will be appreciated that if such a pre-calibration is not available from the supplier of the Quantity Measuring Probe, then a special calibration jig can be constructed that is appropriate to the quantity being measured to calibrate the probe to a probe datum in a calibration process. It will be appreciated that if such a pre-calibration is not available from the supplier of the Quantity Measuring Probe, then alternatively an artefact can be provided that is appropriate to the quantity being measured to align the probe coordinate system to the coordinate system of the Robot CMM Arm by an alignment process well known to those skilled in the art involving taking a sufficient number of measurements of the artefact with the Quantity Measuring Probe mounted on the Robot CMM Arm.

Referring now to the process of quantity measurement of FIG. 66:
In first Step 601, locate object and Robot CMM Arm relative to each other such that the object is within the reach of the Robot CMM Arm for measuring;
In Step 602, mount a Quantity Measuring Probe on the probe end of the Robot CMM Arm;
In Step 603, align the Quantity Measuring Probe coordinate system to the Robot CMM Arm coordinate system;
In Step 604, move the Robot CMM Arm along a path and take measurements with the Quantity Measuring Probe;
In Step 605, store the measurements from the Quantity Measuring Probe and the positions/orientations from the Robot CMM Arm.

The scope of this invention is not limited to this quantity measuring process and this process is provided by way of example.

Modelling

A method is disclosed for taking the quantity measurement data and the Robot CMM Arm position/location data and combining them to build a model of the quantity for the object. In this method, one or more quantities can be combined into the model or kept as separate models. It will be appreciated that, as already disclosed, there is a variety of determinate and indeterminate locations for the quantity measurements relative to the Robot CMM Ann. A further method is disclosed for taking a CAD model of the object and combining it with the quantity measurement data and the Robot CMM Arm position/location data to build a model of the quantity for the object. In this further method, the CAD model of the object is referenced to the quantity measurement data and the Robot CMM Arm position/location data. This further method is suitable for determining previously indeterminate locations by correspondence with the CAD model of the object. For example, if the CAD model of the object provides a surface definition and the quantity measured with an indeterminate location is a surface quantity, then the location can be determined by projecting the quantity at a known orientation until it meets the CAD surface of the object. In general, the quantity can be a surface related quantity such as a colour or an internal quantity such as presence of an inclusion in a weld or a flaw in a bond.

Referring now to the process of modelling of FIG. 67:
In first Step 611, prepare a set of located quantity measurement data from previously stored quantity measurements and Robot CMM Arm locations/orientations using interpolation means in time and space;
In Step 612, place the set of located quantity measurement data into a suitable data structure model using modelling means;
In Step 613, combine a CAD model of the object and the located quantity measurement data structure model to provide an integrated CAD and quantity measurement model using combining means.

The scope of this invention is not limited to this modelling process and this process is provided by way of example. For example, on simple objects such as flat sheet metal, it may not be necessary to provide Step 613. In a further example, a 3D scan of the external shape of the model can be provided instead of a CAD model.

Analysis and Visualisation

Analysis can be performed to determine analysed data from the integrated CAD and quantity measurement model. For example:
(a) the maximum and/or minimum values of the quantity and their locations can be derived
(b) colours can be allocated to the quantity according to the range of values and a colour display of the quantity can be rendered onto a surface projection of the object
(c) pass or fail criteria can be set for the object or regions of the object and pass or fail determined by analysis of the measurements of the quantity according to the criteria (d) statistical data of the measured quantity is derived and individual data of the measured quantity is isolated and these are provided to a production control system to feedback into the production process for trend monitoring and production process adjustment The analysed data and or the integrated CAD and quantity measurement model is preferably visualised on a colour computer display. In many cases, the quantity measurement and or the analysed data is displayed on the surface of the CAD model or inside a 3D voxel model. It can be visualised using immersive 3D visualisation techniques. The visualisation techniques chosen will depend on whether the quantity to be visualised is a surface quantity or an internal quantity; the visualisation techniques chosen will also depend on whether a CAD model or 3D scanned surface model of the object is available. The model can be visualised using any technique or apparatus known to a person skilled in the art including all types of rendering and all types of 3D display.

Referring now to the process of analysis, visualisation and feedback of FIG. 68:

In first Step 621, analyse an integrated CAD and quantity measurement model using analysing means;

In Step 622, output the analysed data;

In Step 623, display the output analysed data for visualisation purposes;

In Step 624, provide the analysed data as feedback into a production process.

The scope of this invention is not limited to this analysis, visualisation and feedback process and this process is provided by way of example. For example, in an unmanned automated line, Step 623 might not normally be included unless a display terminal is available for occasional visual observation of the process.

Fifth Embodiment

Mobile Robot CMM Arm

In this fifth embodiment, a Mobile Robot CMM Arm embodiment is disclosed. Currently, large objects such as vehicles are measured in two general ways: using CMMs that are larger than the vehicle such as moving bridge CMMs or opposing horizontal arm CMMs, or by movable equipment with a smaller measuring reach that is moved around the vehicle. Large CMMs, particularly when automated, require a large capital investment. Movable equipment requires skilled manual work and is subject to human error.

It is a purpose of this fifth embodiment to provide a Mobile Robot CMM Arm for measuring large objects such as vehicles that is automatic, accurate, flexible and compared to large CMMs is small in size and less costly.

Figure 70:
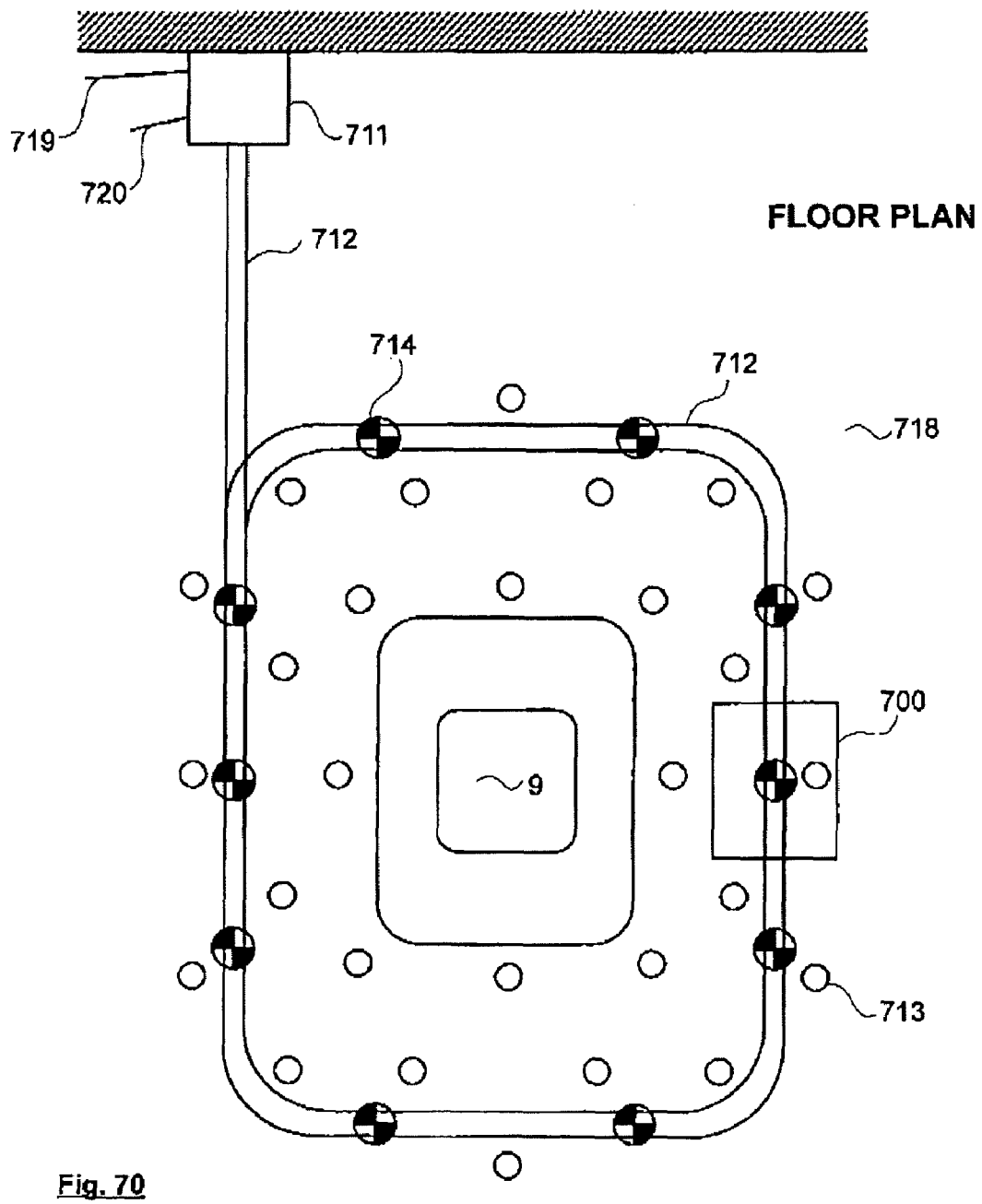
FIG. 70 is a floor plan of a Mobile Robot CMM Arm installation.
Figure 71:
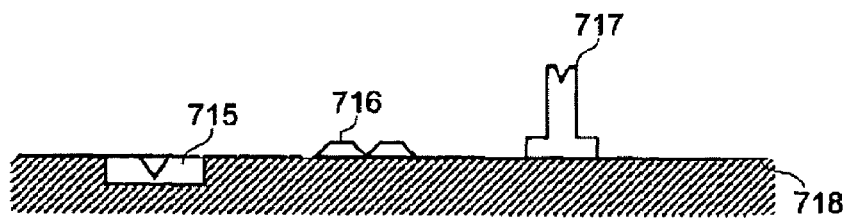
FIG. 71 is a diagram of reference cone installations.

Referring now to FIG. 69, a Mobile Robot CMM Arm 700 is shown in a Side View, End View and View from underneath. The Mobile Robot CMM Arm 700 consists of a vehicle 701 on which a Robot CMM Arm 1 is mounted. The Robot CMM Arm 1 is rigidly attached to the tripod base 704 from which three spiked feet 706 are lowered by feet lowering actuators 707; when the spiked feet 706 are in the lowered position, the full weight of the Mobile Robot CMM Arm 700 is supported by the spiked feet 706 and accurate measuring may take place. The vehicle further comprises four wheels 702, a battery 705, an automatic charging/communications contact 710, motor/gearbox units 703 to drive the wheels, a control unit 709 to which a pendant 153 for manual setup and control of the Mobile Robot CMM Arm 700 is connected and tape following/target identification sensors 708. Referring now to FIG. 70, a typical floor plan of a vehicle measuring area in which a Mobile Robot CMM Arm 700 is used is shown. The Mobile Robot CMM Arm 700 follows a track around the vehicle 9 laid out by tape 712. At intervals along the tape 712 are targets 714 that indicate a location for the Mobile Robot CMM Arm 700 to stop and measure the vehicle. Each target 714 is preferably unique and can identify a measuring program 389 to be used at that location. An array of reference cones 713 is provided on the floor 718 of the vehicle measuring area from which the Mobile Robot CMM Arm 700 can accurately reference its position. A charging/communication station 711 is provided for automatic charging of the battery 705 from an electricity supply 719 and communication with a computer network 720 via the automatic charging/communications contact 710 on the Mobile Robot CMM Arm 700. Referring now to FIG. 71, embedded reference cones 715 can be permanently located in the floor 718. Removable reference cones 716 can be temporarily glued to the floor 718. Raised reference cones 717 are provided where necessary to improve reference accuracy. Referring now to FIG. 72, the 3D locations of the reference cones 713 are stored in a reference cone position array 721. The 3D locations of the targets 714 are stored in a target position array 722. The 3D polyline of the tape is stored in a tape polyline array 723.

Preparation Process

The precise location of each of the Reference cones 713 in the Reference cone array 721 is measured using an accurate 3D measuring device such as an Optical Tracker from Leica or Faro Technologies. The path of the tape 712 as a Tape polyline array 723 and the locations of the targets 714 as a Target position array 722 are also measured. The Reference cone array 721 provides the Global coordinate system 461. These measurements need only be carried out annually or whenever there is a change to the layout. The arrays of the reference cones 721, tape path 723 and target 722 locations are provided to an offline programming system that can also provide a simulation of the process. An operator using the offline programming system generates a measurement program 389. The battery 705 of the Mobile Robot CMM Arm 700 is charged at the charging/communication station 711. The measurement program 389 and the arrays 721, 722, 723 are downloaded into the control unit 709 of the Mobile Robot CMM Arm 700. The object 9 which may be a vehicle is moved approximately into the programmed position used to generate the measurement program 389. The object 9 is normally provided with datum references to the object coordinate system 361. The position of the object 9 is adjusted to within a small error of the programmed position.

Figures 73, 74:
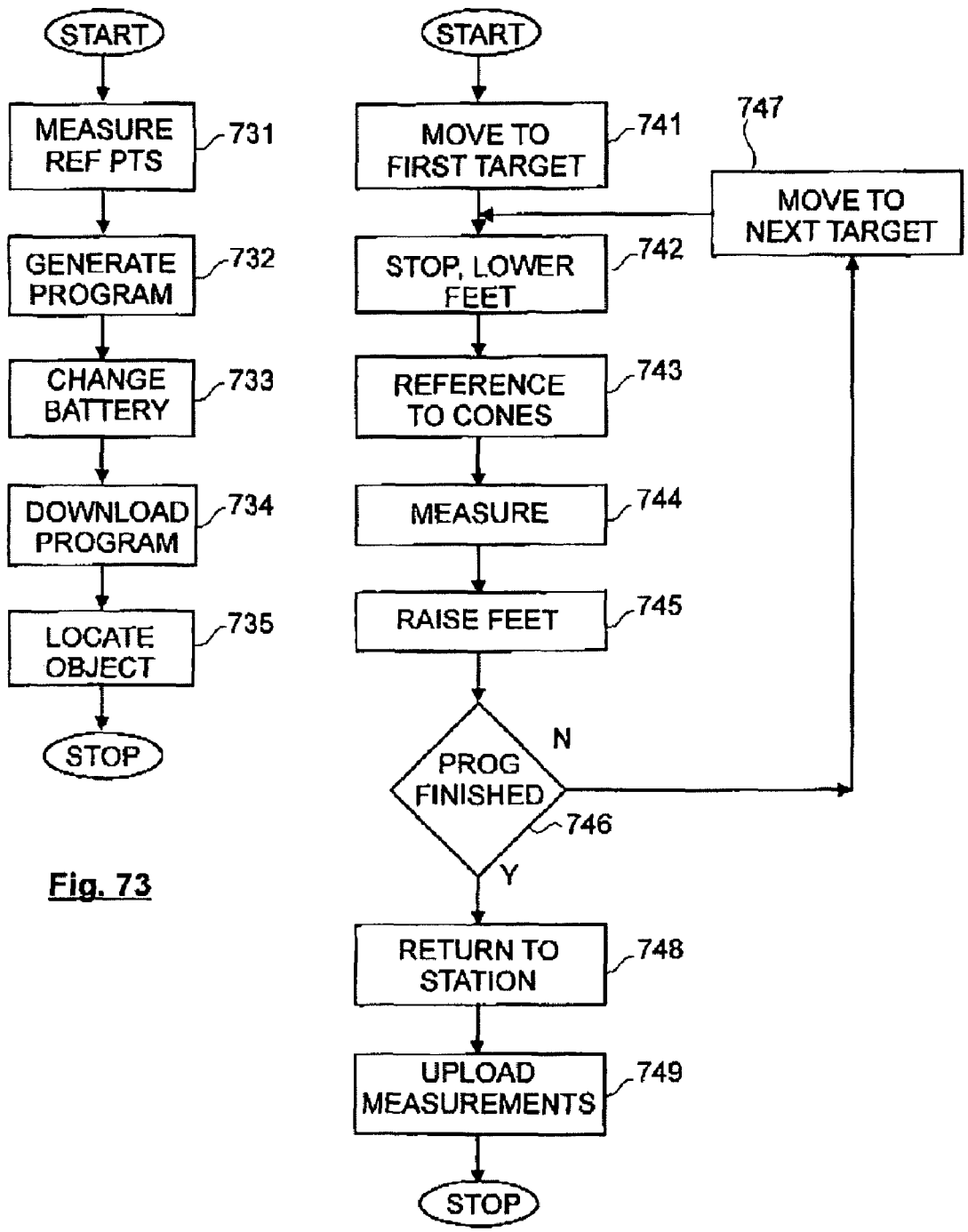

Referring now to the process of preparation of FIG. 73:

In first Step 731, measure reference cones 713, targets 714 and tape 712; provide arrays 721, 722, 723 to the offline programming system;

In Step 732, generate a measuring program 389 using the offline programming system;

In Step 733, charge battery 705;

In Step 734, download measuring program 389 to Mobile Robot CMM Arm 700;

In Step 735, move object 9 to approximate position and adjust.

This process is an example of a process of preparation and is intended to illustrate one possible process of preparation but this embodiment is not limited to this process of preparation. For example Step 733, the charging of the battery may take place at any point in the process.

Measuring Process

The operator 11 initiates the measuring operation. The Mobile Robot CMM Arm 700 executes the measuring program 389. The Mobile Robot CMM Arm 700 follows the tape 712 and proceeds to the first programmed target 714. It stops and lowers its spiked feet 706 using the feet lowering actuators 707. The Mobile Robot CMM Arm 700 references itself to the Global coordinate system 461 by measuring all the reference cones 713 within reach of the arm. It is assumed that the repeatability of position and orientation of the Mobile Robot CMM Arm 700 with respect to a target is better than 5 mm. The program for measuring the position of a reference cone 713 includes a search routine within a greater than 5 mm range to first locate the reference cone before measuring it. Using the positions of the local reference cones 713, the Mobile Robot CMM Arm 700 coordinate system 363 is referenced to the Global coordinate system 461. The Mobile Robot CMM Arm 700 executes the measuring program 389 for that location. It then raises its spiked feet 706 and proceeds to the next location. This process is repeated until the measurement program 389 is complete and the Mobile Robot CMM Arm 700 has returned to the charging/communication station 711. The measurements are uploaded from the Mobile Robot CMM Arm 700 over the communications network 720 to a specified computer. At, at least one target 714 location, the datum references on the object 9 to the object coordinate system 361 are measured. This provides a reference between the object coordinate system 361 and the Global coordinate system 461.

Referring now to the process of measurement of FIG. 74:
In first Step 741, move Mobile Robot CMM Arm 700 to first target;
In Step 742, stop Mobile Robot CMM Arm 700 over target, lower spiked feet 706;
In Step 743, reference Mobile Robot CMM Arm 700 to local reference cones 713 by measuring them;
In Step 744, Mobile Robot CMM Arm 700 measures object 9 according to measuring program 389;
In Step 745, raise spiked feet 706;
In Step 746, verify if program is finished? If finished go to Step 747. If not finished go to Step 748;
In Step 747, move Mobile Robot CMM Arm 700 to next target; go to Step 742;
In Step 748, return Mobile Robot CMM Arm 700 to charging/communication station 711;
In Step 749, upload measurements.

This process is an example of a process of measurement and is intended to illustrate one possible process of measurement, but this embodiment is not limited to this process of preparation. For instance, an additional step of recharging the battery part of the way through the measurement process may be required.

As will be understood by a person skilled in the art of automated guided vehicles, the Mobile Robot CMM Arm 700 provides all the facilities necessary for this application. For example, automated actuation of the wheel angles for steering the vehicle 701 is provided. Algorithms are provided for tape following and target recognition. A map of the locations of the reference cones is provided. Safety sensors for detecting potential collisions are provided. Visible and audible warning systems are provided.

The scope of this fifth embodiment is not limited to the methods and apparatus disclosed but includes all ways of providing a Mobile Robot CMM Arm 700 for automatic, accurate and flexible measurement of large objects. For example, the Mobile Robot CMM Arm 700 can have three, five or more wheels. The tripod base 704 can have four or more spiked feet and the feet lowering actuators 707 could provide a constant force on each. Each wheel 702 can be independently steerable. A radio location system or a dead reckoning system can be used instead of tape 712 and targets 714. Tooling spheres, optical targets or any other contact or non-contact reference artifacts can be used instead of reference cones 713. Multiple and reserve batteries 705 can be provided. Processing of the measurements can take place on the Mobile Robot CMM Arm 700 or on a computer on a network. The vehicle 701 can be combined with the Robot CMM Arm 1 and the tripod base 706 in one self-contained unit, or a vehicle can tow the Robot CMM Arm 1 on the tripod base 406 from one position to another and then withdraw during the measuring process. The vehicle 701 can be driven and operated from one or more of a variety of power sources including: a battery, electricity along a permanently attached cable, electricity from a rail, a fuel cell and a combustible substance such as petrol. In a further embodiment of this fifth embodiment, kinematic mounts are rigidly fixed to the floor 718. The Robot CMM Arm 1 may be raised and lowered by the Mobile Robot CMM Arm 700. The Mobile Robot CMM Arm 700 follows along the tape 712 and stops at a kinematic mount. The Robot CMM Arm 1 is lowered onto the kinematic mount. An automatic locking mechanism locates and locks the Robot CMM Arm 1 in a repeatable position and orientation. The repeatability of these kinematic mounts is better than 10 microns in position. Kinematic mounting methods known to those skilled in the art such as three cylinders at 120 degree orientation are used to achieve this. Prior to use of the Mobile Robot CMM Arm 700, an accurate 3D measuring device such as a Leica optical tracker is used to map the positions and orientations of the Robot CMM Arm 1 in each of the kinematic mounts fixed to the floor. In this way, the Robot CMM Arm 1 is in the known Global coordinate system 461 without needing to reference to reference cones 713 at each location each time the Mobile Robot CMM Arm 700 is used.

Sixth Embodiment

Robot CMM Arm with Displaceable Exoskeleton

In this sixth embodiment, a Robot CMM Arm with displaceable exoskeleton embodiment is disclosed. It has already been disclosed that Robot programs for a Robot CMM Arm can be generated offline or created by interactively teaching a series of robot movements. Both methods of programming the Robot CMM Arm are, for many objects, much slower than manually measuring the object with a Manual CMM Arm.

It is a purpose of this sixth embodiment to provide a Robot CMM Arm with displaceable exoskeleton such that a first object is manually measured with the exoskeleton removed and all further similar objects are automatically measured with the exoskeleton replaced.

Figure 75:
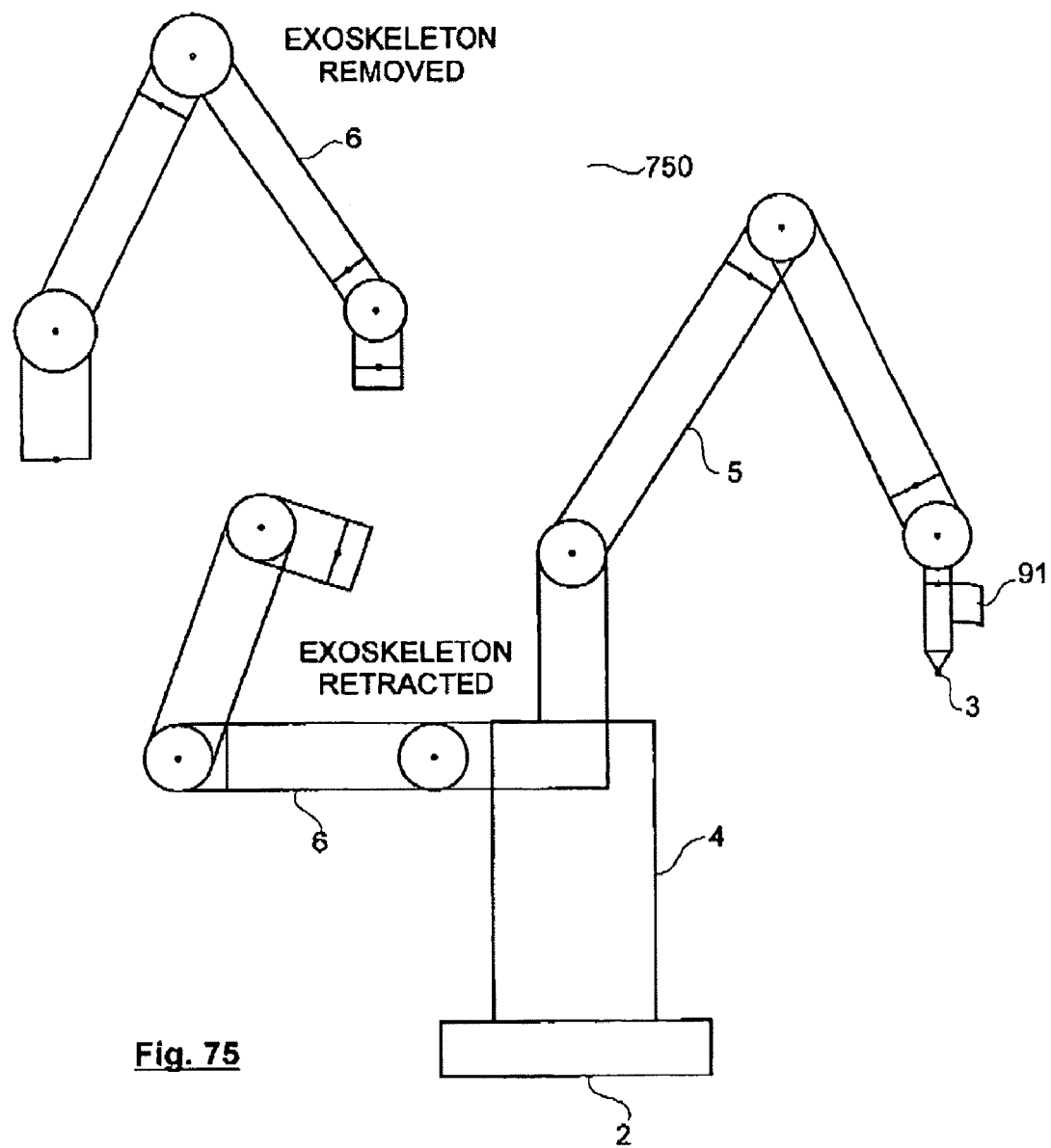
Figure 76:
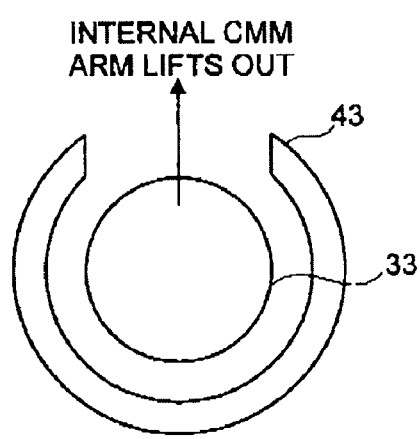
Figure 77:
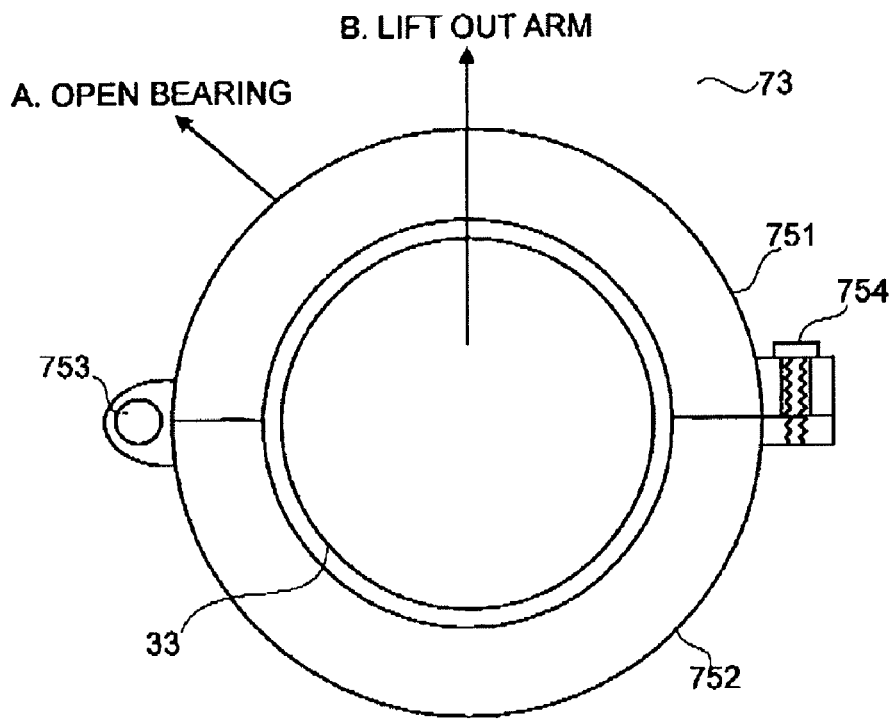
Figure 78:
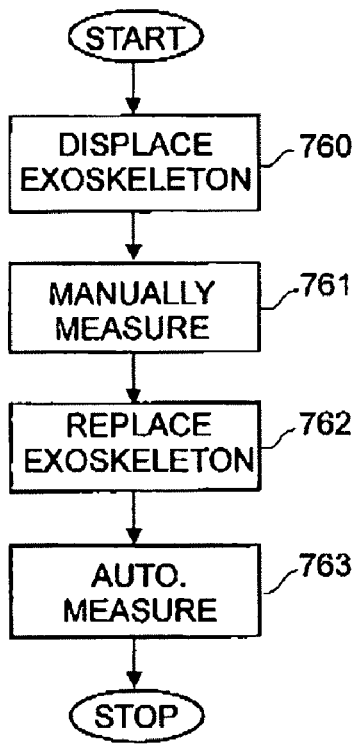

Referring now to FIG. 75, a Robot CMM Arm with displaceable exoskeleton 750 is shown with the exoskeleton 6 either removed or retracted and the Internal CMM Arm 5 operable manually. Referring now to FIG. 76, Exoskeleton Segment3 43 is provided as a tube with a slot milled out of it such that CMM Segment3 33 may be lifted out of Exoskeleton Segment3 43 during the displacement of the exoskeleton 6. CMM Segment5 35 may similarly be lifted out from Exoskeleton Segment5 45 and CMM Segment8 38 may similarly be lifted out from Exoskeleton Segment8 48. The slotted tube is of sufficient wall thickness to provide the strength required. Referring now to FIG. 77, Transmission Means3 73, which is attached to Exoskeleton Segment3 43 is provided as a split bearing assembly comprising upper bearing 751, lower bearing 752, hinge 753 and fastening 754 such that when fastening 754 is unfastened, the CMM Segment3 33 may be lifted out. Transmission Means5 75 and Transmission Means7 77 are similarly provided as split bearing assemblies. Referring now to the process of measuring using the Robot CMM Arm with displaceable exoskeleton 750 of FIG. 78:

In first Step 760, displace the Exoskeleton 6 from the Internal CMM Arm 5; the Robot CMM Arm with displaceable exoskeleton 750 is automatically moved into a suitable spatial layout where (a) the Internal CMM Arm 5 is easily unfastenable from the Exoskeleton 6 and (b) the Exoskeleton 6 is out of the way of future manual use of the Internal CMM Arm 5; the transmission means are unfastened manually; the Internal CMM Arm 5 is lifted out of the Exoskeleton 6; optionally, the Exoskeleton 6 can be retracted further away from the Internal CMM Arm 5 for example by hinge means; optionally the Exoskeleton 6 can be removed for example by unbolting it mechanically and unplugging it electrically;

In Step 761, manually measure an object 9 using Internal CMM Arm 5;

In Step 762, replace the Exoskeleton 6 if it has been retracted or removed; lift the Internal CMM Arm 5 into the Exoskeleton 6 and fasten the transmission means;

In Step 763 automatically measure one or more similar objects 9 using the Robot CMM Arm with displaceable exoskeleton 750.

The scope of this sixth embodiment is not limited to the methods and apparatus disclosed but includes all ways of providing a Robot CMM Arm with displaceable exoskeleton 750. Displacement of the exoskeleton is not limited to the means disclosed of positioning out of the way, removal and retraction, but includes any means of displacing the exoskeleton such that the internal CMM Arm may be used manually. As will be understood by a person skilled in the art, the Robot CMM Arm with displaceable exoskeleton 750 is provided with all the facilities necessary for it to be both manually and automatically operable. Many users have a variety of objects to be measured and some objects are best measured using a Manual CMM Arm and other objects are best measured using a Robot CMM Arm. As a single purchase, the Robot CMM Arm with displaceable exoskeleton 750 provides the user with both a Manual CMM Arm and a Robot CMM Arm. A Robot CMM Arm with a displaceable exoskeleton 750 has further advantages from ease of assembly, test and repair.

Seventh Embodiment

Coupled Robot CMM Arm

Figure 79:
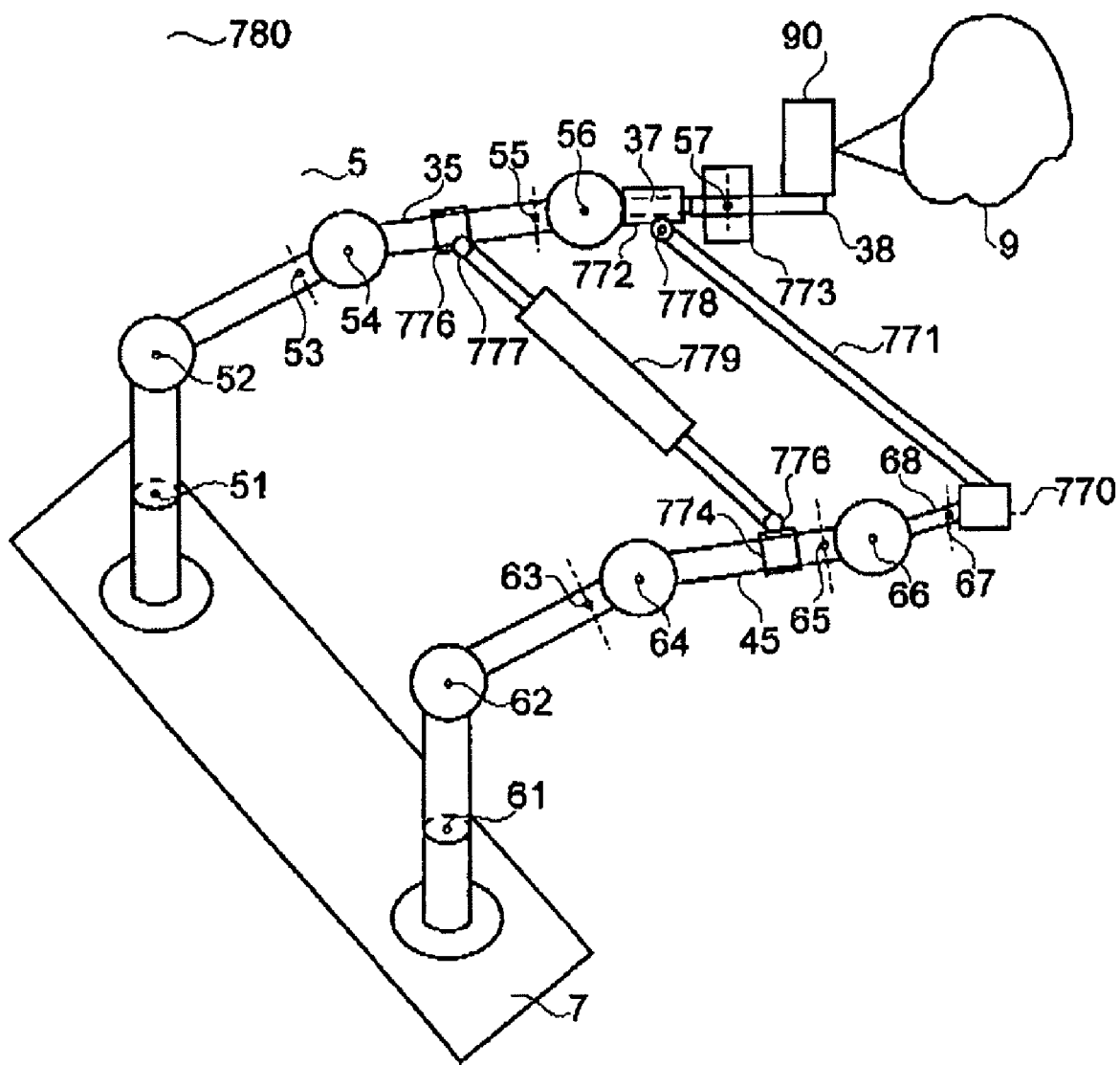

In this seventh embodiment, a Robot CMM Arm comprising a coupled CMM Arm and Robot Exoskeleton is disclosed. CMM Arms with sufficient joints exhibit spatial redundancy, in which for most given positions and orientations of the probe end, there is a continuous set of different positions that the intermediate joints of the arm may have. For the manipulation of the probe end of the CMM Arm whilst constraining the intermediate joints from accelerating under gravitational or inertial forces, the CMM Arm must be supported by the Robot Exoskeleton in at least two positions: near the probe end and at an intermediate position. A specific embodiment of a Coupled Robot CMM Arm is now disclosed. Referring now to FIG. 79, a CMM Arm 5 and Robot Exoskeleton 6 are mounted adjacent to each other on a surface 7 to form a Coupled Robot CMM Arm 780. The base separation distance between the CMM Arm 5 and the Robot Exoskeleton 6 is optimised dependent partially on the reaches of the CMM Arm and Robot Exoskeleton as well as the demands of the application. The CMM Arm carries a Probe 90 on its final segment 38. The CMM Arm 5 and the Robot Exoskeleton 6 are connected in two places by a Driven Beam 771 and a Driven Linear Axis 779. The Driven Beam 771 is rigidly attached to the Robot Gripper 770 such that as the Robot Gripper 770 is rotated about Robot Exoskeleton Joint7 67, the Driven Beam 771 sweeps out a circular path. The Driven Beam 771 is attached to CMMSegment7 37 by a rotating collar 772 and a partially constrained universal joint 778 such that the Robot Exoskeleton 6 can control the position and orientation of CMM Segment7 37. The Driven Linear Axis 779 is attached between Robot Exoskeleton Segment5 45 and CMMSegment5 35. The Driven Linear Axis 779 is attached to Robot Exoskeleton Segment5 45 by means of rotating collar 774 and universal joint 776. The Driven Linear Axis 779 is attached to CMMSegment5 35 by means of rotating collar 775 and universal joint 777. The Driven Linear Axis 779 constitutes an $8^{th}$ driven axis in addition to the seven driven axes of the Robot Exoskeleton 6. The Driven Linear Axis 779 can increase/decrease in length under program control using means well known to those skilled in the art. By increasing or decreasing the length of the The Driven Linear Axis 779, the positional redundancy of the elbow of the CMM Arm 5 at CMMJoint4 54 and associated segments can be constrained. A $9^{th}$ driven axis, the Driven Rotary Axis 773 drives CMMJoint7 57 and permits the Probe 90 to rotate around the axis of CMM Segment8 38.

There are many embodiments in which a Robot Exoskeleton 6 can be coupled with a CMM Arm 5 to provide a Coupled Robot CMM Arm 780. The scope of this seventh embodiment is not limited to the Coupled Robot CMM Arm 780 disclosed above in this seventh embodiment but includes all types of coupling of a Robot Exoskeleton 6 and a CMM Arm 5 by transmission means and other means. For instance, in a further embodiment, the CMM Arm 5 and the Robot Exoskeleton 6 can be connected in more than two places. In a separate embodiment with the CMM Arm 5 exhibiting spatial redundancy and for which the spatial orientation of the intermediate joints is not important, the CMM Arm 5 and the Robot Exoskeleton 6 can be connected only at the probe end. In a different embodiment with the CMM Arm 5 not exhibiting spatial redundancy, the CMM Arm 5 and the Robot Exoskeleton 6 can be connected only at the probe end.

Eighth Embodiment

Manual CMM Arm with Exoskeleton

A typical Manual CMM Arm in a typical mode of use has the following forces/moments acting on it:
- Through the base 2 that is rigidly mounted to a support structure
- Through the contact probe 95 in contact with an object that is rigidly mounted to a support structure
- Through the left hand of the human operator
- Through the right hand of the human operator
- Gravity on the whole Manual CMM Arm
- Through the Counterbalance spring attachments There are many causes of measurement error in a Manual CMM Arm that make it less robust for the measurement purpose including Forces/moments acting on the Manual CMM Arm that cause small geometrical distortions leading to measurement errors. Some of the most significant causes of measurement error on a Manual CMM Arm include:

Cause 1: damage due to the Manual CMM Arm accidentally being dropped or banged against a hard object. In a first mode of damage, severe damage requires that the Manual CMM Arm be sent back to the manufacturer for repair and recalibration. In a second mode of damage, an accumulation of knocks over months and years tends to loosen the joints in a Manual CMM Arm and for it to lose accuracy;

Cause 2: the Forces and Moments applied to the Manual CMM Arm through the left and right hands of the human operator; these forces and moments can distort the bearings and segments of the Manual CMM Arm; these forces and moments can be magnified if the contact probe 95 is in contact with an object or support structure; one bad case of bearing and segment distortion is where CMMSegments3-5 33-35 are in line and the operator applies a bending moment with his hands across CMMSegments3-5 33-35 and CMMJoints3-4 53-54 which can cause an error of the order of 0.5 mm;

Cause 3: the Counterbalance moment across CMMJoint2 22 between CMMSegment2 32 and CMMSegment3 33 if a Compensating device 210 such as an internal machined spring is built into CMMJoint2 22 is variable in a typical range from near to 0 Nm at a vertical orientation of Segment 3 to around 10 Nm at a horizontal orientation of Segment 3. This variable moment will result in a measurement error from two sources: deflection of CMMSegment3 33 due to the moment on it and inaccuracies from applying a moment across the bearings in CMMJoint2 52

Cause 4: the localised asymmetrical heat transfer from operator's hands;

Cause 5: the bumping of non-infinitely rotating axes of the Manual CMM Arm against the bump stops causing shock on the Manual CMM Arm;

Cause 6: the bending of non-infinitely rotating axes of the Manual CMM Arm against the bump stops causing bending moments on the Manual CMM Arm that can be quite high (in excess of 10 Nm torque on Axis 2 is not uncommon);

Cause 7: the masses and inertias of the Manual CMM Arm cause dynamic measurement errors when measurements are taken with the Manual CMM Arm moving such as with scanning using a stripe probe 97; much of the typical 10 kg mass of the Manual CMM Arm is due to the need to build a robust Manual CMM Arm that is capable of surviving mishandling without needing to be recalibrated;

Cause 8: the forces applied to the arm through contact of the tip of the contact probe 95; in this way a significant amount of the Manual CMM Arm weight acts through the contact probe 95; if the operator 11 is bearing down on the Manual CMM Arm, then some of the operator's weight can also act through the contact probe 95;

Cause 9: the forces and moments applied through an optical probe 91 when it is held by an operator;

Cause 10: shock and vibration applied during transportation; in many cases the design of the transportation case provides undesirable applied forces and moments on the arm.

There are many thousands of Manual CMM Arms in the marketplace and they have become more accurate over time. The main user problem in the newer, more accurate arms is the trade-off between accuracy and robustness. As Manual CMM Arms have become more accurate they have become less robust. An arm that is accurate in the calibration facility where it is manufactured may lose accuracy in transportation to the customer or after a short period of use by the customer.

In this eighth embodiment, a Manual CMM Arm with Exoskeleton comprising a light Internal CMM Arm and an Exoskeleton where the Exoskeleton is held by an operator is disclosed that dramatically reduces these causes of measurement error and has the advantage of being more accurate and more robust than an equivalent Manual CMM Arm where the CMM is held directly by the operator.

Figure 80A:
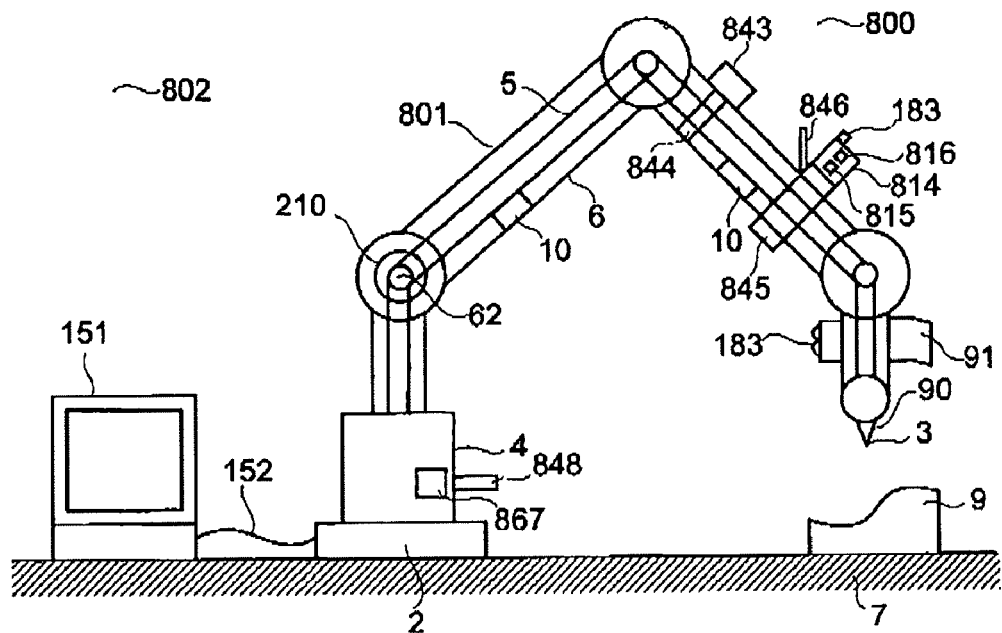

Referring now to FIG. 80A, a Manual CMM Arm with Exoskeleton System 802 is provided comprising a Manual CMM Arm with Exoskeleton 800, connected to a laptop 151 with a cable 152. The Manual CMM Arm with Exoskeleton 800 has a base end 2 and a probe end 3. The Manual CMM Arm with Exoskeleton 800 is mounted on a surface 7. A probe 90 is mounted on the probe end 3 of the Manual CMM Arm with Exoskeleton 800. An Optical probe 91 is also mounted towards the probe end 3 of the Manual CMM Arm with Exoskeleton 800. Operator buttons 183 are mounted adjacent to the probe end 3. The Manual CMM Arm with Exoskeleton 800 comprises a base 4, an Internal CMM Arm 5, an Exoskeleton 801, a Compensating device 210 on ExoskeletonJoint2 62 and Transmission Means 10. The object 9 being measured is situated on the surface 7.

The Exoskeleton 801 is lightweight and the Transmission Means 10 support the Internal CMM Arm 5 such that the stresses on the Internal CMM Arm 5 are minimised. The Exoskeleton 801 protects the Internal CMM Arm 5. The Exoskeleton 801 is compliant with typical segment deflections from 0.1 to 5 mm on either of the long segments xxx, xxx but a segment deflection could be more than 5 mm or less than 0.1 mm. Any bending of the Exoskeleton 801 is taken up by compliance in the Transmission Means 10 in supporting the stiff Internal CMM Arm 5; in other embodiments the Exoskeleton 801 can be rigid. The Exoskeleton 801 is made of a strong and light material such as carbon fibre or a stiff plastic, but could be made of any functional material. The Exoskeleton 801 completely encloses the Internal CMM Arm 5 to fully protect it, but in other embodiments it could only partially enclose it. The Exoskeleton 801 is designed ergonomically for holding by the operator. The Internal CMM Arm 5 is lightweight; because of the protection of the Exoskeleton 801, the Internal CMM Arm 5 does not need to be designed to be strong enough to survive abuse loads in use. The Internal CMM Arm 5 does not include the extra weight associated with the functions of protection for normal and abusive usage, environmental sealing, ergonomics, electronics and decoration which are dealt with by the Exoskeleton 801; for these reasons, the Internal CMM Arm 5 is even lighter per unit length.

The Manual CMM Arm with Exoskeleton 800 eighth embodiment of this CMM arm with Exoskeleton invention is used with an optical probe 91 attached to the Internal CMM Arm 5. The Exoskeleton 801 is held by the operator 11. The design of the optical probe 91 is such that it is protected by the Exoskeleton 801 from being held by the operator 11. In this way the operator cannot apply direct stresses on either the Internal CMM Arm 5 or the optical probe 91 and the Manual CMM Arm with Exoskeleton System 802 is more accurate than an equivalent Manual CMM Arm without Exoskeleton 790.

In an alternative embodiment, the Manual CMM Arm with Exoskeleton 800 invention is used with a contact probe 90 attached to the Internal CMM Arm 5. The Exoskeleton 801 is held by the operator 11. In this way the operator cannot apply direct stresses on either the Internal CMM Arm 5 or the contact probe 90 and the Manual CMM Arm with Exoskeleton System 802 is more accurate than an equivalent Manual CMM Arm without Exoskeleton 790.

Wireless Button Unit

Until now, buttons for the control of the Manual CMM Arm with Exoskeleton 800 have been hardwired onto and through the arm. This restricts the buttons to one or more fixed locations, or at best a rotating location either on a $7^{th}$ axis or on a rotating button collar with slip-rings. A novel embodiment for the control of the Manual CMM Arm with Exoskeleton 800 is the provision of an integrated wireless button unit 814 wherever the user finds it convenient to have control buttons 183 placed. The wireless button unit 814 comprises one or more buttons 183, a transmitter 815 and is powered by a self-contained battery 816. The wireless button unit 814 is provided with a carrier 843 comprising a seat for the wireless button units and one or more Velcro straps 844 to fasten the carrier almost anywhere along the Exoskeleton 6. A wireless receiver 847 is provided that is integrated into the Manual CMM Arm with Exoskeleton System 802 and built into the base 4. There may or may not be an antenna 848 for the wireless receiver 847. The antenna 848 may or may not be external and/or removable. In a further embodiment, a sliding and rotating carrier 845 is provided on each of the long cylindrical sections of the Exoskeleton 6. The wireless button unit 814 has a simple compatible press fit into the carrier 843 or the sliding and rotating carrier 845 such that it can be quickly located on or removed from any compatible carrier. The sliding and rotating carriers 845 are not normally removed from their corresponding exoskeleton sections. The sliding and rotating carrier has a simple brake/release control 846; in the brake position it cannot slide or rotate; in the release position the operator may slide or rotate it to the desired position. The brake/release control 846 can be operated single-handedly. The buttons 183 can control any function of the Manual CMM Arm with Exoskeleton System 802 by means of appropriate system hardware and software, including the user interface point and selection function where the Manual CMM Arm with Exoskeleton 800 acts as a pointer and the buttons 183 act as selection buttons.

Bump Stop

Figure 80B:
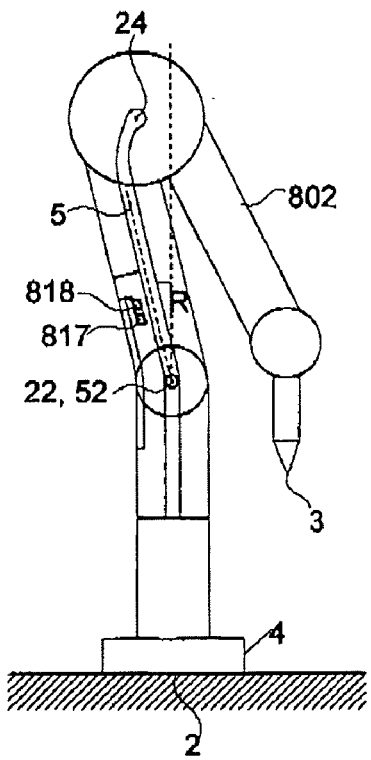

Referring now to FIG. 80B, the Manual CMM Arm with Exoskeleton 800 is provided with a Bump stop 818 for the arm to rest in a rest position when the Base end 2 is oriented vertically upwards, in which JointCentre4 24 is the highest joint centre and the Probe end 3 hangs down towards the Base 4, such that the segments of the arm after JointCentre2 22 do not fall under the action of the gravitational force. The Bump stop 818 on ExoskeletonJoint2 62 provides a rest located at a rest angle R past the vertical orientation in which ExoskeletonJoint2 62 is just past ExoskeletonJoint1 61 such that the Centre of Gravity of that part of the Manual CMM Arm with Exoskeleton 800 lying after JointCentre2 22 is situated towards the bump stop side of the vertical axis upwards from JointCentre2 22. A typical value for R is 5 degrees but it may be more or less. When the Exoskeleton 802 is at rest against the Bump stop 818, CMMJoint2 52 is free to rotate significantly further before reaching any hard limit. An advantage of the Bump stop 818 acting within the Exoskeleton 802 is that the Internal CMM Arm 5 is not subject to shocks when the Bump stop 818 makes contact or bending moments if the Exoskeleton 802 is pushed hard against the Bump stop 818. This means that the design of the Internal CMM Arm 5 can be lighter and the Manual CMM Arm with Exoskeleton 800 as a whole is more robust. In addition, a Magnet 817 situated adjacent to the Bump stop 818 or in an alternative position of leverage can be provided between ExoskeletonSegment2 42 and ExoskeletonSegment3 43 to require a substantial initial force to break the magnetic attraction and start to rotate JointCentre2 22; this means that it is much harder to accidentally knock the arm past the vertical such that it then falls under gravity and suffers damage. In an alternative embodiment, the Magnet 817 can serve the dual purpose of bump stop and restraining magnet.

Features and Reduction of Measurement Error

The Manual CMM Arm with Exoskeleton 800 is provided in a number of embodiments including the benefits of means previously disclosed in this invention, including but not limited to: CMM encoders 178 with one, two or more read-heads 186, CMM temperature sensors 180, CMM strain gauges 181, stand 110 and other mounting means, pre-stressed bearings, any type of optical probe, any type of contact probe including a force probe 99, any number of probes, synchronisation, active transmission means, battery and battery recharger means for both the arm and any or all equipment such as probes attached to it and a system architecture of any design enabling the Manual CMM Arm with Exoskeleton System 802 to function.

This Manual CMM Arm with Exoskeleton 800 eighth embodiment reduces the cause of measurement errors in many ways including:

Cause 1 reduction: The Manual CMM Arm with Exoskeleton 810 is designed to be knocked and dropped up to a reasonable level of abuse. The Exoskeleton 801 absorbs the vast majority of the impact with the Internal CMM Arm 5 being shielded by the Exoskeleton 801 and all impact shocks being conducted only via the Transmission Means 10. In the event of being dropped, one of the most likely points to impact is the Probe 90 and further means for reducing this cause of measurement error are disclosed later on in this disclosure.

Cause 2 reduction: The Transmission Means 10 ensure that only optimal supporting forces to counter the gravitational force is applied to the Internal CMM Arm 5 of the Manual CMM Arm with Exoskeleton system 812. In this way, torques applied by the human operator are largely absorbed by the Exoskeleton 801 without being applied across the Internal CMM Arm 5. This includes the case where CMMSegments3,4 33 and 34 are in line and the operator applies a bending moment with his hands across ExoskeletonSegments3-5 43-45 and ExoskeletonJoints34 63-64 which then distort without applying significant bending moments across CMMSegments3-5 33-35 and CMMJoints3-4 53-54 through TransmissionMeans3-5 73-75 because the transmission means have a low stiffness and absorb the distortion without transferring a significant moment;

Cause 3 reduction: The counterbalance torque from the Compensating device 210 is applied through the Exoskeleton 801 without being applied across the Internal CMM Arm 5. This means that there is no moment from the Compensating Device 210 on CMMSegment3 33 that is simply supported. The deflection of CMMSegment3 33 is around 30 times less than for a corresponding Manual CMM Arm in which the counterbalance torque is applied onto CMMSegment3 33. Such Manual CMM Arms with counterbalance torque applied onto CMM Segment3 33 require a stiffer and heavier CMM Segment3 33. Therefore the Manual CMM Arm with Exoskeleton 810 is more accurate and lighter than a Manual CMM Arm with counterbalance torque applied onto CMM Segment3 33.

Cause 4 reduction: The operator's hands hold the Exoskeleton and not the Internal CMM Arm. The Exoskeleton is thermally insulated from the Internal CMM Arm, significantly reducing localised thermal transfer via the Operator's hands.

Cause 5 reduction: There are bump stops on the Exoskeleton such that bump stops on the Internal CMM Arm are not needed. When the operator moves the Manual CMM Arm with Exoskeleton 810 and it hits a bump stop such that the Exoskeleton 801 is rapidly decelerated, the Transmission Means 10 absorb some more of the shock, reducing the deceleration level on the Internal CMM Arm 5.

Cause 6 reduction: There are bump stops on the Exoskeleton such that bump stops on the Internal CMM Arm are not needed. When the operator bends the Manual CMM Arm with Exoskeleton 810 against a bump stop, then the Exoskeleton 801 deflects, absorbing all the bending moment and the Internal CMM Arm 5 receives no bending moment.

Cause 7 reduction: The Internal CMM Arm 5 of the Manual CMM Arm with Exoskeleton 810 can be much lighter than a Manual CMM Arm. This will reduce the measurement errors in its dynamic scanning performance.

Probe and Optical Probe Covers

Figure 81:
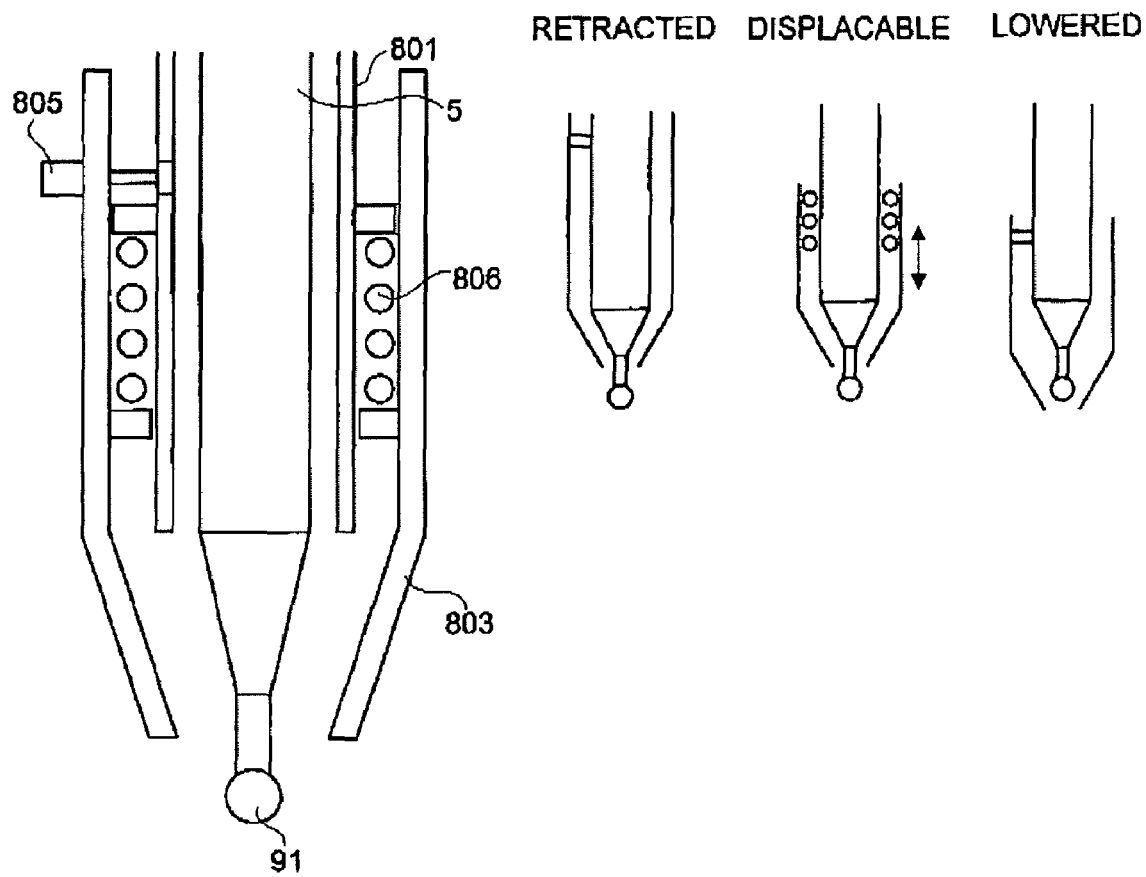

Referring now to FIG. 81, a Probe Cover 803 is attached to the probe end of the Exoskeleton 801. The Probe Cover 803 has three modes of use: lowered, displaceable and retracted. A Probe cover lever 805 is used to move the Probe Cover 803 between the three modes of use. In the lowered mode, the Probe Cover 803 protects the Probe 90 in the event of accidental knock; the lowered mode is the normal mode for transport, assembly in a new location and when using an Optical probe 91. In the displaceable mode, the Probe Cover 803 is displaceable to enable the Probe 90 to carry out contact measurement. The Probe Cover 803 displaces axially upwards against a Probe cover spring 806 such that it is normally in a position that covers the Probe 90 and protects the Probe 90 from lateral knocks. When the Probe 90 is lowered axially onto an Object 9, the Probe cover spring 806 takes some of the weight of the Manual CMM Arm with Exoskeleton 800 and thereby acts as a compensator. In the retracted mode, the Probe Cover 803 is retracted and leaves the Probe 90 completely exposed. The Probe Cover 803 can be used with any type of Probe 90, especially uncompliant or fragile Probes 90, including a Touch Trigger Probe 92 with or without removable styli, a force probe 99 with or without removable styli and a fixed Contact Probe 95. The Probe Cover 803 may be made of most engineering materials but a light and stiff material is preferable. A soft coating such as rubber may be preferred to make it pleasant to hold and move between the three modes. The Probe Cover 803 may be transparent so that the Probe 90 is seen through it.

Cause 8 reduction: The Probe Cover 803 reduces this cause of measurement errors in many ways including: in the lowered mode and for many orientations of the displaceable mode, the Probe Cover 803 absorbs the weight of the Manual CMM Arm with Exoskeleton 810 through the Exoskeleton 801 and protects the Probe 90 from knocks. When measuring in the displaceable mode, a small additional pressure on the Exoskeleton 810 by the operator brings the Probe 90 into contact with the surface of the object 9 under a small contact force; the ideal contact weight is in the range 10-30 g. A Renishaw TP 20 probe is preferred for the Probe 90 although most touch trigger and fixed probes may be used. In the retractable mode, there is no reduction in the measurement error, but the retracted Probe Cover 803 has the advantage that it enables full access of the Manual CMM Arm with Exoskeleton 810 to measure regions difficult to access.

Referring now to FIG. 82A, an Optical Probe Cover 804 is disclosed. The Optical Probe Cover 804 is attached to the Exoskeleton 801 and is arranged so as to protect the Optical Probe 91. The Optical Probe Cover 804 can be held by the operator 11 and does not transmit forces or moments to the Optical Probe 91. The Optical Probe Cover 804 is protective of the Optical Probe 91 in the event of an accidental knock. Referring now to FIG. 82B, the Optical Probe Cover 804 serves a second purpose of being a handle such that the Manual CMM Arm with Exoskeleton 800 can be more easily handled by the Operator 11. Either one of or both of the Optical Probe Cover 804 and the Probe Cover 803 can be provided in the Manual CMM Arm with Exoskeleton 800. The Optical Probe Cover 804 reduces the cause of measurement errors in many ways including:

Cause 9 reduction: The Optical Probe Cover 804 absorbs the weight of the Manual CMM Arm with Exoskeleton 810 and can be handled by the Operator. The Optical Probe 91 receives no forces or moments on it when the Operator handles the Optical Probe Cover 804.

Partial Exoskeleton

In a further embodiment of this eighth embodiment, the Exoskeleton 802 may be a partial exoskeleton with fewer exoskeleton segments than CMM segments. Referring now to FIG. 83A, a Partial Exoskeleton 807 is provided comprising three ExoskeletonSegments1-3 41-43 and two ExoskeletonJoints1-2 61-62. This Partial Exoskeleton 807 has a Compensating device 210 at ExoskeletonJoint2 62 that is preferably a machined spring and is contained within the enclosure of the Partial Exoskeleton 807. This means that a Manual CMM Arm with Exoskeleton 800 in which the exoskeleton is the Partial Exoskeleton 807 has the usability of a counterbalanced arm, the portability advantage of a single enclosure around the lower segments, the Compensating Device not applying a moment through any of CMMSegments1-3 31-33 or CMMJoints1-2 51-52 that provides an accuracy advantage and an aesthetic advantage of fitting neatly and compactly around CMM Segments1-3 31-33. A partial exoskeleton is not limited to the Partial Exoskeleton 807, but may comprise fewer segments and or joints, or more segments and or joints than the Partial Exoskeleton 807. Referring now to FIG. 83B, an Extended Partial Exoskeleton 808 is provided comprising four ExoskeletonSegments1-4 41-44 and two ExoskeletonJoints1-3 61-63. The Extended Partial Exoskeleton 808 supports the Internal CMM Arm 5 closer to CMMJoint4 54 than the Partial Exoskeleton 807. This means that in the Extended Partial Exoskeleton 808 there is less bending moment on CMMSegment4 34 than with the Partial Exoskeleton 807 and there are aesthetic advantages of terminating the Extended Partial Exoskeleton 808 neatly at the elbow. ExoskeletonJoint3 63 has approximately the same joint position as CMMJoint3 53. ExoskeletonJoint3 63 can alternatively be provided closer to the elbow and combined with TransmissionMeans4 74 as a bearing. However, CMMJoint4 54 is exposed to knocks. Referring now to FIG. 83C, a Protective Extended Partial Exoskeleton 809, which is a preferred partial exoskeleton embodiment is provided comprising five ExoskeletonSegments1-5 41-45 and four ExoskeletonJoints1-4 61-64. ExoskeletonSegment5 45 is a short segment covering the elbow and contains a Bumper 819 as a shock absorption element. The Protective Extended Partial Exoskeleton 809 supports the Internal CMM Arm 5 in the same region close to CMMJoint4 54 as the Extended Partial Exoskeleton 808 through TransmissionMeans4 74. The short ExoskeletonSegment5 45 rotates about ExoskeletonJoint4 64. The TransmissionMeans5 75 is provided to minimise any bending moment on CMMSegment5 35. This means that the short ExoskeletonSegment5 45 and especially the Bumper 819 protects CMMJoint4 54 from knocks during usage, from heat transfer from the operator's hand and from abusive usage such as being dropped on its elbow. This partial exoskeleton embodiment is not limited to the embodiments disclosed but can include any arrangement where the number of joints and segments in the Exoskeleton 6 is less than the number of joints and segments in the Internal CMM Arm 5. For example, a Partial Exoskeleton may comprise ExoskeletonSegments1-5, ExoskeletonJoints1-5 and two Transmission Means 10 situated before the elbow CMMJoint4 and before the wrist. CMMJoint6. Such an arrangement has the advantage of simply supporting the two long CMM segments such that the loads on much of the length of the Internal CMM Arm 5 are repeatable wherever the Exoskeleton 6 is held.

Joint Groupings

In a conventional Manual CMM Arm, CMMJoint3 53 is provided adjacent to CMMJoint4 54 rather than adjacent to CMMJoint2 52 so that the operator does not have the inconvenience of holding a rotating segment. Similarly CMMJoint5 55 is provided adjacent to CMMJoint6 56 rather than adjacent to CMMJoint4 54. The conventional Manual CMM Arm CMMJoint layout in CMMJoint groupings at the shoulder-elbow-wrist respectively is referred to as 2-2-2 for a 6-axis arm and 2-2-3 for a 7-axis arm. In any design of Manual CMM Arm, there is an advantage in moving mass closer to the base than the probe end; this means that the arm feels lighter to the user and the user gets less tired. At each joint there is mass from at least bearings and encoder. In the Manual CMM Arm with Exoskeleton 800 or its alternative embodiments with a Partial Exoskeleton 807, Extended Partial Exoskeleton 808 or Protective Extended Partial Exoskeleton 809 or any other type of Partial Exoskeleton, CMMJoint3 53 can be provided adjacent to CMMJoint2 52 rather than adjacent to CMMJoint4 54, as shown in FIG. 83C. The CMMJoint groupings at the shoulder-elbow-wrist respectively is 3-1-2 for a 6-axis arm and 3-1-3 for a 7-axis arm. In the Manual CMM Arm with Exoskeleton 800, CMMJoint5 55 can be provided adjacent to CMMJoint2 52 rather than adjacent to CMMJoint4 54. This means that the CMMJoint groupings at the shoulder-elbow-wrist respectively is 3-2-1 for a 6-axis arm and 3-2-2 for a 7-axis arm. On the same arm, the ExoskeletonJoint groupings at the shoulder-elbow-wrist respectively is 2-2-2 for a 6-axis arm and 2-2-3 for a 7-axis arm. This means that the CMMJoint groupings are different from the ExoskeletonJoint groupings and provides the advantage of a Manual CMM Arm with Exoskeleton 800 that is lighter to use. This Manual CMM Arm with Exoskeleton 800 embodiment and the embodiments with a Partial Exoskeleton 807, Extended Partial Exoskeleton 808 or Protective Extended Partial Exoskeleton 809 or any other type of Partial Exoskeleton can be provided with one Transmission Means per moving segment or can be provided with fewer or more than one Transmission Means per moving segment.

Measuring and Scanning Methods

A measuring method is provided for manual contact measuring with the Manual CMM Arm with Exoskeleton 800 having a hard Contact Probe 95 mounted at the Probe end 3, without the operator needing to hold the Internal CMM Arm 5 or the Contact Probe 95. Referring now to FIG. 83D, in a first step 881, the operator grasps the Exoskeleton 801 of the Manual CMM Arm with Exoskeleton 800 and moves it so that the Contact Probe 95 makes contact with an object 9 in a desired location. In step 882, the operator depresses an Operator button 183 to trigger a measurement. In step 883, the Manual CMM Arm with Exoskeleton system 802 responds to the button trigger signal and generates the position and/or orientation of the contact probe 95.

A measuring method is provided for automatic contact measuring with the Manual CMM Arm with Exoskeleton 800 having a Force Probe 99 mounted at the Probe end 3, without the operator needing to hold the Internal CMM Arm 5 or the Force Probe 99. Referring now to FIG. 83E, in a first step 891, the operator grasps the Exoskeleton 801 of the Manual CMM Arm with Exoskeleton 800 and moves it so that the Force Probe 99 makes contact with an object 9 in a desired location. In step 892, the Force Probe 99 senses the contact of step 881 and automatically triggers the Manual CMM Arm with Exoskeleton system 802. In step 893, the Manual CMM Arm with Exoskeleton system 802 responds to the signal and generates the position and or orientation of the Force Probe 99. This method is applicable when using a Touch Trigger Probe 92 instead of the Force Probe 99. A further advantage of this method is that the operator does not need to press a button to take a point.

A non-contact scanning method is provided with the Manual CMM Arm with Exoskeleton 800 having an Optical Probe 91 mounted at the Probe end 3, without the operator needing to hold the Internal CMM Arm 5 or the Optical Probe 91. Referring now to FIG. 83F, in a first step 901, the operator grasps the Exoskeleton 801 of the Manual CMM Arm with Exoskeleton 800 and moves it so that the surface of an object 9 in a desired region is within the measuring range of the Optical Probe 91. In step 902, the operator depresses an Operator button 183 on the Manual CMM Arm with Exoskeleton 800. In step 903, the Manual CMM Arm with Exoskeleton system 802 responds to the signal and starts scanning. In step 904, the operator moves the Manual CMM Arm with Exoskeleton 800 with respect to the object 9 such that the surface of the object 9 stays within the measuring range of the Optical probe 91. In step 905, the operator depresses an Operator button 183 on the Manual CMM Arm with Exoskeleton 800. In step 906, the Manual CMM Arm with Exoskeleton system 802 responds to the signal and stops scanning.

A contact scanning method is provided with the Manual CMM Arm with Exoskeleton 800 having a Force Probe 99 with automatic scanning capability such as the Renishaw MSP-3 mounted at the Probe end 3, without the operator needing to hold the Internal CMM Arm 5 or the Force Probe 99. Referring now to FIG. 83G, in a first step 911, the operator grasps the Exoskeleton 801 of the Manual CMM Arm with Exoskeleton 800 and moves it so that the Force Probe 99 makes contact with an object 9 in a desired region and leaves it there for a minimum period of time T. In step 912, the Force Probe 99 senses the contact of step 911 for longer than a minimum period of time T and automatically starts scanning. In step 913, the operator moves the Manual CMM Arm with Exoskeleton 800 with respect to the object 9 such that the Force Probe 99 remains in contact with the surface of the object 9 whilst the Force Probe 99 continues to scan. In step 914, the operator moves the Manual CMM Arm with Exoskeleton 800 away from the object 9 such that the Force Probe 99 loses contact with the surface of the object 9. In step 915, the Force Probe 99 senses the loss of contact of step 914 and automatically stops scanning. A further advantage of this method is that the operator does not need to press a button during the scanning process.

Automatic Calibration of Manual CMM Arm

A novel robot calibration apparatus is provided for the automated calibration of a Manual CMM Arm so as to remove human error from the calibration process and provide the benefits such as repeatability and cost saving associated with automation.

In a modular embodiment of the novel robot calibration apparatus, drive units are temporarily fitted to a Manual CMM Arm with Exoskeleton 800. Referring now to FIG. 83H, a Modular Robot calibration rig 920 comprises seven Drive unit modules 921 connected to a Control box 159 with seven Cables 922. The Drive units 921 are assembled onto a Manual CMM Arm with Exoskeleton 800 in a quick-fit process. The Drive units 921 drive the Exoskeleton 801 such that no forces and moments are applied to the Internal CMM Arm 5. The Exoskeleton 801 is provided at each joint with at least two clamping Flanges 923, one Flange 923 attached to each segment adjacent to the joint capable of receiving and distributing torque from the Drive unit module 921 through the adjacent Exoskeleton segments. The combined Manual CMM Arm with Exoskeleton 800 and Modular Robot calibration rig 920 is in effect a temporary embodiment of a Robot CMM Arm 1. The preferred number of axes is 6 or 7 but any other number of axes may be provided. The combined Manual CMM Arm with Exoskeleton 800 and Modular Robot calibration rig 920 can automatically carry out a calibration process such as those previously disclosed for calibrating a Robot CMM Arm 1.

In an alternative temporary Robot CMM Arm embodiment of the novel robot calibration apparatus, an Internal CMM Arm 5 is manipulated by an Exoskeleton 6 with automated drives for automatically calibrating the Internal CMM Arm 5. In this way, the apparatus is temporarily a Robot CMM Arm 1 for the purpose of calibration.

A method is provided for calibrating a Manual CMM Arm with Exoskeleton 800 using any of the above embodiments of the novel robot calibration apparatus. In an optional first step, the manual Exoskeleton 6 is removed from the Internal CMM Arm 5; this step is not necessary if the Internal CMM Arm 5 has just been manufactured and has not yet had a manual Exoskeleton 6 fitted to it. In a second step, a robot Exoskeleton 6 is attached to the Internal CMM Arm 5. Attachment may be by any of the disclosed processes such as 'clad', 'sock or 'insert' or any other attachment process. In a third step, calibration is automatically performed by any of the methods previously discussed. In a fourth step, the robot Exoskeleton 6 is removed from the calibrated Internal CMM Arm 5. In a fourth step, a manual Exoskeleton 6 is attached to the calibrated Internal CMM Arm 5 resulting in a calibrated Manual CMM Arm with Exoskeleton 800. Attachment may be by any of the disclosed processes such as 'clad', 'sock or 'insert' or any other attachment process.

In a preferred external embodiment of the novel robot calibration apparatus, a Manual CMM Arm is clad with a robot Exoskeleton. Referring now to FIG. 83I, an External Robot Calibration Rig 930 comprises a Manual CMM Arm with Exoskeleton 800 and a robot Exoskeleton 6 supporting the existing Exoskeleton 6 of the Manual CMM Arm with Exoskeleton 800 through further Transmission Means 10. the robot Exoskeleton 6 is connected to a Control box 159 with a cable 922. A distinctive feature of this embodiment is that the Internal CMM Arm 5 has two exoskeletons: an intermediate manual Exoskeleton 6 and an external robot Exoskeleton 6. In this embodiment relatively few robot Transmission Means are required to support the Manual CMM Arm with Exoskeleton 800 since the manual Exoskeleton 6 already optimally supports the Internal CMM Arm 5 and the robot Transmission Means need only hold a 6-axis or 7-axis Manual CMM Arm with Exoskeleton 800 in a minimum of two positions in order to move it to any orientation. As already discussed a minimum of 3 or 4 positions are preferred in order to reduce drive system bulk.

A combined Manual CMM Arm with Exoskeleton 800 with robot Exoskeleton 6 can automatically carry out a calibration process such as those previously disclosed for calibrating the first embodiment of a Robot CMM Arm 1 that may include additional axes, additional artifacts, a large number of measurement points and a large number of spatial orientations. This integrated embodiment of the novel robot calibration apparatus can also be used for calibrating a conventional Manual CMM Arm without Exoskeleton 790.

In an alternative hybrid embodiment of the novel robot calibration apparatus, the novel robot calibration apparatus comprises part-robot exoskeleton and part modular drive units and is provided for automatically calibrating a Manual CMM Arm with Partial Exoskeleton 807, Extended Partial Exoskeleton 808 or Protective Extended Partial Exoskeleton 809. The lower joints with an exoskeleton are driven with Drive units 921 and the upper units without an exoskeleton are driven with a partial Exoskeleton 6.

A further method is provided for calibrating a Manual CMM Arm using any of the above embodiments of the novel robot calibration apparatus without needing to disassemble the Manual CMM Arm. This further method is applicable to calibrating any of a Manual CMM Arm with Exoskeleton 800, a conventional Manual CMM Arm without Exoskeleton 790, a Manual CMM Arm with Partial Exoskeleton 807, a Manual CMM Arm with Extended Partial Exoskeleton 808 and a Manual CMM Arm with Protective Extended Partial Exoskeleton 809. In a first step, drive apparatus is attached to the Manual CMM Arm. Attachment may be by any or any combination of the disclosed processes such as 'module attachment', 'clad', 'sock or 'insert' or any other attachment process. In a second step, calibration is automatically performed by any of the methods previously discussed. In a third step, the drive apparatus is removed from the calibrated Manual CMM Arm. This further method has the advantage of not needing the steps of disassembly and reassembly of the Manual CMM Arm.

Advantages of automatically calibrating a Manual CMM Arm with Exoskeleton 800 or an Internal CMM Arm 5 using any of the above embodiments of the novel robot calibration apparatus:

- No manual work except for attaching and detaching the drive apparatus; this saves costs
- No human error; this improves accuracy
- Faster rate of capture in calibration points per second
- The calibration process can run over a longer period of time than with the equivalent manual process since a human operator gets tired and a robot driven apparatus can operate tirelessly
- A lot more calibration points can be taken than with the equivalent manual process; this improves accuracy In all cases, the Manual CMM Arm with Exoskeleton 800 or the Manual CMM Arm without Exoskeleton 790 will need to be designed taking into consideration the need for attaching apparatus for automated calibration. In particular, the Internal CMM Arm 5 will need to be robust enough such that its calibration is accurate whether it has a manual Exoskeleton 5 or a robot Exoskeleton 6. It is preferred that the Internal CMM Arm 5 are supported with the same locations and types of Transmission Means 10 for both manual and robot Exoskeletons 6. This invention is not limited to the embodiments discussed but includes all methods of automated manipulation of a Manual CMM Arm or Internal CMM Arm for the purpose of calibration.

Transportation Case

The Manual CMM Arm with Exoskeleton 800 is portable and will often be transported in a transportation case. The only direct connection of the Internal CMM Arm 5 with the transportation case is through the Base 4. In all other places, the Internal CMM Arm 5 is insulated from shock and vibration by the TransmissionMeans 10, that are designed to absorb noise and vibration. A large proportion of the mass of the Manual CMM Arm with Exoskeleton 800 is in a high density Base 4 and has little surface area of contact with the foam in a transportation case. A large proportion of the surface area of contact of the Manual CMM Arm with Exoskeleton 800 is the surface of the Exoskeleton 801 the corresponding mass and volume of which is low density compared to the base. In a shock situation where there is a disparity of acceleration between the transportation case and the Manual CMM Arm with Exoskeleton 800, the force density from the shock is low around the surface of the Exoskeleton 801 and the force density from the shock is high around the surface of the Base 4. The force density from the shock could be an order of 5-100 times higher around the surface of the Base 4 than the surface of the Exoskeleton 801. During an impact, the foam around the Base 4 can compress 5-100 times more than the foam around the surface of the Exoskeleton 801. This compression ratio relates to the different mass to surface area ratios of the Base 4 and the Exoskeleton 801 in each direction of impact force. There are two different decelerations for the Base 4 and the Exoskeleton 801. The two different decelerations result in shock forces and moments internally to the Manual CMM Arm with Exoskeleton 800 which could cause it damage. In the situation where the shock is longitudinally down the transportation case and the Base 4 of the Manual CMM Arm with Exoskeleton 800 is higher than ExoskeletonJoint4 64, such as when the transportation case is dropped on its end, the mass of the Base 4 will accelerate and create a significant compressive force on ExoskeletonSegments24 32-34 between the Base 4 and the ExoskeletonJoint4 64. In the situation where the shock is transversely across the transportation case and the Manual CMM Arm with Exoskeleton 800 is approximately horizontal, such as when the transportation case is dropped on its base, the mass of the Base 4 will displace further downwards than the Exoskeleton 801 and create a significant bending moment on the ExoskeletonSegments2-3 32-33 in the region after the Base 4 meets the ExoskeletonSegments2 32.

Referring now to FIG. 84, a Transportation case 830 for a Manual CMM Arm with Exoskeleton 800 is disclosed that reduces the shock and vibration suffered by the Internal CMM Arm 5 during transportation. The Transportation case 830 has an upper and lower half attached by a Hinge 836 along the long side of the Transportation case 830. The Transportation case 830 is filled with a Packing material 831 such as foam. There are two Arm cutouts 837 in the Packing material 831. The Arm cutouts 837 are precise and the Packing material 831 makes contact with the Manual CMM Arm with Exoskeleton 800 without air gaps except where there are Cut-aways 832 in the Packing material 831. In this embodiment of this invention, a light and stiff Spreader form 833 is provided that provides significant increased surface area of contact with the Packing material 831 in the directions that are needed. The Base 4 of the Manual CMM Arm with Exoskeleton 800 is attached to the Spreader form 833 with fixings such as Bolts 838 before, during or after the placement of the Manual CMM Arm with Exoskeleton 800 in the Transportation case 830. The Spreader form 833 has significant surface area in contact with the Packing material 831 in all directions. In one preferred embodiment, the surface area of the Spreader form 833 is situated largely on 3 orthogonal planes. The integral of the surface area of the Spreader form 833 in any direction is optimised to minimise damaging forces and moments on the Manual CMM Arm with Exoskeleton 800 due to disparate local deflection of the Packing material 831. The centre of area of the Spreader form 833 in any direction passes approximately through the centre of mass Cg of the Base 4 of the Manual CMM Arm with Exoskeleton 800. This means that under shock, little or no rotational inertia in the base is generated due to the centre of mass Cg of the Base 4 and the centre of area of the Spreader form 833 being significantly unaligned. In alternative embodiments of Spreader form 833, other shapes of Spreader form 833 may be used where (a) disparate local deflection of the Packing material 831 is minimised, and (b) the centre of area of the Spreader form 833 in any direction passes approximately through the centre of mass Cg of the Base 4. In this way the directional force density of a shock on the Transportation case 830 is the same on the rigidly attached Spreader plate 833/Base 4 and the Exoskeleton 801. In the supporting area around the probe end 3, the packing material 831 may be cut away such that none of the CMMSegment 8 38, probe end 3 or probe 90 contacts the packing material 831 since the CMMSegment 8 38, probe end 3 and probe 90 if in situ are supported by TransmissionMeans 10. Further optimisations may be made by providing cut-aways 832 of the packing material 831 from contact with the Exoskeleton 801 in one or more locations. Optionally, localised volumes of lower-elasticity packing material 834 may be provided at locations in contact with the Manual CMM Arm with Exoskeleton 800 with lower elasticity than the main body of packing material 831. Optionally, localised volumes of higher-elasticity packing material 835 may be provided at locations in contact with the Manual CMM Arm with Exoskeleton 800 with greater elasticity than the main body of packing material 831. 3D CAD analysis software for modelling inertias under shock conditions may be used by a person skilled in the art to optimise a combination of one or more of Spreader Plate 833, cut-aways 832, localised volumes of lower-elasticity packing material 834 and localised volumes of higher-elasticity packing material 835. In order to minimise the size of the Transportation case 830, the two long segments of the Manual CMM Arm with Exoskeleton 800 will be either parallel or near to parallel when the Manual CMM Arm with Exoskeleton 800 lies in the Transportation case 830. The shape and position of the Spreader Form 833, Cut-aways 832, localised volumes of lower-elasticity packing material 834 and localised volumes of higher-elasticity packing material 835 are optimised for the situations of longitudinal and transverse shock. The external Shell 839 of the Transportation case 830 is made of a suitable material such as ultra-high molecular weight polyethylene and provided with shape features such as ribs to absorb shock and vibration. The overall shape is not limited to six orthogonal sides, but may have any number of sides or sides with complex curved shapes. The size and shape of the Shell 839 together with the location and layout of the Manual CMM Arm with Exoskeleton 800 within the Transportation case 830 defines the distance between the Shell 839 and the Manual CMM Arm with Exoskeleton 800 at any point. The size and shape of the Shell 839 is optimised to harmonise the deflection of the Packing material 831 for shocks in all directions. Means such as tongue and groove edges and neoprene gaskets are provided for keeping out moisture. Heavy duty latches are provided for provided for. Cause 10 reduction: The Transportation case 830 greatly reduces the forces and moments on the Manual CMM Arm with Exoskeleton 800 resulting from shocks to the Transportation case 830 during transportation by achieving a uniform force density during shock.

Ninth Embodiment

Manual CMM Arm with Holding Exoskeleton

In a further embodiment of the Manual CMM Arm with Exoskeleton, Holding means 811 are provided. Referring now to FIG. 85, a Manual CMM Arm with Holding Exoskeleton system 812 has holding means such as a Brake 811 provided at ExoskeletonJoints1-4 61-64 of the Manual CMM Arm with Holding Exoskeleton 810. The holding means is preferably a Brake 811 that is an electromagnetic brake operating on a Disk 813, but the holding means can hold the arm by any means including:
- a manually operable mechanical connection;
- a force actuated mechanical connection;
- a brake utilising any force including electromagnetic, pneumatic and hydraulic forces;
- a clutch utilising any force including electromagnetic, pneumatic and hydraulic forces.

The Brake 811 can be actuated when the exoskeleton joint is stationary. Alternatively, the Brake 811 can be actuated when the exoskeleton joint is moving and is then braked until the exoskeleton joint is stationary at which point it is held. The Brake 811 can be applied to more or less Exoskeleton joints than ExoskeletonJoints1-4 61-64. The Brake 811 applies to the Exoskeleton 801 and not to the Internal CMM Arm 5. This means that there are no moments across the joints of the Internal CMM Arm 5 resulting from the application of the Brakes 811 and that the Manual CMM Arm with Holding Exoskeleton 810 is more accurate than an equivalent Manual CMM Arm with holding means but without an Exoskeleton 801. The Brake 811 can be activated by the operator using a switch with wired or remote wireless transmission. Different switches can activate different combinations of Brakes 811. In the case of electric power failure, Brakes8 11 using electrical actuation can be implemented so as to brake at loss of electric power and prevent the Manual CMM Arm with Holding Exoskeleton 810 falling under gravity. In an alternative embodiment, gearing can be provided between the Brake 811 and an Exoskeleton Joint to reduce the braking torque required and hence the weight of the brakes; this has a disadvantage of increasing the manual work required to move the Manual CMM Arm with Holding Exoskeleton 810.

Tenth Embodiment

Manual CMM Arm with Endoskeleton

In this tenth embodiment, a Manual CMM Arm with Endoskeleton is provided. Referring now to FIG. 86A, a Manual CMM Arm with no support is shown with a vertical base axis and CMMSegment3 33 in a horizontal spatial orientation that is one embodiment of the state of the art of Manual CMM arms. In this horizontal spatial orientation, CMMSegment3 33 is supported at CMMJoint2 52 with Force Fn1. An internal Compensating device 210 is provided at CMMJoint2 52 that provides a counterbalance moment Mn on CMMSegment3 33 to compensate for the force Fn2 of the weight of the rest of the Manual CMM Arm after CMMJoint3 53. In the state of the art, CMMSegment3 33 is subject to a large bending moment Mn of the order of 10 Nm in the horizontal spatial orientation shown. This results in a significant bending of CMMSegment3 33 and a deflection. The deflection cannot be measured by the CMMEncoders 178 and results in a loss of measurement accuracy. The deflection can be minimised by making CMMSegment3 33 stiffer, but the cost is an increase in weight and or section size of CMMSegment3 33. Referring now to FIG. 86B, a Manual CMM Arm with Exoskeleton 800 is provided and is also shown with a vertical base axis and CMMSegment3 33 in a horizontal spatial orientation. CMMSegment3 33 is simply supported with Forces Fx1 at CMMJoint2 52 and Fx2 at TransmissionMeans3 73. Any deflection in CMMSegment3 33 is due to either the force of gravity or the rest of the weight of the InternalCMMArm 5. For the Manual CMM Arm with Exoskeleton 800 invention, the deflection of CMMSegment3 33 is at least 30 times smaller than for the state of the art Manual CMM Arm of FIG. 86A. Referring now to FIG. 86C, a Manual CMM Arm with Endoskeleton 840 is disclosed. The External CMM Arm 841 is external to the Endoskeleton 842. The EndoskeletonSegments1-3 41-43 are arranged internal to the External CMM Arm 841. The Endoskeleton 842 further comprises EndoskeletonJoints1-2 61-62. The Endoskeleton 842 is rigidly attached to the Base 4 and supports the External CMM Arm 841 with TransmissionMeans3 73 at the far end of CMMSegment3 33. There are no other significant force transferring contacts between the Endoskeleton 842 and the External CMM Arm 841. The EndoskeletonJoint2 62 has a Compensating device 210 attached to it which is preferably a machined spring but could be any other type of compensating device; the compensating device can also be provided with a Damper 211. The EndoskeletonSegments1-3 4143 exhibit significant deflections which can be of the order of several mms. These deflections are not important provided a deflected Endoskeleton segment does not contact the inside of an External CMM Arm segment. It should be noted that due to the deflections, the EndoskeletonJoints1,2 61,62 may move significantly relative to the Base 4 during use in which the spatial orientation of the arm changes. CMMSegment3 33 is simply supported with Forces Fd1 at CMMJoint2 52 and Fd2 at TransmissionMeans3 73. Any deflection in CMMSegment3 33 in the Manual CMM Arm with Endoskeleton 840 is due to either the force of gravity or the rest of the weight of the ExternalCMMArm 841. For the Manual CMM Arm with Endoskeleton 840 invention, the deflection of CMMSegment3 33 is at least 30 times smaller than for the state of the art Manual CMM Arm of FIG. 86A. It will be understood that based on the total disclosure in this specification, a Manual CMM Arm with Endoskeleton 840 can be provided by those skilled in the art.

In a further embodiment of this tenth embodiment, the Endoskeleton 842 is shorter comprising two endoskeleton segments instead of three and is attached at one end to CMMSegment2 22 instead of to the Base 4. It also supports the far end of CMMSegment3 33 with TransmissionMeans3 73. This shorter embodiment of Endoskeleton 842 comprises one joint instead of two: EndoskeletonJoint2 62.

Eleventh Embodiment

Robot CMM Arm with Endoskeleton

In this eleventh embodiment, a Robot CMM Arm with Endoskeleton is provided. This Robot CMM Arm with Endoskeleton embodiment comprises an External CMM Arm guided by an internal Endoskeleton. The Endoskeleton supports and manipulates the External CMM Arm via transmission means such that it can measure accurately. This invention can be embodied in many Robot CMM Arm with Endoskeleton articulated arm layouts. There are two preferable layouts for a Robot CMM Arm with Endoskeleton in accordance with an eleventh embodiment of the present invention: 6-axis with 6 joints and 7-axis with 7 joints. The Robot CMM Arm with Endoskeleton may be portable or be for use in a fixed installation. This eleventh embodiment is in effect the inverse of the first embodiment of the present invention.

Referring now to FIG. 87, a Robot CMM Arm with Endoskeleton 850 comprises an External CMM Arm 841 and an Internal Endoskeleton 851. It will be understood that based on the total disclosure in this specification and particularly the disclosure of the first embodiment, a Robot CMM Arm with Endoskeleton can be provided by those skilled in the art.

Further Embodiments

This CMM Arm with Exoskeleton invention is not limited to the devices of the disclosed embodiments but can include any form of CMM Arm with Exoskeleton device:
for applications in which the reach of the CMM Arm with Exoskeleton ranges from very short to very long,
for applications in which the payload varies from tens of grammes up to hundreds of kilogrammes,
for applications in which accuracy ranges from the accuracy of the most accurate of today's industrial robots through to the accuracy of today's conventional CMM machines,
for applications located on earth and in lower gravity environments such as space,
for applications in which it is preferable to have an Endoskeleton support with an external CMM arm,
for applications in which the object being measured can be moved in six degrees of freedom at any time during or between measurements and that the CMM Arm with Exoskeleton and the object can be each moving in six degrees of freedom simultaneously, during or between measurements.

The invention claimed is:

1. An apparatus for measurement of an object comprising:
(a) a robot CMM Arm comprising:
a movable member having a base end, an opposing probe end and three or more segments separated by two or more rotational axes of movement between said base end and said probe end wherein at least two of the said rotational axes of movement are not parallel;
a continuous movable position reporting device having a base end, an opposing probe end and three or more stiff segments connected in tandem by mechanical joints separated by two or more rotational axes of movement between said base end and said probe end wherein at least two of the said rotational axes of movement are not parallel; and
a transmission in contact with both said movable member and said movable position reporting device, wherein the contact of said transmission with said movable member is located anywhere between said probe end and the rotational axis of movement closest to said base end; such that movement of said movable member causes movement of said movable position reporting device;
wherein said transmission comprises a plurality of discrete transmissions and at least one of said discrete transmissions is not rigid; and
(b) a movable structure configured to translate and/or orientate the robot CMM Arm, wherein the robot CMM Arm is mounted on the movable structure, and/or
(c) an object displacing means configured to translate and/or orientate the object being measured.

2. The apparatus according to claim 1, wherein the movable structure is configured to translate or orientate the robot CMM Arm in six degrees of freedom.

3. The apparatus according to claim 1, wherein the movable structure comprises a rail axis wherein the base end of the robot CMM Arm is mounted thereon such that the robot CMM Arm is traversable along the rail axes.

4. The apparatus according to claim 3, wherein the number of rail axes is two, one Robot CMM Arm is mounted on each rail axis, and the rail axes are arranged parallel and opposite each other.

5. The apparatus according to claim 3, wherein the number of Robot CMM Arms is two, both of which are mounted on a single rail axis and are configured to move independently.

6. The apparatus according to claim 3, wherein the number of Robot CMM Arms is four, the number of rail axes is two, and two Robot CMM Arms are mounted on each single rail axis and are configured to move independently.

7. The apparatus according to claim 3, wherein the base of the Robot CMM Arm is mounted on a vertical axis that can move the Robot CMM Arm vertically upwards and downwards and the vertical axis are configured to move along the rail axis.

8. The apparatus according to claim 3, wherein the number of Robot CMM Arms is two, both of which are mounted on a movable multiple arm base that moves on a single rail axis, wherein the two Robot CMM Arms are separated by a suitable distance S such that the working overlap is sufficient to eliminate unreachable gaps between the robots in the working volume.

9. The apparatus according to claim 3, wherein the rail axis is linear.

10. The apparatus according to claim 3, wherein the rail axis is mounted above a floor such that it can be removed and reinstalled in a different location.

11. The apparatus according to claim 3, wherein the rail axis is permanently embedded in a floor.

12. The apparatus according to claim 3, wherein the rail axis is manually driven, motor driven in response to manual actuation, or CNC driven.

13. The apparatus according to claim 3, wherein the robot CMM arm is configured not to measure whilst it is translating along the rail axis.

14. The apparatus according to claim 1, wherein the movable structure comprises a floor mounted bridge traversing over a work area on which an object to be measured is situated.

15. The apparatus according to claim 1, wherein the movable structure is configured such that it can move any time during or between measurements by the robot CMM Arm.

16. The apparatus according to claim 1, wherein the movable structure is configured to measure the position and optionally the orientation of the robot CMM Arm mounted thereon.

17. The apparatus according to claim 16, wherein the movable structure is a conventional CMM.

18. The apparatus according to claim 16, wherein the CMM is a 3-axis CMM.

19. The apparatus according to claim 1, wherein the object displacing means is configured to measure the position and optionally the orientation of the object mounted thereon.

20. The apparatus according to claim 19, wherein the object displacing means comprises a rotary table equipped with an angular position recording device for rotating an object to be measured.

21. The apparatus according to claim 19, wherein the object displacing means comprises a linear table equipped with a position reporting device for linearly displacing an object to be measured.

22. The apparatus according to claim 1, configured to move both the Robot CMM Arm and the object simultaneously whilst measurement is being performed.

23. The apparatus according to claim 1, configured to move only the object whilst measurement is being performed.

24. The apparatus according to claim 1, configured to move only the Robot CMM Arm whilst measurement is being performed.

25. A method for the measurement of an object using an apparatus according to claim 1 wherein the moving structure and/or object displacing means are moved during or between measurements.

26. The method according to claim 25, comprising the steps of:
   a) mounting the object to be measured on the object displacing means;
   b) measuring the object while the Robot CMM Arm is stationary and the object is moving; and
   c) thereby obtaining a measurement of the object.

27. The method according to claim 25, comprising the steps of:
   a) mounting the object to be measured on the object displacing means;
   b) measuring the object while the both Robot Arm and the object move simultaneously;
   c) transforming the co-ordinate systems of the object displacing means and the moveable structure to a common co-ordinate system; and
   d) thereby obtaining a measurement of the object.

28. The method according to claim 25, comprising the steps of:
   a) mounting the object to be measured on the object displacing means;
   b) measuring the object while the Robot Arm moves and the object is stationary; and
   c) thereby obtaining a measurement of the object.

* * * * *